United States Patent
Pena et al.

(10) Patent No.: US 11,641,439 B2
(45) Date of Patent: *May 2, 2023

(54) REAL TIME VIDEO SPECIAL EFFECTS SYSTEM AND METHOD

(71) Applicants: Henry M. Pena, Round Rock, TX (US); Thomas F. Bryant, III, Round Rock, TX (US)

(72) Inventors: Henry M. Pena, Round Rock, TX (US); Thomas F. Bryant, III, Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/996,711

(22) Filed: Aug. 18, 2020

(65) Prior Publication Data

US 2020/0382723 A1  Dec. 3, 2020

Related U.S. Application Data

(63) Continuation-in-part of application No. 16/793,747, filed on Feb. 18, 2020, now Pat. No. 11,218,646, (Continued)

(51) Int. Cl.
*H04N 5/262* (2006.01)
*H04N 5/232* (2006.01)
(Continued)

(52) U.S. Cl.
CPC ............ *H04N 5/2621* (2013.01); *G06F 3/017* (2013.01); *G06F 3/0485* (2013.01); *H04N 5/232935* (2018.08); *H04N 5/783* (2013.01)

(58) Field of Classification Search
CPC ............ H04N 5/2621; H04N 5/232935; H04N 5/783; H04N 5/23267; H04N 5/232933;
(Continued)

(56) References Cited

U.S. PATENT DOCUMENTS 1,042,012 A  10/1912  Leuthesser
1,132,015 A  3/1915  Jacobus
(Continued)

FOREIGN PATENT DOCUMENTS

AU  2014259879 A1  11/2015
EP  1531474 A1  5/2005
(Continued)

OTHER PUBLICATIONS

Henry M. Pena et al., Real Time Video Special Effects System and Method, U.S. Appl. No. 16/173,033, filed Oct. 29, 2018.
(Continued)

*Primary Examiner* — Antoinette T Spinks
(74) *Attorney, Agent, or Firm* — Franklin & Associates International Inc; Matthew F. Lambrinos

(57) ABSTRACT

A user interface system and method of recording/editing a video while applying special effects in real time. The interface can be associated with an electronic device including a processor in communication with a camera and a memory unit, or can receive previously prepared video. A first speed rate of the video can be changed by modifying a frame in the video data to create a different modified video data at a modified speed rate that. This allows for continuous recording and/or displaying of video at different speed rates without altering operations or settings. The interface can include time guidelines associated with selectable speed rates, to display which speed rate setting is near a touching finger or pointing device. The guidelines can be activated automatically or can change color, shape, intensity or other property based on finger location, and can aid in object positioning in a field-of-view.

53 Claims, 81 Drawing Sheets

Related U.S. Application Data which is a continuation-in-part of application No. 16/456,639, filed on Jun. 28, 2019, now Pat. No. 10,863,109, which is a continuation of application No. 16/173,066, filed on Oct. 29, 2018, now Pat. No. 10,404,923, said application No. 16/793,747 is a continuation-in-part of application No. 16/456,589, filed on Jun. 28, 2019, now Pat. No. 10,755,743, which is a continuation of application No. 16/173,033, filed on Oct. 29, 2018, now Pat. No. 10,388,322, application No. 16/996,711 is a continuation-in-part of application No. 16/456,639, filed on Jun. 28, 2019, now Pat. No. 10,863,109, which is a continuation of application No. 16/173,066, filed on Oct. 29, 2018, now Pat. No. 10,404,923, application No. 16/996,711 is a continuation-in-part of application No. 16/456,589, filed on Jun. 28, 2019, now Pat. No. 10,755,743, which is a continuation of application No. 16/173,033, filed on Oct. 29, 2018, now Pat. No. 10,388,322, application No. 16/996,711 is a continuation-in-part of application No. 16/936,350, filed on Jul. 22, 2020, now Pat. No. 11,367,465, which is a continuation of application No. 16/456,589, filed on Jun. 28, 2019, now Pat. No. 10,755,743, which is a continuation of application No. 16/173,033, filed on Oct. 29, 2018, now Pat. No. 10,388,322.

(51) Int. Cl.
   *H04N 5/783* (2006.01)
   *G06F 3/01* (2006.01)
   *G06F 3/0485* (2022.01)

(58) Field of Classification Search
   CPC ...... H04N 5/77; H04N 9/8042; H04N 9/8205; G06F 3/017; G06F 3/0485; G06F 3/0484; G06F 3/04847; G06F 3/0488; G06F 3/04883; G11B 27/005; G11B 27/34
   See application file for complete search history.

(56) References Cited

U.S. PATENT DOCUMENTS

| | | |
|---|---|---|
| 1,162,014 A | 11/1915 | Arrighi |
| 3,282,003 A | 11/1966 | Swift, Jr. |
| 4,282,011 A | 8/1981 | Terpay |
| 4,302,013 A | 11/1981 | Kavis |
| 5,182,005 A | 1/1993 | Schwiegk et al. |
| 5,192,005 A | 3/1993 | Zimmerman |
| 6,132,013 A | 10/2000 | Ganzel |
| 6,302,014 B1 | 10/2001 | Kuan |
| 6,424,789 B1 | 7/2002 | Abdel-Mottaleb |
| 6,546,188 B1 | 4/2003 | Ishii et al. |
| 6,590,586 B1 | 7/2003 | Swenton-Wall et al. |
| 7,102,014 B2 | 9/2006 | Weber et al. |
| 7,136,093 B1* | 11/2006 | Itoh ............... G06F 16/9537 348/207.11 |
| 7,142,016 B2 | 11/2006 | Kim |
| 7,152,209 B2 | 12/2006 | Jojic et al. |
| 8,122,378 B2 | 2/2012 | Ciudad et al. |
| 8,132,012 B2 | 3/2012 | Labaton |
| 8,202,013 B2 | 6/2012 | Kubota |
| 8,249,299 B1 | 8/2012 | Dhawan et al. |
| 8,292,017 B2 | 10/2012 | Inoue et al. |
| 8,515,241 B2 | 8/2013 | Forsyth et al. |
| 8,934,762 B2 | 1/2015 | Schmit et al. |
| 9,077,957 B2 | 7/2015 | Kano |
| 9,208,819 B1 | 12/2015 | Gregg et al. |
| 9,302,004 B2 | 4/2016 | Baumler et al. |
| 9,749,676 B2 | 8/2017 | Sood et al. |
| 9,756,091 B1 | 9/2017 | Davies |
| 10,098,204 B1 | 10/2018 | Byers et al. |
| 10,252,016 B2 | 4/2019 | Pedro et al. |
| 10,272,009 B2 | 4/2019 | Schem |
| 10,388,322 B1 | 8/2019 | Pena et al. |
| 10,404,923 B1 | 9/2019 | Pena |
| 10,534,525 B1 | 1/2020 | Suchland |
| 10,558,354 B2* | 2/2020 | Lee ............... G06F 3/04883 |
| 10,732,830 B2* | 8/2020 | Kato ............... G06F 3/04883 |
| 10,734,025 B2 | 8/2020 | Bradley et al. |
| 10,755,743 B2 | 8/2020 | Pena et al. |
| 10,771,736 B2 | 9/2020 | Inkpen et al. |
| 10,863,109 B2 | 12/2020 | Pena et al. |
| 11,044,420 B2 | 6/2021 | Pena et al. |
| 11,218,646 B2 | 4/2022 | Pena et al. |
| 11,367,465 B2 | 6/2022 | Pena et al. |
| 2003/0052909 A1 | 3/2003 | Mo et al. |
| 2004/0189691 A1 | 9/2004 | Jojic et al. |
| 2005/0053356 A1 | 3/2005 | Mate et al. |
| 2005/0108765 A1* | 5/2005 | Barletta ............... G11B 27/005 725/90 |
| 2006/0277454 A1 | 12/2006 | Chen |
| 2007/0074115 A1 | 3/2007 | Patten et al. |
| 2008/0307307 A1 | 2/2008 | Ciudad et al. |
| 2008/0184121 A1 | 7/2008 | Kulas |
| 2009/0058842 A1 | 3/2009 | Bull et al. |
| 2010/0172624 A1 | 7/2010 | Watts |
| 2011/0097059 A1 | 4/2011 | Sekiguchi |
| 2012/0030636 A1* | 2/2012 | Miyazaki ............ G06F 3/04847 715/863 |
| 2012/0079386 A1* | 3/2012 | Kim ............... G06F 3/0485 715/720 |
| 2012/0200574 A1* | 8/2012 | Hill ............... G06F 9/453 345/473 |
| 2012/0274662 A1* | 11/2012 | Kim ............... G11B 27/10 345/650 |
| 2012/0301114 A1 | 11/2012 | Johnson |
| 2013/0067332 A1* | 3/2013 | Greenwood .......... G06F 3/0488 715/720 |
| 2013/0148940 A1 | 6/2013 | Schmit et al. |
| 2013/0163955 A1 | 6/2013 | Yamamoto |
| 2013/0194476 A1 | 8/2013 | Shimosato |
| 2014/0035944 A1 | 2/2014 | Kulkarni |
| 2014/0193140 A1 | 7/2014 | Fliderman et al. |
| 2014/0237365 A1 | 8/2014 | Oberbrunner et al. |
| 2014/0355960 A1 | 12/2014 | Paulus et al. |
| 2014/0355961 A1 | 12/2014 | Paulus et al. |
| 2014/0359447 A1 | 12/2014 | Kannan et al. |
| 2014/0359448 A1 | 12/2014 | Paulus et al. |
| 2015/0212667 A1* | 7/2015 | Holt ............... G06F 3/04842 345/173 |
| 2015/0212694 A1 | 7/2015 | Ho |
| 2015/0213840 A1* | 7/2015 | Innami ............... H04N 9/87 386/243 |
| 2015/0215245 A1* | 7/2015 | Carlson ............... G06F 3/04817 715/752 |
| 2015/0261305 A1* | 9/2015 | Lee ............... G06F 3/011 345/157 |
| 2015/0318020 A1 | 11/2015 | Pribula |
| 2015/0381930 A1 | 12/2015 | Quinn et al. |
| 2016/0259412 A1* | 9/2016 | Flint ............... G06F 3/165 |
| 2016/0315986 A1 | 10/2016 | Chen |
| 2017/0034444 A1 | 2/2017 | Song et al. |
| 2018/0033173 A1 | 2/2018 | Choi et al. |
| 2018/0158486 A1 | 6/2018 | Gilley |
| 2019/0237104 A1 | 8/2019 | Jeon et al. |
| 2019/0379822 A1* | 12/2019 | Leong ............... G11B 27/031 |
| 2020/0092493 A1 | 3/2020 | McCauley |
| 2020/0135235 A1 | 4/2020 | Pena et al. |
| 2020/0137319 A1 | 4/2020 | Pena et al. |
| 2020/0186728 A1* | 6/2020 | Pena ............... G11B 27/005 |
| 2020/0311120 A1 | 10/2020 | Zhao et al. |
| 2020/0372934 A1 | 11/2020 | Pena et al. |
| 2020/0382723 A1* | 12/2020 | Pena ............... G06F 3/0485 |
| 2020/0382724 A1 | 12/2020 | Pena et al. |
| 2021/0051278 A1 | 2/2021 | Pena et al. |
| 2021/0160435 A1* | 5/2021 | Pena ............... H04N 5/2621 |

(56) References Cited

U.S. PATENT DOCUMENTS

| | | | |
|---|---|---|---|
| 2021/0237735 A1* | 8/2021 | Ha | B60W 30/18145 |
| 2022/0124258 A1 | 4/2022 | Pena et al. | |

FOREIGN PATENT DOCUMENTS

| | | | |
|---|---|---|---|
| EP | 3874736 A1 | 9/2021 | |
| EP | 3874762 A2 | 9/2021 | |
| JP | 6012384 B2 | 10/2016 | |
| WO | 2011052045 A1 | 5/2011 | |
| WO | 2014179466 A1 | 11/2014 | |
| WO | 2016112346 A1 | 1/2015 | |
| WO | 2018034371 A1 | 2/2018 | |
| WO | 2020092301 A2 | 5/2020 | |
| WO | 2020092326 A1 | 5/2020 | |
| WO | 2021167595 A1 | 8/2021 | |
| WO | 2022040308 A1 | 2/2022 | |

OTHER PUBLICATIONS

Henry M. Pena et al., Office Action Summary, U.S. Appl. No. 16/173,033, Notification Date Feb. 11, 2019.

Henry M. Pena et al., Notice of Allowance, U.S. Appl. No. 16/173,033, dated Jun. 5, 2019.

Henry M. Pena et al., Real Time Video Special Effects System and Method, U.S. Appl. No. 16/456,639, filed Jun. 28, 2019.

Henry M. Pena et al., Real Time Video Special Effects System and Method, U.S. Appl. No. 16/173,066, filed Oct. 29, 2018.

Henry M. Pena et al., Notice of Allowance, U.S. Appl. No. 16/173,066, May 20, 2019.

Henry M. Pena et al., Real Time Video Special Effects System and Method, U.S. Appl. No. 16/456,589, filed Jun. 28, 2019.

Henry M. Pena et al., Real Time Video Special Effects System and Method, U.S. Appl. No. 16/793,747, filed Feb. 18, 2020.

MOBOTIX, "Software Camera Manual Security-Vision-Systems Part 2", MOBOTIX AG—Security-Vision-Systems Made in German, Retrieved from the Internet http://www.mobotix.com/sites/default/files/2017-10/Mx_ML_Software_en_20061010.pdf.

Henry M. Pena et al., Real Time Video Special Effects System and Method, International Application No. PCT/US2019/058458, Filed Oct. 29, 2019.

PCT/US2019/058458, International Searching Authority, Notification of Transmittal of The International Search Report and the Written Opinion of the International Searching Authority, Notification Date Jan. 27, 2020.

Henry M. Pena et al., Real Time Video Special Effects System and Method, International Application No. PCT/US2019/058503, Filed Oct. 29, 2019.

PCT/US2019/058503, International Searching Authority, Notification of Transmittal of The International Search Report and the Written Opinion of the International Searching Authority, Notification Date Jan. 14, 2020.

Henry M. Pena et al., Office Action Summary, U.S. Appl. No. 16/456,639, Notification Date Oct. 23, 2019.

Henry M. Pena et al., Real Time Video Special Effects System and Method, U.S. Appl. No. 16/936,350, filed Jul. 22, 2020.

Notice of allowance and fee(s) due dated Jun. 15, 2020, on U.S. Appl. No. 16/456,589, filed Jun. 28, 2019.

Non-Final Rejection Office Action dated Oct. 2, 2019, on U.S. Appl. No. 16/456,589, filed Jun. 28, 2019.

Non-Final Rejection Office Action dated Jun. 25, 2021, on U.S. Appl. No. 16/936,350, filed Jul. 22, 2020.

Notice of allowance and fee(s) due dated Sep. 5, 2019, on U.S. Appl. No. 16/173,033, filed Oct. 29, 2018.

Reply to Notice of allowance and fee(s) due dated Sep. 5, 2019, on U.S. Appl. No. 16/173,033, filed Oct. 29, 2018.

Office Action Requirement for Restriction Election dated Feb. 11, 2019, on U.S. Appl. No. 16/173,033, filed Oct. 29, 2018.

International Search Report and the Written Opinion From the International Searching Authority, on PCT No. PCT/US2019/058458 filed Oct. 29, 2019.

Notice of allowance andfee(s) due dated Nov. 26, 2021, on U.S. Appl. No. 16/793,747, filed Feb. 18, 2020.

Non-Final Rejection Office Action dated Nov. 13, 2020, on U.S. Appl. No. 16/793,747, filed Feb. 18, 2020.

Notice of allowance and fee(s) due dated Apr. 21, 2021, on U.S. Appl. No. 16/996,748, filed Aug. 18, 2020.

Non-Final Rejection Office Action dated Dec. 10, 2020, on U.S. Appl. No. 16/996,748, filed Aug. 18, 2020.

MOBOTIX, "Software Camera Manual Security-Vision-Systems Part 2", MOBOTIX AG—Security-Vision-Systems Made in German, Retrieved from the Internet http://www.mobotix.com/sites/default/files/2017-10/Mx_ML_Software_en_20061010.pdf pp. 1-136.

MOBOTIX, "Software Camera Manual Security-Vision-Systems Part 2", MOBOTIX AG—Security-Vision-Systems Made in German, Retrieved from the Internet http://www.mobotix.com/sites/default/files/2017-10/Mx_ML_Software_en_20061010.pdf pp. 137-273.

Non-Final Rejection Office Action dated Oct. 23, 2019, on U.S. Appl. No. 16/456,639, filed Jun. 28, 2019.

Notice of allowance and fee(s) due dated Jul. 21, 2020, on U.S. Appl. No. 16/456,639, filed Jun. 28, 2019.

Non-Final Rejection Office Action dated Aug. 31, 2021, on U.S. Appl. No. 17/088,582, filed Nov. 4, 2020.

Notice of allowance and fee(s) due dated May 20, 2019, on U.S. Appl. No. 16/173,066, filed Oct. 29, 2018.

Notice of allowance and fee(s) due dated Feb. 4, 2019, on U.S. Appl. No. 16/173,066, filed Oct. 29, 2018.

International Search Report and the Written Opinion From the International Searching Authority, on PCT No. PCT/US2020/018709, filed Feb. 18, 2020.

International Search Report and the Written Opinion From the International Searching Authority, on PCT No. PCT/US2019/058503, filed Oct. 29, 2019.

U.S. Appl. No. PCT/US21/46499, filed Aug. 18, 2021, in the name of Henry M. Pena.

International Search Report and the Written Opinion From the International Searching Authority, on PCT No. PCT/US2021/046499 filed Aug. 18, 2021.

Non-Final Rejection Office Action dated Aug. 16, 2021, on U.S. Appl. No. 16/996,711, filed Aug. 18, 2020.

Notice of allowance and fee(s) due dated Mar. 17, 2021, on U.S. Appl. No. 16/996,748, filed Aug. 18, 2020.

Notice of Allowance dated Feb. 23, 2022, on a U.S. Appl. No. 16/936,350, filed Jul. 22, 2020, in the name of SubescribeMeUp.

Notice of Allowance dated Mar. 17, 2021, on a U.S. Appl. No. 16/996,748, filed Aug. 18, 2020, in the name of SubscribeMeUp.

MOBOTIX, "Software Camera Manual Security-Vision-Systems Part 2", MOBOTIX AG—Security-Vision-Systems Made in German, Retrieved from the Internet http://www.mobotix.com/sites/defaultffiles/2017-10/Mx_ML_Software_en_20061010.pdf pp. 1-136.

MOBOTIX, "Software Camera Manual Security-Vision-Systems Part 2", MOBOTIX AG—Security-Vision-Systems Made in German, Retrieved from the Internet http://www.mobotix.com/sites/defaultffiles/2017-10/Mx_ML_Software_en_20061010.pdf pp. 137-273.

Lou et. al. "A real-time interactive multi-view video system." Proceedings of the 13th annual ACM International Conference on Multimedia, 2005. Nov. 6, 2005 (Nov. 6, 2005) Retrieved on Dec. 7, 2021 (Dec. 7, 2021) from <https://dl.acm.org/doi/abs/10.1145/1101149.1101173> entire document.

Non Final Rejection dated Jul. 13, 2022, on a U.S. Appl. No. 17/165,854, filed Feb. 2, 2021, in the name of SubscribeMeUp.

Notice of Allowance dated May 20, 2020, on a U.S. Appl. No. 17/088,582, filed Nov. 4, 2020, in the name of SubscribeMeUp.

Henry M. Pena et al., Real Time Video Special Effects System and Method, U.S. Appl. No. 17/751,271, filed May 23, 2022.

European Search Report dated Jun. 27, 2022 on a EPO No. 19,879,645.0 filed Oct. 29, 2019, in the name of Pena Henry et al., SubscribeMeUp.

(56) References Cited

OTHER PUBLICATIONS

Supplementary European Search Report dated Jun. 27, 2022 on a EPO No. 19,879,645.0 filed Oct. 29, 2019, in the name of Pena Henry et al., SubscribeMeUp.
European Search Report dated Jun. 28, 2022 on a EPO No. 19,878,478.7 filed Oct. 29, 2019, in the name of Pena Henry et al., SubscribeMeUp.
Supplementary European Search Report dated Jun. 28, 2022 on a EPO No. 19,878,478.7 filed Oct. 29, 2019, in the name of Pena Henry et. al., SubscribeMeUp.

* cited by examiner

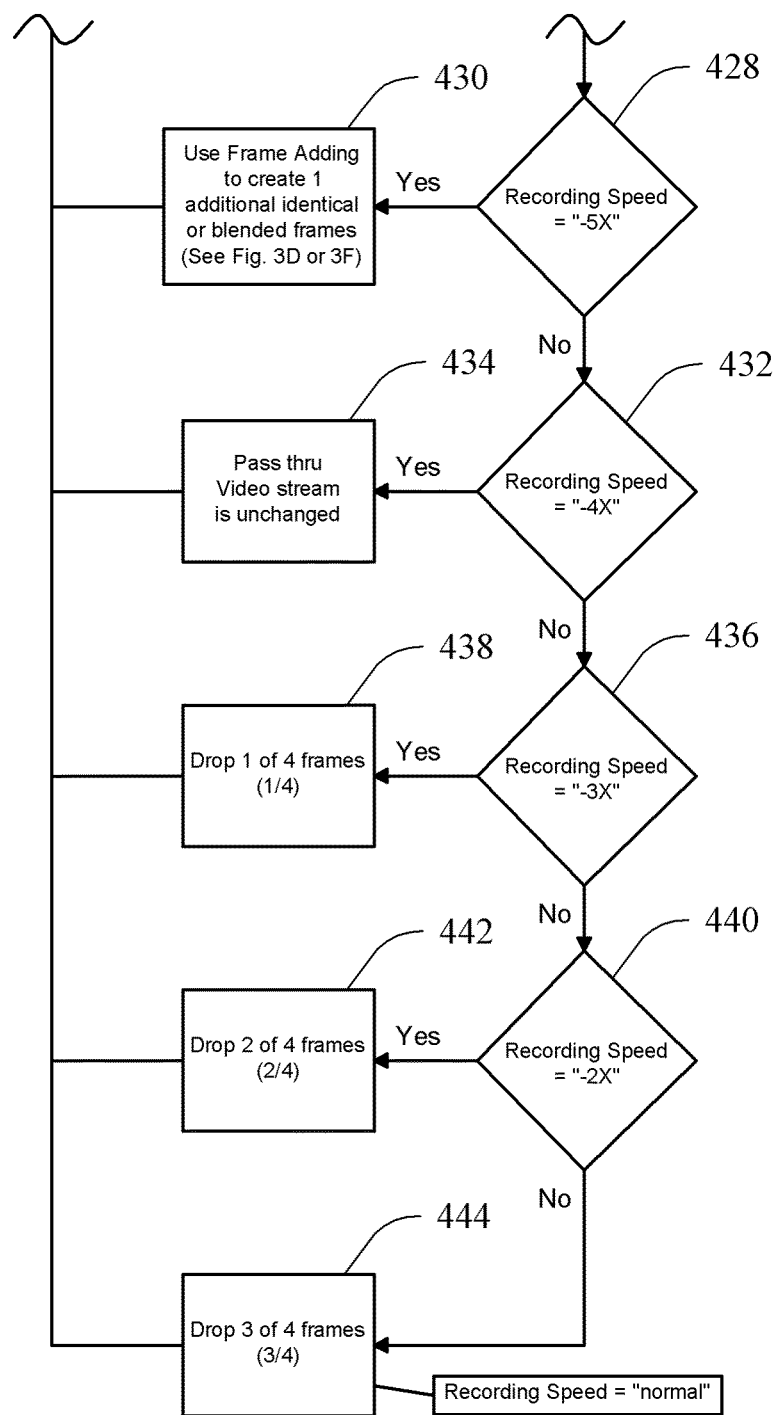
FIG. 17 - Continued

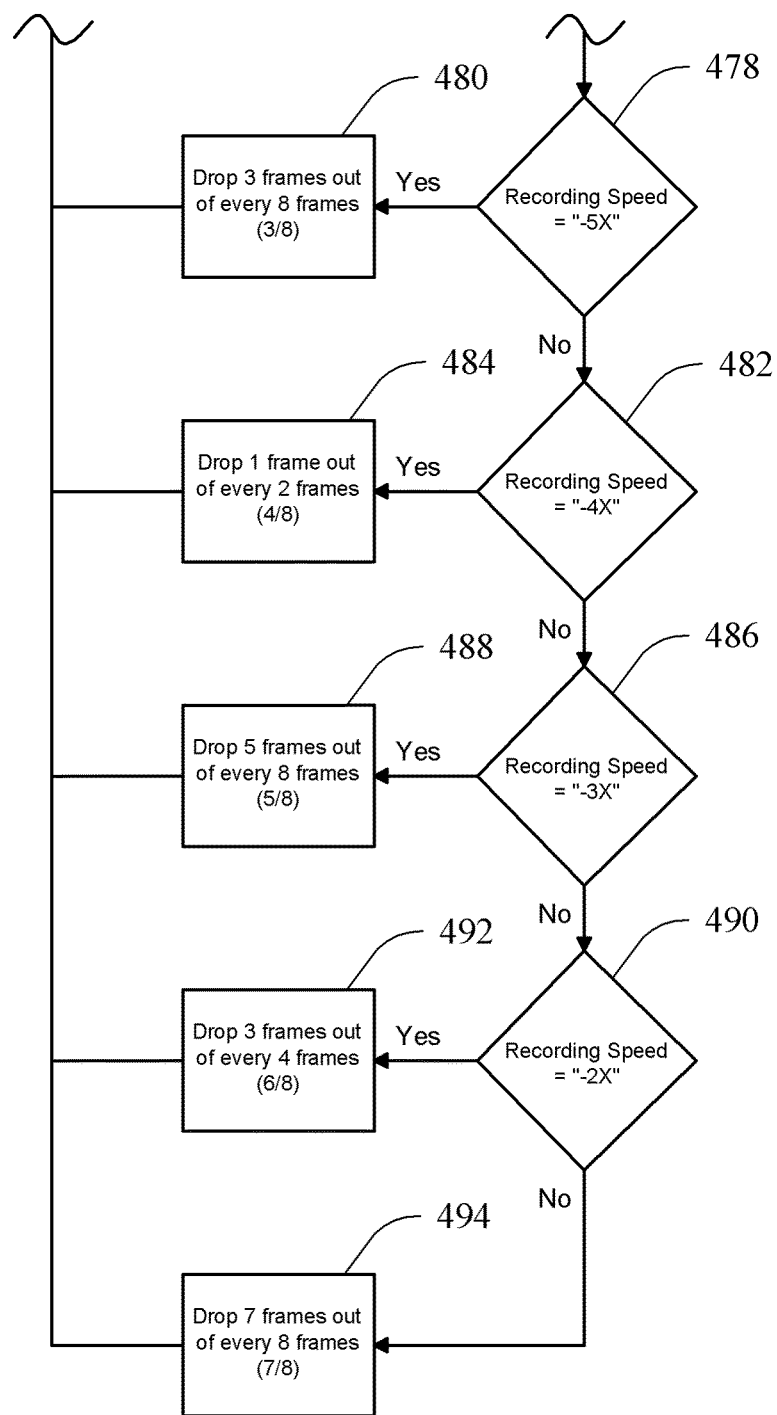
FIG. 18 - Continued

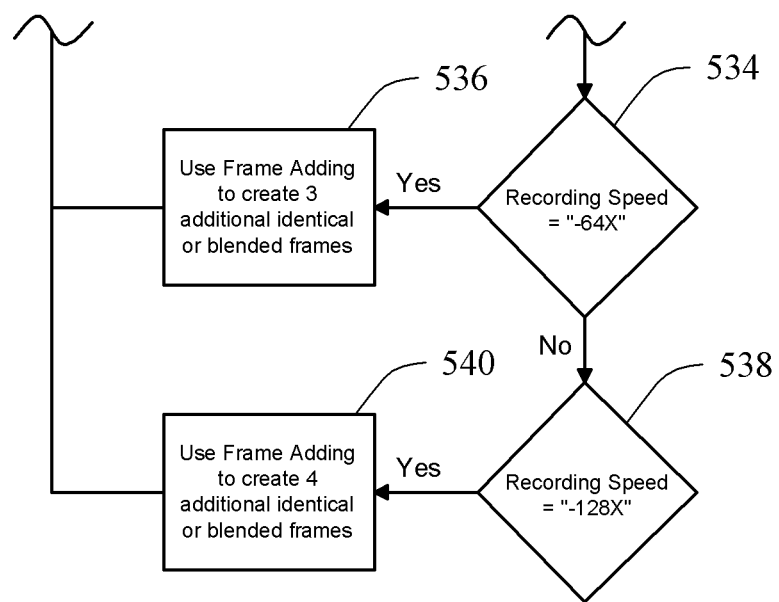
FIG. 19 - Continued

REAL TIME VIDEO SPECIAL EFFECTS SYSTEM AND METHOD

CROSS-REFERENCE TO RELATED APPLICATION

This application is a continuation-in-part under 35 U.S.C. § 120 based upon co-pending U.S. patent application Ser. No. 16/793,747 filed on Feb. 18, 2020, wherein U.S. patent application Ser. No. 16/793,747 is a continuation-in-part application based on U.S. patent application Ser. No. 16/456,639 filed on Jun. 28, 2019, which is a continuation application based on U.S. patent application Ser. No. 16/173,066 filed on Oct. 29, 2018 and now patented as U.S. Pat. No. 10,404,923 issued on Sep. 3, 2019, and wherein U.S. patent application Ser. No. 16/793,747 is a continuation-in-part application based on U.S. patent application Ser. No. 16/456,589 filed on Jun. 28, 2019, which is a continuation application based on U.S. patent application Ser. No. 16/173,033 filed on Oct. 29, 2018 and now patented as U.S. Pat. No. 10,388,322 issued on Aug. 20, 2019. The entire disclosures of the prior applications are incorporated herein by reference.

This application is a continuation-in-part under 35 U.S.C. § 120 based upon co-pending U.S. patent application Ser. No. 16/456,639 filed on Jun. 28, 2019, wherein U.S. patent application Ser. No. 16/456,639 is a continuation application based on U.S. patent application Ser. No. 16/173,066 filed on Oct. 29, 2018 and now patented as U.S. Pat. No. 10,404,923 issued on Sep. 3, 2019. The entire disclosures of the prior applications are incorporated herein by reference.

This application is a continuation-in-part under 35 U.S.C. § 120 based upon co-pending U.S. patent application Ser. No. 16/456,589 filed on Jun. 28, 2019, wherein U.S. patent application Ser. No. 16/456,589 is a continuation application based on U.S. patent application Ser. No. 16/173,033 filed on Oct. 29, 2018 and now patented as U.S. Pat. No. 10,388,322 issued on Aug. 20, 2019. The entire disclosures of the prior applications are incorporated herein by reference.

This application is a continuation-in-part under 35 U.S.C. § 120 based upon co-pending U.S. patent application Ser. No. 16/936,350 filed on Jul. 22, 2020, which is a continuation of U.S. patent application Ser. No. 16/456,589 filed on Jun. 28, 2019, wherein U.S. patent application Ser. No. 16/456,589 is a continuation application based on U.S. patent application Ser. No. 16/173,033 filed on Oct. 29, 2018 and now patented as U.S. Pat. No. 10,388,322 issued on Aug. 20, 2019. The entire disclosures of the prior applications are incorporated herein by reference.

BACKGROUND

Technical Field

The present technology relates to a real time video special effects graphical user interface, system and method for use in connection with controlling, creating or editing special effects in video recordings while recording is in progress or from an existing video feed. Particularly, the present technology relates to an interface associated with a system and method of decoding and altering a speed rate of a video stream from a device live or in real time prior to being recorded and written to long term memory storage with no post editing. More particularly, the present technology relates to displaying time guidelines on the graphical user interface that are associated with selectable speed rate settings.

Background Description

Modern video formats utilize a variety of frame rates. Film, which was almost universally shot at 24 frames per second, could not be displayed at its native frame rate, which required pulldown conversion, often leading to "judder". For example, to convert 24 frames per second into 60 frames per second, every odd frame is doubled and every even frame is tripled, which creates uneven motion. Other conversions have similar uneven frame doubling. Newer video standards support 120, 240, or 300 frames per second, so frames can be evenly multiplied for common frame rates such as 24 frames per second (fps) film and 30 fps video, as well as 25 and 50 fps video in the case of 300 fps displays. These standards also support video that is natively in higher frame rates, and video with interpolated frames between its native frames.

Native camera applications (app) in devices running on electronic devices, such as smartphones, can record in regular time and then process the video data stream to create slow motion and in speed up time or time-lapse. However, these known systems or methods do not utilize a user interface where the user can manually control the "time special effects" within the video in real time while recording. For example, the native camera app in the Samsung Galaxy S9+® has a special effect feature where the camera changes the frames per second capture rate when the app detects that the an object has crossed inside a portion of the screen, as indicated with a box outline in the middle of the screen in this case.

Third party apps like Instagram®, Facebook® and Snapchat® uses cameras from mobile devices, but these apps have no feature that allows the user of the app to modify the slowing down or speeding up of the recording speed in real time while recording is in progress.

With higher end feature-rich camera apps like FILMiC Pro®, users can pre-set the recording frame rate speed and playback frame rate speed independently of each other, thus, creating slow motion and speed up effects in the final produced video.

Time remapping of optical flow is known like with Premiere Pro CC 2015, which enables users to achieve smooth speed and framerate changes by interpolating missing frames. Optical Flow interpolation modifies the speed of clips containing objects with no motion blur that are moving in front of a mostly static background that contrasts highly with the object in motion.

Motion interpolation or motion-compensated frame interpolation (MCFI) is a form of video processing in which intermediate animation frames are generated between existing ones by means of interpolation, in an attempt to make animation more fluid and to compensate for display motion blur.

It can be appreciated that the use of motion interpolation as it reduces motion blur produced by camera pans and shaky cameras and thus yields better clarity of such images. It may also be used to increase the apparent framerate of video game software for a more realistic feel, though the addition of input lag may be an undesired side effect. This "video look" is created deliberately by the Video Field Interpolation Restoration Effect (VidFIRE) technique to restore archive television programs that only survive as film telerecordings. VidFIRE is a restoration technique intended to restore the video-like motion of footage originally shot with television cameras now existing only in formats with telerecording as their basis. The main differences between an artificially and naturally high framerate (via interpolation versus in-camera), are that the latter is not subject to any of the aforementioned artifacts, contains more accurate (or "true to life") image data, and requires more storage space and bandwidth since frames are not produced in real time.

Motion compensation is an algorithmic technique used to predict a frame in a video, given the previous and/or future frames by accounting for motion of the camera and/or objects in the video. It is employed in the encoding of video data for video compression, for example in the generation of MPEG-2 files. Motion compensation describes a picture in terms of the transformation of a reference picture to the current picture. The reference picture may be previous in time or even from the future. When images can be accurately synthesized from previously transmitted/stored images, the compression efficiency can be improved.

Motion compensation exploits the fact that, often, for many frames of a movie, the only difference between one frame and another is the result of either the camera moving or an object in the frame moving. In reference to a video file, this means much of the information that represents one frame will be the same as the information used in the next frame.

Using motion compensation, a video stream will contain some full (reference) frames; then the only information stored for the frames in between would be the information needed to transform the previous frame into the next frame.

Frame Blending may be another technique known to those skilled in the art. In some footage, using Optical Flow for creating smoother motion may not produce the desired results. In such scenarios, you can use one of the other time interpolation options—Frame Sampling or Frame Blending. Frame Sampling repeats or removes frames as needed to reach the desired speed. Frame Blending repeats frames, and it also blends between them as needed to help smooth out the motion.

It can be appreciated that using known video speed manipulation techniques can include a disadvantage of not providing to the user the current speed rate or a proximity of cursor or touch input in changing to a next speed rate. It is difficult for the user to "eyeball" the distance their fingers are from one an on-screen actuatable operation to a next on-screen actuatable operation when the user moves their finger across a touch screen. The user's finger could have a tendency to drift right or left as they zoom in and out, or during other gesture operations, thereby accidentally crossing over to an adjacent on-screen actuatable icon, button or region. This disadvantage in known techniques is readily apparent when the user's finger accidentally moves to the left or right, thereby unwittingly activating an operation associated with sliding or drifting of the user's finger or pointing device.

While the above-described devices fulfill their respective, particular objectives and requirements, the aforementioned patents do not describe a real time video special effects system and method that allows creating special effects in video recordings while recording is in progress.

SUMMARY

In view of the foregoing disadvantages inherent in the known types of video speed rate changing systems and methods now present in the prior art, the present technology provides a novel real time video special effects system and method, and overcomes one or more of the mentioned disadvantages and drawbacks of the prior art. As such, the general purpose of the present technology, which will be described subsequently in greater detail, is to provide a new and novel real time video special effects system and method and method which has all the advantages of the prior art mentioned heretofore and many novel features that result in a real time video special effects system and method which is not anticipated, rendered obvious, suggested, or even implied by the prior art, either alone or in any combination thereof.

According to one aspect of the present technology, there can be provided an interface system utilizable with controlling a special effects operation of video data. The system can include an electronic device including at least one processing unit in operable communication with a display and at least one memory. A user interface can be associated with the electronic device and displayable on the electronic device. The user interface can include a display region, and one or more affordances configured or configurable to provide an input utilizable in changing a speed rate of video data. One or more guidelines can be displayable in the display region, and at least one of the guidelines can include a parameter associated with the input.

The user interface can be operably implemented or implementable on the electronic device and executable by the processing unit.

According to another aspect, the present technology can include a non-transitory computer readable medium with an executable program stored thereon comprising instructions for execution by at least one processing unit for controlling a special effects operation of video data, such that the instructions when executed by the at least one processing unit causes the at least one processing unit to display video data on a user interface displayed on a display of an electronic device. The instructions when executed can further cause the at least one processing unit to receive an input from an affordance of the user interface upon activation of the affordance by a user. The input can be utilizable in changing a speed rate of the video data. The user interface can be executable by the at least one processing unit and displayable on the display. The instructions when executed can further cause the at least one processing unit to display on the user interface one or more guidelines, with at least one of the guidelines including a parameter associated with the input.

The instructions when executed can further cause the at least one processing unit to modify the video data to create modified video data at a modified speed rate that is different to a first speed rate of the video data, and to change a playing speed of the video data being displayed on the user interface from the first speed rate to the modified speed rate based in part on the input.

According to still yet another aspect, the present technology can be a method for controlling a special effects operation of video data. The method can include steps of displaying a user interface including a speed rate affordance on a display operably associated with an electronic device including at least one processing unit and at least one memory in operable communication with processing unit. Receiving, by the processing unit, an input associated with the speed rate affordance based upon activation by a user, the input being associated with changing a speed rate of video data. Displaying, by the processing unit, output video data to the display. Displaying one or more guidelines on the graphical user interface, at least one of the guidelines including a parameter associated with the input.

According to another aspect of the present technology, there can be provided a video display system utilizable with controlling a special effects operation of live recording or recorded video data in real time. The system can include an electronic device including at least one processing unit in operable communication with a display and at least one memory. The processing unit can be configured to receive video data in real time from a camera, the memory or a secondary memory not included with in the electronic device. A graphical user interface can be operably implemented or implementable on the electronic device and executable by the processing unit. The graphical user interface can be configured or configurable to provide a video display region and one or more affordances displayable on the display. The affordances can each be configured or configurable to provide one or more inputs to at least one operation executed or executable by the processing unit of the electronic device. The graphical user interface can be configured or configurable to display one or more guidelines in at least the video display region. The guidelines can be configured or configurable to associate with one or more speed rate indicators displayed on the graphical user interface.

According to still another aspect, the present technology can include a non-transitory computer readable medium with an executable program stored thereon comprising instructions for execution by at least one processing unit for controlling a special effects operation of live recording or recorded video data in real time, such that the instructions when executed by the at least one processing unit can cause the at least one processing unit to receive video data from a camera or a video feed. The video data can at least in part correspond to images being captured by the camera in real time or in the video feed in real time. The instructions when executed can further cause the at least one processing unit to display on a graphical user interface at a first speed rate the video data being captured in real time or in the video feed in real time. The instructions when executed can further cause the at least one processing unit to receive at least one input from an affordance of the graphical user interface upon activation of the affordance by a user. The graphical user interface can be executable by the at least one processing unit and displayable on a display. The instructions when executed can further cause the at least one processing unit to display on the graphical user interface one or more guidelines. The guidelines can be configured or configurable to associate with one or more speed rate indicators displayed on the graphical user interface.

According to yet another aspect, the present technology can include a method for controlling a special effects operation of live recording or recorded video data in real time. The method can include the steps of displaying a graphical user interface including at least one speed rate affordance on a display operably associated with an electronic device including at least one processing unit and at least one memory in operable communication with processing unit. Receiving, by the processing unit, video data at a native speed rate from a camera or a video feed. The video data can at least in part correspond to images being captured by the camera or from the video feed in real time. Receiving, by the processing unit, at least one input from the speed rate affordance upon activation by a user associated with changing a speed rate of the video data. Displaying, by the processing unit, output video data to the display. Wherein the output video data can be any one or any combination of the following: the video data at a native speed rate, and a modified video data at a modified speed rate different to the native speed rate. Displaying one or more guidelines on the graphical user interface. The guidelines can be configured or configurable to associate with one or more speed rate indicators displayed on the graphical user interface.

According to still yet another aspect, the present technology can be a computer-implemented method for controlling a special effects operation of live recording or recorded video data in real time. The method can include the steps of displaying a graphical user interface including at least one speed rate affordance on a display operably associated with an electronic device including at least one processing unit and at least one memory in operable communication with processing unit. Receiving, by the processing unit, video data at a native speed rate from a camera or a video feed. The video data can at least in part correspond to images being captured by the camera or from the video feed in real time. Receiving, by the processing unit, at least one input from the speed rate affordance upon activation by a user associated with changing a speed rate of the video data. Displaying, by the processing unit, output video data to the display. Wherein the output video data can be any one or any combination of the following: the video data at a native speed rate, and a modified video data at a modified speed rate different to the native speed rate. Displaying one or more guidelines on the graphical user interface. The guidelines can be configured or configurable to associate with one or more speed rate indicators displayed on the graphical user interface.

According to still another aspect of the present technology, there can be provided a video capture and display system for controlling a special effects operation of live video recording data in real time. The system can comprise one or more cameras configured to capture video of a real world scene; an electronic device including at least one processing unit operably connected or connectable to the camera, and at least one memory; and a graphical user interface operably implemented or embeddable on the electronic device and executable by the processing unit. The graphical user interface can be configured or configurable to: provide one or more affordances to a user, the affordances each can be configured or configurable to provide one or more inputs to at least one operation executed or executable by the processing unit of the electronic device; display on the graphical user interface at normal speed the video being captured; and change a video playing speed on the graphical interface of the video being captured from the normal playing speed to a modified playing speed in response to at least one of the inputs received by the graphical user interface in real time while recording is in progress.

According to still yet another aspect, the present technology can include a video recording interface system for controlling a special effects operation of live video recording data in real time is provided. The system can comprise an electronic device including at least one processing unit in operable communication with a camera and at least one memory. The camera can be configured to capture raw video data in real time and provide the raw video data to the processing unit. A graphical user interface can be associated with the electronic device and displayable on the electronic device. The graphical user interface can comprise a video display region configured to display a video feed, a record affordance, and at least one first affordance. The record affordance can be configured or configurable to provide at least one record input receivable and usable in determining if a recording operation is to be started or stopped. The first affordance can be configured or configurable to provide at least one input receivable and usable in determining a change in speed rate of raw video data from a native speed rate to a modified speed rate. The processing unit can be configured or configurable to: receive the record input and the input from the graphical user interface; determine if the input is associated with changing the native speed rate of the raw video data and if so to modify at least one frame in the raw video data to create modified video data at the modified speed rate that are different to the native speed rate in real time with receiving the raw video data from the camera; and display the video feed in the video display region. The video feed can be one of the raw video data at the native speed rate, the modified video data at the modified speed rate, and a combination of the raw video data and the modified video data.

According to yet another aspect, the present technology can include a video recording interface system for controlling a special effects operation of live video recording data in real time is provided. The system can comprise an electronic device including at least one processing unit in operable communication with a camera and at least one memory, the camera can be configured to capture raw video data in real time; and a graphical user interface associated with the electronic device and displayable on the electronic device. The graphical user interface can comprise a video display region, and at least one first affordance configured or configurable to provide at least one input receivable and usable by the processing unit in determining if the input is associated with changing the native speed rate of the raw video data and if so to modify at least one frame in the raw video data to create modified video data at the modified speed rate that are different to the native speed rate in real time with receiving the raw video data from the camera. Wherein the graphical user interface can be configured to receive the modified video data from the processing unit and display the modified video data in the video display region.

According to another aspect, the present technology can include a method for controlling a special effects operation of live video recording data in real time. The method can comprise the steps of: displaying a graphical user interface including at least one affordance on a display operably associated with an electronic device including at least one processing unit and at least one memory in operable communication with processing unit; receiving, by the processing unit, raw video data at a native speed rate from a camera, the raw video data at least in part corresponds to images captured by the camera in real time; receiving, by the processing unit, at least one input from the affordance upon activation of the affordance by a user; determining, by the processing unit, if the input is associated with changing the native speed rate of the raw video data and if so modifying the raw video data to create modified video data at one or more modified speed rate that are different to the native speed rate in real time with receiving the raw video data from the camera; and displaying at least a first region of the graphical user interface, by the processing unit, output video recording data to the display, wherein the output video recording data is one of the raw video data at the native speed rate, the modified video data at the modified speed rate, and a combination of the raw video data and the modified video data.

According to still another aspect, the present technology can include a client-side electronic system for controlling a special effects operation of live video recording data in real time. The system can include a memory and a processor that are respectively configured to store and execute software instructions. The instructions are organized into: a graphical user interface component configured or configurable to display a video feed on a display of an electronic device, and an affordance capable of providing an input; a raw data receiving component configured or configurable to receive a request to acquire raw video data at a native speed rate from a camera, wherein the raw video data can at least in part correspond to images captured by the camera in real time; a speed rate determination component configured or configurable to receive the input from the graphical user interface to change the native speed rate of the raw video data from the camera to at least one modified speed rate; a frame modification component configured or configurable to, upon receiving a request to change the native speed rate, identify at least one frame or location in the raw video data to be modified, and modifying the frame or location to create modified video data at the modified speed rate that is different to the native speed rate in real time with receiving the raw video data from the camera; and an output video recording data displaying component configured or configurable to display output video recording data to a display of the electronic device in real time with receiving the raw video data from the camera, wherein the output video recording data is selected from one of the raw video data at the native speed rate, the modified video data at the modified speed rate, and a combination of the raw video data and the modified video data.

According to even yet another aspect, the present technology can include an interface system including an interface in operable communication with a processing unit that is in operable communication with at least one camera configured or configurable to provide raw video data at a native speed rate, wherein the raw video data at least in part corresponds to images captured by the camera, at least one memory unit and at least one display. The interface can be associated with at least one computer-readable storage media in communication with the processing unit or a computer system including at least one processor. The interface can be a graphical user interface including a portion configured or configurable to generate an input associated with a desired speed rate of a raw video data received from the camera. The processing unit is configured or configurable to use the input to determine if the raw video data is to be modified to create a modified video data with a speed rate different to a native speed rate of the raw video data in real time with receiving the raw video data from the camera. The interface can be configured or configurable to display output video recording data in real time with receiving the raw video data from the camera. The output video recording data can be configured or configurable to include a combination of the raw video data and the modified video data, with a transitioning between the raw video data and the modified video data being dependent on the input.

According to even still another aspect, the present technology can be a computer-implemented method for controlling a real time special effects operation of live video recording data. The method can include the steps of receiving, by at least one processing unit, raw video data at a native speed rate from a camera at a request by a user input from at least one interface that is operably associated with the processing unit, wherein the raw video data at least in part corresponds to images captured by the camera in real time. The method can include determining if the input is associated with changing the native speed rate of the raw video data and if so modifying the raw video data to create modified video data with one or more modified speed rate that is different to the native speed rate in real time with receiving the raw video data from the camera. The method can further include writing at least one output video recording data to the memory, wherein the output video recording data is one of the raw video data at the native speed rate, the modified video data at the modified speed rate, and a combination of the raw video data and the modified video data.

In some or all embodiments of the present technology the guidelines can be displayed upon activation of at least one of the one or more affordances or while at least one of the one or more affordances is in an activated state.

In some or all embodiments of the present technology the guidelines are not displayed upon deactivation of at least one of the one or more affordances or while at least one of the one or more affordances is in a deactivated state.

In some or all embodiments of the present technology the parameter can be selected from the group consisting any one or any combination of color, pattern, length, thickness, flashing, brightness, shape, orientation, and display time.

In some or all embodiments of the present technology the guidelines can be vertically oriented in the display region with each of the guidelines extending from or being associated with a speed rate indicator displayed on the user interface.

In some or all embodiments of the present technology the guidelines can be multiple guidelines, and a color of at least one of the guidelines can be changed to a different color to that of at least one other of the guidelines based in part on the input.

In some or all embodiments of the present technology at least one of the one or more affordances can be a speed rate affordance associated with changing the speed rate of the video data.

In some or all embodiments of the present technology at least one of the guidelines displayed on the user interface can be activated, modified or deactivated automatically based on a distance of the speed rate affordance with one or more speed rate indicators displayed on the user interface.

In some or all embodiments of the present technology, the speed rate affordance or at least one of the guidelines on the user interface can be activated, modified or deactivated based on a touch input on the display.

In some or all embodiments of the present technology the input can be associated with a gesture on the display of the electronic device, the gesture being selected from the group consisting any one or any combination of a tap, a multiple tap, a touch holding, a sliding, a pinch, and a touch holding and sliding.

Some embodiments of the present technology can include a video playing speed of the video data that can be changed from a first speed rate to a modified playing speed rate in response to the input. The changing of the video playing speed can be accomplished by the processing unit of the electronic device or a remote processing unit of a remote device in communication with the processing unit of the electronic device.

In some or all embodiments of the present technology, the speed rate of the video data can be changed from a first speed rate to a modified speed rate when a finger touches the display, and then revert from the modified speed rate to the first speed rate when the finger is removed from the display.

In some or all embodiments of the present technology, the speed rate of the video data can be changed from a first speed rate to a modified speed rate upon a first finger tap on the display, and then revert from the modified speed rate to the first speed rate upon a second finger tap on the display.

In some or all embodiments of the present technology at least one of the affordances can be movable on the user interface to provide a movable affordance.

In some or all embodiments of the present technology, the movable affordance can be configured or configurable in determining a change in zoom factor of the video data based on vertical movement of the movable affordance on the user interface.

In some or all embodiments of the present technology, the movable affordance can be a speed rate affordance associated with changing the speed rate of the video data.

In some or all embodiments of the present technology, the user interface is a graphical user interface.

In some or all embodiments of the present technology, the one or more affordances can include a slide bar associated with changing the speed rate of the video data.

In some or all embodiments of the present technology, the guidelines or a portion thereof can be vertically or horizontally oriented in the video display region or in any port of the graphical user interface.

In some or all embodiments of the present technology, the guidelines can be displayed or displayable according to a parameter, which is configurable by a user.

In some or all embodiments of the present technology, the guidelines can be two or more guidelines, with at least part of each of the two or more guidelines can be displayed in the video display region in a spaced apart relationship.

In some or all embodiments of the present technology, the spaced apart guidelines can be configured or configurable on the graphical user interface to represent a field-of-view of the video data.

In some or all embodiments of the present technology, the graphical user interface can be configured or configurable by the processing unit to seamlessly change a playing speed on the graphical user interface of the video data from the first speed rate to the modified speed rate.

In some or all embodiments of the present technology, the graphical user interface can include a current speed rate indicator that is configured or configurable to indicate a playing speed rate of the video data being displayed in real time.

Some or all embodiments of the present technology can include one or more cameras that can be configured to capture video of a real world scene. The camera and the graphical user interface can be incorporated in the electronic device or the camera can be remote from the electronic device.

In some or all embodiments of the present technology, the one or more affordances can include a zoom affordance configured or configurable in determining a change in zoom factor of the video data. The zoom affordance can be associated with at least one of the guidelines.

In some or all embodiments of the present technology, the guidelines can be displayed on the graphical user interface in an orientation different to an orientation of a speed rate slide bar, a speed rate affordance or a speed rate indicator.

In some or all embodiments of the present technology, the processing unit can modify the video data by adding at least one new frame to the video data or removing at least one frame from the video data to create the modified video data.

In some or all embodiments of the present technology, the processing unit can modify a first or native speed rate of the video data to a modified speed rate when a finger touches the graphical user interface, and then revert from the modified speed rate to the first or native speed rate when the finger is removed from the graphical user interface.

There are, of course, additional features of the present technology that will be described hereinafter and which will form the subject matter of the claims attached.

BRIEF DESCRIPTION OF THE DRAWINGS

The present technology will be better understood and objects other than those set forth above will become apparent when consideration is given to the following detailed description thereof. Such description makes reference to the annexed drawings wherein, with the phantom (dash-dot-dash) lines depicting environmental structure and forming no part of the claimed present technology:

The same reference numerals refer to the same parts throughout the various figures.

DETAILED DESCRIPTION OF THE PREFERRED EMBODIMENTS

Figure 1:
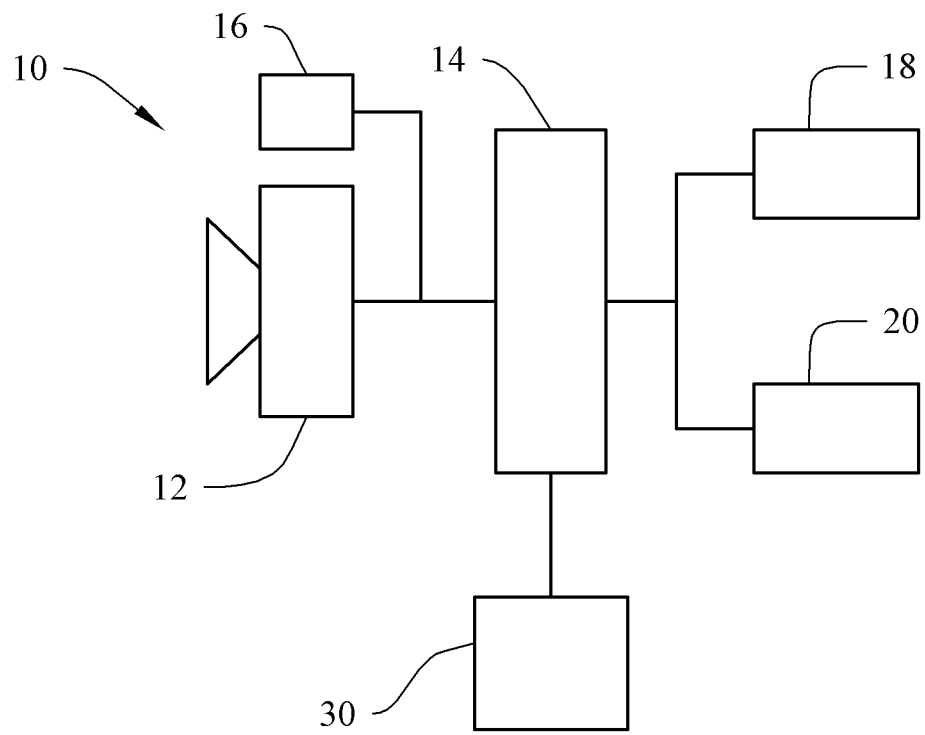
FIG. 1 is a block diagram of an embodiment of the real time video special effects system constructed in accordance with the principles of the present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

It is known that video recordings are made up a series of frames or group of pictures displayed at a speed rate to create motion. These frames of images or video can be characterized as digital frame data, which can be buffered in the playing back of the video. The frame rate (expressed in frames per second or fps) is the frequency (rate) at which these consecutive frames appear on a display. This can be applied equally to film and video cameras, computer graphics, and motion capture systems. Frame rate may also be called the frame frequency, and be expressed in hertz.

Real-time recording and/or playback of video is typically performed at a rate of thirty (30) fps. It is desirable in several situations to speed up or slowdown the playback of the video. This is typically conducted while keeping the recording and playback frames per second at 30 fps in order to maintain compatibility with the existing components, such as the display devices, etc. For example, if a viewer wanted to speed up the playback of a video by a certain percentage from the standard real-time playback speed while keeping 30 fps, the information or data of a specific number of frames is required to be played back in a time segmented for 30 frames. A scheme to create this is to skip one frame, from the recorded video, out of every predetermine number of frames so that the appropriate number of frames of video are displayed at 30 fps. It is noted that these known systems and methods are provided as a post-recording process, which skips frames from a 30 fps recording. The recording is initially written to memory in real time at 30 fps, with no special effects.

The present technology solves the problem of requiring "post production editing" to insert the time modification special effects, which can be time and resource costly, especially for amateur filmmakers.

Furthermore, the present technology solves the problem of pre-setting the motion recording speed to either fast motion or slow motion where user cannot adjust the motion recording speed in real time during the recording process.

Even still further, the present technology solves the problem of presetting the motion recording speed where a user cannot adjust the motion recording speed continuously and vary from fast motion to slow motion in real time during the recording process.

The present technology alleviates and solves the issue requiring hardware support for every device. By using the software algorithm to simulate slow motion, it is not device dependent and the resulting file is much smaller than hardware supported slow motion video.

While the above-described devices fulfill their respective, particular objectives and requirements, the aforementioned devices or systems do not describe a real time video special effects system and method that allows creating special effects in video recordings while recording is in progress. The present technology additionally overcomes one or more of the disadvantages associated with the prior art by adding or removing frames from the frame strip provided by the camera in real time.

Still further, there is no known interface for the user to change the speed of recording and the duration to apply the special effects in real time while recording is in progress. Furthermore, the scene has to be relatively fixed, with the camera not panning or following the action. The algorithm associated with this known system uses a motion sensor while the camera remains steadily fixed on a scene and the subject has to traverse the scene while the rest of the scene remains fixed.

The present technology can utilize a graphical user interface associated with the electronic device that modifies the frames from a camera in real time prior to recording or saving.

A need exists for a new and novel real time video special effects system and method that can be used for creating special effects in video recordings while recording is in progress. In this regard, the present technology substantially fulfills this need. In this respect, the real time video special effects system and method according to the present technology substantially departs from the conventional concepts and designs of the prior art, and in doing so provides an apparatus primarily developed for the purpose of creating special effects in video recordings while recording is in progress.

Users of the present technology can in "real time" produce videos that contain the special effect of user controlled variable time modification, aka fast motion or slow motion, by using the user interface programmed into the device's apps that run on their supported operating systems, and other embedded devices. The produced video is taken in one-shot, with all of the time modification commands entered in real time while recording.

For exemplary purposes, the present technology can utilizes a set video frame rate to 30 fps, resulting in 30 frames per second while recording.

In some or all embodiments of the present technology, a user can utilize a fast forward option of the present technology, which results in dropping frames according to the set fast forward rate (like 1×, 2×, 3×, etc.). If the user sets 2× fast forward video then the present technology can append the 1st frame in writer and skips the 2nd frame, then write the 3rd frame, and then skip the 4th frame and so on. The resultant video that is recorded is at the predefined fast forward speed in real time while retaining a 30 fps.

In some or all embodiments, a user can utilize a slow motion option of the present technology, which results in appending a same frame twice thereby repeating this frame so the final video that is recorded is in slow motion. For example, if the user sets 2× slow video then the present technology can append the 1st frame in writer, and the same frame append to the next time/frame slot. The resultant video that is recorded is at the predefined slow motion speed in real time while retaining a 30 fps.

The present technology allows the user to control the recording device's (and any other video recording device) recording speed and other camera settings while recording through the use of the custom user interface, such that when the user plays the video immediately after the present technology algorithm has processed the commands, the playback speed of the scenes correspond with the commands during recording. The present technology accomplishes this with software simulation without having to increase the recording device's frame rate and is not device dependent and works across all platforms.

An additional aspect of the present technology can be to increase the frame rate of the recording device while recording is in progress. This requires application programming interface (API) access to limited number of supported hardware and there is no industry standard API, which limits the number of supported devices. The display shows the current time recording rate, from normal speed to 3× faster, or −3× slower (can be 4×, 5× or more). The user can control the recording rate by utilizing the interface.

Numerous advantages exist with the present technology, such as an easy to use custom user interface, wherein the user can add special effects of time modification into the video in real time while recording is in progress. This is an advantage over existing technology because the user can produce a video with the special effects (variable fast and slow motion recording speeds) while recording of that video is in progress. This reduces the time and costs to produce videos with these kinds of special effects by not requiring a separate video editing software and or paying a video editor to edit and produce a comparable video. User can enjoy viewing the videos they created with the special effects immediately once they have completed recording and brief processing time for the device to process adding the special effects and automatically producing a new video with the special effects implemented.

Another advantage of user's manual control of the special effect in real time is that the user can pan along with the movement of the scene, and capture the peak moment of the action and use continuously variable slow/fast motion at just the right time and for as long as desired, and then return back to normal speed as the user is recording.

Still another advantage is that the present technology is not hardware dependent for the slow or fast motion special effect to work. The software algorithm simulates the slow or fast motion.

Even still another advantage is that with the manual user interface, the camera does not have to remain stationary while pointing at a stationary scene for an AI software to determine the "action" to apply the special effects thereto.

Another advantage is that the present technology can accept input from, but not limited to, a remote camera feed, a joystick, a retina scanner, a body suit controller, on-screen subject gestures and a tactile user interface.

In some or all embodiments, the present technology can also be applied to add time modifying special effects to pre-existing videos. The user can control the time variable in the playback by using the same familiar easy to use left-right on a compatible device, such as a smartphone or tablet, to control and modify the values for the playback time value, from −3× to 4× in this case. It can be appreciated that there are additional abilities to the factor of time modification once digital processing technology has advanced sufficiently to be able to interpolate data and images in between frames captured one the video.

When the user slides towards the 4×, the recorded speed is played back faster than normal, up to 4× faster. When the user slides towards the −3×, the recorded speed is played back slower than normal, up to 3× slower.

In some or all embodiments, the raw video data can include data such as, but not limited to, streaming video data, video, audio, depth, object identification, histogram, and combination thereof.

In some or all aspects, the processing unit can be configured or configurable to preclude the raw video data from being written to the memory unit from the camera, such that the present technology can intercept the raw video data.

In some or all embodiments, the input can be one or more desired speed rate values that the modified speed rate is based on. Where the modified speed rates can be one of less than the native speed rate or greater than the native speed rate.

If the modified speed rate is less than the native speed rate, then the processing unit can be configured or configurable to add at least one frame to the raw video data to create the modified video data.

If the modified speed rate is greater than the native speed rate, then the processing unit can be configured or configurable to remove at least one frame from the raw video data to create the modified video data.

If the input is not a request to change the native speed, then the processing unit can be configured or configurable to keep all the frames from the raw video data and write the raw video data to memory.

In some or all embodiments, the interface can be a graphical user interface including a portion configured or configurable to generate the input that is associated with the native speed rate or the modified speed rate. The graphical user interface can be configured or configurable to display the output video recording data in real time with receiving the raw video data from the camera. The output video recording data can be configured or configurable to include a combination of the raw video data and the modified video data, with a transitioning between the raw video data and the modified video data being dependent on the input. It can be appreciated that the interface can be a joystick or can utilize a joystick.

In yet another aspect, the interface can be operable associated with at least one computer-readable storage media storing instructions that, when executed by the processing unit or a processor of a computer system, causes the processing unit to direct the raw video data from the camera to the processing unit and as well as to the memory unit in real time with receiving the raw video data from the camera, and to write the raw video data from the processing unit to the memory unit or apply at least one algorithm to the raw video data to create the modified video data and write the modified video data from the processing unit to the memory unit.

According to yet another aspect of the present technology, the present technology can be a method of recording a video at one or more speed rates in real time with receiving the raw video data from the camera. The method can include the steps of receiving, by at least one processing unit, raw video data at a native speed rate from a camera in real time with capturing images at least in part corresponding with the raw video data from the camera, and receiving an input from at least one interface that is operably associated with the processing unit. The method can include determining, by the processing unit, if the input is associated with changing the native speed rate of the raw video data and if so modifying the raw video data to create modified video data at one or more modified speed rates that are different to the native speed rate in real time with receiving the raw video data from the camera. The method can further include writing, by the processing unit, output video recording data to at least one memory, wherein the output video recording data is one of the raw video data at the native speed rate, the modified video data at the modified speed rate, and a combination of the raw video data and the modified video data.

Some or all embodiments of the present technology can include determining if the modified speed rate is less than the native speed rate, and if so then modifying the raw video data can include adding at least one new frame to the raw video data to create the modified video data.

In some or all embodiments, the method can include adding the new frame by copying at least one raw frame to create the new frame, and adding the new frame to the raw video data adjacent to the raw frame.

In some or all embodiments, the new frame to be added can be a plurality of new frames each being a copy of at least one raw frame from the raw video data, with the new frames being added to the raw video data adjacent to the raw frame that was copied.

In some or all embodiments, the method can include adding the new frame by frame blending at least two raw frames to create the new frame, and adding the new frame to the raw video data between the two raw frames.

In some or all embodiments, the new frame(s) to be added can be a plurality of new frames each being a blend of at least two raw frames from the raw video data, with the new frames being added to the raw video data between the raw frames that was blended.

In some or all embodiments, each of the new frames can be added to the raw video data adjacent to the raw frame or adjacent to a second raw frame of the raw video data.

Some or all embodiments can include the step of determining if the modified speed rate is greater than the native speed rate, and if so then modifying the raw video data can include removing at least one first raw frame from the raw video data to create the modified video data.

In some or all embodiments, the removing of the first raw frame can include selecting the first raw frame to be removed, and then removing the first raw frame from the raw video data to create the modified frame.

In some or all embodiments, the interface can be a graphical user interface including a portion configured or configurable to generate the input that is associated with the native speed rate or the modified speed rate, and wherein the interface is configured or configurable to display the output video recording data.

Some or all embodiments can include the output video recording data being a combination of the raw video data and the modified video data. With the modified video data configured or configurable to include multiple subsets each having a speed rate dependent on the input. Where a transitioning between the raw video data and any one of the subsets or between any of the subsets is dependent on the input, and wherein the output video recording data is displayed in the graphical user interface in real time with receiving the raw video data from the camera.

In some or all embodiments, the present technology can include an extreme slow motion subroutine at constant high recoding fps. This subroutine can be utilized for slow motion speed ranges greater than or equal to −8×, by passing through an unchanged video stream or make copies of each frame a predetermined number of times.

In some or all embodiments, the present technology can include a segment time compression and expansion subroutine that provides an algorithm for slow motion and fast motion by speeding up or slowing down the playback time during video processing after the recording has stopped. This subroutine can set the device's recording and/or playback fps, and set video segment playback fps to equal the recording fps using an algorithm that utilizes in part the segment playback fps and record fps.

In some or all embodiments, the present technology can include a variable playback speed record subroutine that provides an algorithm for slow motion and fast motion by speeding up or slowing down the playback frame rate while video recording is in progress. This algorithm can produce a normal video with the fast/slow motion commands embedded in the video's metadata.

In some or all embodiments, the present technology can include a variable playback speed playback subroutine that provides an algorithm for playing a video file with slow motion and fast motion special effects by speeding up or slowing down the playback frame rate while video playback is in progress.

Some or all embodiments can include the graphical user interface being configured or configurable by the processing unit to revert from playing at the modified playing speed on the graphical user interface the video being captured to playing the video being captured at the normal speed.

In some or all embodiments, the graphical user interface can be configured or configurable by the processing unit to revert from playing at the modified speed on the graphical user interface the video being captured to playing the video being captured at the normal playing speed in response to a user input received by the graphical user interface.

In some or all embodiments, the graphical user interface can be configured or configurable by the processing unit to seamlessly change the playing speed on the graphical interface of the video being recorded from the normal playing speed to a modified playing speed.

In some or all embodiments, the graphical user interface can be displayed on a display of the electronic device, and the graphical user interface can include multiple regions with a first region being configured or configurable to display the video being captured at the normal playing speed, and a second region being configured or configurable to display the video being captured at the modified playing speed.

Some or all embodiments of the graphical user interface can include a first affordance including at least one selectable value from a plurality of values.

In some or all embodiments, the selectable value can be selected by a gesture on the display of the electronic device selected from the group consisting of a tap, a multiple tap, a touch holding, a sliding, a pinch, and a touch holding and sliding.

In some or all embodiments, the plurality of values of the first affordance can include varying speed rates associated with slow motion speed, fast motion speed and normal speed.

In some or all embodiments, the graphical user interface can include a second affordance configured or configurable to provide a second input to the processing unit and usable in determining a change in zoom factor of the raw video data.

In some or all embodiments, the first affordance can be a slide bar associated with the varying speed rates, or the second affordance can be a slide bar indicating associated with varying zoom factors.

In some or all embodiments, the second affordance can be displayed in the graphical user interface in an orientation different to an orientation of the first affordance.

In some or all embodiments, at least one of the first affordance and the second affordance is in part arranged over the video display region.

Some or all embodiments of the graphical user interface can include a second video display region configured to display a second video feed that can be different to the video feed displayed in the display region and can be one of the raw video data at the native speed rate, the modified video data at the modified speed rate, and a combination of the raw video data and the modified video data.

In some or all embodiments, the graphical user interface can include a record affordance configured or configurable to provide at least one record input receivable and usable by the processing unit in at least determining if a recording operation is to be started or stopped. The record affordance can have a generally circular configuration with a first annular region configured or configurable to display a time lapse indication of the captured raw video data.

Some or all embodiments of the graphical user interface can include one or more additional affordances configured or configurable to provide at least one additional input receivable and usable in initiating additional operations by the processing unit.

In some or all embodiments, the additional operations are selected from the group consisting of a flash, a hands free operation, a timer, a mute operation, a rear camera operation, a setting operation associated with the electronic device, a setting operation associated with the camera, an editing operation, a scene filter operation, an "Augmented Reality" (AR) filter operation, adding music operation, a filter operation, a writing operation, and a transmission operation.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

Even still another object of the present technology is to provide a real time video special effects system and method for creating special effects in video recordings while recording is in progress. This allows a user to control the speed rate of the video prior to and while recoding is in progress in real time while acquiring the video from the camera.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some or all embodiments of the present technology may meet only one such object or none at all.

Figure 60:
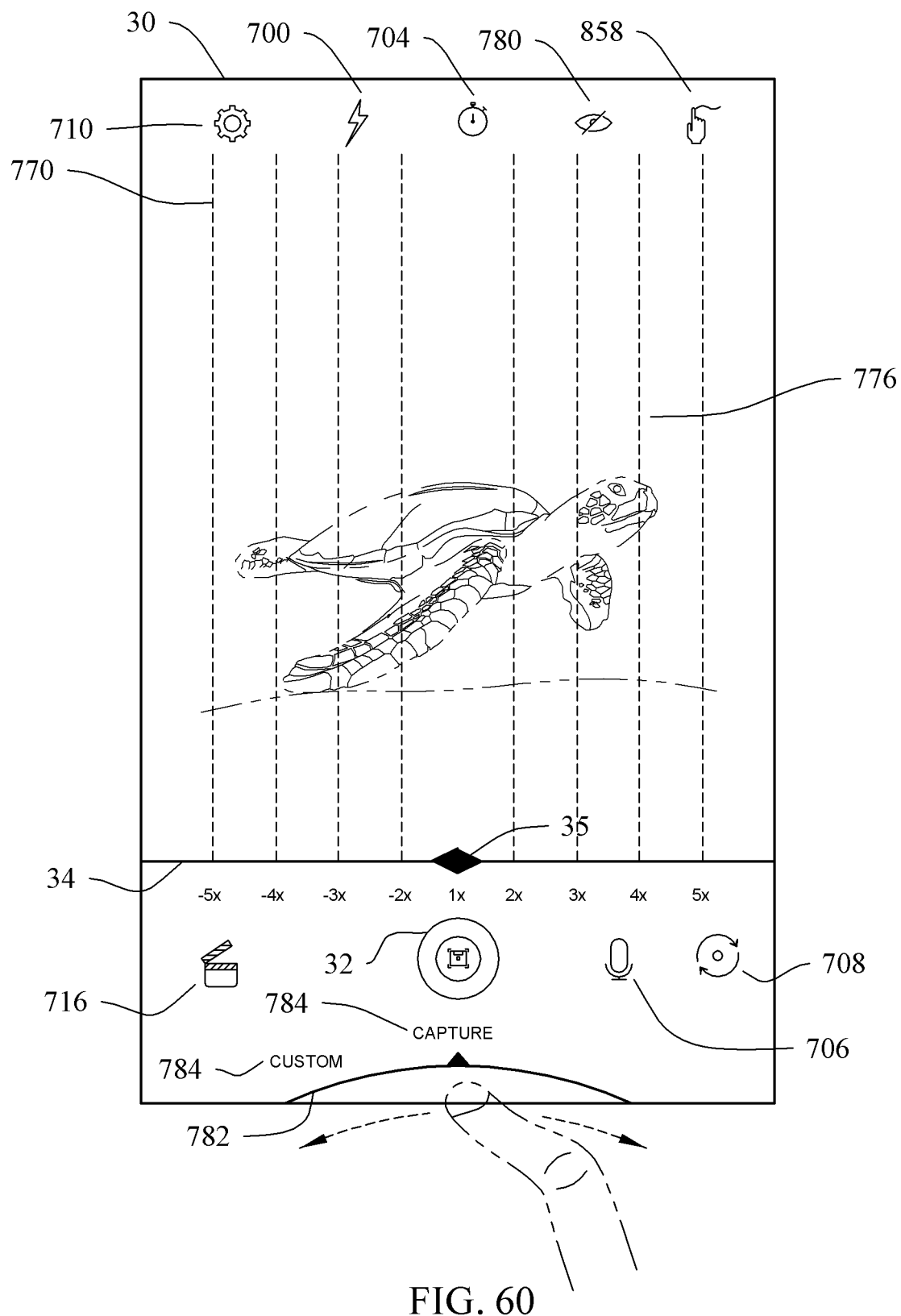
FIG. 60 is a sample GUI screenshot of a "Camera View" of the device employing the GUI with a "Capture" option selected on the selectable options bar utilizing the process and/or system of the present technology.
Figure 61:
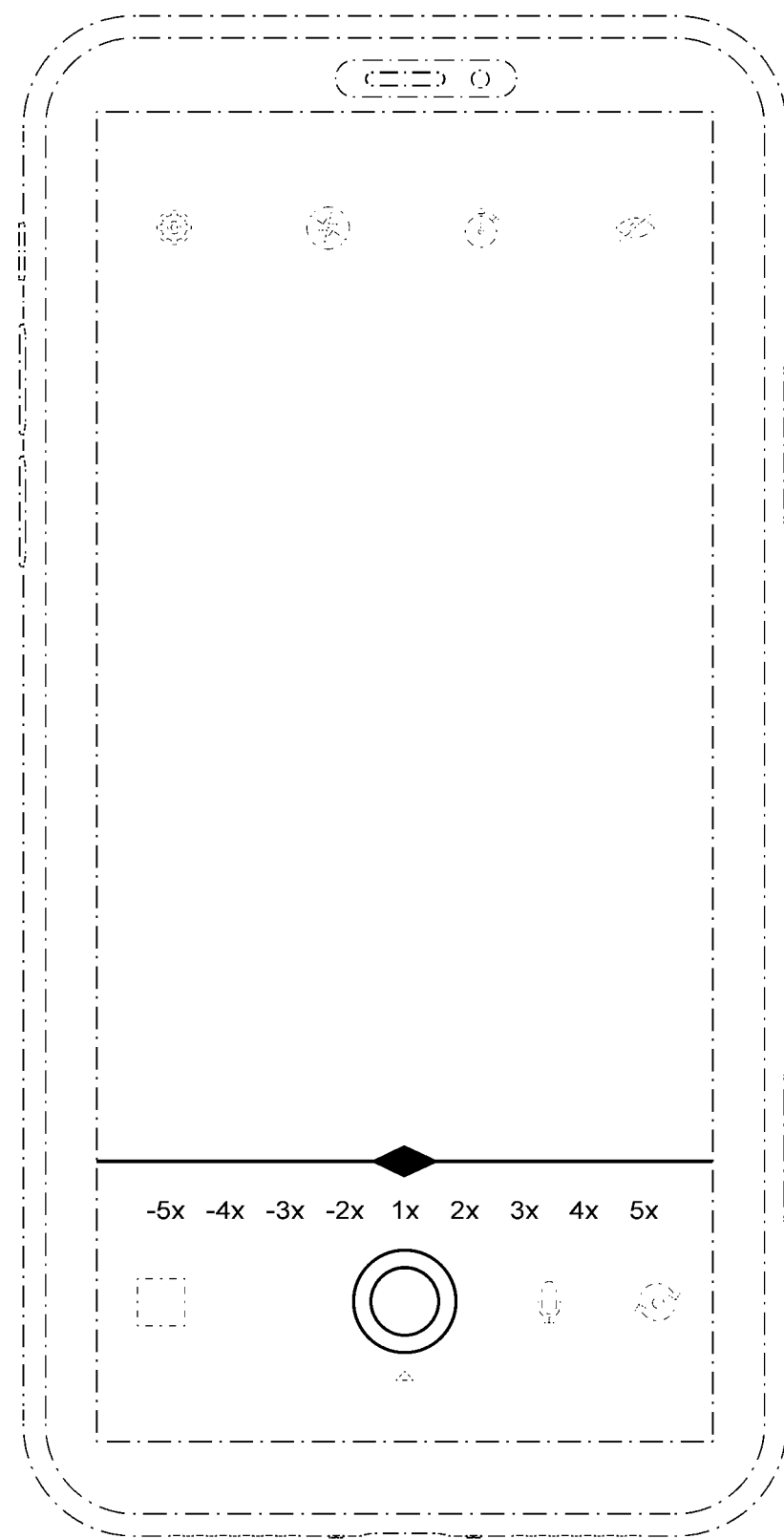
FIGS. 61-80 are sample GUI screenshots of the present technology, with the phantom (dash-dot-dash) lines depicting environmental structure and forming no part of the claimed present technology or design and with the dashed (dot-dot) vertical lines representing the guidelines being part of the present technology and design.
Figure 62:
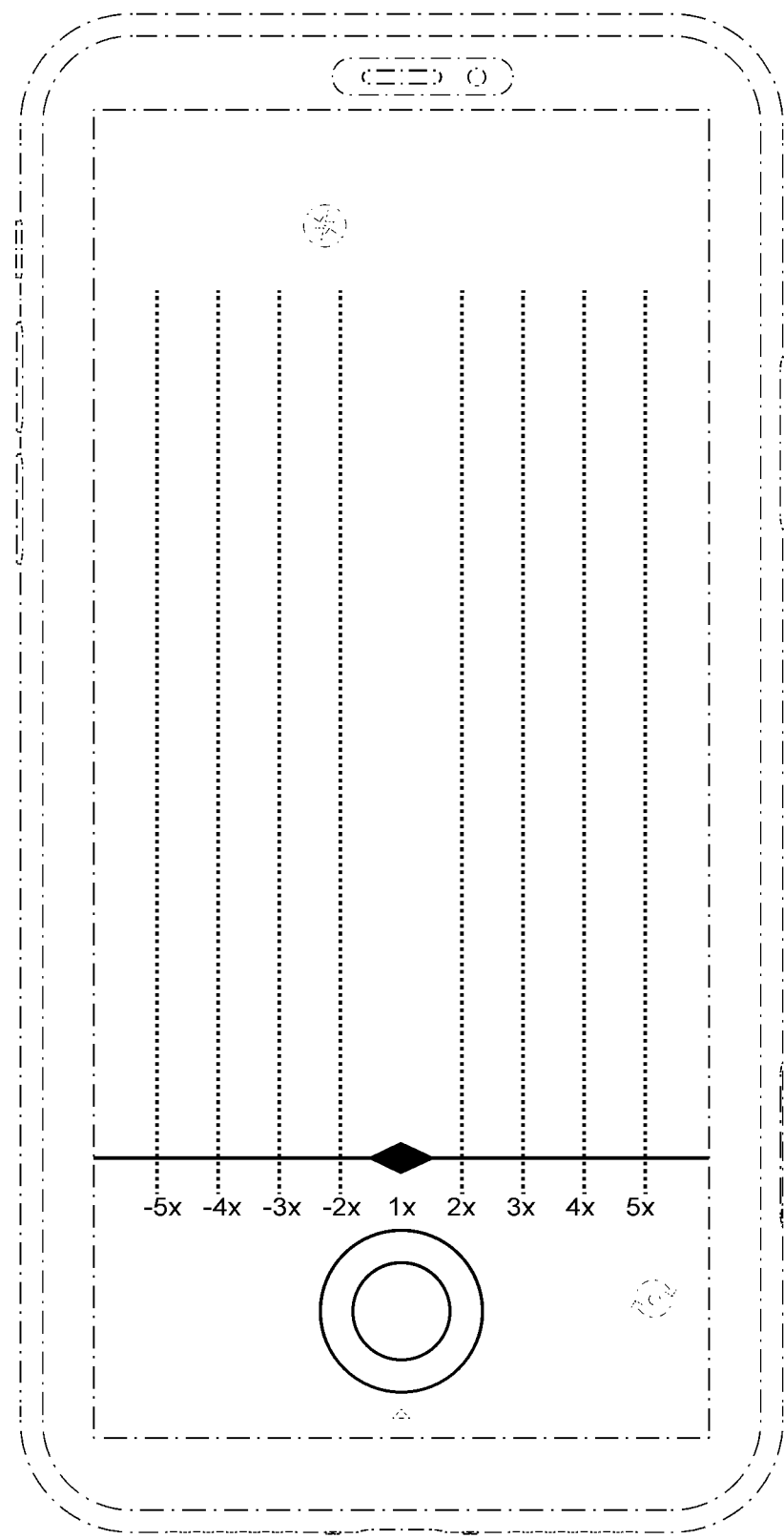
Figure 63:
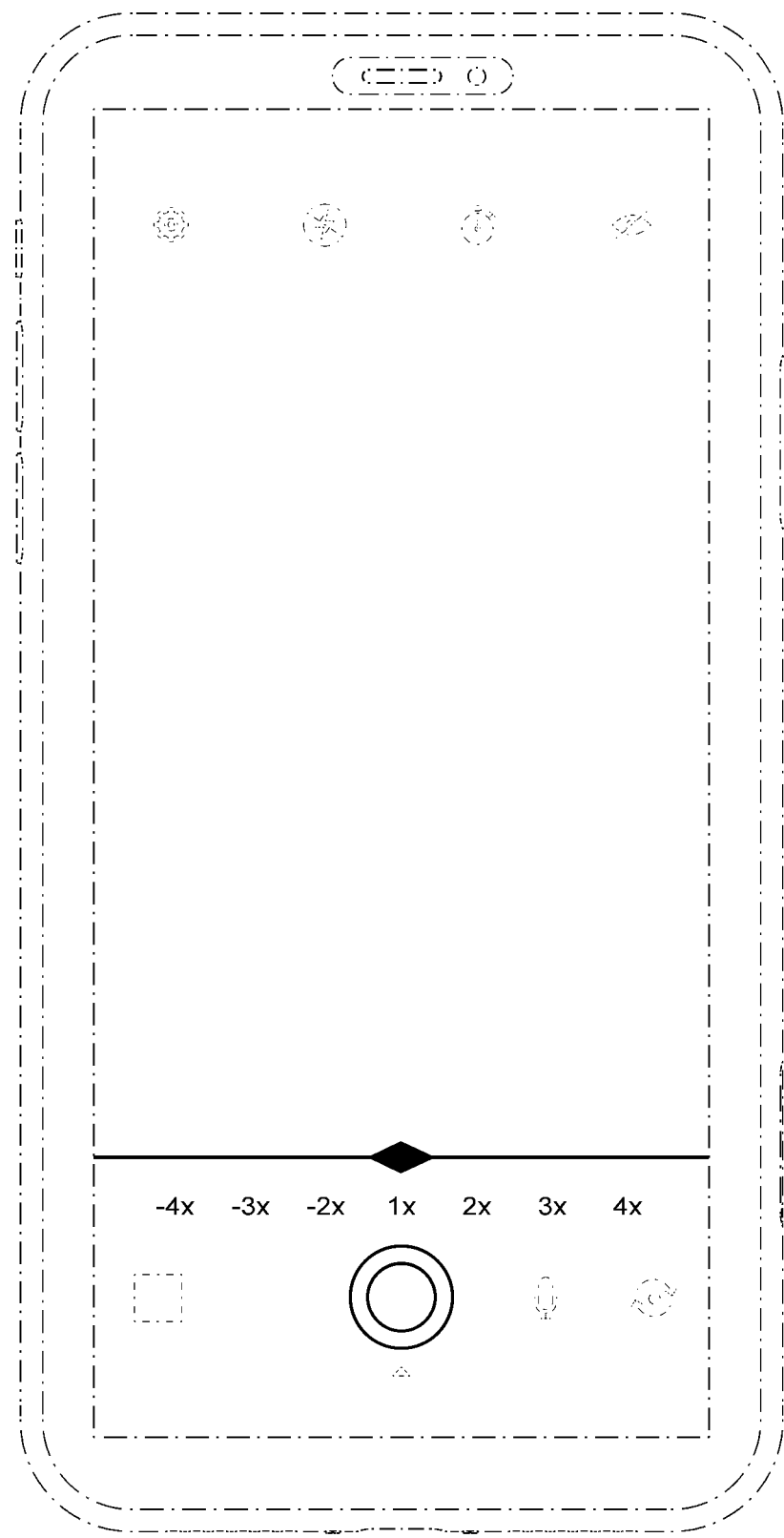
Figure 64:
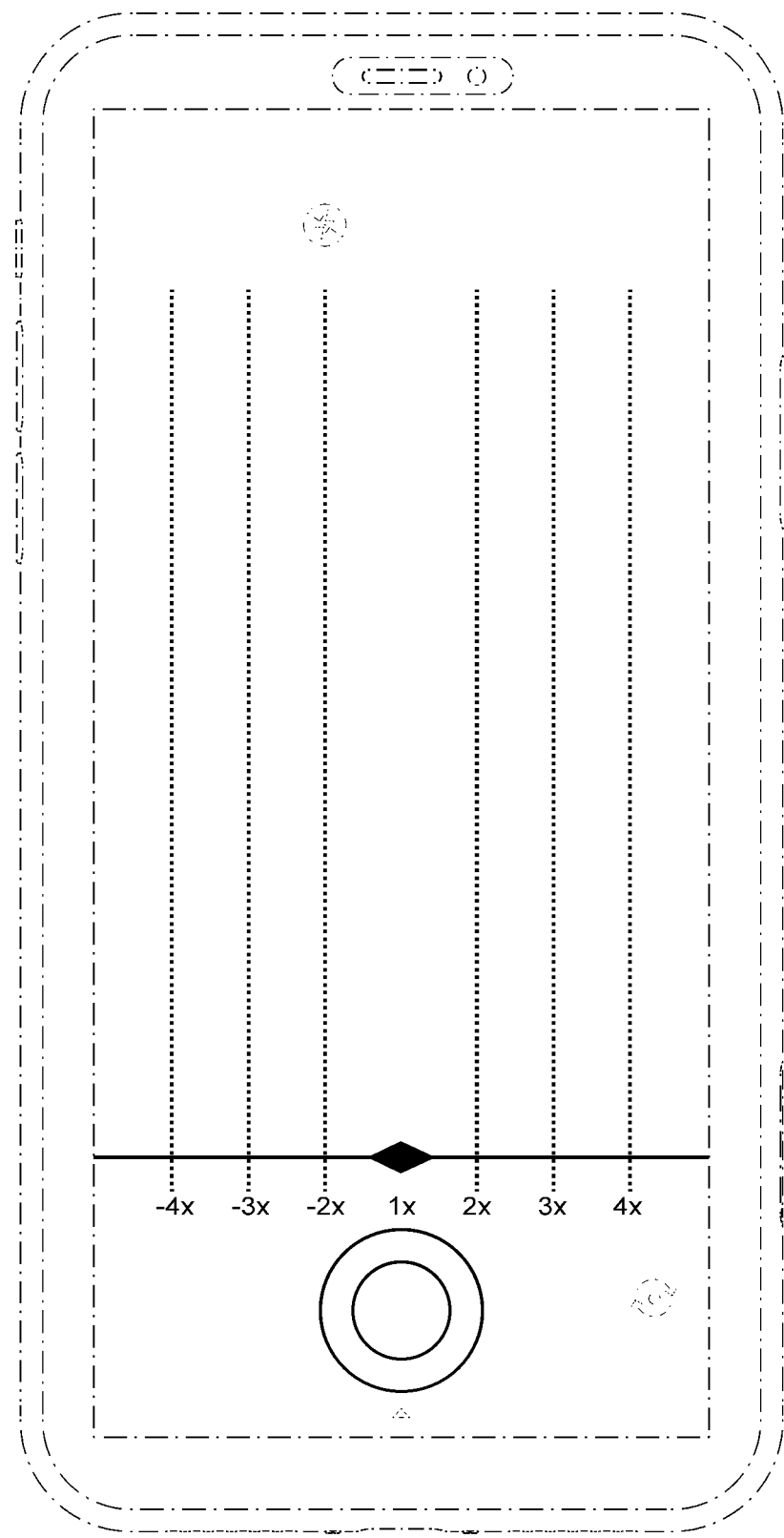
Figure 65:
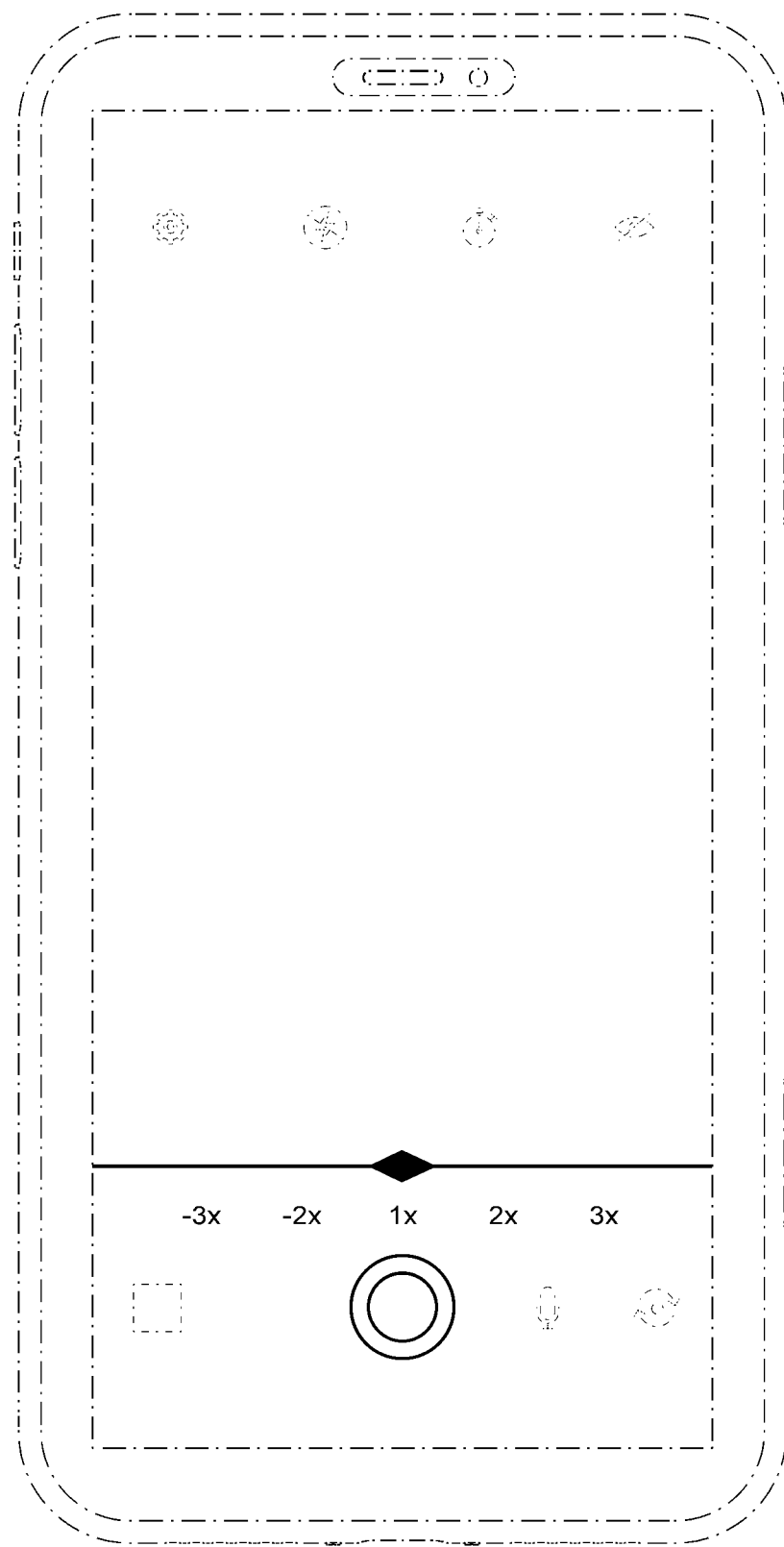
Figure 66:
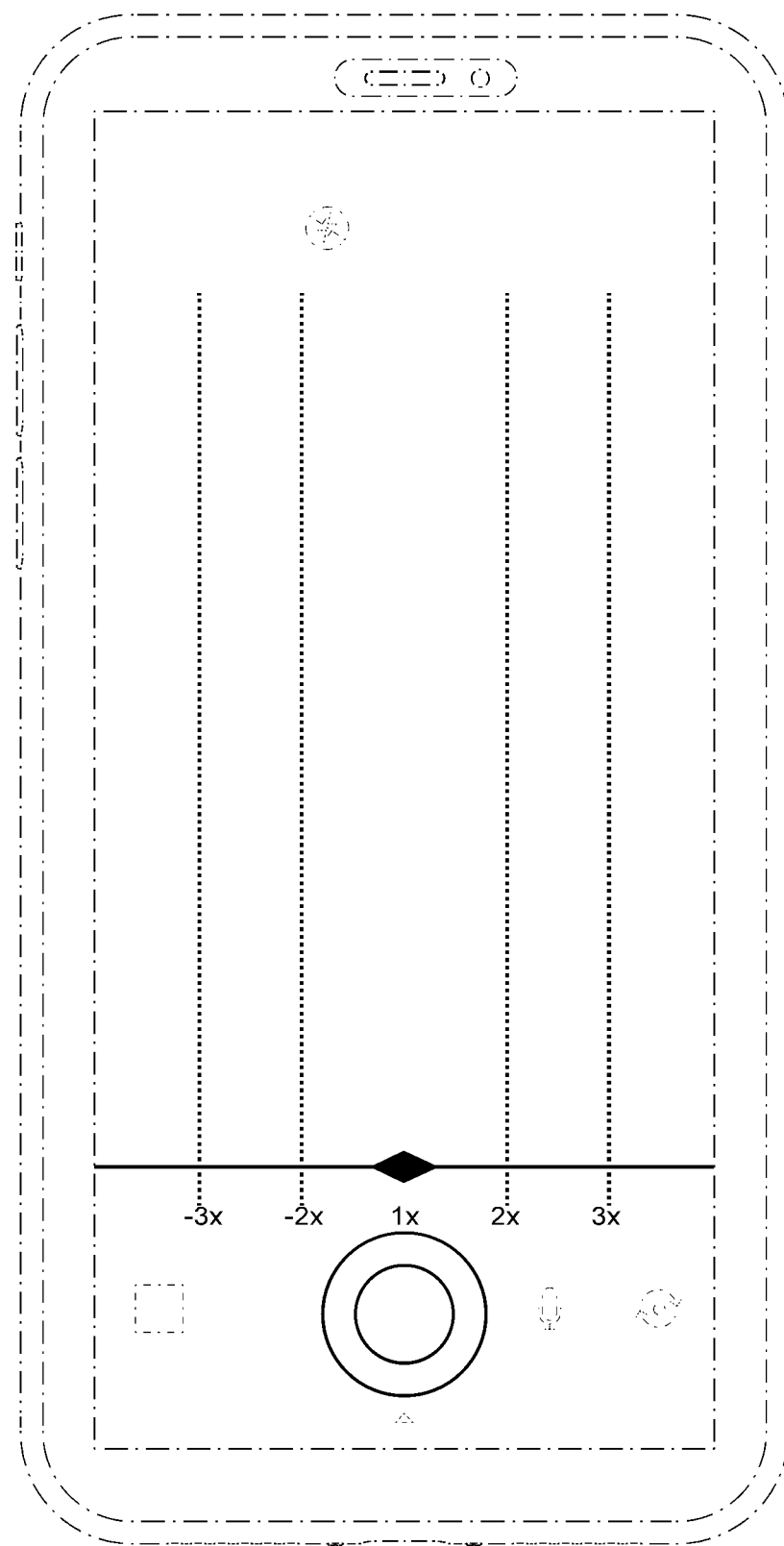
Figure 67:
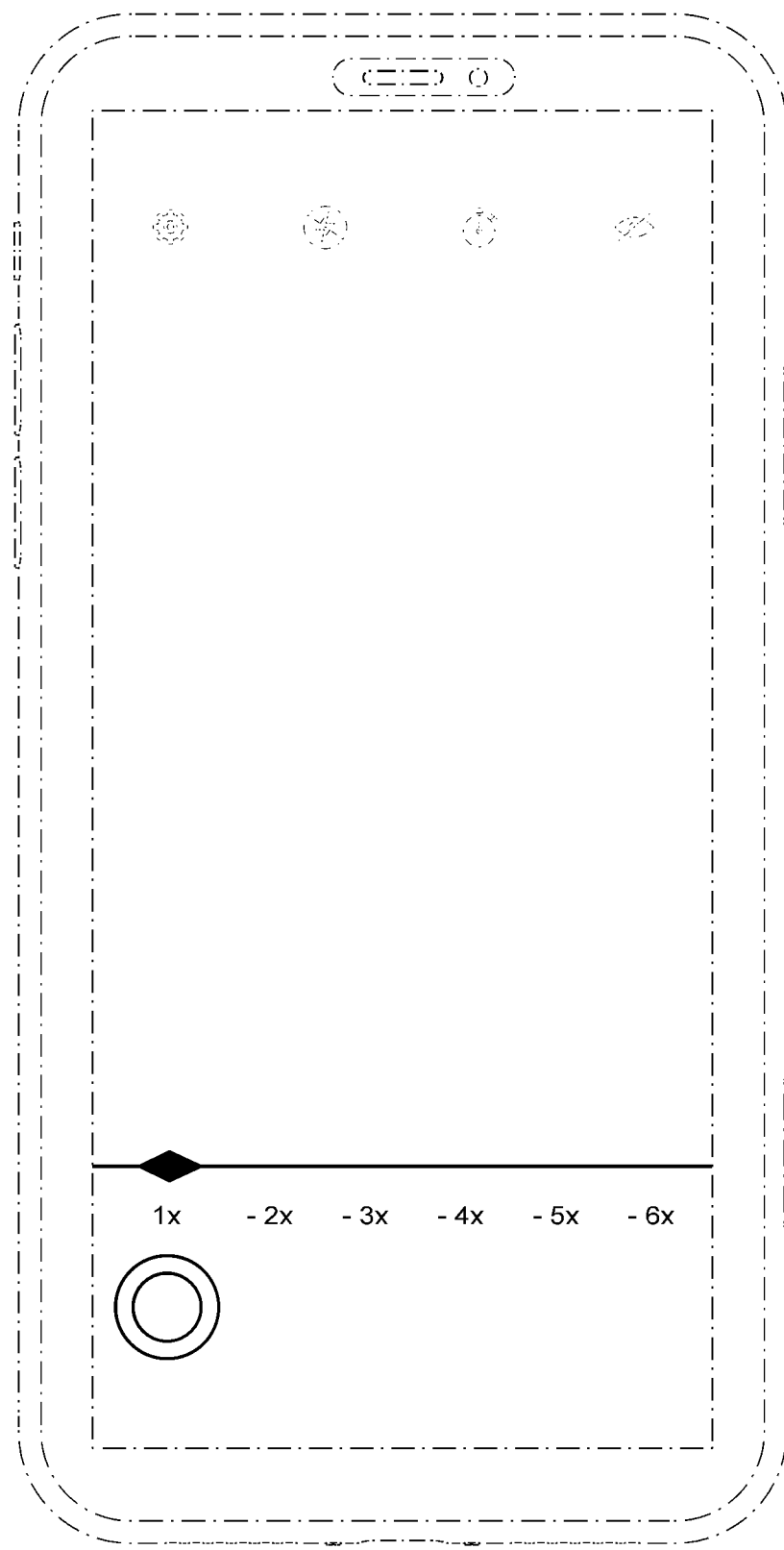
Figure 68:
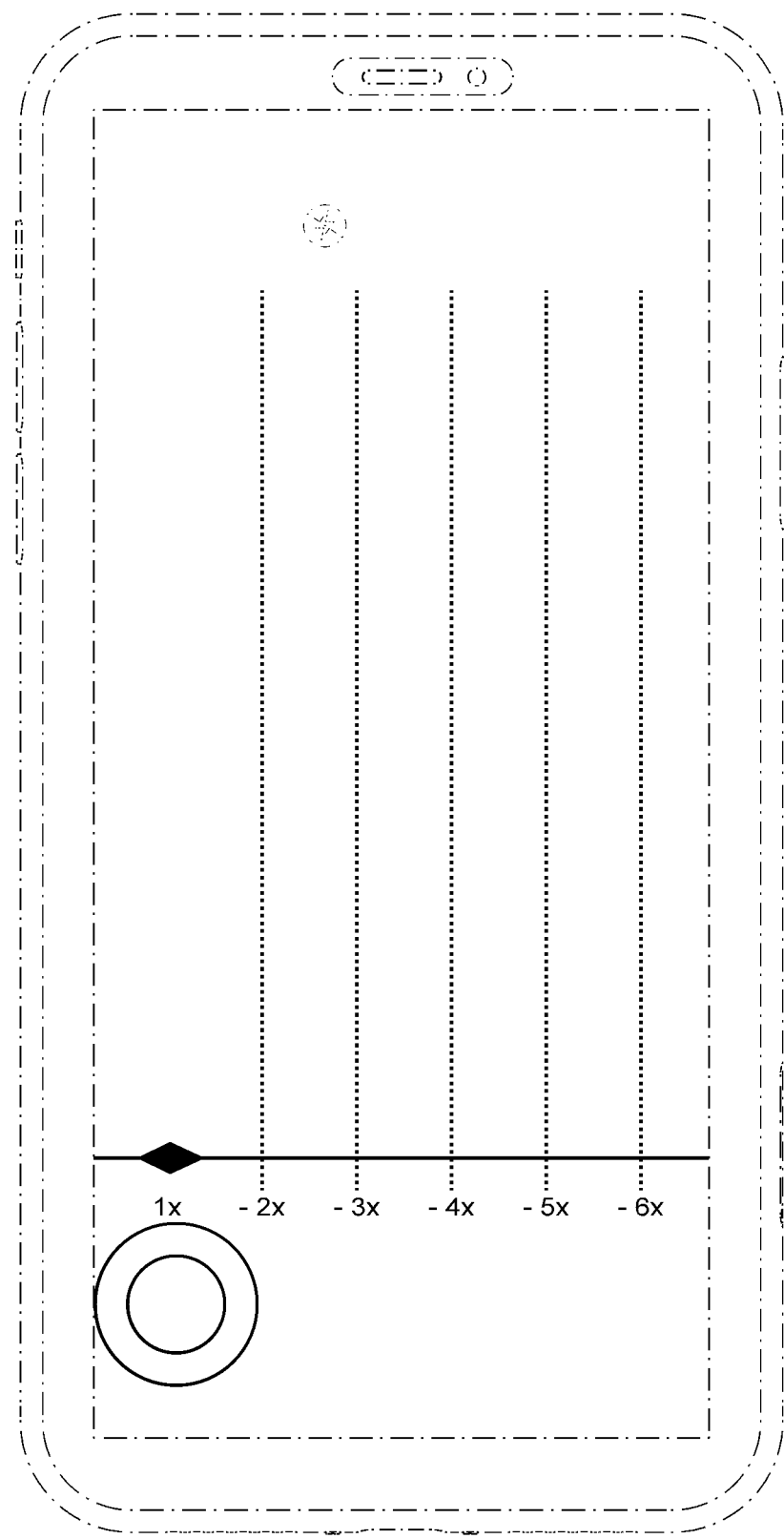
Figure 69:
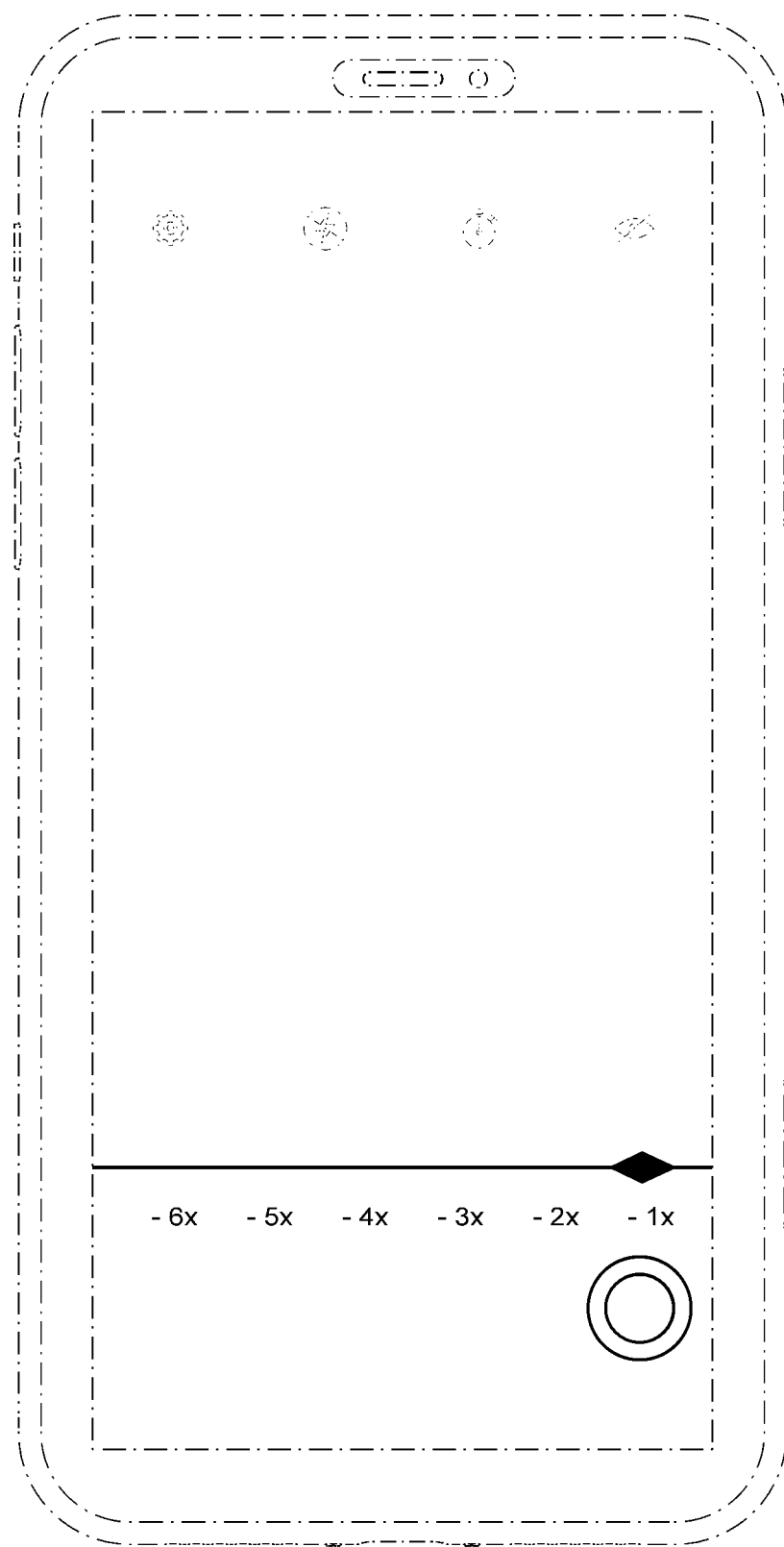
Figure 70:
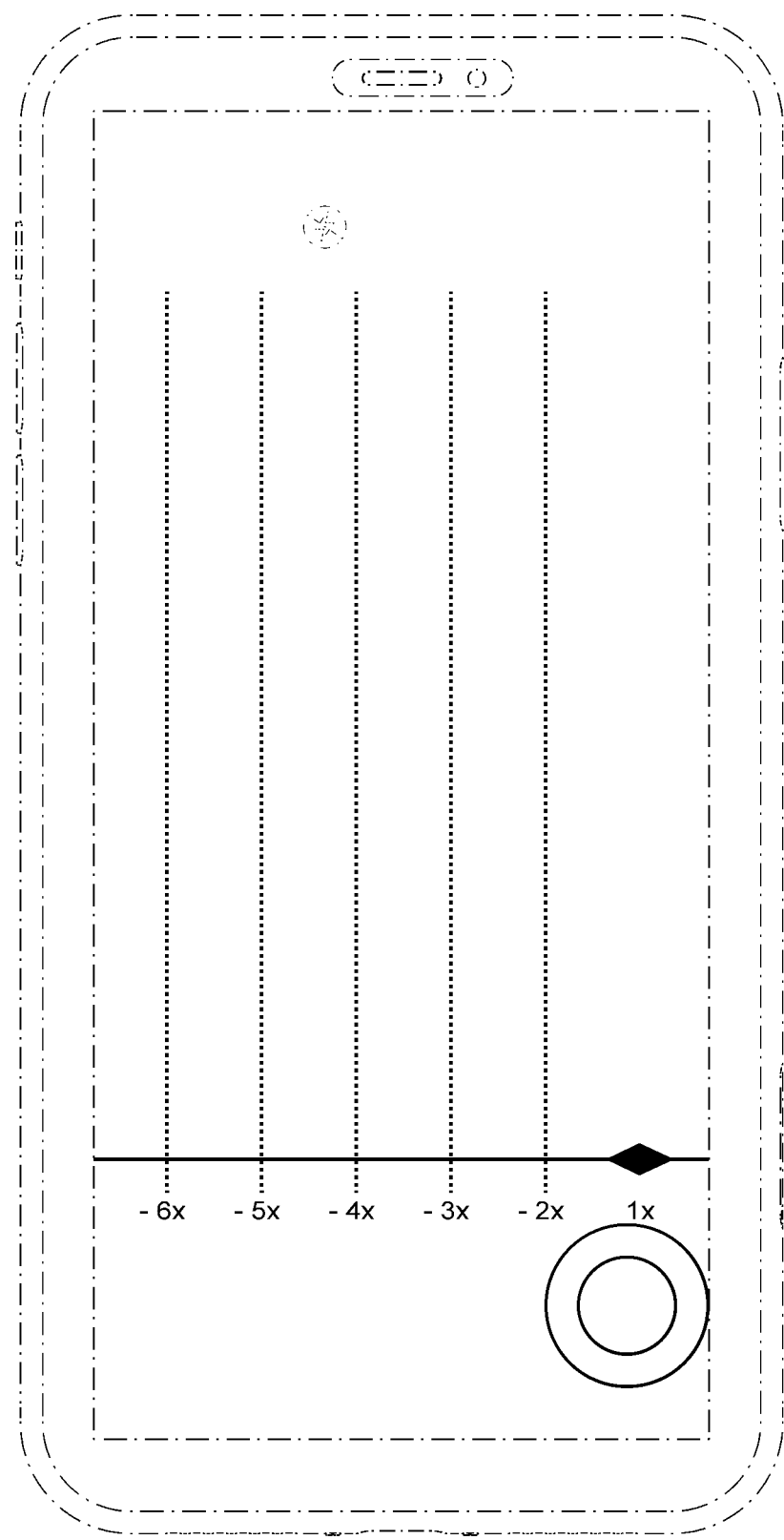
Figure 71:
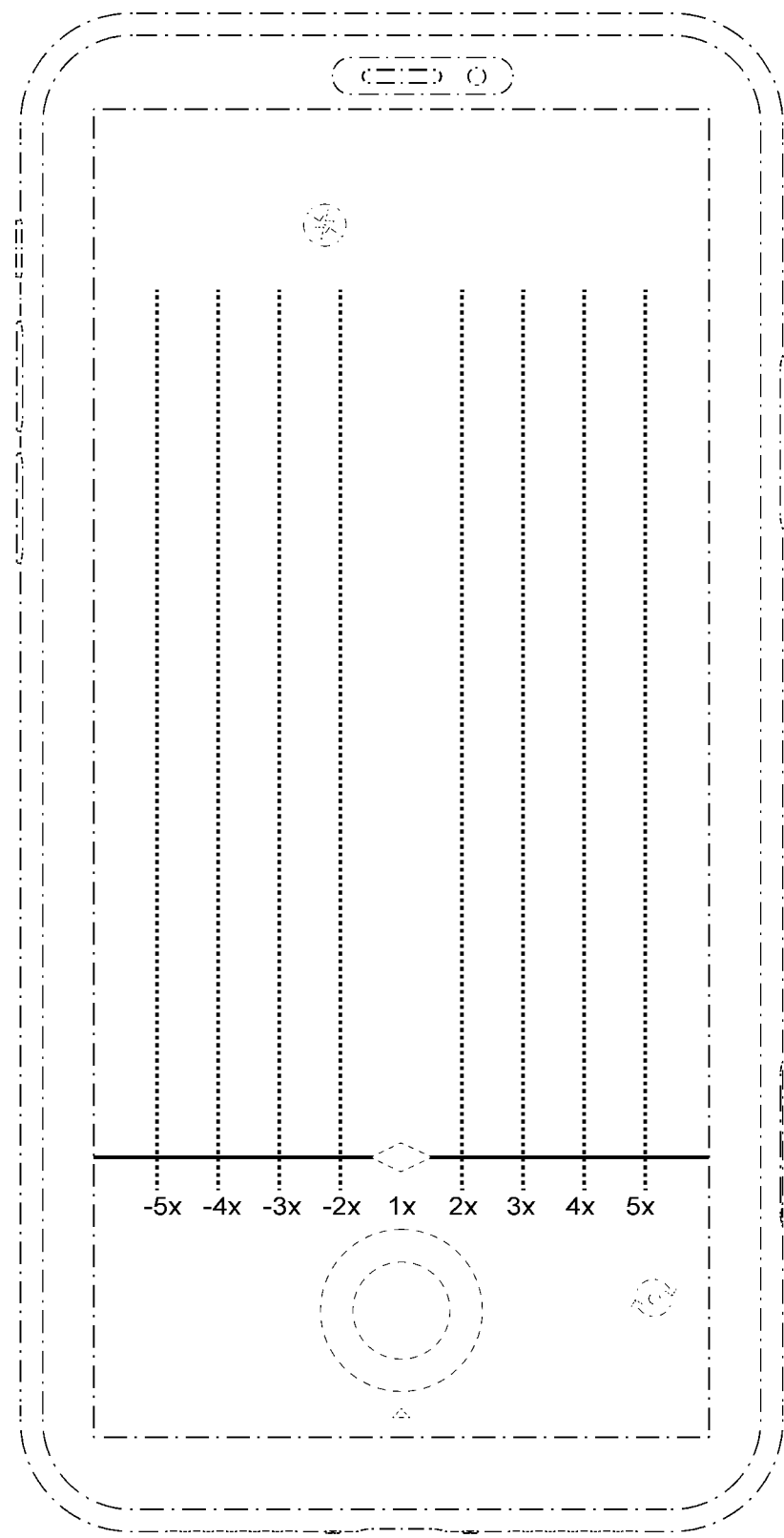
Figure 72:
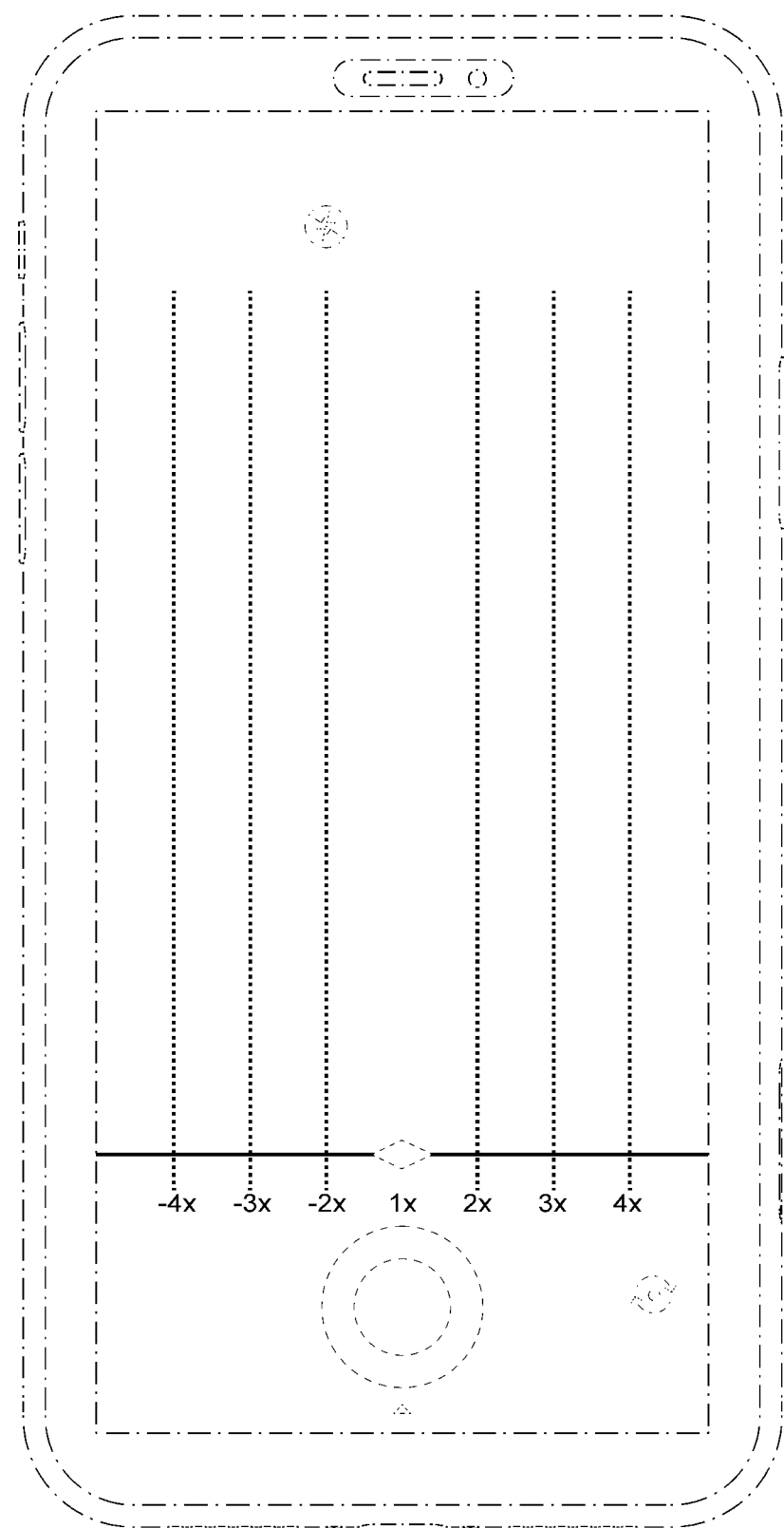
Figure 73:
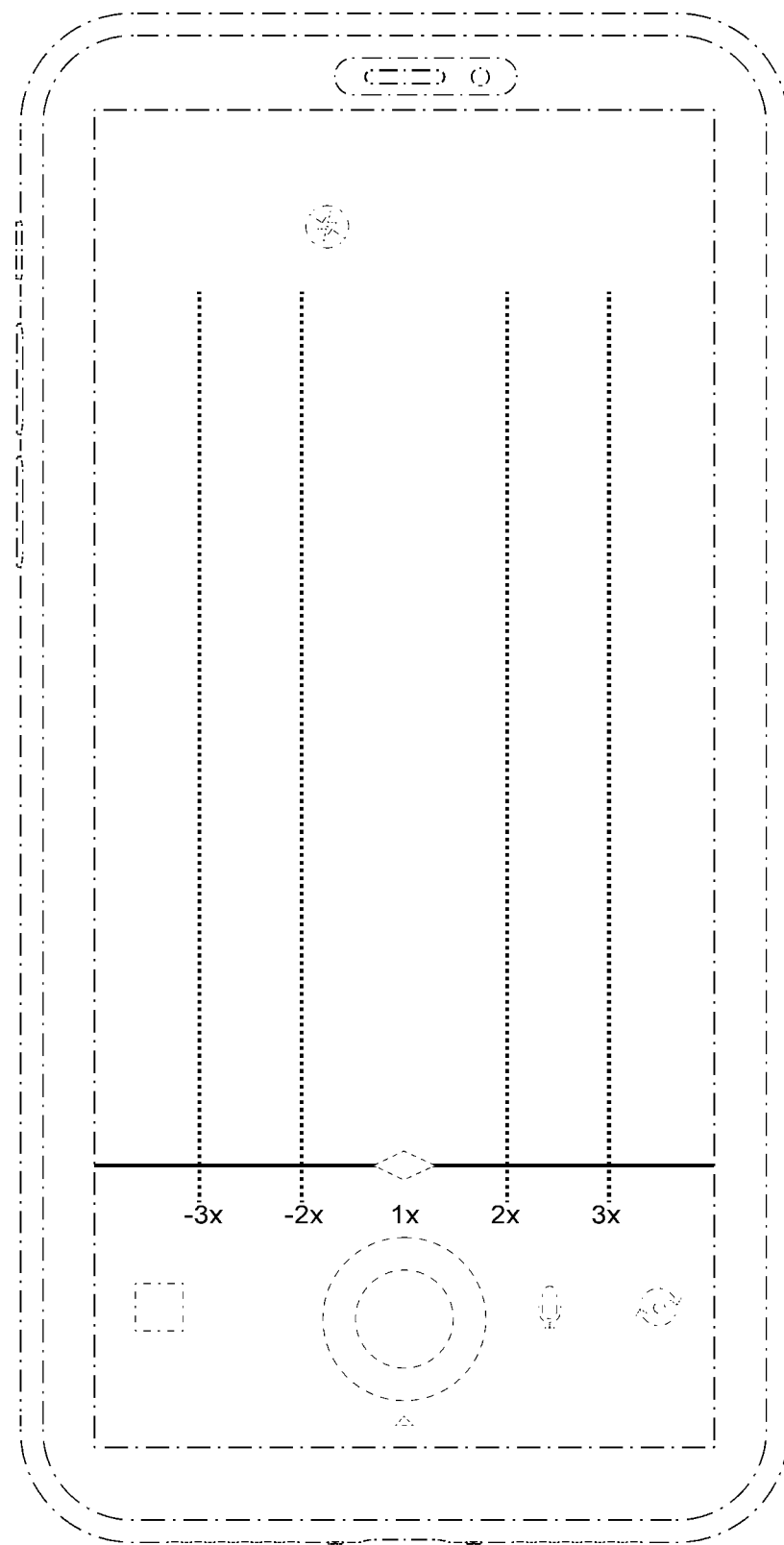
Figure 74:
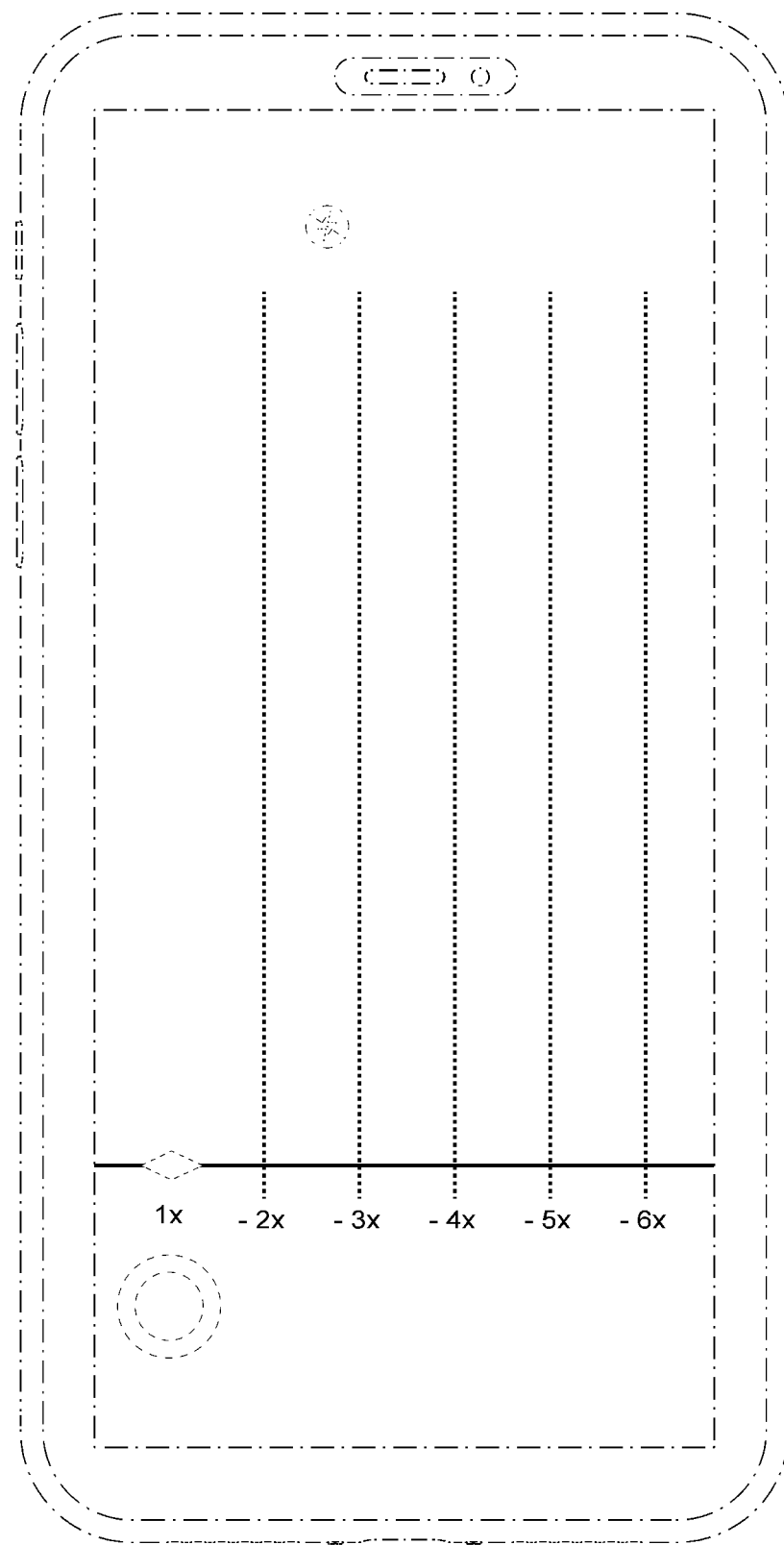
Figure 75:
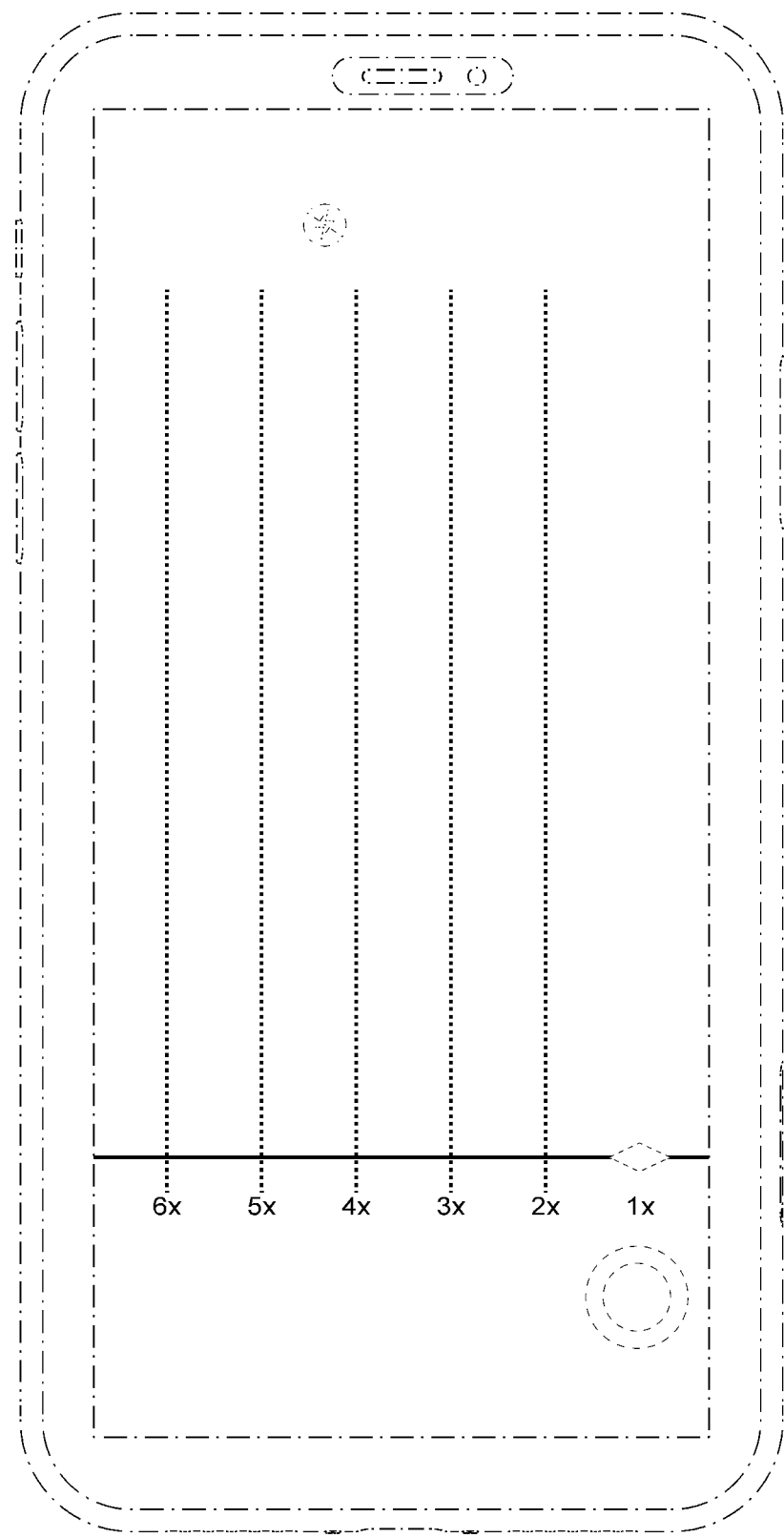
Figure 76:
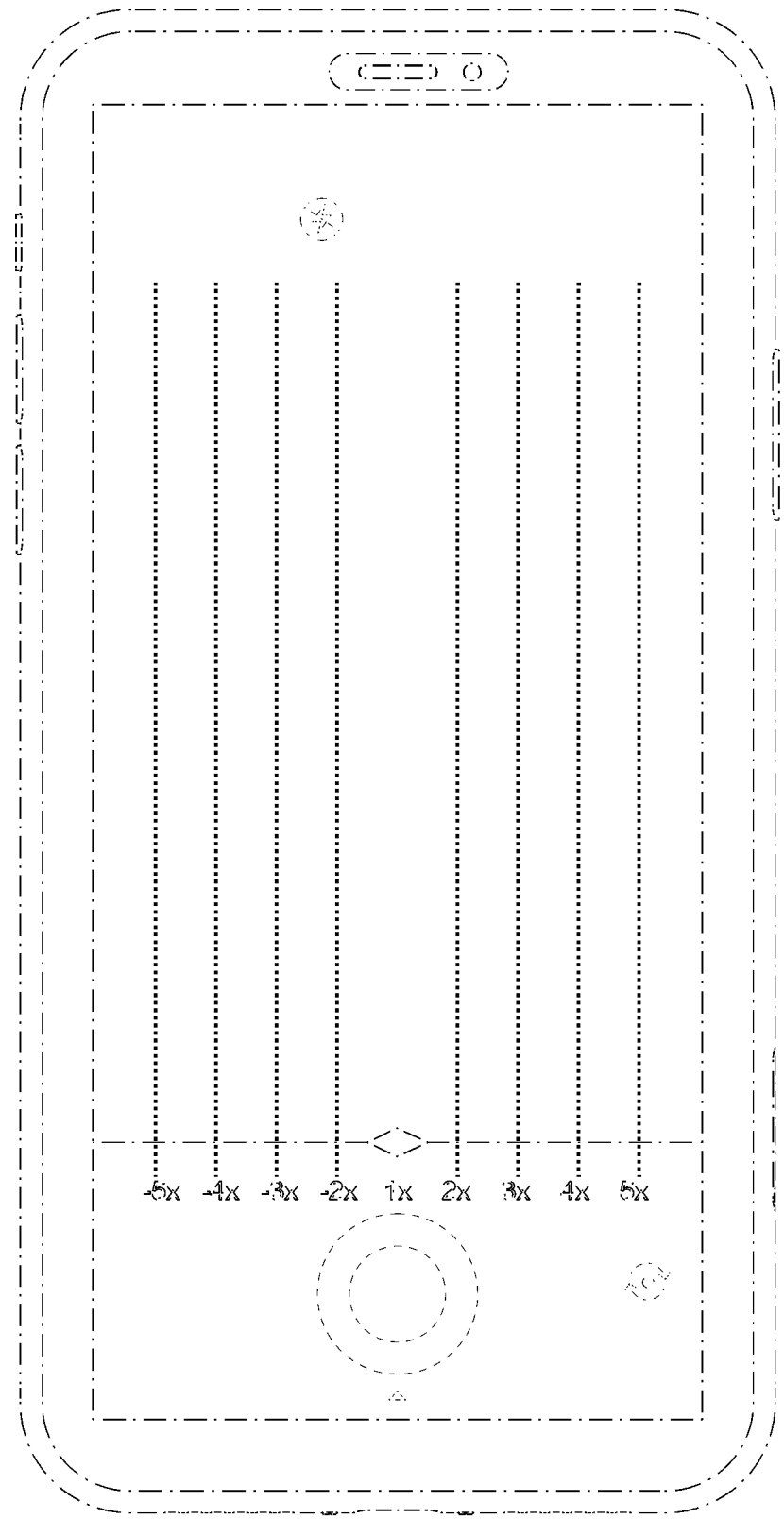
Figure 77:
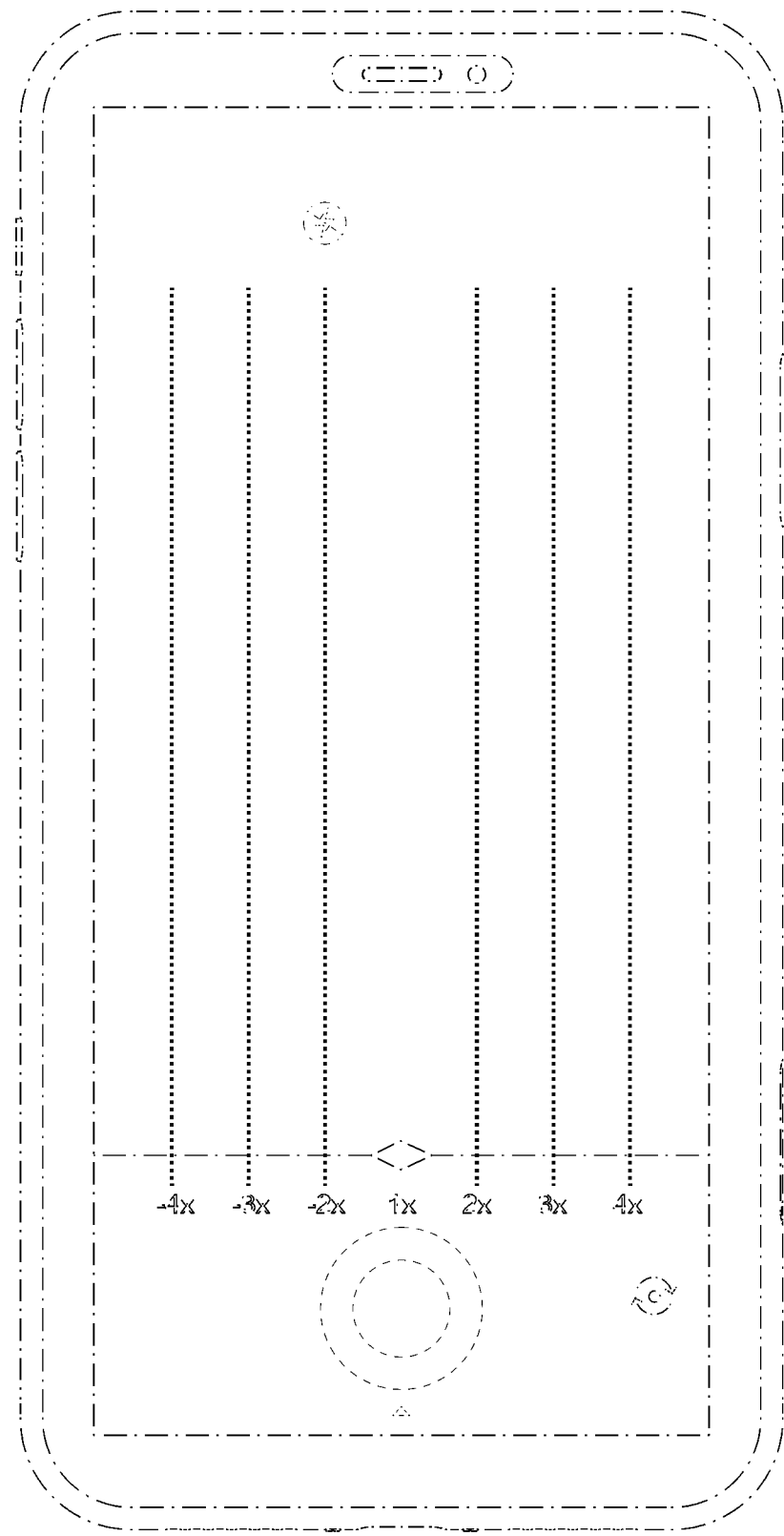
Figure 78:
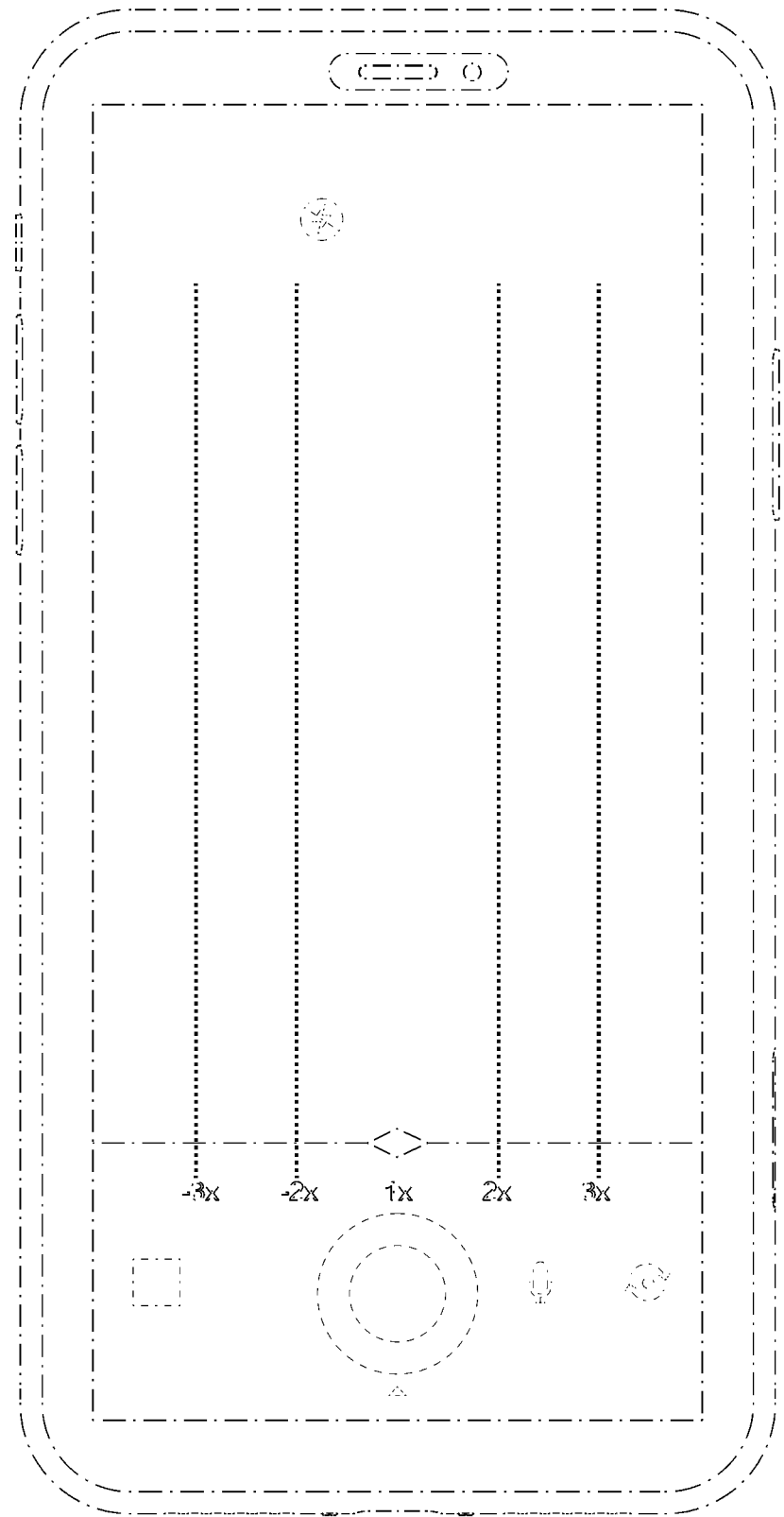
Figure 79:
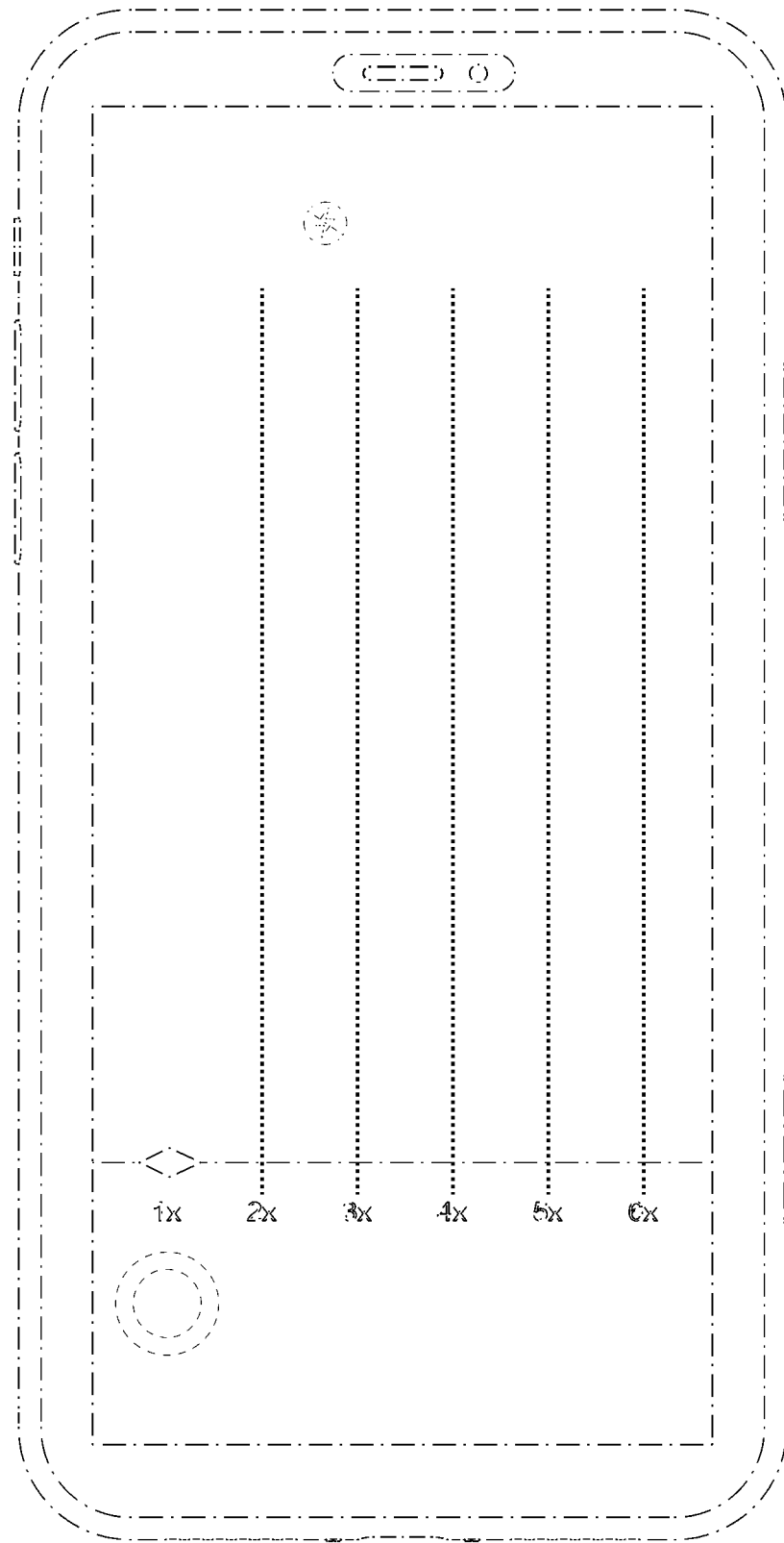
Figure 80:
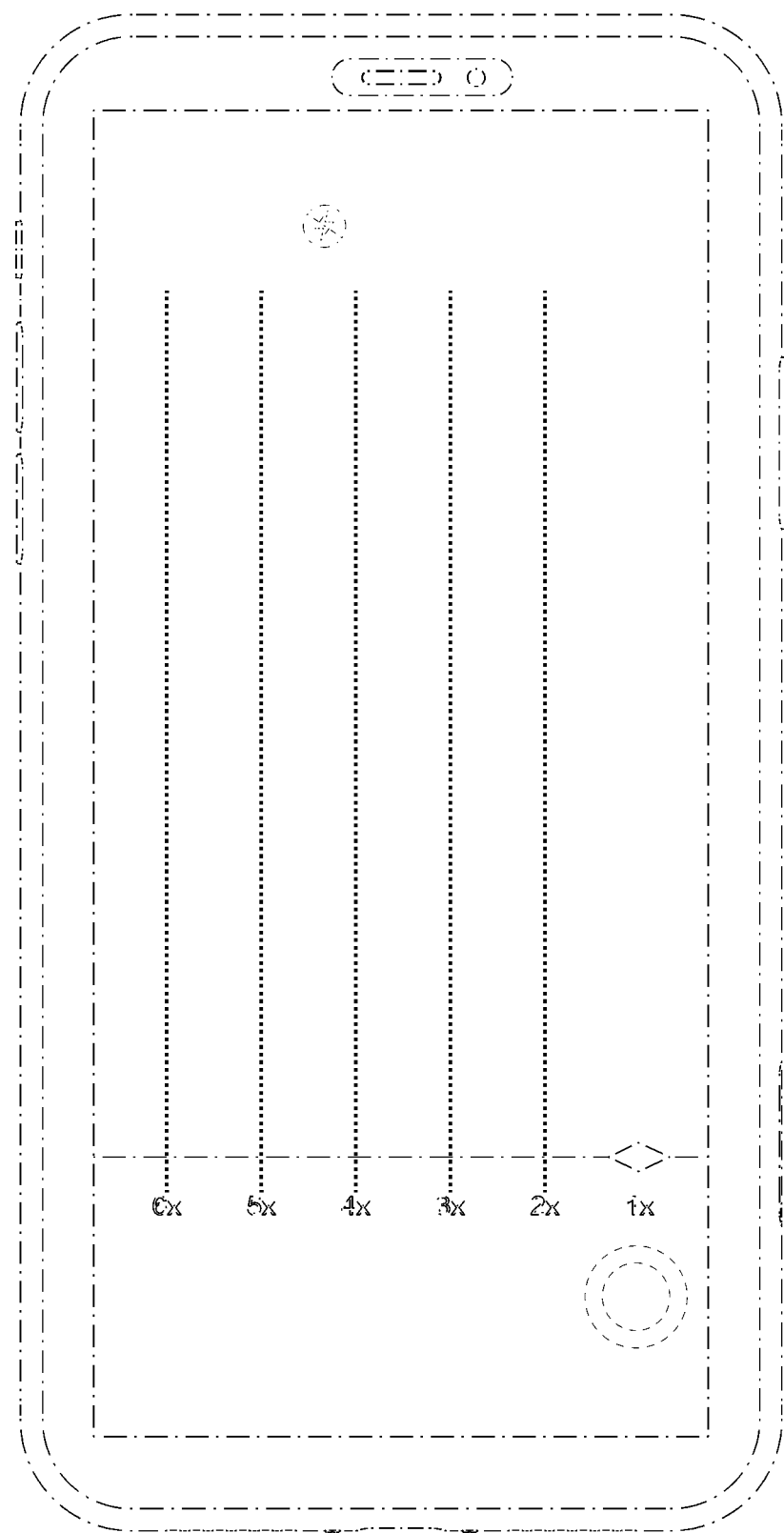

Referring now to the drawings, and particularly to FIGS. 1-60, some or all embodiments of the real time video special effects system and method of the present technology are shown and generally designated by the reference numeral 10. As a general outline, the system comprises a camera configured to capture video of a real world scene or any video remote video feed, including video games, a graphical user interface, at least one memory; and at least one processing unit operably connected or connectable to the camera, the graphical user interface and the at least one memory. The at least one processing unit is configured to: play on the graphical user interface at normal speed the video being captured; and change the video playing speed on the graphical interface of the video being captured from the normal playing speed to a modified playing speed in response to a user input received by the graphical user interface.

Referring now to some or all embodiments in more detail, new and novel real time video special effects system and method 10 of the present technology for creating special effects in video recordings while recording is in progress is illustrated and will be described with reference to FIG. 1. More particularly, the real time video special effects system and method 10 can include a camera 12, an image processor or processing unit 14, a user interface 30 associated with the processing unit, a storage or memory unit 18, a display unit 20. At least one RAM memory and/or at least one non-volatile long term memory can be operably connected or connectable with the processing unit 14. It can be appreciated that the camera 12 can be any device capable of capturing images and/or video, and can be associated or integrated with a microphone 16. The image processing unit 14 is in operable communication with the camera 12, microphone 16, the memory unit 18 and/or the display unit 20. The image processing unit 14 intercepts the raw video data from the camera 12 and/or microphone 16, processes the raw video data in real time in possible accordance with at least one algorithm, and then records output/final video recording data in the memory unit 18 and/or displays the output/final video recording data in the display unit 20.

It can be appreciated that the system 10 can be configured or configurable as a complete video system of an electronic device having one or more video cameras 12, one or more display devices 20, and one or more integrated circuits or processors. Alternatively, it can be appreciated that the imaging processing unit 14 can be configured or configurable as a module or integrated circuit chip embedded in the electronic device or with a component of the electronic device. Further in the alternative, the system 10 can be configured or configurable as a video data processing device such as, but not limited to, a graphics processing unit (GPU), digital signal processor (DSP), Active Server Pages (ASP), central processing unit (CPU), accelerated processing unit (APU), Application Specific Integrated Circuit (ASIC). Even further in the alternative, the system 10 can be configured or configurable as software or programming code as part of an operating system or application running on or controlling the electronic device or camera.

The electronic device including the camera 12, microphone 16 and display unit 20 can be, but not limited to, smart phones, smart watches, tablets, notebooks, desktop computers, laptops, DVD players, televisions digital cameras (point and shoot, single-lens reflex, video cameras, high end audio/visual gear), eyewear, drones, gimbals and other stabilizers, selfie sticks, closed circuit video monitoring system, dash cam for cars, endoscopes, microscopes, telescopes, camera and/or display embedded circuits, wearables, "Internet of Things" (IoT), and the like.

Figure 2:
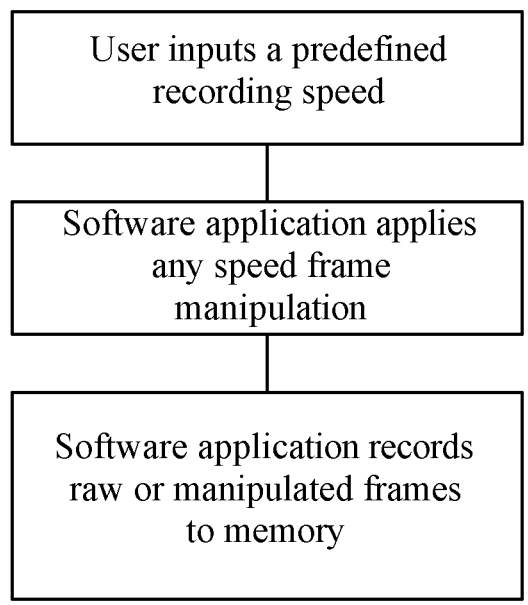
FIG. 2 is a block diagram view of the real time recording speed control method of the present technology.

With reference to FIG. 2, the processing unit 14 can be configured or configurable to receive an input of a user selection of a requested recording speed. The raw video data from the camera 12 can be diverted to the imaging processing unit 14, where the program and/or algorithm modifies or retains the raw frames contained in the raw video data from the camera 12. The raw frames in the data stream are either modified or retained by the imaging processing unit 14 in real time, and then passed to the memory unit 18 and/or display unit 20.

Figure 3A:
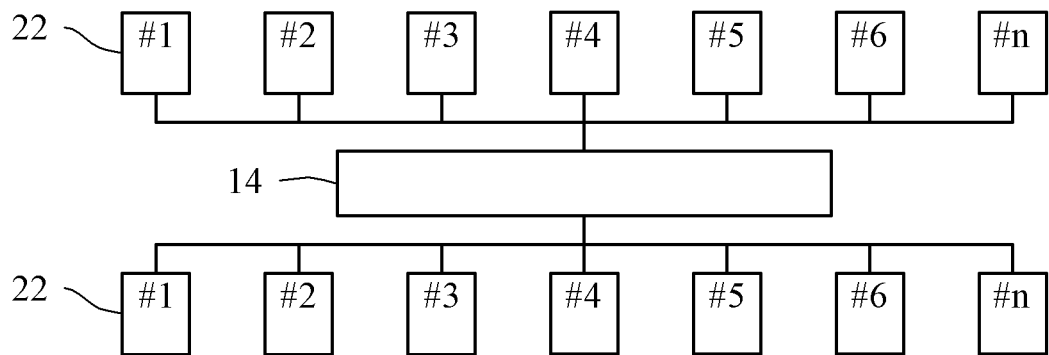
FIG. 3A is a representation of a series of video frames indicating an example of a native frame rate in accordance with the teachings of the present technology.

Examples of operations of the imaging process unit using frame adding, frame blending and frame dropping are illustrated in FIGS. 3A-G. When actuated or while in operation, the imaging processing unit 14 intercepts the raw video data 22 from the camera 12, which includes a series of frames #1-#n at a native frame rate for proper presentation by the display unit 20. For exemplary purposes, the frame rate shown in FIG. 3A can be 30 fps. The imaging processing unit 14 receives the raw frames 22 and then can modify or retain the raw frames dependent on one or more inputs signals received by the imaging processing unit 14. If the imaging processing unit 14 receives no input signals requesting an adjustment of the frame speed rate, then all the raw frames contained in the raw video data 22 are passed through to other components such as the memory unit of the electronic device, as best illustrated in FIG. 3A.

Figure 3B:
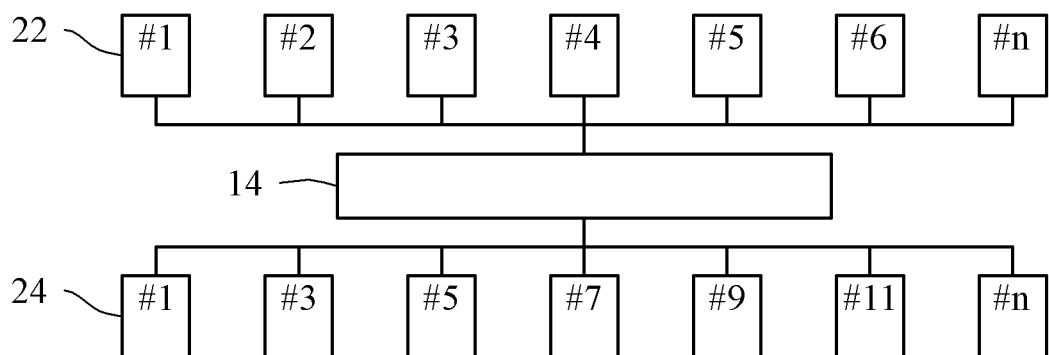
FIG. 3B is a representation of a series of video frames indicating an example of frame dropping in accordance with a fast motion speed at 2× the native frame rate.

In some or all embodiments, if the imaging processing unit 14 receives a special effect input signal associated with a fast motion recording operation, which represents a speed up or fast forward displaying at 2× the native frame rate, then the imaging processing unit 14 appropriately modifies the raw video data 22. Upon which, the raw frames 22 are processed using algorithm wherein every second frame is dropped, as best illustrated in FIG. 3B. Raw frame #1 can be appended in writer, raw frame #2 can be skipped/dropped, then raw frame #3 can be written, and then raw frame #4 can be skipped/dropped, and so on until a modified or output video recording data 24 is generated in 2× fast motion speed. This process is conducted in real time, and the fast motion output video is recorded in place of the raw video data 22, and/or displayed in real time.

Figure 3C:
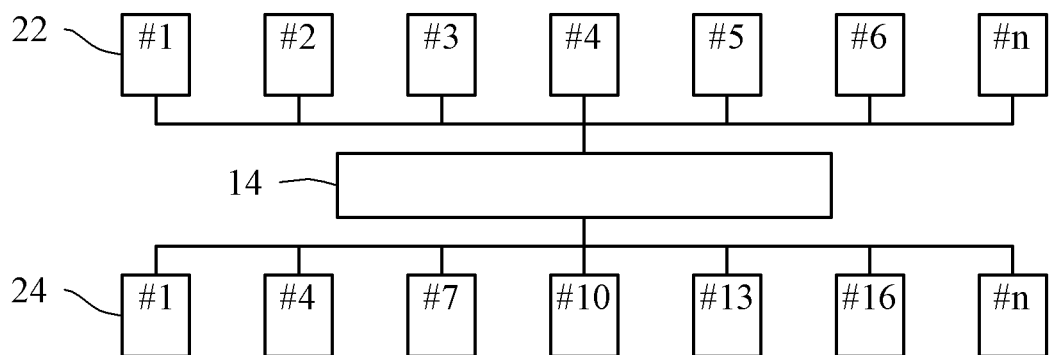
FIG. 3C is a representation of a series of video frames indicating an example of frame dropping in accordance with a fast motion speed at 3× the native frame rate.

In some or all embodiments, if the imaging processing unit 14 receives a special effect input signal associated with a fast motion recording operation, which represents a speed up or fast forward displaying at 3× the native frame rate, then the imaging processing unit 14 appropriately modifies the raw video data 22. Upon which, the raw frames 22 are processed using algorithm wherein every second and third frames are dropped, as best illustrated in FIG. 3C. Raw frame #1 can be appended in writer, the raw frames #2 and #3 can be skipped/dropped, then raw frame #4 can be written, then raw frames #5 and #6 can be skipped/dropped, and then raw frame #7 can be written, and so on until a modified or output video recording data 24 is generated in 3× fast motion speed. This process is conducted in real time, and the fast motion output video is recorded in place of the raw video data 22, and/or displayed in real time.

Figure 3D:
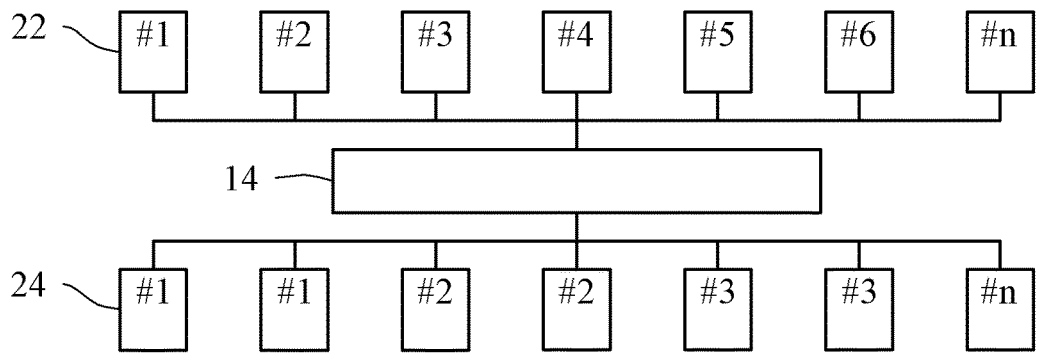
FIG. 3D is a representation of a series of video frames indicating an example of frame adding using frame copying in accordance with a slow motion speed at −2× the native frame rate.

For example, if the imaging processing unit 14 receives a special effect input signal associated with a slow motion recording operation, which represents a slowdown or slow motion displaying at −2× the native frame rate. Upon which, the raw frames 22 are processed using algorithm wherein every frame is duplicated/repeated, as best illustrated in FIG. 3D. Raw frame #1 can be appended in writer, then raw frame #1 is duplicated and written, then raw frame #2 is written, then raw frame #2 is duplicated and written, then raw frame #3 is written, and then raw frame #3 is duplicated and written, and so on until a modified or output video recording data 24 is generated in −2× slow motion speed. This process is conducted in real time, and the slow motion output video is recorded in place of the raw video data 22, and/or displayed in real time or immediately after recording has stopped and the post recording algorithm has completed processing the commands entered while recording.

Figure 3E:
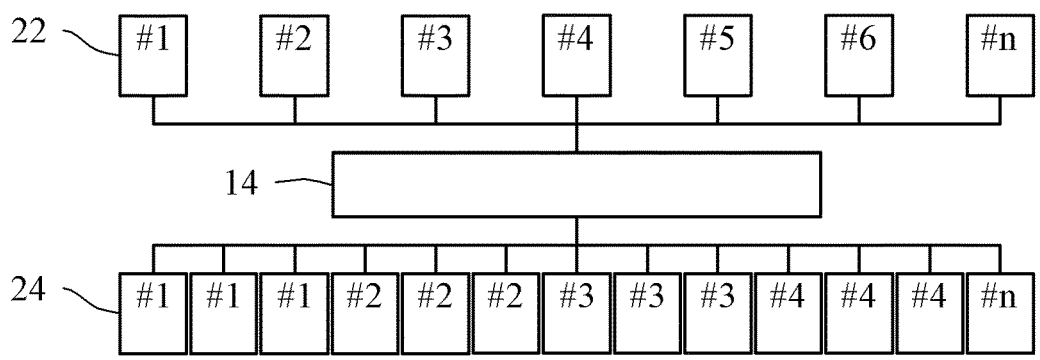
FIG. 3E is a representation of a series of video frames indicating an example of frame adding using frame copying in accordance with a slow motion speed at −3× the native frame rate.

In some or all embodiments, if the imaging processing unit 14 receives a special effect input signal associated with a slow motion recording operation, which represents a slowdown or slow motion displaying at −3× the native frame rate, then the imaging processing unit 14 appropriately modifies the raw video data 22. Upon which, the raw frames are processed using algorithm wherein every frame is duplicated/repeated at least twice, as best illustrated in FIG. 3E. Raw frame #1 can be appended in writer, then raw frame #1 is duplicated twice and each is written, then raw frame #2 is written, then raw frame #2 is duplicated twice and each is written, then raw frame #3 is written, and then raw frame #3 is duplicated twice and each written, and so on until a modified or output video recording data 24 is generated in −3× slow motion speed. This process is conducted in real time, and the slow motion output video is recorded.

Figure 3F:
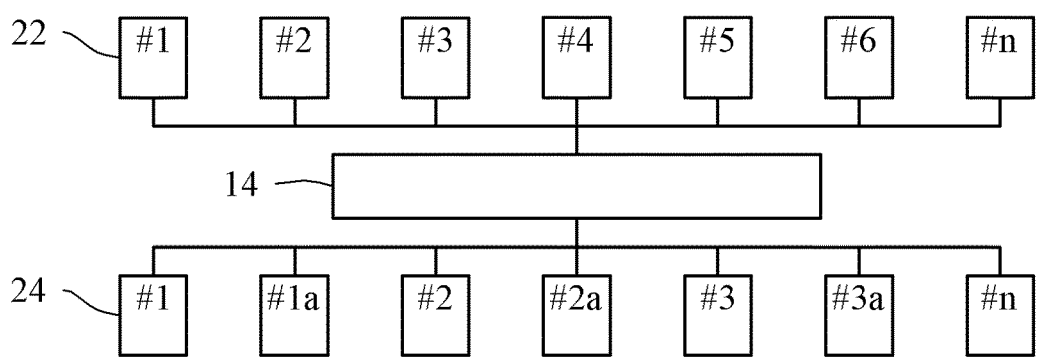
FIG. 3F is a representation of a series of video frames indicating an example of frame adding using frame blending in accordance with a slow motion speed at −2× the native frame rate.

In some or all embodiments, if the imaging processing unit 14 receives a special effect input signal associated with a slow motion recording operation, which represents a slowdown or slow motion displaying at −2× the native frame rate. Upon which, the raw frames 22 are processed using algorithm wherein new frames are created as a result of "blending" of two adjacent frames, as best illustrated in FIG. 3F. Raw frame #1 can be appended in writer, then raw frame #1 is "blended" with raw frame #2 to create 1 new frame, #1a, and then #1a is written, then raw frame #2 is written, then raw frame #2 is "blended" with raw frame #3 to create 1 new frame, #2a, and then #2a is written, then raw frame #3 is written, then raw frame #3 is "blended" with raw frame #4 to create 1 new frame, #3a, and then #3a is written, and so on until a modified or output video recording data 24 is generated in −2× slow motion speed. This process is conducted in real time, and the slow motion output video is recorded in place of the raw video data 22, and/or displayed in real time or immediately after recording has stopped and the post recording algorithm has completed processing the commands entered while recording.

Figure 3G:
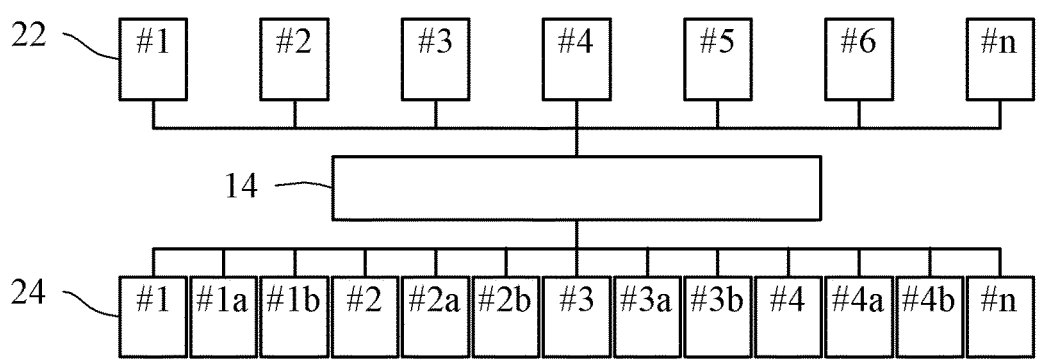
FIG. 3G is a representation of a series of video frames indicating an example of frame adding using frame blending in accordance with a slow motion speed at −3× the native frame rate.

In some or all embodiments, if the imaging processing unit 14 receives a special effect input signal associated with a slow motion recording operation, which represents a slowdown or slow motion displaying at −3× the native frame rate. Upon which, the raw frames 22 are processed using algorithm wherein new frames are created as a result of "blending" of two adjacent frames, as best illustrated in FIG. 3G. Raw frame #1 can be appended in writer, then raw frame #1 is "blended" with raw frame #2 to create 2 new frame, #1a & 1b, and then #1a & #1b are written, then raw frame #2 is written, then raw frame #2 is "blended" with raw frame #3 to create 2 new frame, #2a & #2b, and then #2a & #2b are written, then raw frame #3 is written, then raw frame #3 is "blended" with raw frame #4 to create 2 new frame, #3a & #3b, and then #3a & #3b are written, and so on until a modified or output video recording data 24 is generated in −3× slow motion speed. This process is conducted in real time, and the slow motion output video is recorded in place of the raw video data 22, and/or displayed in real time or immediately after recording has stopped and the post recording algorithm has completed processing the commands entered while recording.

It can be appreciated that additional fast and/or slow motion operations can be performed with greater fast motion or slow motion speeds than those described above. It can further be appreciated that a combination of fast motion and slow motion speeds can be implemented to a single raw video data in real time. Thus creating output/final video recording data containing portions of native speed rate, fast motion speed, slow motion speed or any combination thereof.

Figure 4:
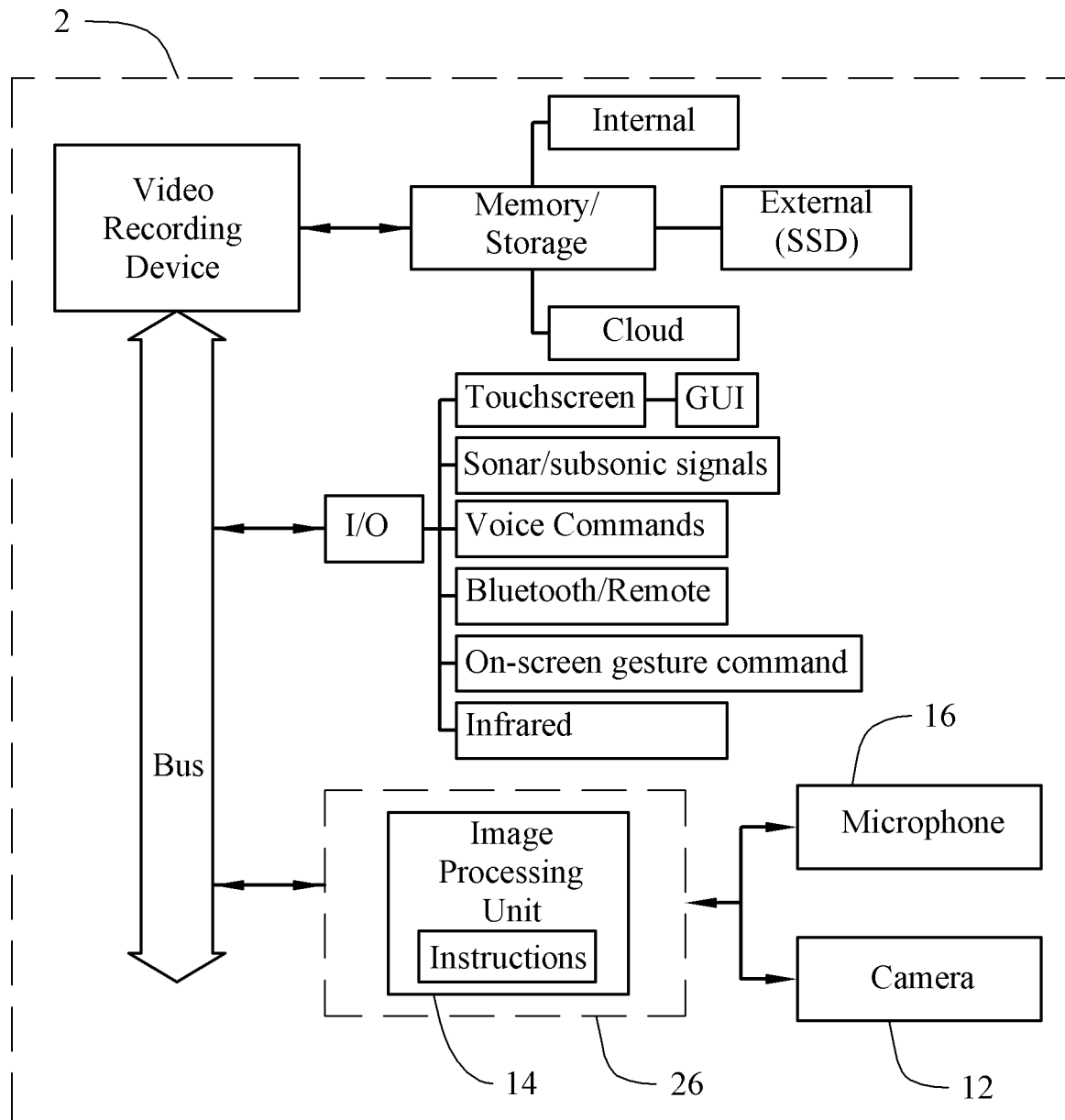
FIG. 4 illustrates an exemplary integrated circuit chip embedded in an electronic computing device that may be used to implement an embodiment of the present technology.
Figure 5:
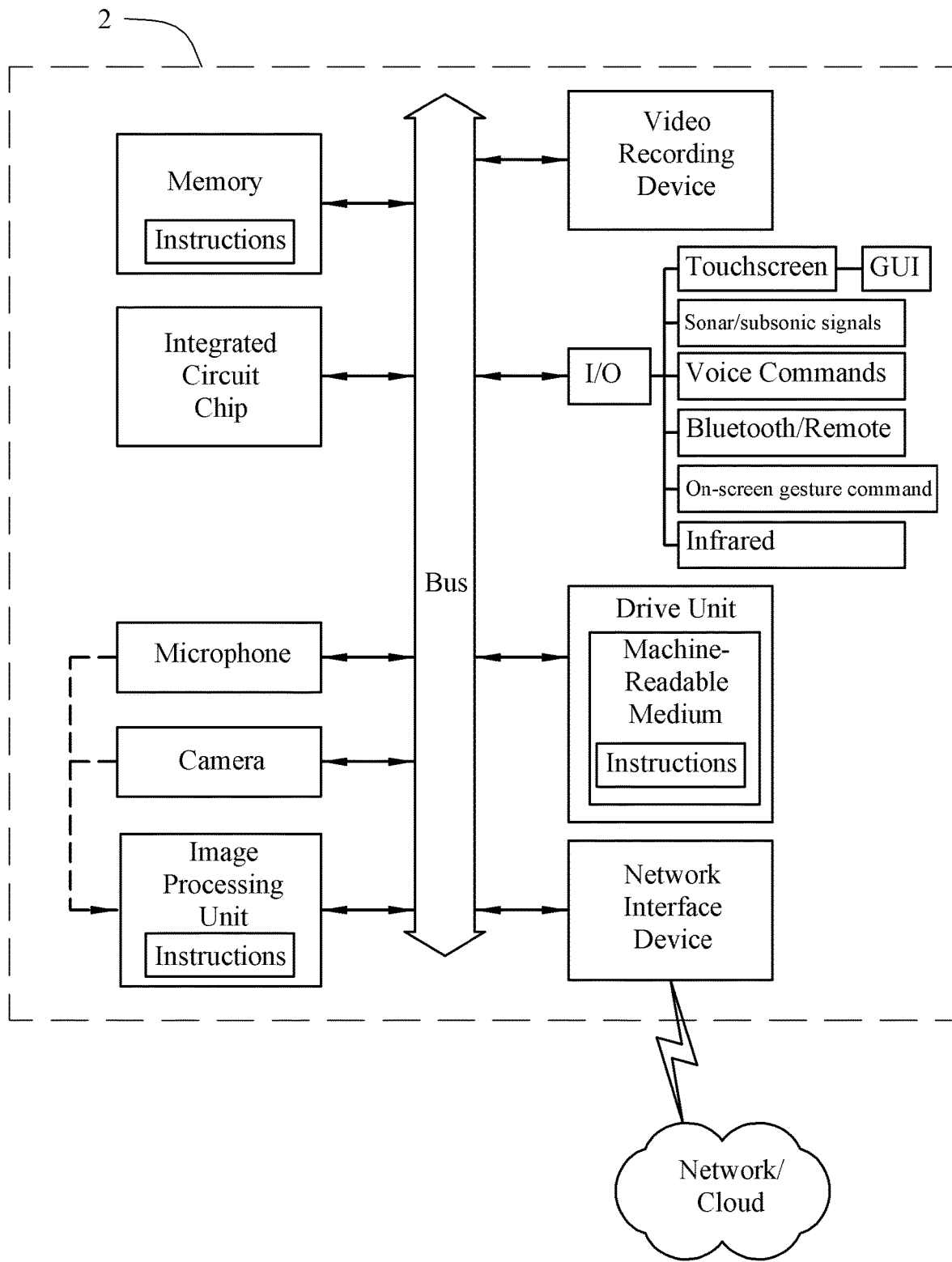
FIG. 5 illustrates an exemplary electronic computing device that may be used to implement an embodiment of the present technology.

With reference to FIGS. 4 and 5, a companion software application can be associated with and/or executed by the image processing unit 14 or an electronic computing device, machine or system 2 that is operably associated with the image processing unit 14. FIG. 4 is a diagrammatic representation of the image processing unit 14 incorporated with an integrated circuit chip 26, which can be embedded with an example machine or component thereof, such as the camera 12, in the form of the electronic device 2, within which a set of instructions for causing the component or electronic device to perform any one or more of the methodologies discussed herein may be executed. Integrated circuit chip 26 containing the image processing unit 14 can be configured or configurable to include firmware for its operation. It can be appreciated that the integrated circuit chip 26 can be embedded with the camera 12, the display unit 20, or other components of the electronic device 2. It can be appreciated that remote controls connected to the electronic device or camera through Bluetooth® or other protocols can be utilized.

The integrated circuit chip 26 can include a computer or machine-readable medium on which is stored one or more sets of instructions and data structures (e.g., instructions) embodying or utilizing any one or more of the methodologies or functions described herein. The instructions are configured or configurable for operation of the image processing unit 14, which can receive operational instructions from the interface or GUI.

The device 2 can further include a number of different input (including simultaneous input from multiple feeds) and/or output (I/O) systems such as, but not limited to, a touchscreen and GUI, sonar or subsonic transmitter, receiver and/or transceiver, voice command, Bluetooth®, remote controller, on-screen gesture command or infrared. The device 2 can further record video or images from the video recording device to a memory/storage system such as, but not limited to, an internal memory, an external memory, external solid-state drive (SSD) or the cloud.

FIG. 5 is a diagrammatic representation of the image processing unit 14 incorporated with the electronic device 2 within which a set of instructions for causing the electronic device to perform any one or more of the methodologies discussed herein may be executed.

In various example embodiments, the electronic device 2 operates as a standalone device or may be connected (e.g., networked) to other devices. In a networked deployment, the electronic device may operate in the capacity of a server or a client machine in a server-client network environment, or as a peer machine in a peer-to-peer (or distributed) network environment. The electronic device may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that device. Further, while only a single electronic device is illustrated, the term "device" shall also be taken to include any collection of devices that individually or jointly execute a set (or multiple sets) of instructions to perform any one or more of the methodologies discussed herein.

The example electronic device 2 includes a processor or multiple processors (e.g., CPU, GPU, or both), and a main memory and/or static memory, which communicate with each other via a bus. In other embodiments, the electronic device 2 may further include a video display (e.g., a liquid crystal display (LCD)). The electronic device 2 may also include an alpha-numeric input device(s) (e.g., a keyboard), a cursor control device (e.g., a mouse), a voice recognition or biometric verification unit (not shown), a drive unit (also referred to as disk drive unit), a signal generation device (e.g., a speaker), a universal serial bus (USB) and/or other peripheral connection, and a network interface device. In other embodiments, the electronic device 2 may further include a data encryption module (not shown) to encrypt data.

The image processing unit 14 can be a module operably associated with the drive unit, with the drive unit including a computer or machine-readable medium on which is stored one or more sets of instructions and data structures (e.g., instructions) embodying or utilizing any one or more of the methodologies or functions described herein. The instructions may also reside, completely or at least partially, within the memory and/or within the processors during execution thereof by the electronic device 2. The memory and the processors may also constitute machine-readable media.

The instructions may further be transmitted or received over a network via the network interface device utilizing any one of a number of well-known transfer protocols (e.g., Extensible Markup Language (XML)). While the machine-readable medium is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the device and that causes the device to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

It is appreciated that the software application is configured or configurable to be stored in any memory of the electronic device 2 or on a remote computer in communication with the electronic device 2. The software application is configured or configurable to include the interface capable of allowing a user to define a custom frame speed rate of the video to be recorded without changing the default frame speed rate by the camera 12.

Referring now in more to methods for controlling a special effects operation of live video capturing data in real time. As outline, in some or all embodiments, the methods comprise capturing a video of real world scene with the camera; playing at normal speed on a graphical user interface the video being captured; changing the playing speed on the graphical user interface of the video being recorded from the normal playing speed to a modified playing speed in response to a user interface input received by the graphical user interface. Reference will now be made in more detail to specific processes according to some or all embodiments for controlling special effects operations of live video capturing data in real time.

Figure 6:
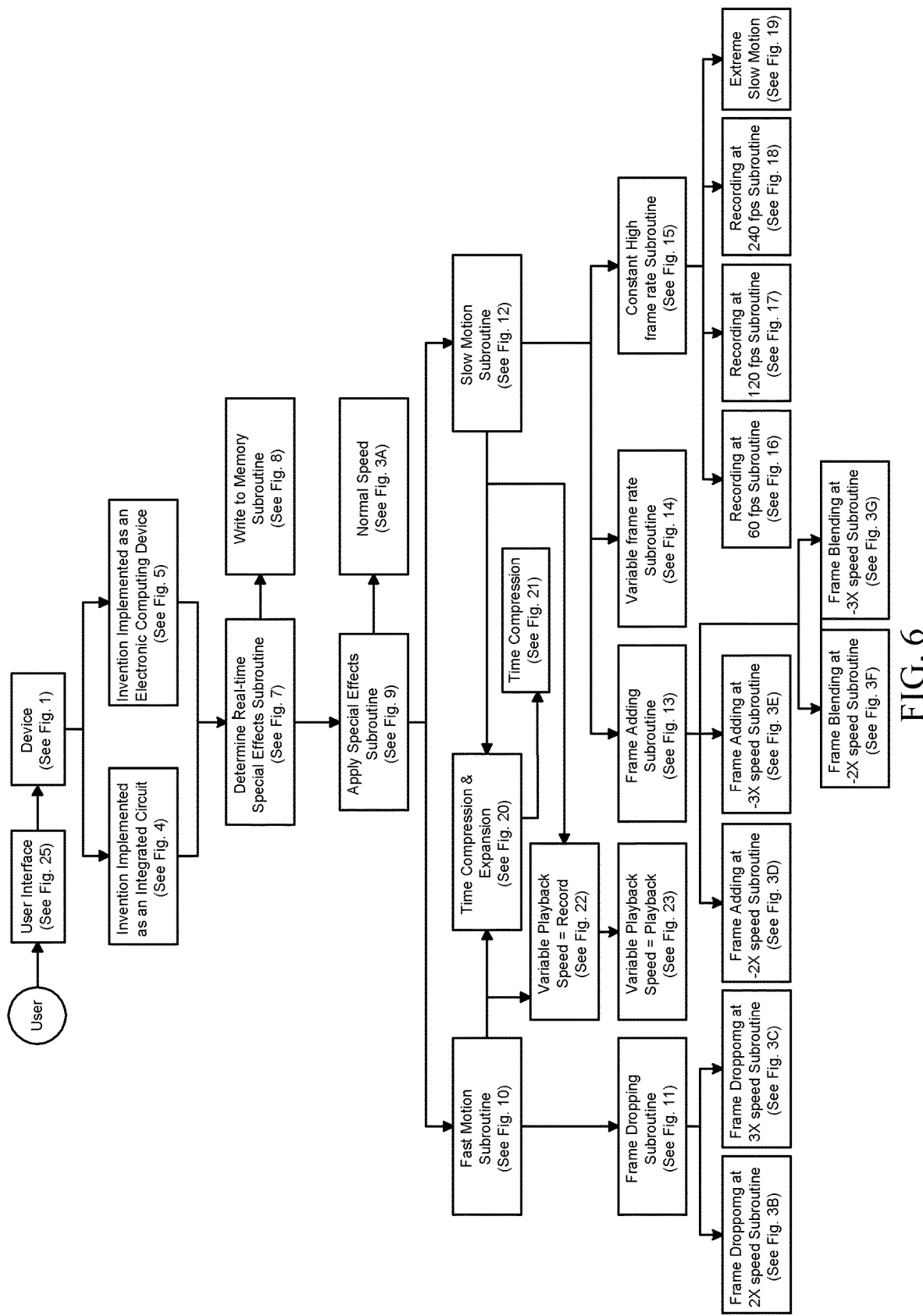
FIG. 6 is a flow chart of an example of the overall process including subroutines that can be utilized.
Figure 7:
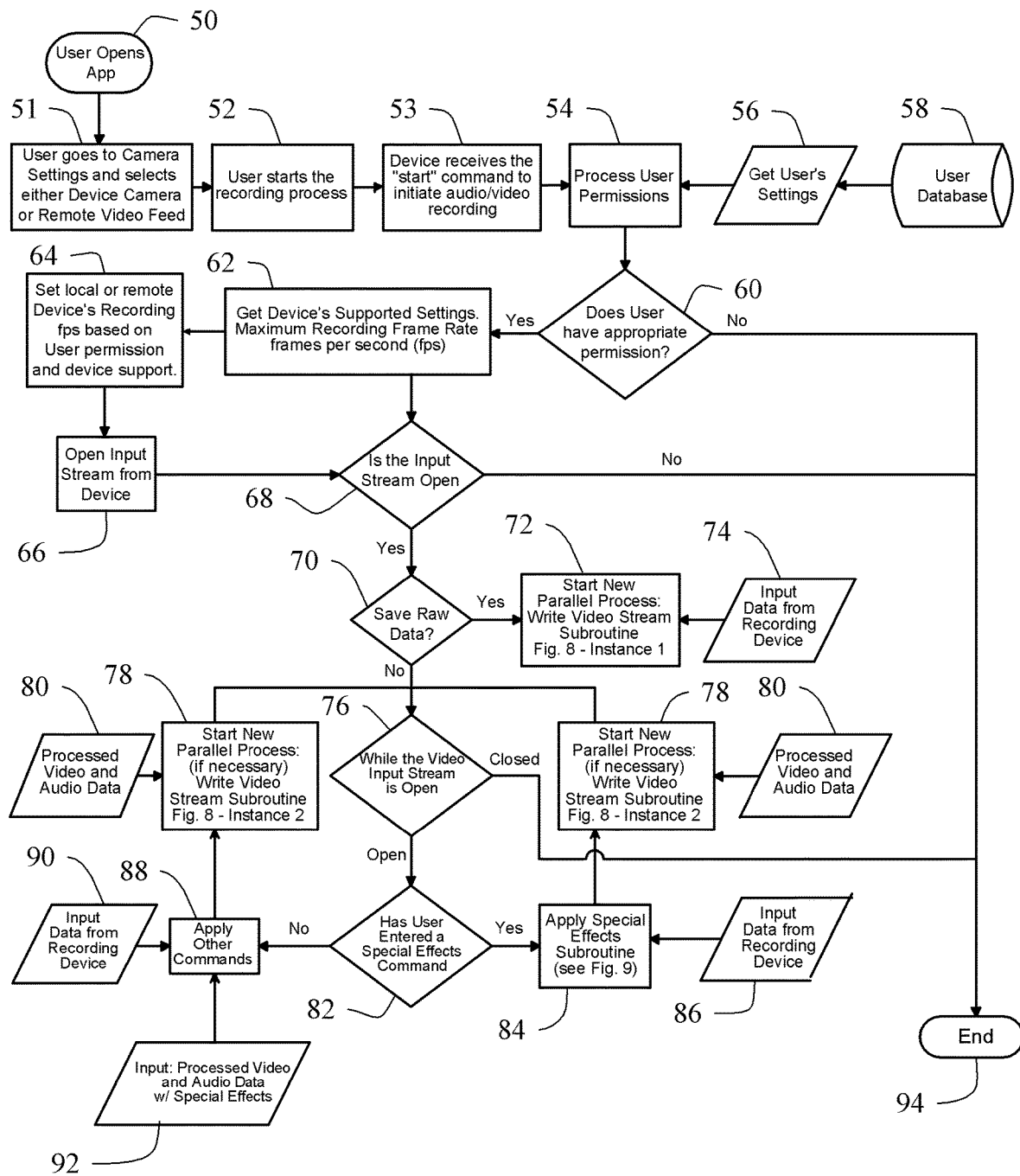
FIG. 7 is a flow chart of an example of a main process that initially determines if a speed up and/or slowdown special effects should be utilized in real time.
Figure 24:
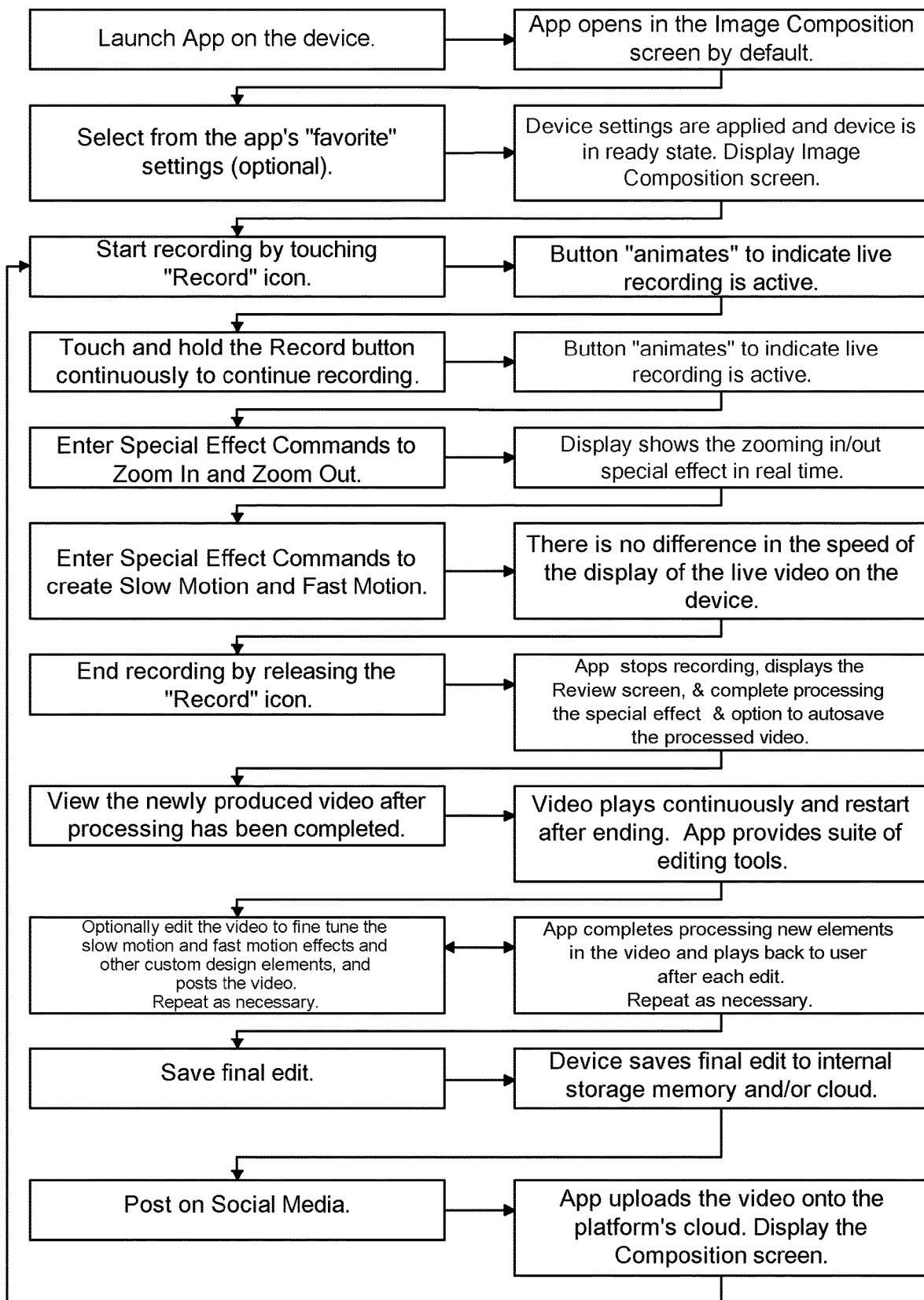
FIG. 24 is a flow chart of an example a possible process by a user utilizing the user interface associated with the present technology.

A possible process of the software application or interface is illustrated in FIGS. 6, 7 and 24. The interface and/or software application allows the user to select a predefined video recording speed rate in real time, without altering the raw speed rate provided by the camera. This makes the present technology not camera or device dependent. FIG. 6 illustrates an overall process of the present technology including the user interface, the device, and the subroutines associated with the overall process.

Referring to FIG. 7, the process of the present technology is described which determines if any special effects option has been requested for raw video data stream from the camera. For exemplary purposes, the special effects can be the changing of video speed rate by modifying of frames in the raw video data. The process can be configured or configurable to initiate subroutines and/or subprocesses to assist in the overall process.

The present technology software application is initiated and the user interface is provided to the user. An initial step can be for the user to opens the App 50. After which, step 51 allows the user to go into Camera Settings and selects either to use the electronic device's camera or a remote video feed. The process then proceeds to step 52 wherein the user starts the recording process. The camera or electronic device receives a "start" command 53 to initiate audio/video recording. It can be appreciated that the camera "start" command can be initiated by the present technology software application, a camera application, any other application associated with the electronic device or with a remote device in communication with the electronic device or camera.

Step 54 in the process can be to determine if the user has appropriate permission to proceed with the process. At step 56, permission attributes can be obtained from separate user settings, profiles, databases, keys, accounts, and the like. The permission attributes can be obtained from a user database 58.

Step 60 determines if the user has the appropriate permission, and if the user does not have the appropriate permission, then the process is stopped or ends (step 94). If the user does have appropriate permission then the process proceeds to step 62, which will get the device's supported settings, including a maximum recording frame rate frames per second (fps). Then the process sets the local or remote device's recording fps based on user permission and device support in step 64, and then opens an input stream from the device in step 66.

Once the raw data input stream from the camera is communicated to the image processing unit, then the process will then determine if the video data stream from the camera is opened in step 68, while receiving information from step 62. This request can be utilized to check if image processing unit is receiving the raw video data from the camera. The raw video data stream may include an integral or peripheral microphone, and can be passed to the image processing unit and not to the memory unit or video recording device. If the process determines that the input stream is not opened, then the process is stopped or ends (step 94).

If the input stream is open, then the process proceeds to step 70 to determine if the raw video data should be saved/recorded. If the raw video data is to be saved, then the process proceeds to step 72 to initiate a new parallel process utilizing the write video stream subroutine as illustrated in instance 1 in FIG. 8. Additional input data from the recording device (step 74) can be saved with the raw video data.

Figure 9:
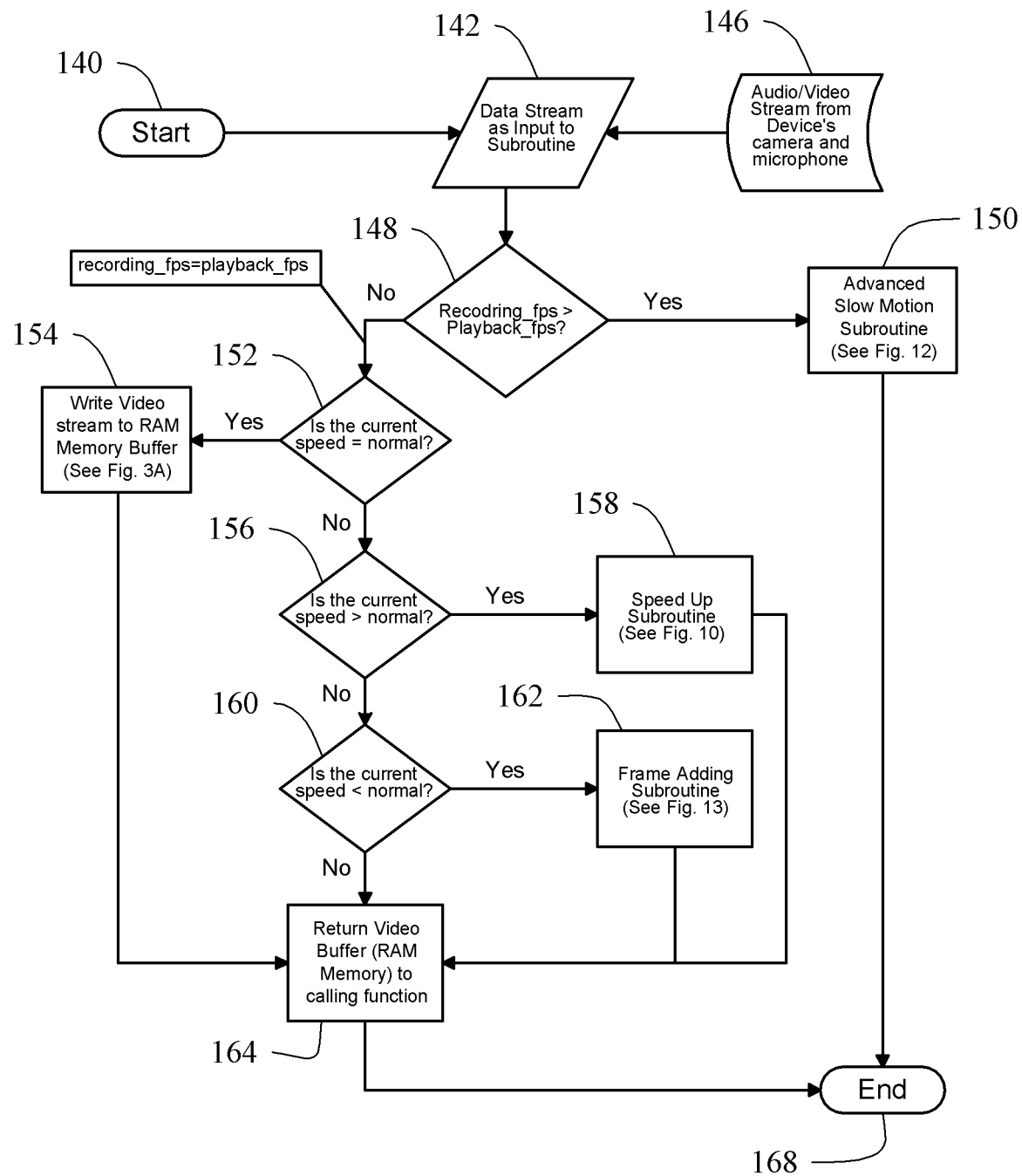
FIG. 9 is a flow chart of an example of the apply special effects subroutine associated with the present technology.

If it was determined in step 70 that the raw video data is not to be saved, then process proceeds to step 76 to determine if while the video input stream is open, and if it is open then the process proceeds to step 76 to determine if a special effect command has been entered by the user (step 82). The special effect command can be entered in this process by way of the interface. If the user entered a special effect command, then step 84 is initiated to apply a special effect subroutine, as best illustrated in FIG. 9. Additional input data from the recording device (step 86) can be included with the application of special effects in step 84.

If the user has not entered a request for a special effect in step 82, such as a change in video speed rate, then step 88 is initialized which applies other commands, such as input data from the recording device (step 90) and/or input processed video and audio data with special effects (step 92). Step 88 can include other information from step 84.

If the video input stream is determined to be closed in step 76, then the process proceeds stops or ends (step 94).

Figure 8:
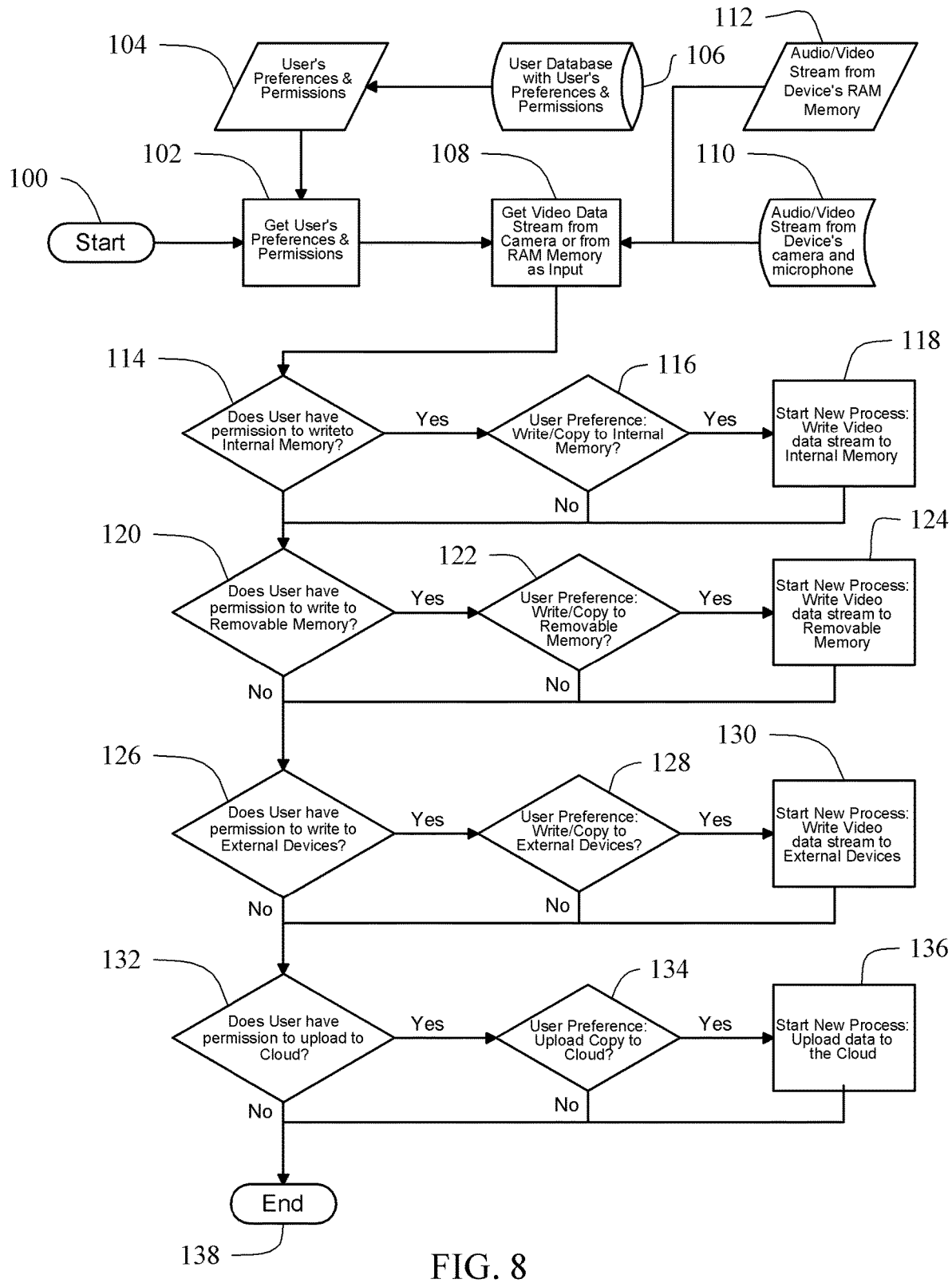
FIG. 8 is a flow chart of an example of the write video stream subroutine associated with the present technology.

If necessary, step 78 can initiate a new parallel process utilizing the write video stream subroutine as illustrated in instance 2 in FIG. 8. Additional processed video and audio data (step 80) can be saved with the video data from step 78. The new parallel process of step 78 can be initiated separately and independently from steps 84 and/or 88. After step 78 the process proceeds back to step 76.

This process can write the raw video stream using the write video stream subroutine after the raw video data stream has been either processed using apply special effect subroutine or has retained the raw video data stream.

Referring to FIG. 8, the write video stream subroutine is describe which provides the process to write/save/record the video data stream to one or more internal memory, to one or more removable memory in communication with the electronic device, to one or more external devices, and/or to upload to one or more cloud devices or accounts.

The present technology process determines in sequence which device or devices is the video data stream to be written to, and if the user has appropriate permission for each of the steps associated with the write video stream subroutine. If the user does have the appropriate permission to write to that particular device or devices, then the process writes the video data stream to that particular device or devices in accordance with any user preferences.

This subroutine starts (step 104) upon initiation by a command from the process in FIG. 7. This subroutine then proceeds to obtain user's preferences and permissions (step 102) from the process in FIG. 7 or a database (steps 104 and 106). After step 102, this subroutine acquires the raw video data stream from the camera as an input (step 108). The raw video data stream can be audio/video stream from the electronic device, the camera and/or the microphone, as per step 110 and/or audio/video stream from the device's RAM memory and/or non-volatile long term memory, as per step 112.

After acquisition of the raw video data stream, step 114 of this subroutine is initiated which determines if the user has permission to write to internal memory? If the user does have the appropriate permission and if the user preferences allows for a write/copy action to internal memory (step 116), then a new process is started at step 118 which writes the video data stream to the internal memory.

If the user does not have permission to write to the internal memory from step 114, or if the user preferences in step 116 do not allow the write/copy action in step 116, or after starting the process in step 118, then this subroutine continues to determine if the user has permission to write to removable memory (step 120). If the user does have the appropriate permission and if the user preferences allows for a write/copy action to removable memory (step 122), then a new process is started at step 124 which writes the video data stream to the removable memory.

If the user does not have permission to write to the removable memory from step 120, or if the user preferences in step 122 does not allow such an action, or after starting the process in step 124, then this subroutine continues to determine if the user has permission to write to external devices (step 126). If the user does have the appropriate permission and if the user preferences allows for a write/copy action to external devices (step 128) is requested, then a new process is started at step 130, which writes the video data stream to the external devices.

If the user does not have permission to write to the external devices from step 126, or if the user preferences in step 128 do not allow the write/copy action in step 128 does not allow such an action, or after starting the process in step 130 is completed, then this subroutine continues to determine if the user has permission to write to cloud (step 132). If the user does have the appropriate permission and if the user preferences allows for a write/copy action to the cloud (step 134), then a new process is started at step 136 which writes the video data stream to the cloud.

If the user does not have permission to write to the cloud from step 132, or if the user preferences from step 134 does not allow such an action, or after starting the process in step 136, then this subroutine stops or ends (step 138).

Referring to FIG. 9, the apply special effects subroutine is described which determines if a special effects option has been requested and to the specific operation of the special effects request. This subroutine starts (step 140) upon initiation by a command from the process in FIG. 7. After starting, this subroutine acquires the raw video data stream from the camera as an input (step 142). The raw video data stream can be audio/video stream from the electronic device, the camera and/or the microphone, as per step 146.

Figure 12:
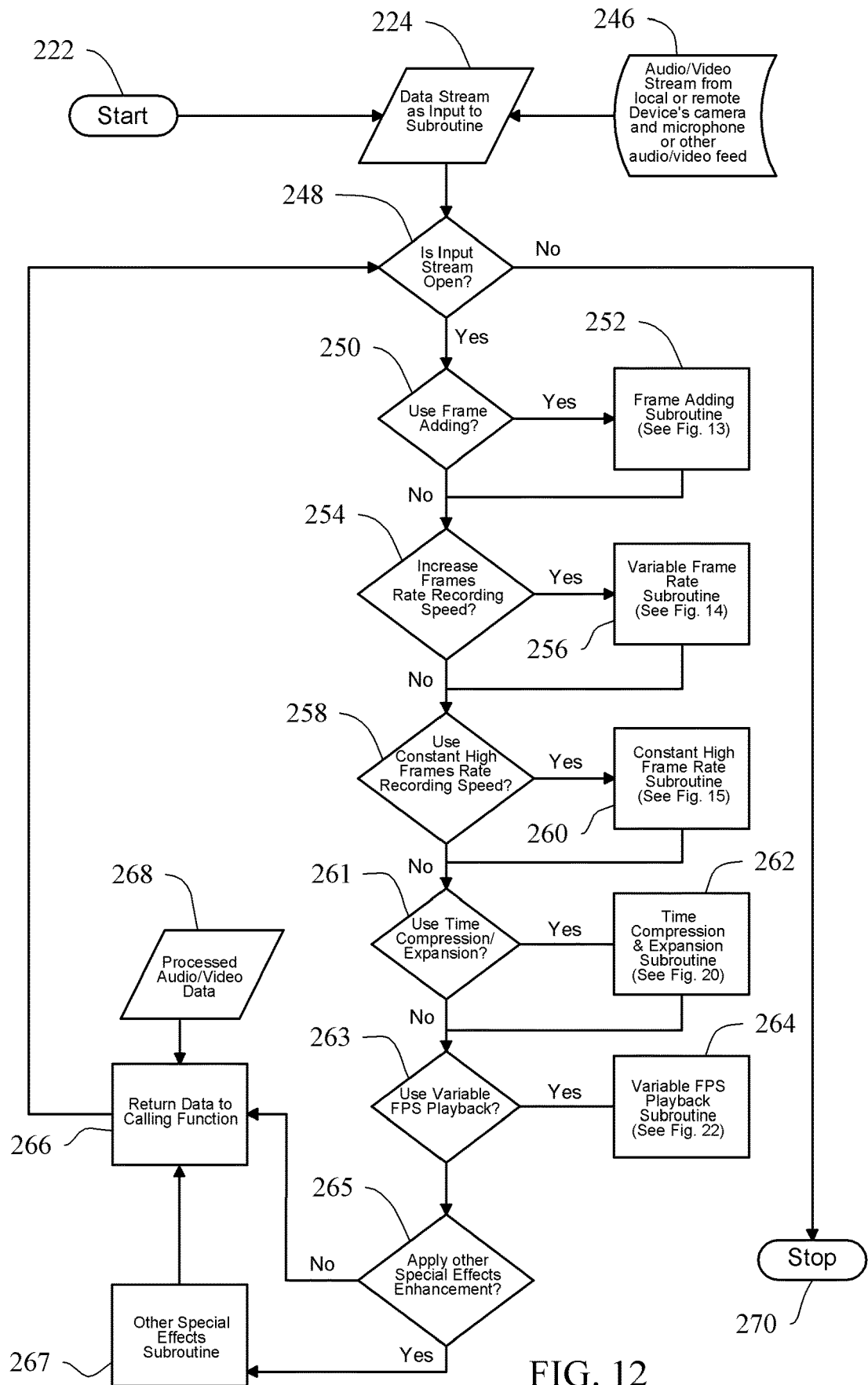
FIG. 12 is a flow chart of an example of the advanced slow motion subroutine associated with the present technology.

After acquisition of the raw video data stream, step 148 is initiated, which determines if the current speed is equal to the normal or native speed, such as but limited to Recording_fps is greater than the Playback_fps. If the user has made a speed change request, then step 150 initiates an advanced slow motion subroutine, as best illustrated in FIG. 12. After the completion of step 150, this subroutine stops or ends (step 168).

If the user has not made a speed change request such that the new speed is not set to normal, such as if the Recording_fps is not greater than the Playback_fps or if the Recording_fps is equal to the Playback_fps, then this subroutine proceeds to step 152 which determines if the current speed is equal to the normal or native speed. If the user has made a speed change request or if user has set the speed back to normal from a previously modified speed setting, then this subroutine continues to step 154 to write video stream to RAM memory and/or non-volatile long term memory buffer, as per FIG. 3A. After step 154 is completed, the subroutine proceeds to step 164 to return video buffer (RAM memory and/or non-volatile long term memory) to a calling function, which can be as step to determine if the video stream is open or this subroutine stops or ends (step 168).

Figure 10:
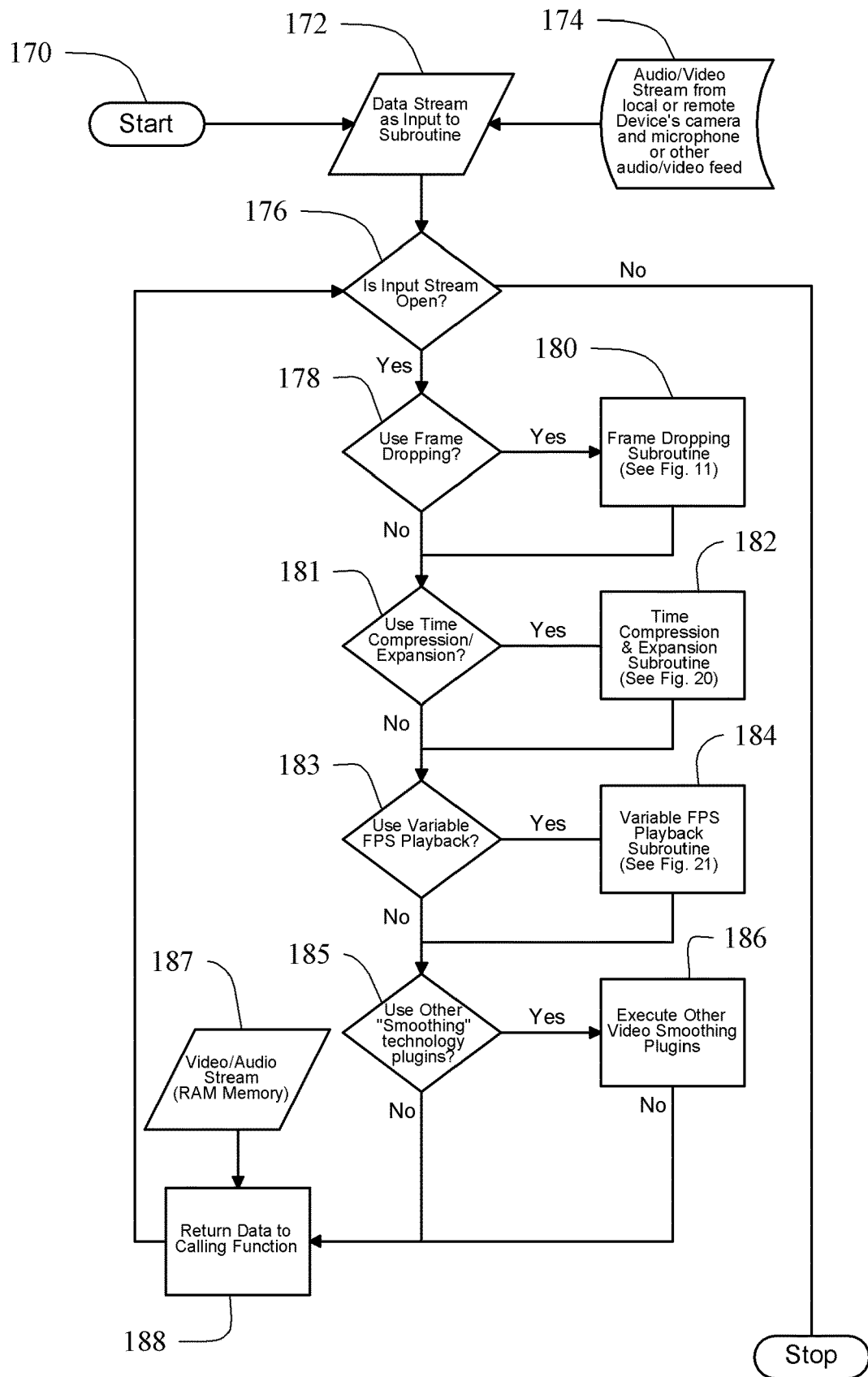
FIG. 10 is a flow chart of an example of the speed up subroutine associated with the present technology.

If the user has not made a speed change request such that the new speed is not set to normal, this subroutine will then proceed to step 156, which determines if the speed change request is faster or slower than the normal speed of the raw video data stream. This can be accomplished by determining if the current speed is greater than normal. If the current speed is greater than the normal spend, then this subroutine will initiate a speed up subroutine (step 158), as best illustrated in FIG. 10. After the speed up subroutine is completed, this subroutine will then initiate step 164 to return video buffer (RAM memory and/or non-volatile long term memory) to the calling function.

Figure 13:
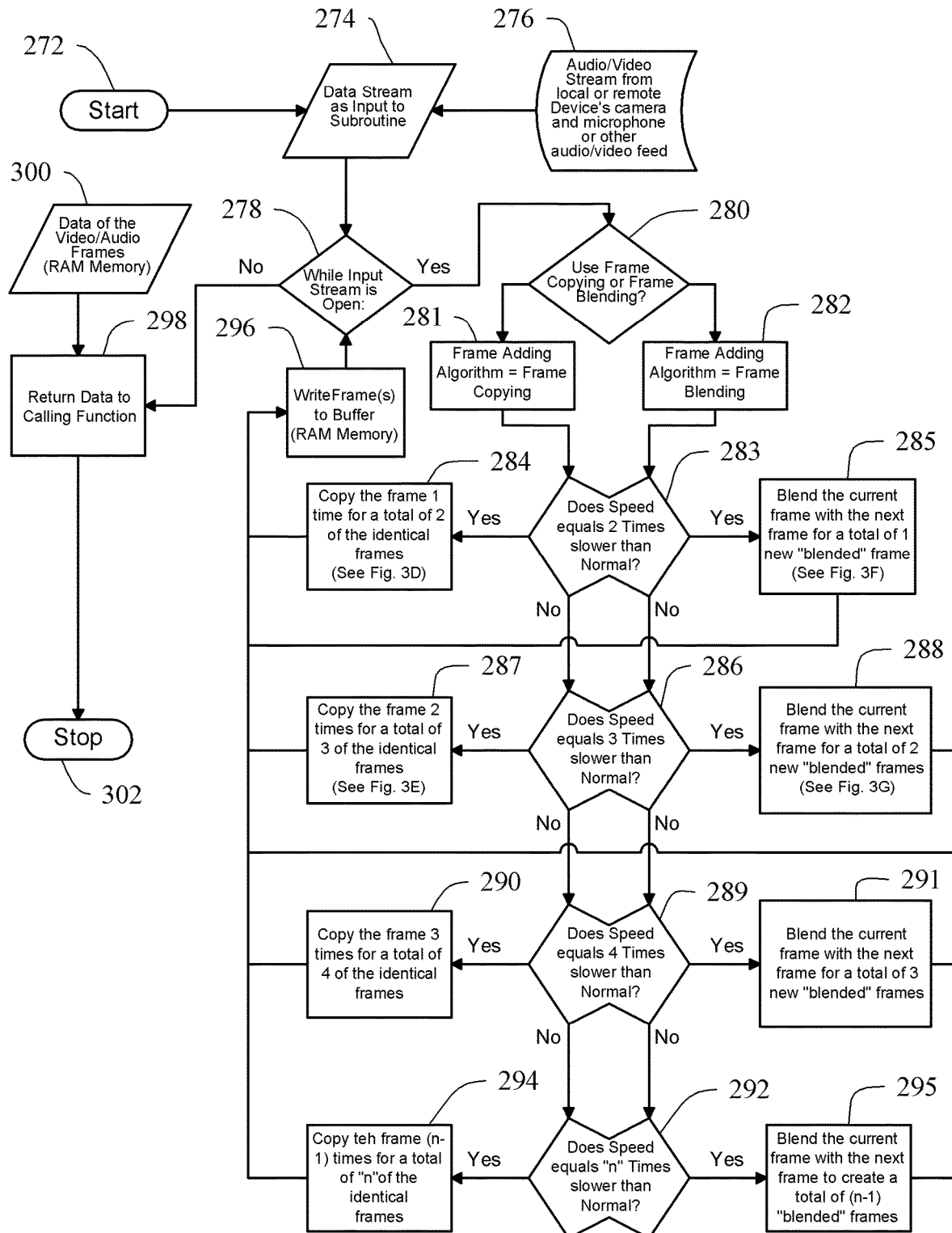
FIG. 13 is a flow chart of an example of the frame adding subroutine in simulating slow motion associated with the present technology.

If the requested current speed is not greater than the normal speed, then this subroutine continues to step 160 to determine if the current speed is to be less than normal. If the current speed is less than the normal spend, then this subroutine will initiate a slowdown subroutine (step 162), as best illustrated in FIG. 13. After the slowdown subroutine is completed or if the current speed is not to be less than normal, then this subroutine will initiate step 164 to return video buffer (RAM memory and/or non-volatile long term memory) to the calling function.

Referring to FIG. 10, the speed up subroutine is described which determines if a frame dropping option and/or other plugins are required. This subroutine starts (step 170) upon initiation by a command from the apply special effects subroutine (FIG. 9, step 158). After starting, this subroutine acquires the raw video data stream from the camera and/or from streamed input from a remote video feed as an input (step 172). The raw video data stream can be audio/video stream from the local electronic device including the camera and/or microphone, from a remote device including the camera and/or the microphone, or from other audio/video feeds, as per step 174.

After acquisition of the raw video data stream, step 176 of this subroutine is initiated which determines if the video data input stream from the camera is open. If it is not open then this subroutine proceeds to step 189, which stops or ends this subroutine.

Figure 11:
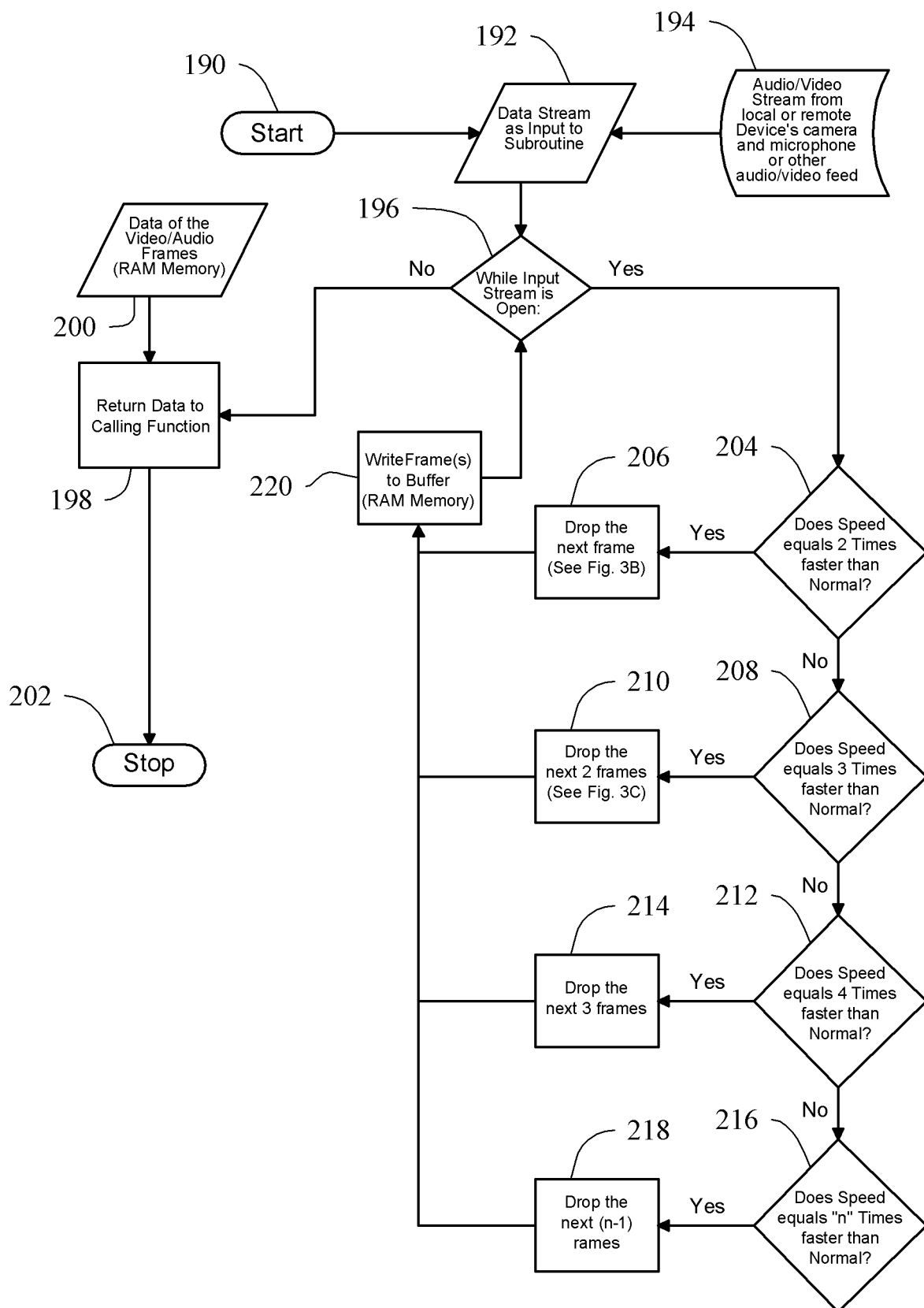
FIG. 11 is a flow chart of an example of the frame dropping subroutine in simulating fast motion associated with the present technology.

If the input stream is open then this subroutine determines if frame dropping is required (step 178), and if required then continues to step 180 that initiates a frame dropping subroutine as best illustrated in FIG. 11.

Figure 20:
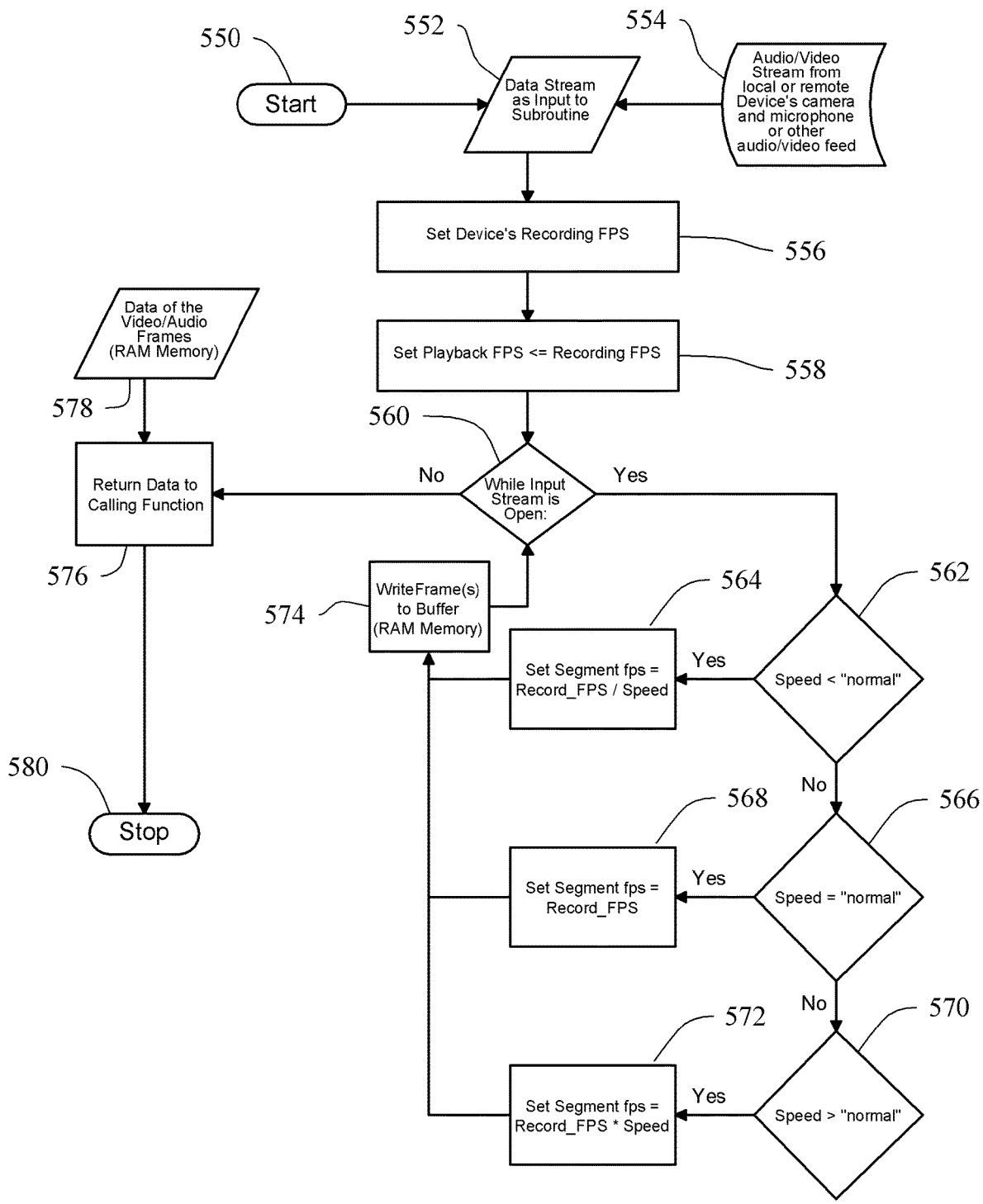
FIG. 20 is a flow chart of an example of time expansion and compression subroutine to simulate slow motion and fast motion associated with the present technology.

If frame dropping is not required from step 178 or after the frame dropping subroutine of step 180 is completed, then this subroutine proceeds to step 181 to determine if the use of time compression or expansion is requested, and if required then continues to step 182 that initiates a time compression and expansion subprocess as best illustrated in FIG. 20.

Figure 21:
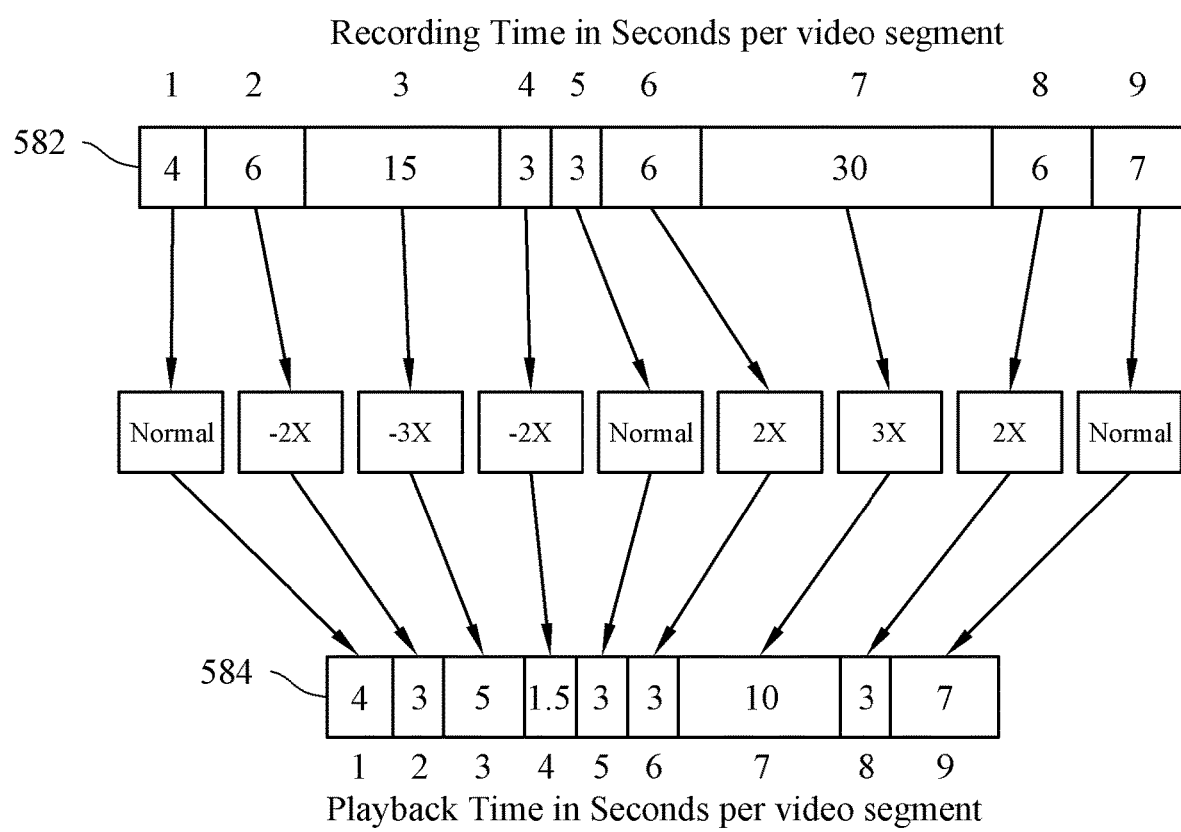
FIG. 21 is a representation of a series of associated recording and playback video segments per time in seconds indicating an example of a time compression of FIG. 20.

If frame time compression and/or expansion is not required from step 181 or after the time compression and/or expansion subprocess of step 182 is completed, then this subroutine proceeds to step 183 to determine if the use of variable FPS playback is requested, and if required then continues to step 184 that initiates a variable FPS playback subprocess as best illustrated in FIG. 21.

If frame variable FPS playback is not required from step 183 or after the variable FPS playback subprocess of step 184 is completed, then this subroutine proceeds to step 185 to determine if other plugins or applications are requested.

In the case that other plugins or application is requested, then this subroutine proceeds to step 186 to execute the other plugins or applications and apply their functions to the raw video stream from step 178 or modified video stream from any of steps 180, 182 and/or 184. For example, other plugins or applications can be, but not limited to, smoothing technology and the like. These other plugins or applications can be integrated with the present technology software application, or can be remote from the present technology but accessible and operable with present technology software application.

In the case the user does not request the use of other plugins or applications from step 185 or after the other plugin process of step 186 is completed, then this subroutine will continue to step 188 to return data to a calling function that loops back to step 176 to determine if the video input stream is open. Step 188 can receive video/audio streams from RAM memory and/or non-volatile long term memory (step 187).

It can be appreciated that this apply special effects subroutine includes a looped subprocess including steps 178, 180, 185, 186 and 188 until the input stream is determined to not be open in step 176.

With reference to FIG. 11, the frame dropping subroutine is described which determines if and which frames are dropped to simulate the requested fast motion video. An exemplary case for this subroutine can be if the Record_fps is equal to the Playback_fps. This subroutine starts (step 190) upon initiation by a command from the speed up subroutine. After starting, this subroutine acquires the raw video data stream from the camera as an input (step 192). The raw video data stream can be audio/video stream from the local electronic device including the camera and/or microphone, from a remote device including the camera and/or the microphone, or from other audio/video feeds, as per step 194.

After acquisition of the raw video data stream, step 196 of this subroutine is initiated which determines if the video data input stream from the camera is open. If step 196 determines that the input stream is not open, then this subroutine proceeds to step 198, which returns data to a calling function being step 180 in FIG. 10. Step 198 can receive data of the video/audio frames from RAM memory and/or non-volatile long term memory (step 200). After the step 198 is completed, then this subroutine stops or ends (step 202).

While the input stream is open from step 196, this subroutine determines if the speed equals 2 times faster than normal (step 204). If so then step 206 is initialized which will drop the next frame, as per FIG. 3B. After which, this subroutine proceeds to step 220 to write frame(s) to buffer (RAM memory and/or non-volatile long term memory). After step 220, this subroutine returns to step 196.

If the speed does not equal 2 times faster than normal (step 204), then this subroutine determines if the speed equals 3 times faster than normal (step 208). If so then step 210 is initialized which will drop the next 2 frames, as per FIG. 3C. After which, this subroutine proceeds to step 220 and then returns to step 196.

If the speed does not equal 3 times faster than normal (step 208), then this subroutine determines if the speed equals 4 times faster than normal (step 212). If so then step 214 is initialized which will drop the next 3 frames. After which, this subroutine proceeds to step 220 and then returns to step 196.

If the speed does not equal 4 times faster than normal (step 212), then this subroutine will sequentially continue to determine if the speed equals "n" times faster than normal (step 216). If so then each "nth" step will initialize a drop the next (n−1) frames action (step 218). After which, this subroutine proceeds to step 220 and then returns to step 196.

It can be appreciated that this frame dropping subroutine determines if a frame should or should not be dropped on a frame-by-frame basis. The result is a modified video stream with specific frames removed to simulate a fast motion video of predetermined speed. This modified video stream is then written/saved to memory in real time.

It can be appreciated that this frame dropping subroutine includes a looped subprocess including steps 204-220 until the input stream is determined to not be open in step 196.

Referring to FIG. 12, the advanced slow motion subroutine is described which determines if a frame adding option or other plugins are required. This subroutine starts (step 222) upon initiation by a command from the apply special effects subroutine. After starting, this subroutine acquires the raw video data stream from the camera as an input (step 224). The raw video data stream can be audio/video stream from the local electronic device including the camera and/or microphone, from a remote device including the camera and/or the microphone, or from other audio/video feeds, as per step 246.

After acquisition of the raw video data stream, step 248 of this subroutine is initiated which determines if the video data input stream from the camera is open. If step 248 determines that the input stream is not open, then this subroutine proceeds to step 270, which stops this subroutine.

While the input stream is open from step 248, this subroutine determines if frame adding is required (step 250), and if required then continues to step 252 that initiates a frame adding subroutine, as best illustrated in FIG. 13.

Figure 14:
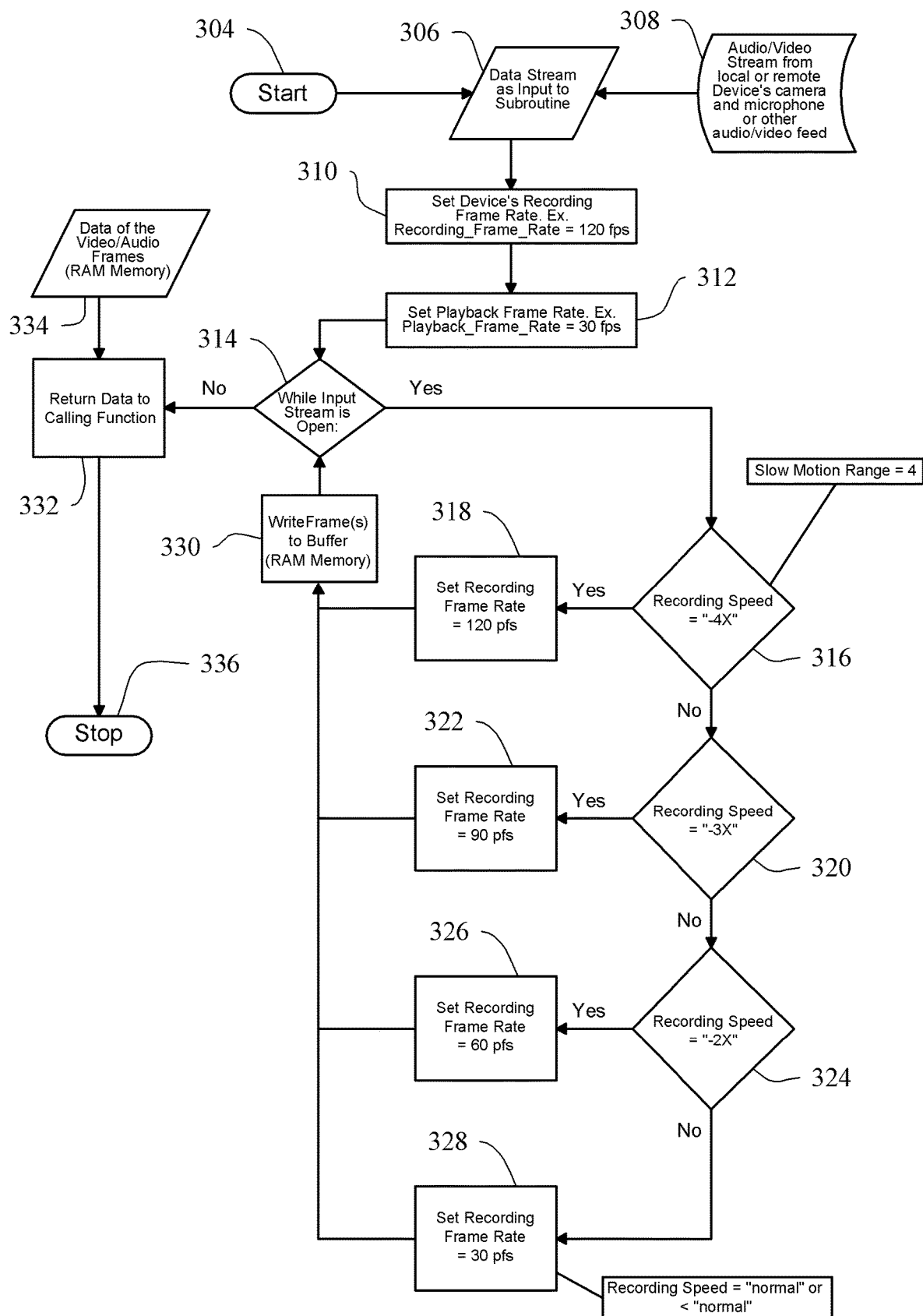
FIG. 14 is a flow chart of an example of the variable high recording fps subroutine (120 fps) in simulating slow motion associated with the present technology.

If frame adding is not required from step 250 or after the frame adding subroutine from step 252 is completed, then this subroutine proceeds to step 254 to determine if an increase in frames rate recording speed is required. If so, then this subroutine continues to step 256, which initiates a variable frame rate subroutine or an increase frame rate subroutine, as best illustrated in FIG. 14.

Figure 15:
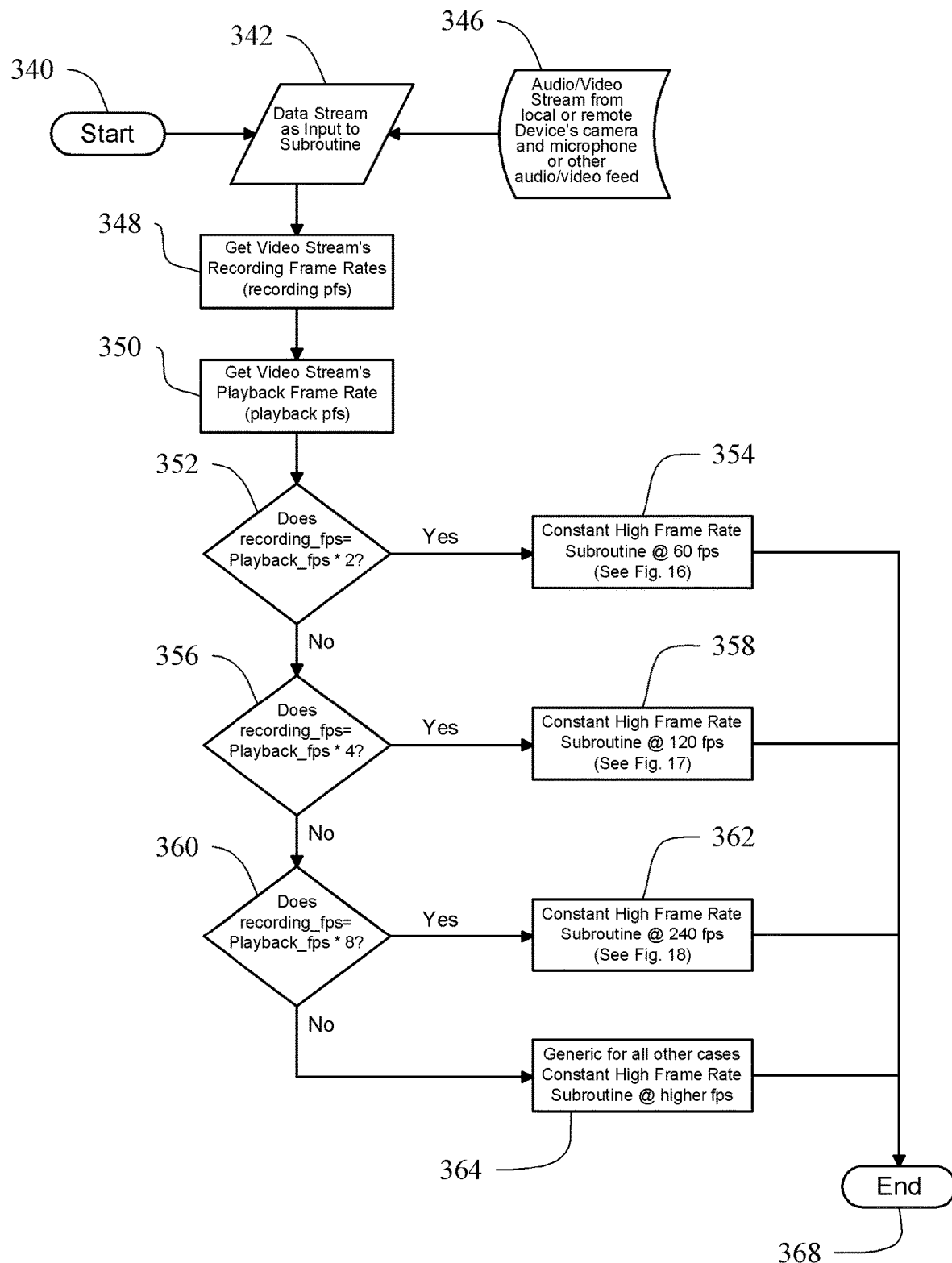
FIG. 15 is a flow chart of an example of the constant frame rate slow motion subroutine associated with the present technology.

If increase in frames rate recording speed is not required from step 254 or after the variable frame rate subroutine from step 256 is completed, then this subroutine proceeds to step 258 to determine if a constant high frames rate recording speed is to be used. If so, then this subroutine proceeds to step 260, which initiates a constant high frame rate subroutine, as best illustrated in FIG. 15.

If frame constant high frames rate recording speed is not required from step 258 or after the constant high frames rate recording speed subroutine of step 260 is completed, then this subroutine proceeds to step 261 to determine if the use of time compression or expansion is requested, and if required then continues to step 262 that initiates a time compression and expansion subprocess as best illustrated in FIG. 20.

Figure 22:
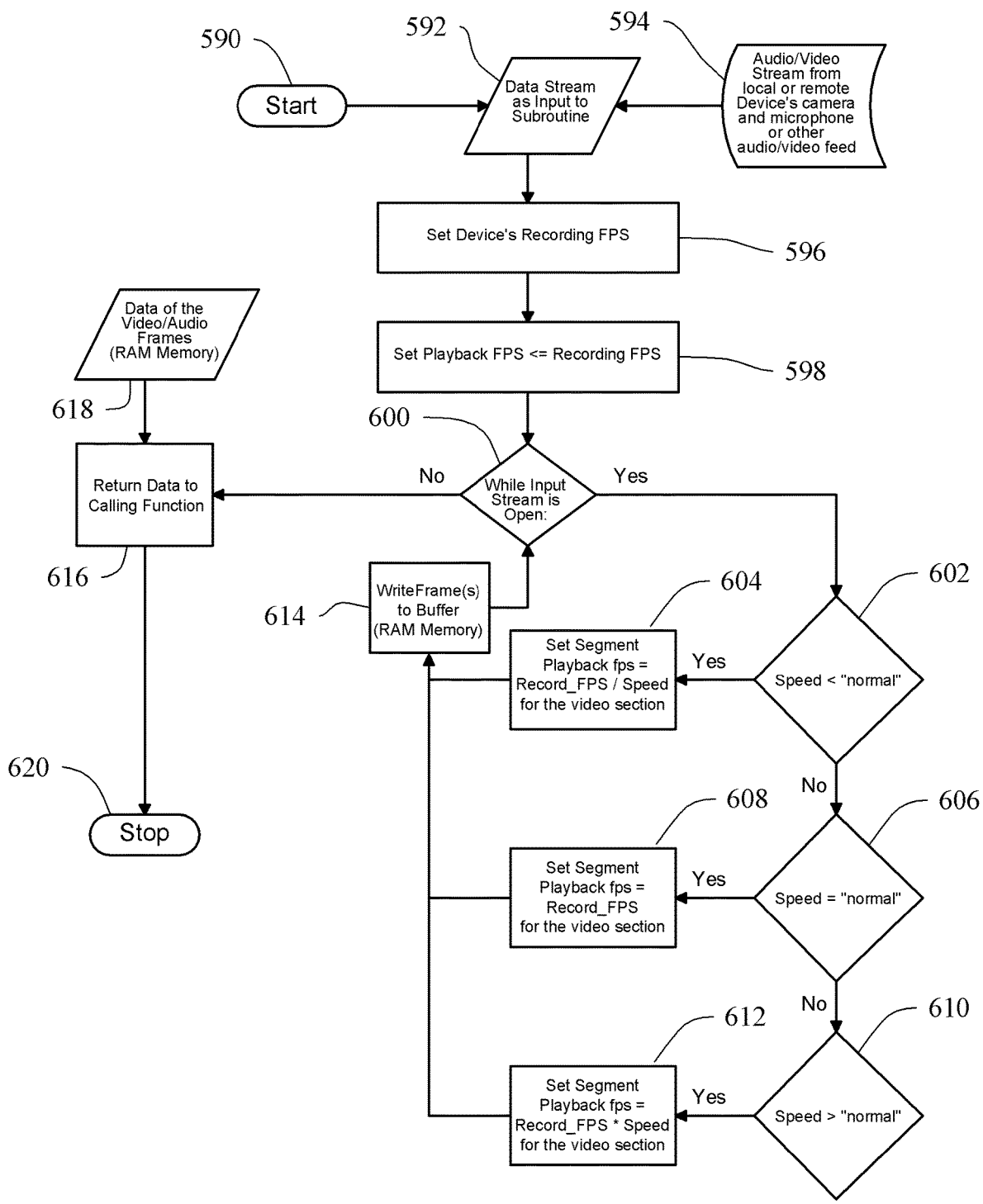
FIG. 22 is a flow chart of an example of a recording using a variable playback rate to simulate slow motion and fast motion associated with the present technology.

If frame time compression and/or expansion is not required from step 261 or after the time compression and/or expansion subprocess of step 262 is completed, then this subroutine proceeds to step 263 to determine if the use of variable FPS playback is requested, and if required then continues to step 264 that initiates a variable FPS playback subprocess as best illustrated in FIG. 22.

If frame variable FPS playback is not required from step 263 or after the variable FPS playback subprocess of step 264 is completed, then this subroutine proceeds to step 265 to determine if other special effects enhancement is requested. In the case that other special effects enhancement is requested, then this subroutine proceeds to step 267, which can execute the other special effects subroutine and apply their functions to the raw or modified video stream. This other special effects subroutine can be integrated with the present technology software application, or can be remote from the present technology but accessible and operable with present technology software application.

In the case the user does not request the use of other special effects enhancement from step 265 or after the other special effects subroutine from step 267 is completed, then this subroutine will continue to step 266 to return data to a calling function that loops back to step 248 to the determine if the video input stream is open. It can be appreciated that other processed audio/video data can be part of the data returned to the calling function, as per step 268.

It can be appreciated that this advanced slow motion subroutine includes a looped subprocess including steps 250-266 until the input stream is determined to not be open in step 248.

With reference to FIG. 13, the frame adding subroutine associated with the slowdown subroutine of FIG. 12 is described which determines if and which frames are added to simulate the requested slow motion video. This subroutine assumes that recording fps=playback fps. This subroutine starts (step 272) upon initiation by a command from the slowdown subroutine. After starting, this subroutine acquires the raw video data stream from the camera as an input (step 274). The raw video data stream can be audio/video stream from the local electronic device including the camera and/or microphone, from a remote device including the camera and/or the microphone, or from other audio/video feeds, as per step 276.

After acquisition of the raw video data stream, step 274 of this subroutine is initiated which determines if the video data input stream from the camera is open. If step 278 determines that the input stream is not open, then this subroutine proceeds to step 298, which returns data to a calling function being step 252 in FIG. 12. Step 298 can receive data of the video/audio frames from RAM memory and/or non-volatile long term memory (step 300). After step 298 is completed, then this subroutine stops or ends (step 302).

While the input stream is open from step 278, this subroutine determines the type of frame adding to utilize in step 280, either simple frame copying (step 281) or a more CPU intensive frame blending (step 282). If the user has selected frame copying, then the process proceeds to step 281 and the algorithm and its description are unchanged. However, if the user selected "Frame Blending" and their hardware supports it, then the process proceeds to step 282 and the algorithm can include new or additional steps.

It can be appreciated that if frame copying was selected during step 280 then for each of the speed "checks", logically, the process will proceed along the left algorithm path. It can be further appreciated that if frame blending was selected during step 280 then for each of the speed "checks", logically, the process will proceed along the right algorithm path.

The subroutine continues to determine if the speed equals 2 times slower than normal (step 283). If so, for the frame copying path, then step 284 is initialized which will copy the frame 1 time for a total of 2 of the identical frames, as per FIG. 3D. After which, this subroutine proceeds to step 296 to write frame(s) to buffer (RAM memory and/or non-volatile long term memory). After step 296, this subroutine returns to step 278. For the frame blending path, then step 285 is initialized which will blend the current frame with the next frame for a total of 1 new "blended" frame, as per FIG. 3F. After which, this subroutine proceeds to step 296.

If the speed does not equal 2 times slower than normal (step 283), then this subroutine determines if the speed equals 3 times slower than normal (step 286). If so, for the frame copying path, then step 287 is initialized which will copy the frame 2 times for a total of 3 of the identical frames, as per FIG. 3E. After which, this subroutine proceeds to step 296 and then returns to step 278. For the frame blending path, then step 288 is initialized which will blend the current frame with the next frame for a total of 2 new "blended" frames, as per FIG. 3G. After which, this subroutine proceeds to step 296.

If the speed does not equal 3 times slower than normal (step 286), then this subroutine determines if the speed equals 4 times slower than normal (step 289). If so, for the frame copying path, then step 290 is initialized which will copy the frame 3 times for a total of 4 of the identical frames. After which, this subroutine proceeds to step 296 and then returns to step 278. For the frame blending path, then step 291 is initialized which will blend the current frame with the next frame for a total of 3 new "blended" frames. After which, this subroutine proceeds to step 296.

If the speed does not equal 4 times slower than normal (step 289), then this subroutine will continue to determine if the speed equals "n" times slower than normal (step 292). If so, for the frame copying path, then each "nth" step will copy the frame (n−1) times for a total of "n" of the identical frames. After which, this subroutine proceeds to step 296 and then returns to step 278. For the frame blending path, then step 295 is initialized which will blend the current frame with the next frame for a total of (n−1) new "blended" frames. After which, this subroutine proceeds to step 296.

It can be appreciated that this frame adding subroutine includes a looped subprocess including steps 280-296 until the input stream is determined to not be open in step 278.

With reference to FIG. 14, an example of the variable high recording fps subroutine (120 FPS) associated with the variable frame rate subroutine of FIG. 12 is described. This variable frame rate subroutine can be utilized for simulating slow motion, such as but limited to, slow motion range=recording speed/playback fps=120 fps/30 fps=4.

This subroutine starts (step 304) upon initiation by a command from the slowdown subroutine. After starting, this subroutine acquires the raw video data stream from the camera as an input (step 306). The raw video data stream can be audio/video stream from the electronic device, the camera and/or the microphone, as per step 308.

After acquisition of the raw video data stream, step 310 of this subroutine is initiated to set the device's recording frame rate, for example to Recording_Frame_Rate=120 fps. After which, step 312 sets the device's playback frame rate, for example to Playback_Frame_Rate=30 fps.

Step 314 of this subroutine is initiated which determines if the video data input stream from the camera is open. If step 314 determines that the input stream is not open, then this subroutine proceeds to step 332, which returns data to a calling function being step 256 in FIG. 12. Step 332 can receive data of the video/audio frames from RAM memory and/or non-volatile long term memory (step 334). After step 332 is completed, then this subroutine stops or ends (step 336).

While the input stream is open from step 314, this subroutine determines if the recording speed equals "−4×" (step 316), which can be a slow motion range of 4. If so then step 318 is initialized which sets the recording frame rate to 120 fps. After which, this subroutine proceeds to step 330 to write frame(s) to buffer (RAM memory and/or non-volatile long term memory). After step 330, this subroutine returns to step 314.

If the recording speed does not equal "−4×" (step 316), then this subroutine determines if the recording speed equals "−3×" (step 320). If so then step 322 is initialized which sets the recording frame rate to 90 fps. After which, this subroutine proceeds to step 330 to write frame(s) to buffer (RAM memory and/or non-volatile long term memory). After step 330, this subroutine returns to step 314.

If the recording speed does not equal "−3×" (step 320), then this subroutine determines if the recording speed equals "−2×" (step 324). If so then step 326 is initialized which sets the recording frame rate to 60 fps. After which, this subroutine proceeds to step 330 to write frame(s) to buffer (RAM memory and/or non-volatile long term memory). After step 330, this subroutine returns to step 314.

If the recording speed does not equal "−2×" (step 324), then this subroutine will set the recording frame rate to 30 fps (step 328), which can be a recording speed equal to or less than "normal". After which, this subroutine proceeds to step 330 to write frame(s) to buffer (RAM memory and/or non-volatile long term memory). After step 330, this subroutine returns to step 314.

It can be appreciated that this variable high recording fps subroutine includes a looped subprocess including steps 316-330 until the input stream is determined to not be open in step 314.

With reference to FIG. 15, an example of the constant frame rate slow motion subroutine associated with the constant high frame rate subroutine of FIG. 12 is described. This constant frame rate slow motion subroutine can be utilized for simulating slow motion.

This subroutine starts (step 340) upon initiation by a command from the slowdown subroutine. After starting, this subroutine acquires the raw video data stream from the camera as an input (step 342). The raw video data stream can be audio/video stream from the local electronic device including the camera and/or microphone, from a remote device including the camera and/or the microphone, or from other audio/video feeds, as per step 346.

After acquisition of the raw video data stream, step 348 of this subroutine is initiated which gets the video stream's recording frame rates (recording fps), and then continues to step 350 that gets the video stream's playback frame rates (playback fps).

Figure 16:
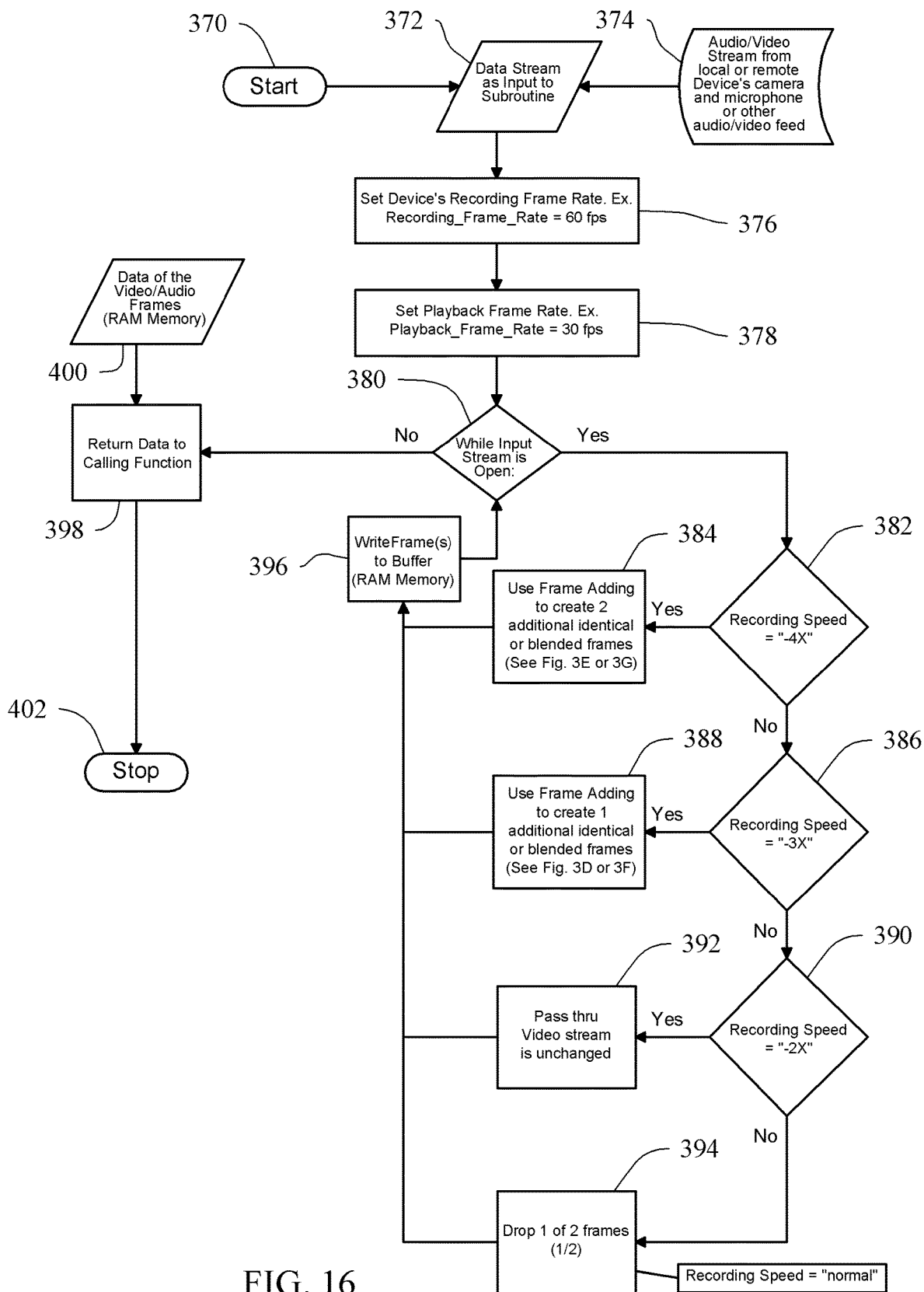
FIG. 16 is a flow chart of an example of the constant high recording fps subroutine (60 fps) in simulating slow motion associated with the present technology.

With the recording and playback frame rates acquired, this subroutine then determines if the recording_fps=playback_fps*2 (step 352). If so, then it proceeds to step 354 to initiate a constant high frame rate subroutine at 60 fps, as best illustrated in FIG. 16. After which, this subroutine stops or ends (step 368).

Figure 17:
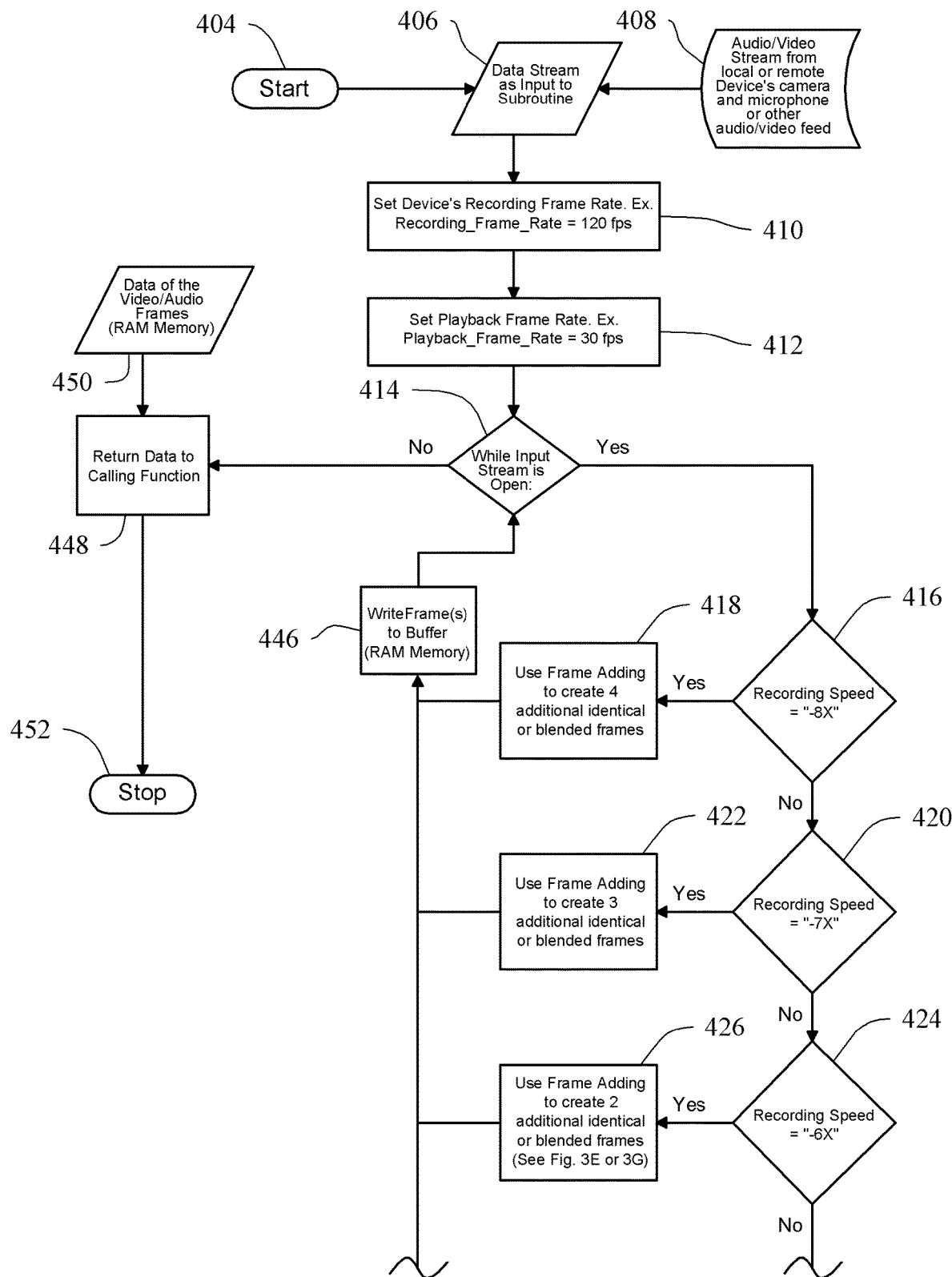
FIG. 17 is a flow chart of an example of the constant high recording fps subroutine (120 fps) in simulating slow motion associated with the present technology.

If is not found that the recording_fps=playback_fps*2, then this subroutine proceeds to step 356 to determine if the recording_fps=playback_fps*4. If so, then it proceeds to step 358 to initiate a constant high frame rate subroutine at 120 fps, as best illustrated in FIG. 17. After which, this subroutine stops or ends (step 368).

Figure 18:
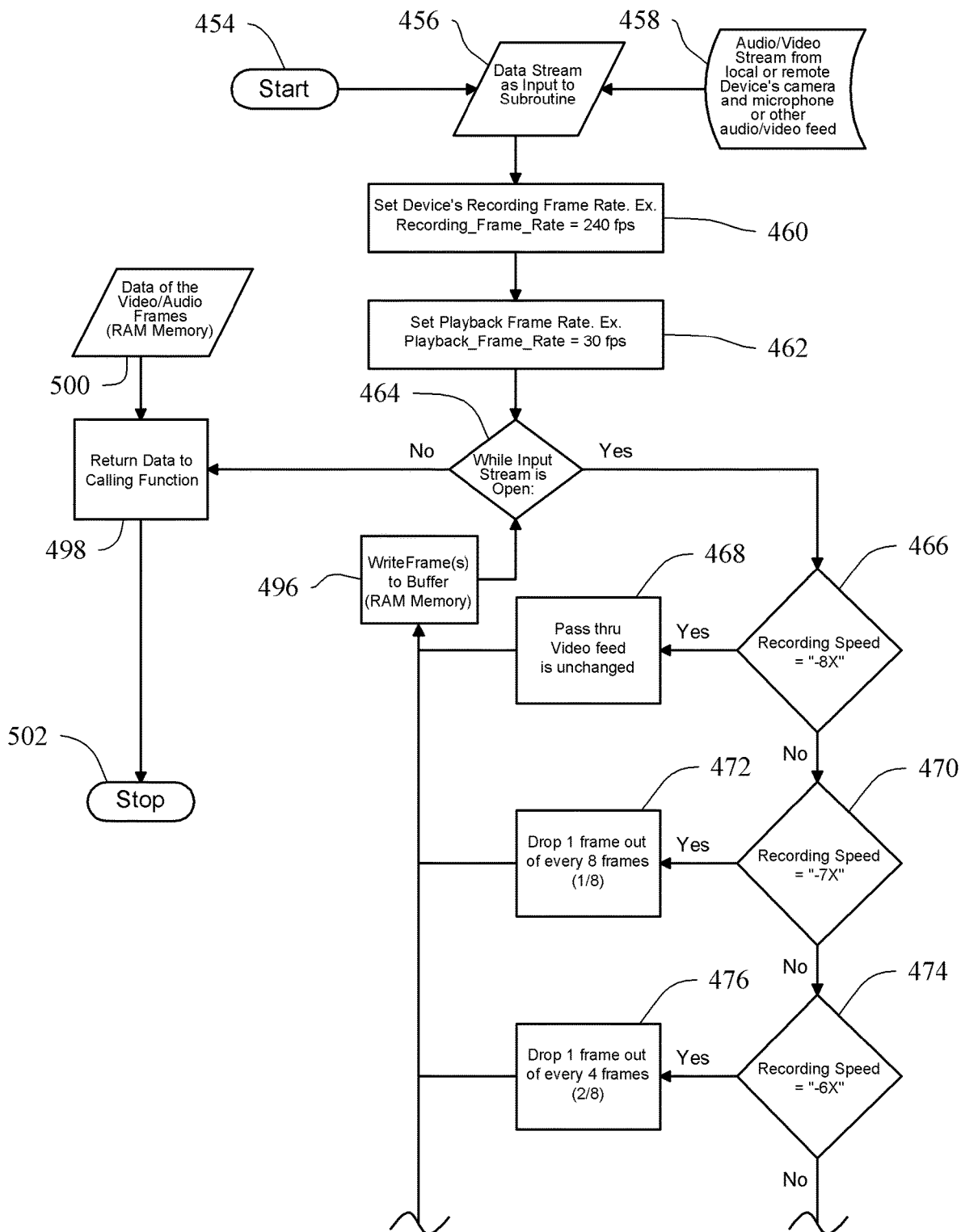
FIG. 18 is a flow chart of an example of the constant high recording fps subroutine (240 fps) in simulating slow motion associated with the present technology.

If is not found that the recording_fps=playback_fps*4, then this subroutine proceeds to step 360 to determine if the recording_fps=playback_fps*8. If so, then it proceeds to step 362 to initiate a constant high frame rate subroutine at 240 fps, as best illustrated in FIG. 18. After which, this subroutine stops or ends (step 368).

If is not found that the recording_fps=playback_fps*8, then this subroutine proceeds to step 364, which is generic for all other cases and initiates a constant high frame rate subroutine at higher fps. After which, this subroutine stops or ends (step 368).

With reference to FIG. 16, an example of the constant high recording fps subroutine (60 FPS) associated with the constant high frame rate subroutine of FIG. 15 is described. This constant high frame rate subroutine can be utilized for simulating slow motion, such as but limited to, slow motion range=recording speed/playback fps=60 fps/30 fps=2. "Slow motion range" is defined as the multiple factor that a slow motion effect can be created with the record and playback fps settings such that the algorithm does not have to use "frame adding" of any type.

This subroutine starts (step 370) upon initiation by a command from the slowdown subroutine. After starting, this subroutine acquires the raw video data stream from the camera as an input (step 372). The raw video data stream can be audio/video stream from the local electronic device including the camera and/or microphone, from a remote device including the camera and/or the microphone, or from other audio/video feeds, as per step 374.

After acquisition of the raw video data stream, step 376 of this subroutine is initiated which set the device's recording frame rate, for example to Recording_Frame_Rate=60 fps. After which, step 378 sets the device's playback frame rate, for example to Playback_Frame_Rate=30 fps.

Step 380 of this subroutine is initiated which determines if the video data input stream from the camera is open. If step 380 determines that the input stream is not open, then this subroutine proceeds to step 398, which returns data to a calling function being step 354 in FIG. 15. Step 398 can receive data of the video/audio frames from RAM memory and/or non-volatile long term memory (step 400). After step 398 is completed, then this subroutine stops or ends (step 402).

While the input stream is open from step 380, this subroutine determines if the recording speed equals "−4×" (step 382). If so then step 384 is initialized which copies each frame in the stream 2 times for a total 3 identical frames as per FIG. 3E or blended frames as per FIG. 3G. After which, this subroutine proceeds to step 396 to write frame(s) to buffer (RAM memory and/or non-volatile long term memory). After step 396, this subroutine returns to step 380.

If the recording speed does not equal "−4×" (step 382), then this subroutine determines if the recording speed equals "−3×" (step 386). If so then step 388 is initialized which copies each frame in the stream 1 time for a total 2 identical frames as per FIG. 3D or blended frames as per FIG. 3F. After which, this subroutine proceeds to step 396 to write frame(s) to buffer (RAM memory and/or non-volatile long term memory). After step 396, this subroutine returns to step 380.

If the recording speed does not equal "−3×" (step 386), then this subroutine determines if the recording speed equals "−2×" (step 390). If so then step 392 is initialized which passes thru an unchanged video stream. After which, this subroutine proceeds to step 396 to write frame(s) to buffer (RAM memory and/or non-volatile long term memory). After step 396, this subroutine returns to step 380.

If the recording speed does not equal "−2×" (step 390), then this subroutine will drop 1 of 2 frames (1/2) (step 394) for a recording speed equal to "normal". After which, this subroutine proceeds to step 396 to write frame(s) to buffer (RAM memory and/or non-volatile long term memory). After step 396, this subroutine returns to step 380.

It can be appreciated that this constant high recording fps subroutine (60 FPS) includes a looped subprocess including steps 382-396 until the input stream is determined to not be open in step 380.

With reference to FIG. 17, an example of the constant high recording fps subroutine (120 FPS) associated with the constant high frame rate subroutine of FIG. 15 is described. This constant high frame rate subroutine can be utilized for simulating slow motion, such as but limited to, slow motion range=recording speed/playback fps=120 fps/30 fps=4.

This subroutine starts (step 404) upon initiation by a command from the slowdown subroutine. After starting, this subroutine acquires the raw video data stream from the camera as an input (step 406). The raw video data stream can be audio/video stream from the local electronic device including the camera and/or microphone, from a remote device including the camera and/or the microphone, or from other audio/video feeds, as per step 408.

After acquisition of the raw video data stream, step 410 of this subroutine is initiated which sets the device's recording frame rate, for example to Recording_Frame_Rate=120 fps. After which, step 412 sets the device's playback frame rate, for example to Playback_Frame_Rate=30 fps.

Step 414 of this subroutine is initiated which determines if the video data input stream from the camera is open. If step 414 determines that the input stream is not open, then this subroutine proceeds to step 448, which returns data to a calling function being step 358 in FIG. 15. Step 448 can receive data of the video/audio frames from RAM memory and/or non-volatile long term memory (step 450). After step 448 is completed, then this subroutine stops or ends (step 452).

While the input stream is open from step 414, this subroutine determines if the recording speed equals "−8×" (step 416). If so then step 418 is initialized which copies the frame 4 times for a total 5 identical frames or blended frames. After which, this subroutine proceeds to step 446 to write frame(s) to buffer (RAM memory and/or non-volatile long term memory). After step 446, this subroutine returns to step 414.

If the recording speed does not equal "−8×" (step 416), then this subroutine determines if the recording speed equals "−7×" (step 420). If so then step 422 is initialized which copies the frame 3 times for a total 4 identical frames or blended frames. After which, this subroutine proceeds to step 446 to write frame(s) to buffer (RAM memory and/or non-volatile long term memory). After step 446, this subroutine returns to step 414.

If the recording speed does not equal "−7×" (step 420), then this subroutine determines if the recording speed equals "−6×" (step 424). If so then step 426 is initialized which copies the frame 2 times for a total 3 identical frames as per FIG. 3E or blended frames as per FIG. 3G. After which, this subroutine proceeds to step 446 to write frame(s) to buffer (RAM memory and/or non-volatile long term memory). After step 446, this subroutine returns to step 414.

If the recording speed does not equal "−6×" (step 424), then this subroutine determines if the recording speed equals "−5×" (step 428). If so then step 430 is initialized copies the frame 1 time for a total 2 identical frames as per FIG. 3D or blended frames as per FIG. 3F. After which, this subroutine proceeds to step 446 to write frame(s) to buffer (RAM memory and/or non-volatile long term memory). After step 446, this subroutine returns to step 414.

If the recording speed does not equal "−5×" (step 428), then this subroutine determines if the recording speed equals "−4×" (step 432). If so then step 434 is initialized which passes thru an unchanged video stream. After which, this subroutine proceeds to step 446 to write frame(s) to buffer (RAM memory and/or non-volatile long term memory). After step 446, this subroutine returns to step 414.

If the recording speed does not equal "−4×" (step 432), then this subroutine determines if the recording speed equals "−3×" (step 436). If so then step 438 is initialized which drops 1 of 4 frames (1/4) (step 438). After which, this subroutine proceeds to step 446 to write frame(s) to buffer (RAM memory and/or non-volatile long term memory). After step 446, this subroutine returns to step 414.

If the recording speed does not equal "−3×" (step 436), then this subroutine determines if the recording speed equals "−2×" (step 440). If so then step 442 is initialized which drops 2 of 4 frames (2/4) (step 442). After which, this subroutine proceeds to step 446 to write frame(s) to buffer (RAM memory and/or non-volatile long term memory). After step 446, this subroutine returns to step 414.

If the recording speed does not equal "−2×" (step 440), then this subroutine will drop 3 of 4 frames (3/4) (step 444) for a recording speed equal to "normal". After which, this subroutine proceeds to step 446 to write frame(s) to buffer (RAM memory and/or non-volatile long term memory). After step 446, this subroutine returns to step 414.

It can be appreciated that this constant high recording fps subroutine (120 FPS) includes a looped subprocess including steps 416-446 until the input stream is determined to not be open in step 414.

With reference to FIG. 18, an example of the constant high recording fps subroutine (240 FPS) associated with the constant high frame rate subroutine of FIG. 15 is described. This constant high frame rate subroutine can be utilized for simulating slow motion, such as but limited to, slow motion range=recording speed/playback fps=240 fps/30 fps=8.

This subroutine starts (step 454) upon initiation by a command from the slowdown subroutine. After starting, this subroutine acquires the raw video data stream from the camera as an input (step 456). The raw video data stream can be audio/video stream from the local electronic device including the camera and/or microphone, from a remote device including the camera and/or the microphone, or from other audio/video feeds, as per step 458.

After acquisition of the raw video data stream, step 460 of this subroutine is initiated which set the device's recording frame rate, for example to Recording_Frame_Rate=240 fps. After which, step 462 sets the device's playback frame rate, for example to Playback_Frame_Rate=30 fps.

Step 464 of this subroutine is initiated which determines if the video data input stream from the camera is open. If step 464 determines that the input stream is not open, then this subroutine proceeds to step 498, which returns data to a calling function being step 362 in FIG. 15. Step 498 can receive data of the video/audio frames from RAM memory and/or non-volatile long term memory (step 500). After step 498 is completed, then this subroutine stops or ends (step 502).

While the input stream is open from step 464, this subroutine determines if the recording speed equals "−8×" (step 466). If so then step 468 is initialized which passes thru an unchanged video stream. After which, this subroutine proceeds to step 496 to write frame(s) to buffer (RAM memory and/or non-volatile long term memory). After step 496, this subroutine returns to step 464.

If the recording speed does not equal "−8×" (step 466), then this subroutine determines if the recording speed equals "−7×" (step 470). If so then step 472 is initialized which drops 1 frame out of every 8 frames (1/8). After which, this subroutine proceeds to step 496 to write frame(s) to buffer (RAM memory and/or non-volatile long term memory). After step 496, this subroutine returns to step 464.

If the recording speed does not equal "−7×" (step 470), then this subroutine determines if the recording speed equals "−6×" (step 474). If so then step 476 is initialized which drops 1 frame out of every 4 frames (2/8). After which, this subroutine proceeds to step 496 to write frame(s) to buffer (RAM memory and/or non-volatile long term memory). After step 496, this subroutine returns to step 464.

If the recording speed does not equal "−6×" (step 474), then this subroutine determines if the recording speed equals "−5×" (step 478). If so then step 480 is initialized which drops 3 frame out of every 8 frames (3/8). After which, this subroutine proceeds to step 496 to write frame(s) to buffer (RAM memory and/or non-volatile long term memory). After step 496, this subroutine returns to step 464.

If the recording speed does not equal "−5×" (step 478), then this subroutine determines if the recording speed equals "−4×" (step 482). If so then step 484 is initialized which drops 1 frame out of every 2 frames (4/8). After which, this subroutine proceeds to step 496 to write frame(s) to buffer (RAM memory and/or non-volatile long term memory). After step 496, this subroutine returns to step 464.

If the recording speed does not equal "−4×" (step 482), then this subroutine determines if the recording speed equals "−3×" (step 486). If so then step 488 is initialized which drops 5 frame out of every 8 frames (5/8). After which, this subroutine proceeds to step 496 to write frame(s) to buffer (RAM memory and/or non-volatile long term memory). After step 496, this subroutine returns to step 464.

If the recording speed does not equal "−3×" (step 486), then this subroutine determines if the recording speed equals "−2×" (step 490). If so then step 492 is initialized which drops 3 frame out of every 4 frames (6/8). After which, this subroutine proceeds to step 496 to write frame(s) to buffer (RAM memory and/or non-volatile long term memory). After step 496, this subroutine returns to step 464.

If the recording speed does not equal "−2×" (step 490), then this subroutine will drop 7 frame out of every 8 frames (7/8) (step 494). After which, this subroutine proceeds to step 496 to write frame(s) to buffer (RAM memory and/or non-volatile long term memory). After step 496, this subroutine returns to step 464.

It can be appreciated that this constant high recording fps subroutine (240 FPS) includes a looped subprocess including steps 466-496 until the input stream is determined to not be open in step 464.

Figure 19:
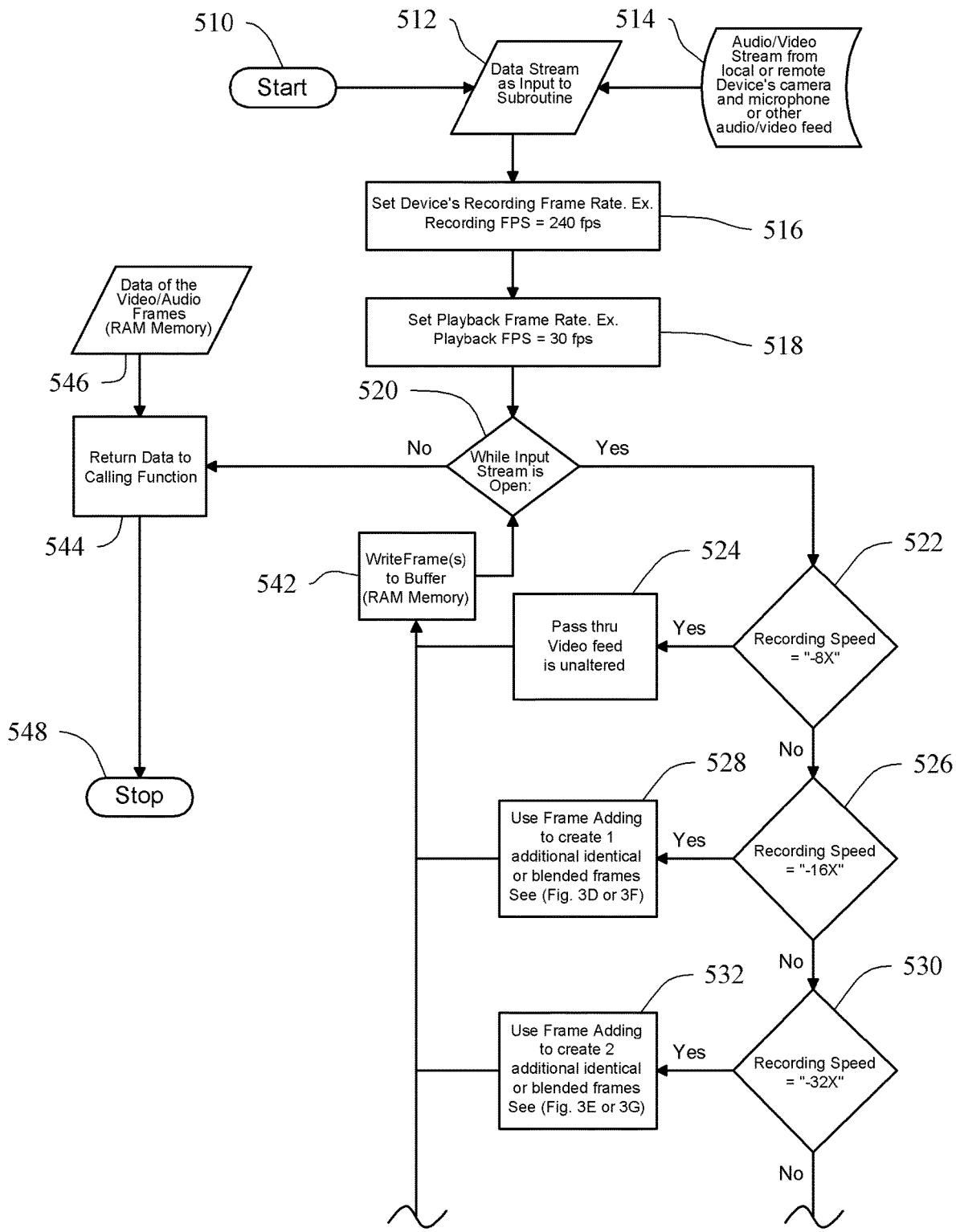
FIG. 19 is a flow chart of an example of extreme slow motion subroutine associated with the present technology.

With reference to FIG. 19, an example of an extreme slow motion at constant high recording fps subroutine (240 FPS) associated with the constant high frame rate subroutine of FIG. 15 is described. This constant high frame rate subroutine can be utilized for simulating extreme slow motion, such as but limited to, slow motion range of −8× to −128× speed. Constant High Recording FPS with Frame Adding Subroutine of FIG. 19 illustrates an exemplary flow chart algorithm for the combination of high frames per second recording rate, "normal" playback frames per seconds, and frame adding to boost the slow motion special effect. This subroutine further illustrates speeds that are >=−8× and perfect multiples of 2, with speeds slower than −8× being best illustrated in FIG. 18.

This subroutine starts (step 510) upon initiation by a command from the slowdown subroutine. After starting, this subroutine acquires the raw video data stream from the camera as an input (step 512). The raw video data stream can be audio/video stream from the electronic device, the camera and/or the microphone, as per step 514.

After acquisition of the raw video data stream, step 516 of this subroutine is initiated which set the device's recording frame rate, for example to Recording Frame Rate=240 fps. After which, step 518 sets the device's playback frame rate, for example to Playback Frame Rate=30 fps.

Step 520 of this subroutine is initiated which determines if the video data input stream from the camera is open. If step 520 determines that the input stream is not open, then this subroutine proceeds to step 544, which returns data to a calling function being step 358 in FIG. 15. Step 544 can receive data of the video/audio frames from RAM memory and/or non-volatile long term memory (step 546). After step 544 is completed, then this subroutine stops or ends (step 548).

While the input stream is open from step 520, this subroutine determines if the recording speed equals "−8×" (step 522). If so then step 524 is initialized which passes thru an unaltered/unchanged video stream. After which, this subroutine proceeds to step 542 to write frame(s) to buffer (RAM memory and/or non-volatile long term memory). After step 542, this subroutine returns to step 520.

If the recording speed does not equal "−8×" (step 522), then this subroutine determines if the recording speed equals "−16×" (step 526). If so then step 528 is initialized which copies each frame 1 times for a total of 2 identical frames as per FIG. 3D or blended frames as per FIG. 3F. After which, this subroutine proceeds to step 542 to write frame(s) to buffer (RAM memory and/or non-volatile long term memory). After step 542, this subroutine returns to step 520.

If the recording speed does not equal "−16×" (step 526), then this subroutine determines if the recording speed equals "−32×" (step 530). If so then step 532 is initialized which copies each frame 2 times for a total of 3 identical frames as per FIG. 3E or blended frames as per FIG. 3G. After which, this subroutine proceeds to step 542 to write frame(s) to buffer (RAM memory and/or non-volatile long term memory). After step 542, this subroutine returns to step 520.

If the recording speed does not equal "−32×" (step 530), then this subroutine determines if the recording speed equals "−64×" (step 534). If so then step 536 is initialized which copies each frame 3 times for a total of 4 identical frames or blended frames. After which, this subroutine proceeds to step 542 to write frame(s) to buffer (RAM memory and/or non-volatile long term memory). After step 542, this subroutine returns to step 520.

If the recording speed does not equal "−64×" (step 534), then this subroutine determines if the recording speed equals "−128×" (step 538). If so then step 540 is initialized which copies each frame 4 times for a total of 5 identical frames or blended frames. After which, this subroutine proceeds to step 542 to write frame(s) to buffer (RAM memory and/or non-volatile long term memory). After step 542, this subroutine returns to step 520.

It can be appreciated that this constant high recording fps subroutine (240 FPS) includes a looped subprocess including steps 520-542 until the input stream is determined to not be open in step 520.

With reference to FIG. 20, an example of a segment time compression and expansion subroutine is illustrated and will be described, which provides a flow chart algorithm for slow motion and fast motion by speeding up or slowing down the playback time during video processing after the recording has stopped. Frame adding/dropping can be performed in the time compression/expansion algorithm to simulate the slow motion special effect.

Video files that are create with this algorithm/subroutine can be played normally in all video players and requires no metadata. This is in alternative to other video files created in the present technology.

This subroutine starts (step 550) upon initiation by a command from the slowdown subroutine. After starting, this subroutine acquires the raw video data stream from the camera as an input (step 552). The raw video data stream can be audio/video stream from the local electronic device including the camera and/or microphone, from a remote device including the camera and/or the microphone, or from other audio/video feeds, as per step 554.

After acquisition of the raw video data stream, step 556 of this subroutine is initiated which set the device's recording FPS. After which, step 558 sets the playback FPS to less than or equal to (<=) the recording FPS.

Step 560 of this subroutine is initiated which determines if the video data input stream from the camera is open. If step 560 determines that the input stream is not open, then this subroutine proceeds to step 576. Step 576 can receive data of the video/audio frames from RAM memory and/or non-volatile long term memory (step 578). After step 576 is completed, then this subroutine stops or ends (step 580).

While the input stream is open from step 560, this subroutine determines if the speed is less than "normal" (step 562). If so then step 564 is initialized which sets video segment fps to equal the recording fps divided by the speed (Segment FPS=Record_FPS/Speed). After which, this subroutine proceeds to step 574 to write frame(s) to buffer (RAM memory and/or non-volatile long term memory). After step 574, this subroutine returns to step 560.

If the speed is not less than "normal" (step 562), then this subroutine determines if the speed equals "normal" (step 566). If so then step 568 is initialized which sets video segment fps to equal the recording fps (Segment FPS=Record_FPS). After which, this subroutine proceeds to step 574 to write frame(s) to buffer (RAM memory and/or non-volatile long term memory). After step 574, this subroutine returns to step 560.

If the recording speed does not equal "normal" (step 566), then this subroutine determines if the speed is greater than "normal" (step 570). If so then step 572 is initialized which sets video segment fps to equal the recording fps times the speed (Segment FPS=Record_FPS*Speed). After which, this subroutine proceeds to step 574 to write frame(s) to buffer (RAM memory and/or non-volatile long term memory). After step 574, this subroutine returns to step 560.

It can be appreciated that this segment time compression and expansion subroutine includes a looped subprocess including steps 560-574 until the input stream is determined to not be open in step 560.

An example of the segment time compression and expansion subroutine is best illustrated in FIG. 21, which illustrates the results of the algorithm in FIG. 20. The top bar represents the video segments 582 in seconds per video segment in a continuous recording. The recording video segments 582, in seconds, are process by the segment time compression and expansion subroutine. The segments 582 are created when the user/AI changes the speed variable. The time special effects are applied to the raw video segment, and written into the processed video stream RAM, where each segment is either compressed, expanded or unchanged. The resultant playback video segments 584 are then provided in seconds per video segment corresponding to the recording segments time in seconds.

With reference to FIG. 22, an example of a variable playback speed record subroutine is illustrated and will be described, which provides a flow chart algorithm for slow motion and fast motion by speeding up or slowing down the playback frame rate while video recording is in progress. This algorithm can produce a normal video with the fast/slow motion commands embedded in the video's metadata. The metadata is data embedded in the video file that does not show up in the video recording.

This subroutine starts (step 590) upon initiation by a command from the slowdown subroutine in FIG. 12 (step 264). After starting, this subroutine acquires the raw video data stream from the camera as an input (step 592). The raw video data stream can be audio/video stream from the local electronic device including the camera and/or microphone, from a remote device including the camera and/or the microphone, or from other audio/video feeds, as per step 594.

After acquisition of the raw video data stream, step 596 of this subroutine is initiated which set the device's recording FPS. After which, step 598 sets the playback FPS to less than or equal to (<=) the recording FPS.

Step 600 of this subroutine is initiated which determines if the video data input stream from the camera is open. If step 600 determines that the input stream is not open, then this subroutine proceeds to step 616. Step 616 can receive data of the video/audio frames from RAM memory and/or non-volatile long term memory (step 618). After step 616 is completed, then this subroutine stops or ends (step 620).

While the input stream is open from step 600, this subroutine determines if the speed is less than "normal" (step 602). If so then step 604 is initialized which sets the segment playback fps to equal the recording fps divided by the speed for that video section (Segment FPS=Record_FPS/Speed). After which, this subroutine proceeds to step 614 to write frame(s) to buffer (RAM memory and/or non-volatile long term memory). After step 614, this subroutine returns to step 600.

If the speed is not less than "normal" (step 602), then this subroutine determines if the speed equals "normal" (step 606). If so then step 608 is initialized which sets the segment playback fps to equal the recording fps for that video section (Segment FPS=Record FPS). After which, this subroutine proceeds to step 614 to write frame(s) to buffer (RAM memory and/or non-volatile long term memory). After step 614, this subroutine returns to step 600.

If the recording speed does not equal "normal" (step 606), then this subroutine determines if the speed is greater than "normal" (step 610). If so then step 612 is initialized which sets the segment playback fps to equal the recording fps times by the speed for that video section (Segment FPS=Record_FPS*Speed). After which, this subroutine proceeds to step 614 to write frame(s) to buffer (RAM memory and/or non-volatile long term memory). After step 614, this subroutine returns to step 600.

It can be appreciated that this segment time compression and expansion subroutine includes a looped subprocess including steps 600-614 until the input stream is determined to not be open in step 600.

Figure 23:
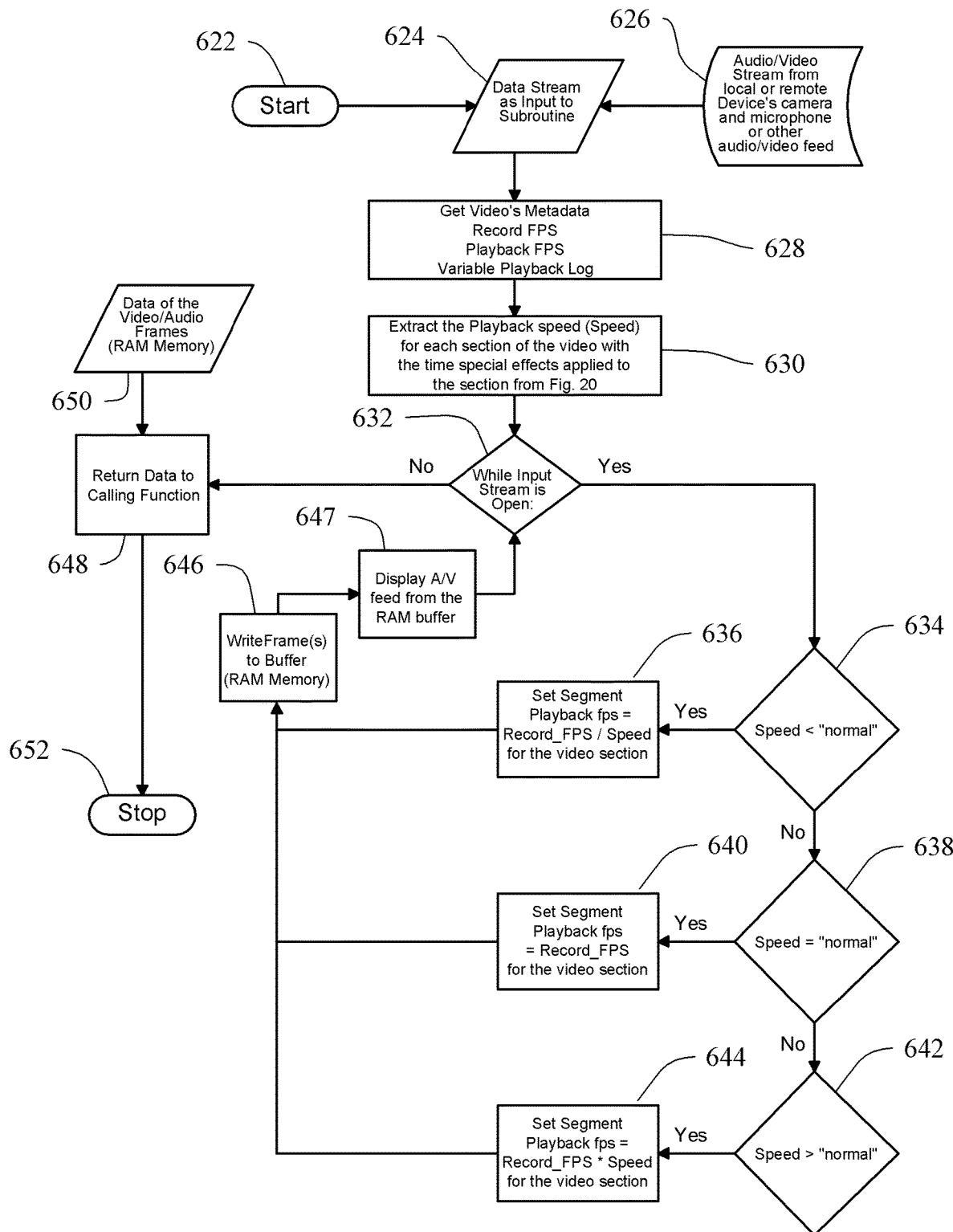
FIG. 23 is a flow chart of an example of a playback device playing a video file created by an application employing the algorithm in FIG. 22 to simulate slow motion and fast motion associated with the present technology.

With reference to FIG. 23, an example of a variable playback speed playback subroutine is illustrated and will be described, which provides a flow chart algorithm for playing a video file with slow motion and fast motion special effects by speeding up or slowing down the playback frame rate while video playback is in progress. An application employing the algorithm in FIG. 23 is required to play a video produced by the algorithm in FIGS. 20 and 21. This application must be capable of decoding the information in the metadata and/or an accompanying "video project file" and applying the speed up and slowdown commands to the playback frame rate while the video is playing. A video project contains the video file plus an accompanying file that has the special effects commands to be executed, that a custom player can decode and apply in real-time playback.

If the video is played with an incompatible player, then the speed up and slowdown special effects commands in the metadata are ignored and the video plays continuously in the same speed.

This subroutine starts (step 622) upon initiation by a command from the slowdown subroutine. After starting, this subroutine acquires the raw video data stream from the video project file residing in device's memory as an input (step 624). The raw video data stream can be audio/video stream in the video project file from the electronic device, or remote video project files, as per step 626.

After acquisition of the raw video data stream, step 628 of this subroutine is initiated which gets the video's metadata, record FPS, playback FPS and variable playback log. After which, step 630 extracts the playback speed (Speed) for each section of the video with the time special effects applied to the section from FIG. 20.

Step 632 of this subroutine is initiated which determines if the video data input stream from the camera is open. If step 632 determines that the input stream is not open, then this subroutine proceeds to step 648. Step 648 can receive data of the video/audio frames from RAM memory and/or non-volatile long term memory (step 650). After step 648 is completed, then this subroutine stops or ends (step 652).

While the input stream is open from step 632, this subroutine determines if the speed is less than "normal" (step 634). If so then step 636 is initialized which sets the segment playback fps to equal the recording fps divided by the speed for that video section (Segment FPS=Record_FPS/Speed). After which, this subroutine proceeds to step 646 to write frame(s) to buffer (RAM memory and/or non-volatile long term memory). The subroutine then proceeds to step 647, which displays the Audio/Video feed from the RAM butter, and after which continues to step 632.

If the speed is not less than "normal" (step 634), then this subroutine determines if the speed equals "normal" (step 638). If so then step 340 is initialized which sets the segment playback fps to equal the recording fps for that video section (Segment FPS=Record_FPS). After which, this subroutine proceeds to step 646 to write frame(s) to buffer (RAM memory and/or non-volatile long term memory). After step 646, this subroutine returns to step 632.

If the recording speed does not equal "normal" (step 638), then this subroutine determines if the speed is greater than "normal" (step 642). If so then step 644 is initialized which sets the segment playback fps to equal the recording fps times by the speed for that video section (Segment FPS=Record_FPS*Speed). After which, this subroutine proceeds to step 646 to write frame(s) to buffer (RAM memory and/or non-volatile long term memory). After step 646, this subroutine continues to step 647 to display the audio/video (A/V) feed from the RAM buffer, and then returns to step 632.

It can be appreciated that this segment time compression and expansion subroutine includes a looped subprocess including steps 632-647 until the input stream is determined to not be open in step 632.

A possible method of using the present technology is illustrated in FIG. 24. A user can launch an application software (App) on a device capable of running the App, utilizing a user interface of the present technology. The App can open in an image composition screen, which can be as a default setting. Favorite or predetermined settings can optionally be selectable by the user. Device settings are applied and the device is in a ready state, while optionally still in the image composition screen.

The user can the start recording, utilizing the device's camera, a remote camera or a remote video stream, by touching or activating a "Record" icon associated with the App or user interface. Optionally, the user can touch and hold the Record icon or button continuously to continue recording. One aspect can be that the icon or a button associated with the icon can be animated to indicate a live recording is active.

While the recording is in progress, the user can enter special effect commands being to zoom in or zoom out. The video being displayed by the device is configured or configurable to show the zooming in or out special effect associated with the video in real time.

While the recording is in progress, the user can enter special effect commands being to create slow motion and/or fast motion. One aspect is that there is no difference in the speed of the display of the live video on the device.

The user can end recording by releasing or removing the touching of the Record icon or button. After which, the App stops recording, displays a "Review" screen, completes processing the special effect, and provides an option to save or autosave the processed video.

After saving, the newly produced video can be viewed by the device or a remote device after the processing has been completed. The video can play continuously and restart after ending. The App can provide a suite of editing tools that can be utilized to further edit or modify the raw or processed video. Optionally, the video can be edited to fine tune the slow motion and fast motion effects, along with other custom design elements, and post the video. This process can be repeated until a desired video result is created.

The App completes processing any new elements in the video and play back to the user after each edit is completed. This process can be repeated until a desired video result is created.

After processing the video and/or any additional editing to the video is complete, the App can save a final video or edit. The App can save the final video to the device's internal memory, to an external memory and/or to the cloud.

The App can further provide an option allowing the user to post the final video to social media platform. The App can upload the final video onto additional platforms and/or clouds, and display the composition screen allowing the user to start recording a new video.

Figure 25:
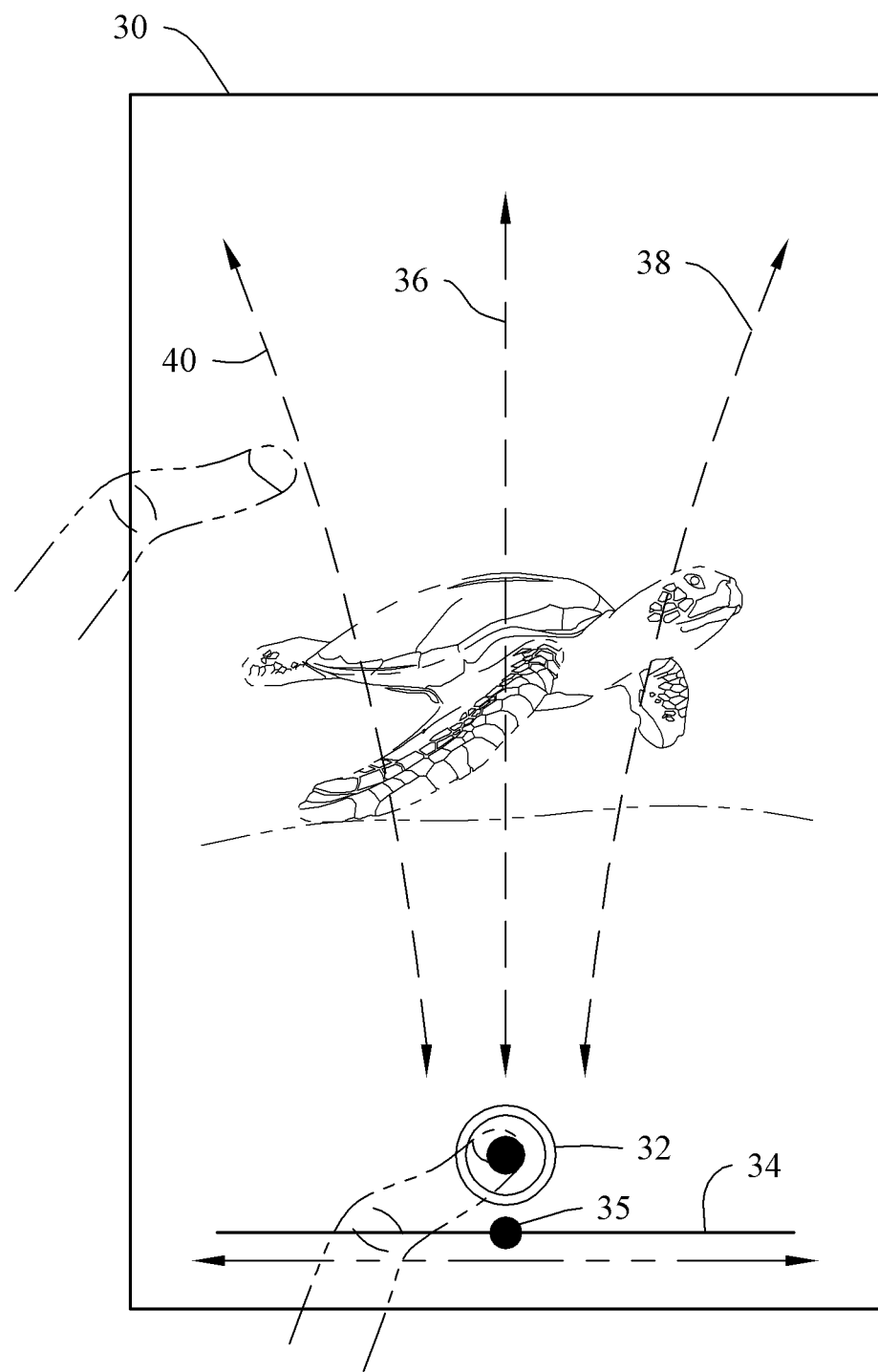
FIG. 25 is a sample graphical user interface (GUI) screenshot of the interface system of the present technology.

With reference to FIG. 25, at least a portion of the interface 30 is described. The interface 30 can be, but not limited to, a GUI interface capable of providing a screen for device optimized parameters or variables. The GUI 30 can be configured or configurable to include a recording start/stop control 32 provided anywhere on the screen, and a speed selection region 34 provided anywhere on the screen that can provide a default or predefined frame rate speed that is used to manipulate the frame in the raw video data from the camera 12. The speed selection region 34 can include a speed selection affordance or control indicator 35 that can travel along the speed selection region 34 via control by the user to indicate the current or selectable speed. The GUI interface 30 can also include regions anywhere on the screen for controlling zoom 36, zoom and fast motion speed rate 38, and/or zoom and slow motion speed rate 40.

In some or all embodiments, a user can touch and/or hold the recording start/stop control 32 to initiate, stop or pause the recording function of the camera. Additionally, a user can interact with the speed selection region 34 by touching the region with a finger or stylus-like device, and making a sliding motion along the region in any direction. The processing unit can be configured or configurable to interpret this sliding movement as a special effect input command. For example, sliding from a central area of the speed selection region 34 toward the right could change the speed rate from the native speed rate to 2×, 3×, 4×, "n"× the native speed rate, depending on how far right the sliding motion travels on the speed selection region 34. Sliding from the central area of the speed selection region 34 toward the left could change the speed rate from the native speed rate to −2×, −3×, −4×, −"n"× the native speed rate, depending on how far left the sliding motion travels on the speed selection region 34.

In some or all embodiments, a user could control the zoom function of the camera by making a vertical sliding motion from a lower region of the GUI toward an upper region. A user could further control a combination of zoom and speed rate by making a curving vertical sliding motion from a lower region of the GUI toward an upper right or left region, depending if a zoom and fast motion or slow motion effect is desired.

Alternatively, the GUI interface 30 can be configured or configurable to include areas, icons or windows where functions, attributes, operations, settings and/or characteristics of the camera and/or display can be controlled. Examples of these functions, attributes, operations, settings and/or characteristics can be, but not limited to, flash, hands free, timer, mute, selfie, broadcast, sharing, filters, media, stop/start recording, and the like. The GUI interface 30 can be configured or configurable to be used to preset a minimum, a maximum or a range of the speed rate of the raw video.

Still further and optionally, the GUI interface 30 can be configured or configurable to include areas, icons or windows providing editing options to the video data stream. The editing options can include, but not limited to, adding text, adding drawings, adding sounds, face filters, adding decorations, creating a video loop, adding a cover, and the like.

The GUI interface 30 can be configured or configurable to include a display of the output video recording data, which can be the raw video data and/or the modified video data, or the edited video data stream can be displayed. It can be appreciated that the output video recording data displayed by the GUI interface 30 can be dynamically changing in real time due to changes in the input. Thus, the present technology can display, in real time, a seamless transition between the raw video data, any number of the modified video data or subsets thereof, while the camera acquires the video and while recording is in progress. The modified video data can include any number of fast to slow motion subsets, and these subsets can be in combination with subsets of the raw video data. The displaying of the raw video data and/or any number of modified video data is accomplished live or in real time as the camera is capturing images associated with the raw video data. It can be appreciated that the present technology renders the displayed output video data as the camera captures the images and while the output video is written to memory. Consequently, allowing the user to move, pan, zoom, etc. the camera while still capturing the video and at the same time applying and displaying any number of special effects to the raw video data.

In some or all embodiments, the user of the device implementing the present technology and GUI 30 is able to access operational functions of the present technology and/or device and/or camera and/or saved video by entering login credentials associated with a user account.

Figure 26:
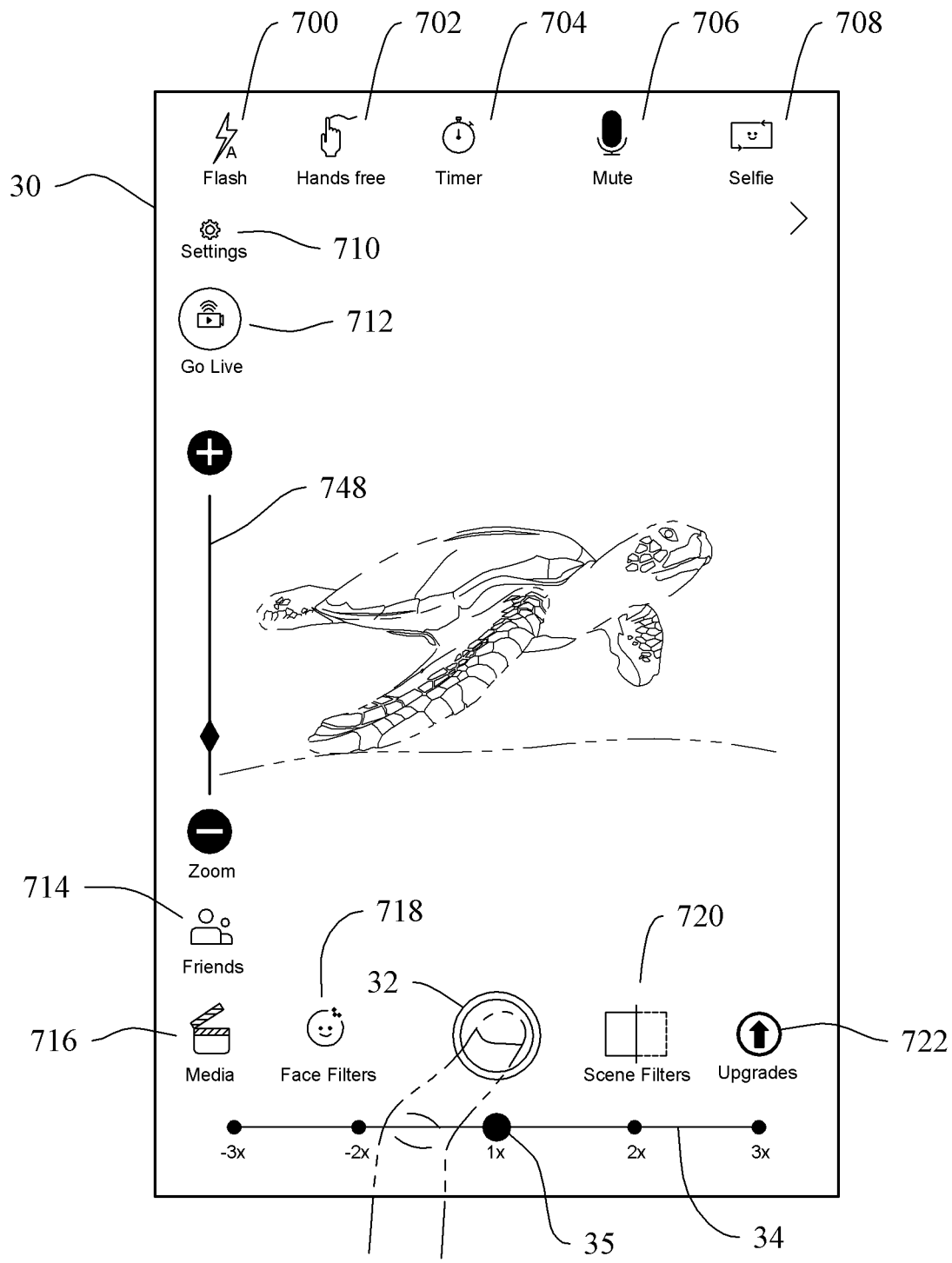
FIG. 26 is a sample GUI screenshot of a "Camera View" of the device employing the GUI while recording in normal "1×" speed utilizing the process of the present technology.

FIG. 26 illustrates an embodiment of the GUI 30 of the present technology utilized on an electronic device displaying an implementation of GUI of the present technology on a touch screen. FIG. 26 is an exemplary "Camera View" of the device employing the GUI 30 while recording in normal "1×" speed. In this normal speed setting, the raw video stream from the camera is not changed and displayed in real time in the GUI 30.

In some or all embodiments of the present technology, the screen shot or GUI 30 can include a number of icons or actuatable elements representing various functions or affordances that the user can select. These affordances change icons as different "states" settings are selected for each affordance by the user. Affordances utilizable in the present technology or GUI 30 can be object's properties that show the possible actions users can take with it, thereby suggesting how they may interact with that object. Affordances can be deliberately constrained to enable only the correct or desired actions when actuated. The affordances utilized in the present technology can include cues to suggest actions that are possible by an interface element. The affordances utilizable in the present technology or GUI 30 can be, but not limited to, any actuatable element in the realm of icons, buttons, dropdown menus, actuatable regions, images, cursor actuatable elements, or touch dependent inputs. In some or all embodiments of the present technology, any of the affordances can be displayed, activated, manipulated, deactivated or hidden depending on a touch or touch release by the user on the display, which can be a touch sensitive screen or pad.

These affordances can be, but not limited to: a "Flash" affordance 700, which when activated (e.g. via a tap gesture), enables the user of the device to select a flash or light of the device to be on, off or automatically activated depending on light levels detected by or inputted into the device implementing the present technology; a "Hands Free" affordance 702, which when activated (e.g. via a tap gesture), enables the user of the device to control aspects of the present technology utilizing gestures on the device, remote control units, speech recognition, and/or a preprogrammed sequence or scheme so that the user can initiate continuously recording without requiring the user to constantly touch with the device (A "Hands-On" mode means the user must touch the record button continuously to continue recording. Once the user releases the record button, recording stops); a "Timer" affordance 704, which when activated (e.g. via a tap gesture), enables the user of the device to start and/or stop recording at a predetermined time(s) of day and/or for a predetermined time duration(s); a "Mute" affordance 706, which when activated (e.g. via a tap gesture), enables the user of the device to mute or deactivate a microphone associated with the device and/or camera; a "Selfie" or "Rear" affordance 708, which when activated (e.g. via a tap gesture), enables the user of the device to switch to a rearward facing or secondary camera associated with the device implementing the present technology; a "Setting" affordance 710, which when activated (e.g. via a tap gesture), enables the user of the device to control operational settings of the GUI, device and/or camera; a "Go Live" affordance 712, which when activated (e.g. via a tap gesture), enables the user of the device to transmit the video feed from the present technology to a remote device or server; a "Friend" affordance 714, which when activated (e.g. via a tap gesture), enables the user of the device to search and/or invite friends or contacts to make a social connection; a "Media" affordance 716, which when activated (e.g. via a tap gesture), opens a media folder that enables the user of the device to open and load videos from a folder created in memory of the device or a remote device or a cloud storage; a "Face Filters" affordance 718, which when activated (e.g. via a tap gesture), enables the user of the device to initiate a subprocess or a third-party application that applies filtering with "Augmented Reality" (AR) functions to the video; a "Scene Filters" affordance 720, which when activated (e.g. via a tap gesture), enables the user of the device to initiate a subprocess or a third-party application that applies filtering functions to the video; and/or an "Upgrades" affordance 722, which when activated (e.g. via a tap gesture), enables the user of the device to upgrade aspects of the present technology and/or memory storage. It can be appreciated that additional icons, functions or affordances can be implemented with or on the GUI. Any number of the icons or affordances 700-722 can be positioned or positionable in predetermined or customizable locations in the GUI 30.

The recording start/stop control 32 can be provided as a button anywhere on the screen that allows the user to start, stop and/or pause the recording of video (e.g. via a tap or touch holding gesture), and the speed selection region which can be a slide bar 34 can be provided anywhere on the screen as a slide bar with circles and/or other shapes and markers indicating selectable playback speeds of the portion of the video in playback. The slide bar 34 enables the user to control the special effects aspect of the video (e.g. via a sliding gesture). The current speed indicator in FIG. 26 is set at "1×" indicating the record speed is "normal". This speed factor is inputted into step 82 of the process illustrated in FIG. 7. In this example, since the user has not entered a special effects command (speed factor "1×" or "normal"), then the process would proceed to step 88, dependent in part of preceding steps.

If the user activated any of the additional operation functions 700-722, then these inputs are determined by step 88, and the appropriate or corresponding parallel processes are initiated in step 78. The record button 32, the speed selection button 35, the speed selection region 34, the zoom level indicator/controller 748, and any icons can be activated utilizing the touchscreen of the user device.

In FIG. 26, the video feed displayed in a first region of the GUI 30 is a live video feed from the respective camera or a remote video feed. Any editing or modified video stream from any initiated operation functions 700-722 can be displayed in one or more additional regions of the GUI 30. These display regions in the GUI 30 can be separate and independent regions, can in part overlap, or can be overlaid. In some or all implementations, the video feed displayed in any of the regions may be previously recorded video footage. In other implementations, the video displayed in any of the regions of the GUI 30 can be, for example, any position on an event timeline associated with the displayed video feed. The timeline can be manipulated by the user by sliding a timeline bar causing the present technology to display the video feed from that point in time forward in any of the regions.

Additionally, the raw video stream and/or editing video stream can be saved to an appropriate memory indicated by the user using the GUI 30. The memory or memory devices selected by the user using the GUI 30 is inputted into the write video stream subroutine in FIG. 8 and the video stream(s) are written or copied appropriately.

Figure 27:
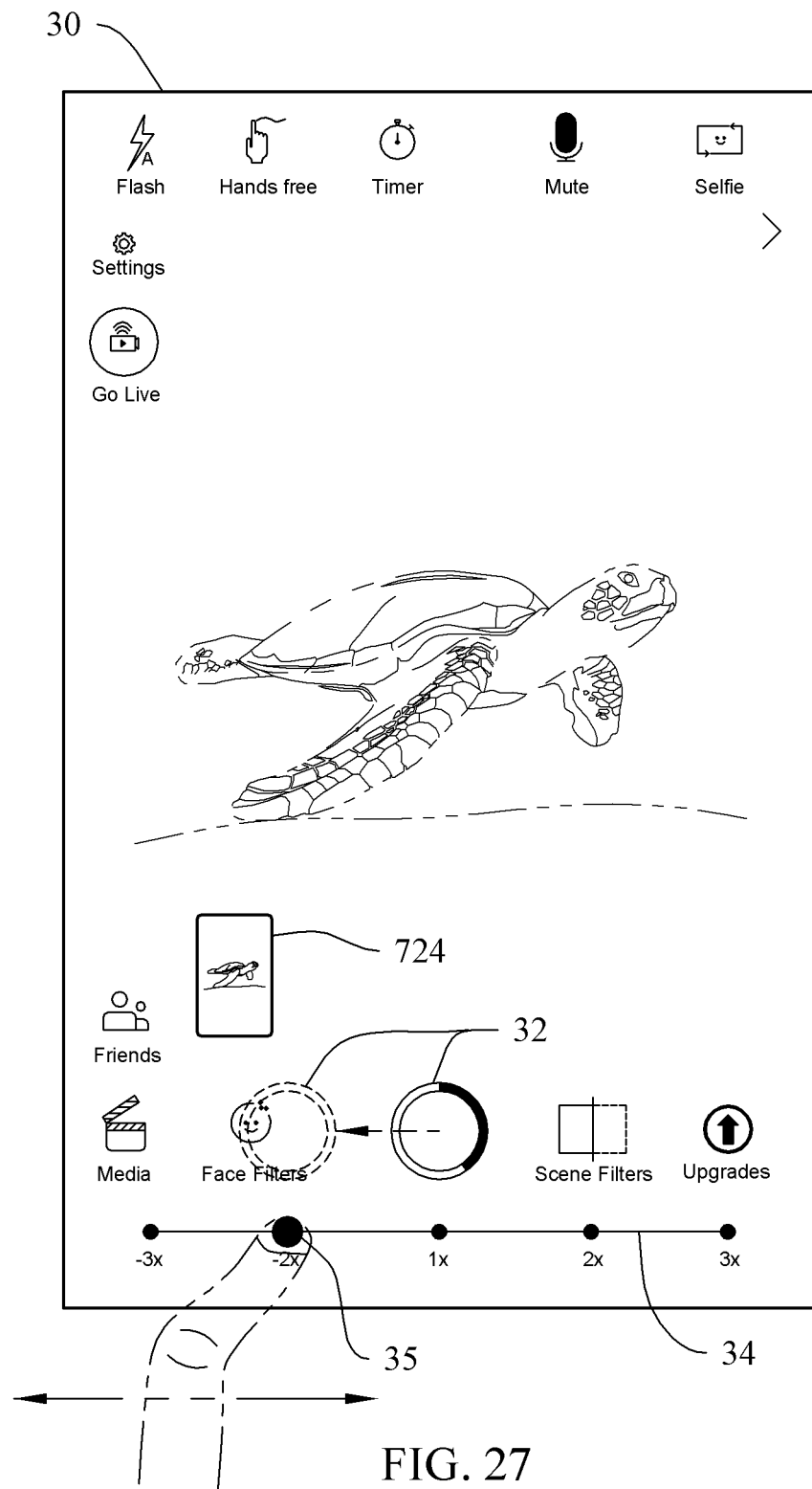
FIG. 27 is a sample GUI screenshot of a "Camera View" of the device employing the GUI while recording in slow motion "—2×" speed utilizing the process of the present technology.

FIG. 27 illustrates an exemplary embodiment "Camera View" of the electronic device employing the GUI 30 of the present technology while recording in slow motion "−2×" speed. In this slow motion speed setting, the frame adding subroutine is utilized and the apparent playback speed is twice as slow as a normal video. In the "Hands-Free" mode example, the user can tap a desired speed marker or slide an indicator to a desired speed marker located on the speed selection region 34. In "Hands-On" mode, the user can press and hold the "Record" button 32 and slide his finger to the left and the button follows directly under the user's finger, so that the button is vertically above the "−2×" affordance label in this example. It can be appreciated that the speed selection affordance or indicator 35 can automatically move along the speed selection region 34 to follow the movement of the "Record" button 32.

In some or all embodiments, a window 724 can be implemented in the GUI 30 that displays the raw video stream, while a majority of the GUI 30 displays the slow motion video stream. In the alternative, it can be appreciated that the window 724 can display the slow motion video stream, while the majority of the GUI 30 displays the raw video stream. In another alternative, it can be appreciated that the window 724 can display the slow motion video stream or a still frame "cover" image of the video stream, while the majority of the GUI 30 displays the live video stream.

The current speed indicator in FIG. 27 is set at "−2×" indicating the record speed is slow motion. This speed factor is inputted into step 82 of the process illustrated in FIG. 7. In this example, the user has entered a special effects command (speed factor "−2×" or "slow motion"), then the process would proceed to step 84 wherein the process would initiate the special effects subroutine in FIG. 9.

If the user activated any of the additional operation functions 700-722, then these inputs are determined and the appropriate or corresponding parallel processes are initiated in step 78.

With the speed factor set to "−2×" using the GUI 30, the apply special effects subroutine is initiated which determines if the input from the GUI 30 represents a fast motion command (step 156 in FIG. 9) or a slow motion command (step 160 in FIG. 9), or go to advanced slow motion subroutine command (step 150 in FIG. 9). The process then initiates the appropriate subroutines corresponding to the input by the user on the slide bar 34. In this example, the frame adding subroutine illustrated in FIG. 13 would be initiated.

As the raw video stream is modified per the initiated subroutine, the GUI 30 displays in real time the resultant slow motion video via the device's display. The raw video stream can also be displayed via the GUI 30, in conjunction with the resultant slow motion video. Additionally, the resultant slow motion video and/or the raw video stream can be saved to an appropriate memory indicated by the user using the GUI 30. The memory or memory devices selected by the user using the GUI 30 is inputted into the write video stream subroutine in FIG. 8 and the video stream(s) are written or copied appropriately.

Figure 28:
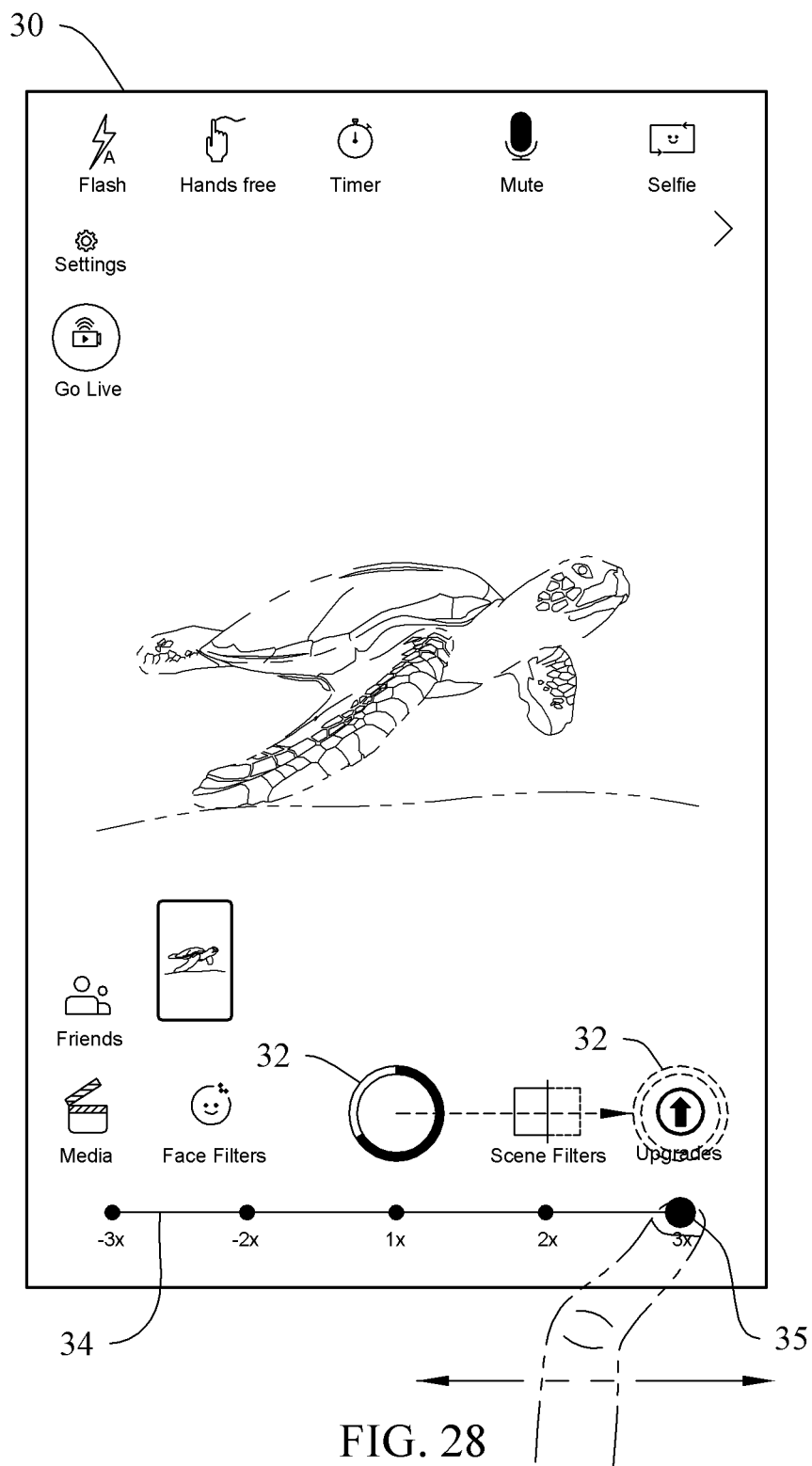
FIG. 28 is a sample GUI screenshot of a "Camera View" of the device employing the GUI while recording in fast motion "3××" speed utilizing the process of the present technology.

FIG. 28 illustrates an exemplary embodiment "Camera View" of the device employing the GUI 30 of the present technology while recording in fast motion "3×" speed. In this fast motion speed setting, the frame dropping subroutine or time compression subroutines is utilized and the apparent playback speed is three times as fast as a normal video without frame dropping. In this example, a "Hands-Free" mode can be utilized where the user can tap a desired speed marker or slide an indicator to a desired speed marker located on the speed selection region 34. In a "Hands-On" mode, the user can press and hold the record button 32 to record continuously and slide his finger left and right to indicate desired speed and the speed affordance or indicator 35 located on the speed selection region 34 moves accordingly.

In some or all embodiments, the user can utilize a "One-Touch" mode to manipulate the video's time. In this mode, recording operation can be initiated by touching the screen, and taking a finger off the screen will stop recording operation. Alternatively, recording is in operation while touching the screen. Exemplary operation can include: moving the touching finger to the left of a middle of the screen will slow down video's time; moving the touching finger to the middle of screen returns video's time to normal speed; moving the touching finger to the right left of the middle of the screen will speed up video's time; the touching finger can quickly go from extreme left to extreme right (and vice-versa); moving the touching finger up will initiate a zoom in (telephoto) operation; moving the touching finger down will initiate a zoom out (wide angle) operation; and adjusting other settings separately live, such as but not limited to, flash 700, mute 706, etc., with other finger while recording is in progress and while the touching finger is on the screen.

Still further, some or all embodiments can include a "Multiple Touch" mode that allows the user to individually select functions through user interface whilst video is being recorded is shown in the user interface.

In some or all embodiments, the window 724 can be implemented in the GUI 30 that displays the raw video stream, while the majority of the GUI 30 displays the fast motion video stream. In the alternative, it can be appreciated that the window 724 can display the fast motion video stream, while the majority of the GUI 30 displays the raw video stream. In another alternative, it can be appreciated that the window 724 can display the fast motion video stream, while the majority of the GUI 30 displays the live video stream. In another alternative, it can be appreciated that the window 724 can display the still frame "cover image" for the fast motion video stream, while the majority of the GUI 30 displays the live video stream.

The current speed indicator in FIG. 28 is set at "3×" indicating the record speed is fast motion. This speed factor is inputted into step 82 of the process illustrated in FIG. 7. In this example, the user has entered a special effects command (speed factor "3×" or "fast motion"), then the process would proceed to step 84 wherein the process would initiate the special effects subroutine in FIG. 9.

If the user activated any of the additional operation functions 700-722, then these inputs are determined and the appropriate or corresponding parallel processes are initiated in step 78.

With the speed factor set to "3×" using the GUI 30, the apply special effects subroutine is initiated which determines if record fps=playback fps and if the input from the GUI 30 represents a fast motion command (step 156 in FIG. 9) or a slow motion command (step 160 in FIG. 9). The process then initiates the appropriate subroutines corresponding to the input by the user on the slide bar 34. In this example, the speed up subroutine illustrated in FIG. 10 would be initiated. If record fps>playback fps and if the input from the GUI 30 represents a fast motion command or a slow motion command, the process then initiates the appropriate subroutines corresponding to the input by the user on the slide bar 34. In this case, the speed up subroutine illustrated in FIG. 12, step 262 initiates subroutine illustrated in FIG. 20.

As the raw video stream is modified per the initiated subroutine, the GUI 30 displays in real time the resultant fast motion video via the device's display. The raw video stream can also be displayed via the GUI 30, in conjunction with the resultant slow motion video. Additionally, the resultant fast motion video and/or the raw video stream can be saved to an appropriate memory indicated by the user using the GUI 30. The memory or memory devices selected by the user using the GUI 30 is inputted into the write video stream subroutine in FIG. 8 and the video stream(s) are written or copied appropriately.

Figure 29:
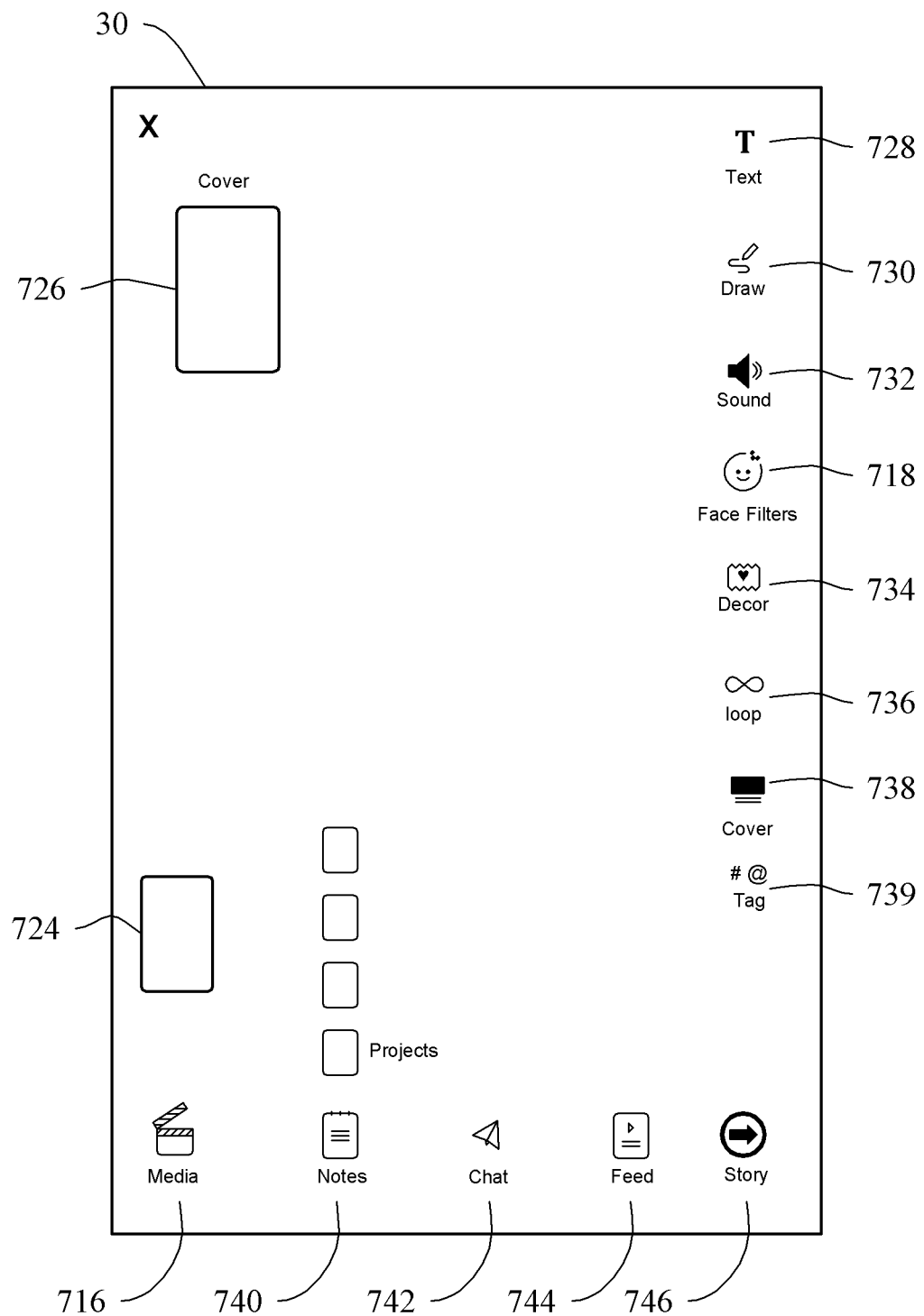
FIG. 29 is a sample GUI screenshot of a "Review Screen" of the device employing the GUI while the user has stopped recording utilizing the process of the present technology.

FIG. 29 illustrates an exemplary embodiment "Screen Shot" of the device employing the GUI 30 of the present technology while the user has stopped recording and the system displays a review screen for the user to review and edit the captured video. The GUI can highlight the icons by removing the background image example.

In some or all embodiments, the review screen can contain a number of icons representing various functions or affordances that the user can select. These icons, functions or affordances can be, but not limited to: a "Display Cover" affordance 726 which displays the still frame "cover image" of the video, a "Text" affordance 728, which when activated (e.g. via a tap gesture), enables the user of the device to add text to the video; a "Draw" affordance 730, which when activated (e.g. via a tap gesture), enables the user of the device to add images, clipart's and/or draw to the video; a "Sound" affordance 732, which when activated (e.g. via a tap gesture), enables the user of the device to add sound or music to the video; the "Face Filter" affordance 718; a "Decor" affordance 734, which when activated (e.g. via a tap gesture), enables the user of the device to add decorations such as stickers and emoji's to the video; a "Loop" affordance 736, which when activated (e.g. via a tap gesture), enables the user of the device to create loop sequence of a selected segment of the video; a "Cover" affordance 738, which when activated (e.g. via a tap gesture), enables the user of the device to use a frame or segment of the video as a cover page for the video a "Tag" affordance 739, which when (e.g. via a tap gesture), enables the user of the device to identify and tag other users who may nor may not appear in the video, and add "hashtags" for search engine optimization; a Media" affordance 716 which when activated (e.g. via a tap gesture), enables the user of the device to save the video to a folder on the device or in the cloud; a "Notes" affordance 740, which when activated (e.g. via a tap gesture), enables the user of the device to save the video to a "Notes" folder or application associated with the device; a "Project" affordance, which when activated (e.g. via long press "a touch and hold" gesture on the "Notes" affordance), enables the user of the device to save the video to a "Projects" folder or application associated with the device for collaboration between other users; a "Chat" affordance 742, which when activated (e.g. via a tap gesture), enables the user of the device to send the video to a contact or friend; a "Feed" affordance 744, which when activated (e.g. via a tap gesture), enables the user of the device to post the video to the user's channel's timeline in the social media aspect of the app, which can also be configured to post to the user's Web or RSS feed; and/or a "Story" affordance 746, which when activated (e.g. via a tap gesture), enables the user of the device to post the video to the user's story or social media page within the app or shared externally to other social media apps like Instagram®, Facebook®, Twitter®, etc. In some or all embodiments, when the Notes affordance 740 is pressed, a list of icons or "Projects" folders appear, each representing an available project the user can post the video to.

For example, the user can add decorations in the video, as well as set other properties for social media upload into the cloud. The user can elect to save the videos in the user's "Media" folder, save to the user's "Notes" location, save to the user's "Projects" location, send the video to a "Chat" contact or group, post to their "Feed", or post to their "Story". The system saves the story and takes appropriate action, utilizing any one of the subroutines and/or subprocesses associated with the present technology.

Figure 30:
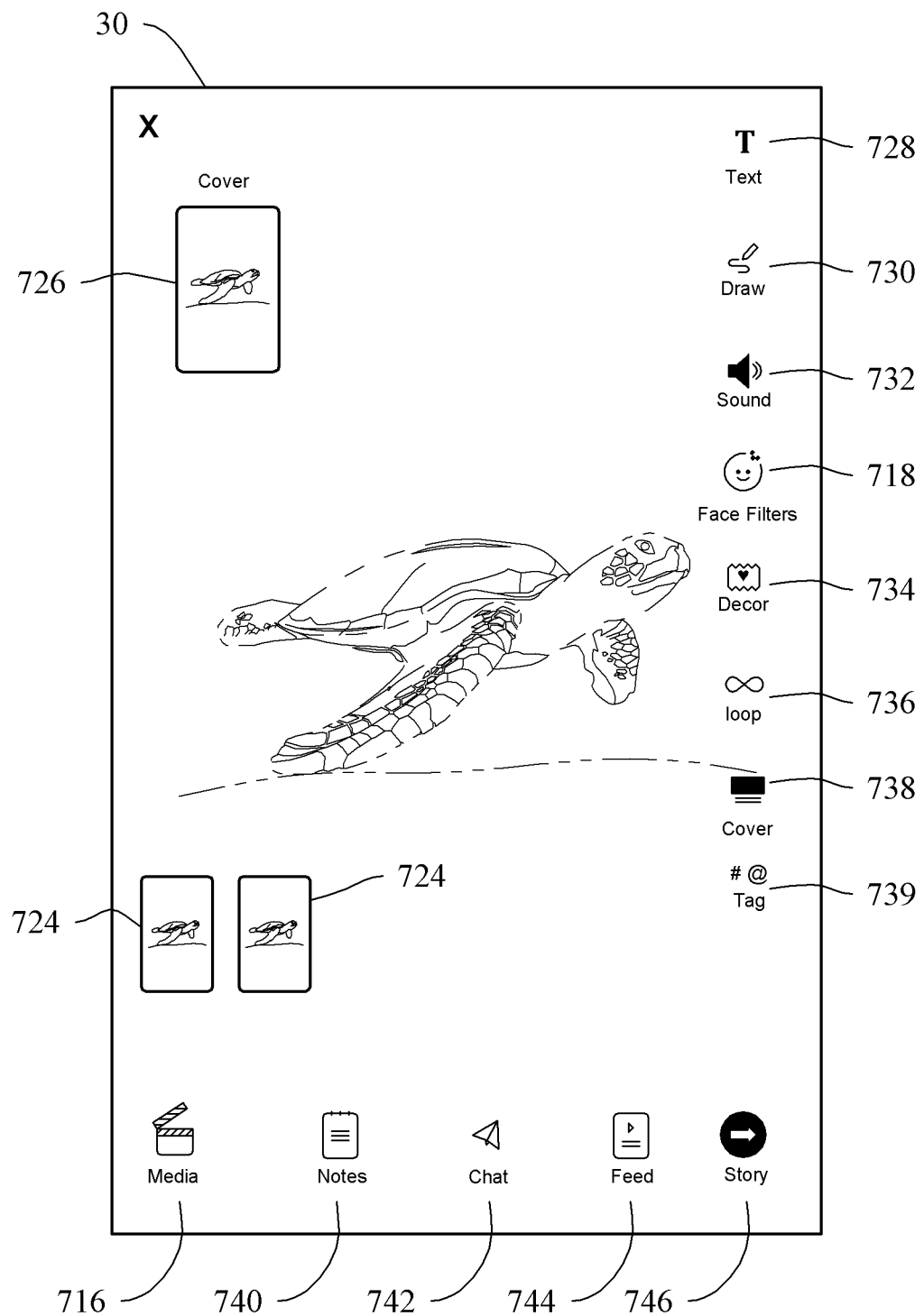
FIG. 30 is a sample GUI screenshot of the "Review Screen" of FIG. 29 to review the captured video utilizing the process of the present technology.

FIG. 30 illustrates an exemplary embodiment "Screen Shot" of FIG. 29 where the user has stopped recording and the system displays the review screen for the user to review the captured video. It can be appreciated that multiple windows 724 can be utilized, each displaying a different edited video stream or still frame cover image of the edited video stream.

Figure 31:
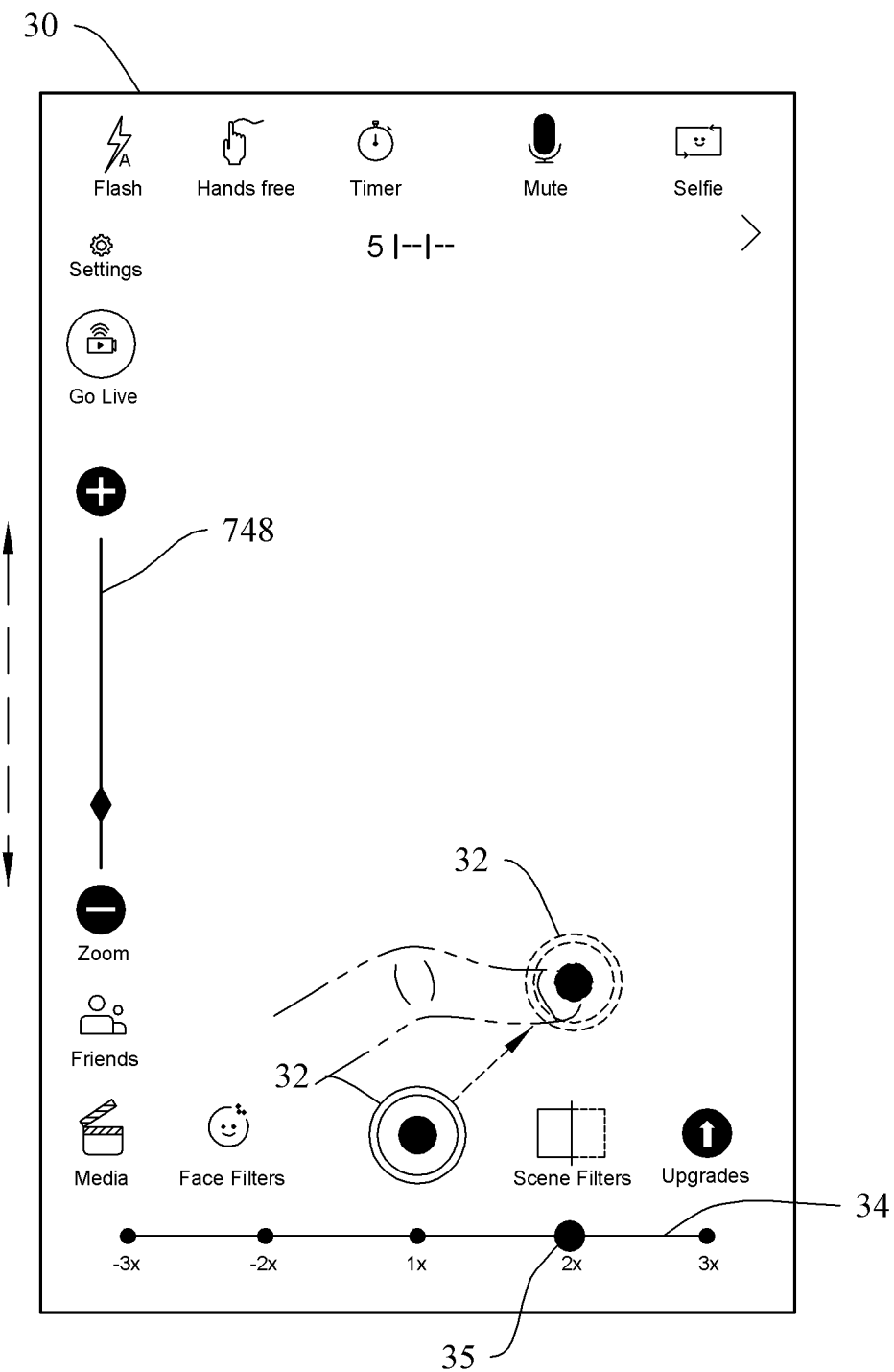
FIG. 31 is a sample GUI screenshot of a "Composition Screen" of the device employing the GUI before recording has started utilizing the process of the present technology.

FIG. 31 illustrates an exemplary embodiment "Screen Shot" of the device employing the GUI 30 of the present technology while the system displays a composition screen before recording has started. The speed range can be displayed from "−3×" to "3×" normal speed, but additional speeds and ranges can be utilized and displayed.

In some or all embodiments, the composition screen can include a zoom setting region 748, which can control a zoom function of the camera (e.g. via a sliding and/or tap gesture or pinch-to-zoom). The zoom setting region 748 can be a zoom slid bar having an indicator moveable by the user by way of touching and sliding the indicator to a desired zoom operation. For example, the zoom slid bar 748 can be a vertically orientated slide bar located on the left or right side of the GUI 30. It can be appreciated that any gesture interface can be utilized in place of the exemplary slide bar. As the user slides his finger from top to bottom and back on the zoom slide bar 748, the "zoom factor" adjusts zoom in and zoom out accordingly as illustrated. In another example, using the "pinch-to-zoom", the user uses a multi-touch gesture to quickly zoom in and out, while the "zoom factor" adjusts up and down accordingly.

The record button 32 can be located in a lower middle section of the GUI, with the "time speed" side bar 34 located therebelow. It is appreciated that the GUI 30 is not limited to specific locations of the record button 32, speed slide bar 34 and any of the icons as illustrated herewith. The record button 32, speed slide bar 34 and any of the icons can be located anywhere in the GUI, and can also be reconfigured, sized and/or moved by the user. For example, the user can provide a touch and hold gesture to any of the affordances, which thus enables the user to move or resize that selected affordance.

In FIG. 31, the user has tapped the "1×" speed marker or slid the indicated to the "1×" speed marker, which means the raw video is being displayed at normal speed with no special effects. It can be appreciated that the indicator "1×" can be substituted with other speed indicators such as, but not limited to, "Normal".

The user can selectively set the location of the record button 32 before recording commences, to set the zoom 748 and the speed factors 34 for the device once recording starts. As the user move the moveable record button, the zoom and speed factors move accordingly. As the user slides his finger side to side on the speed slide bar 34, the "time speed" adjust faster or slower accordingly as illustrated.

Figure 32:
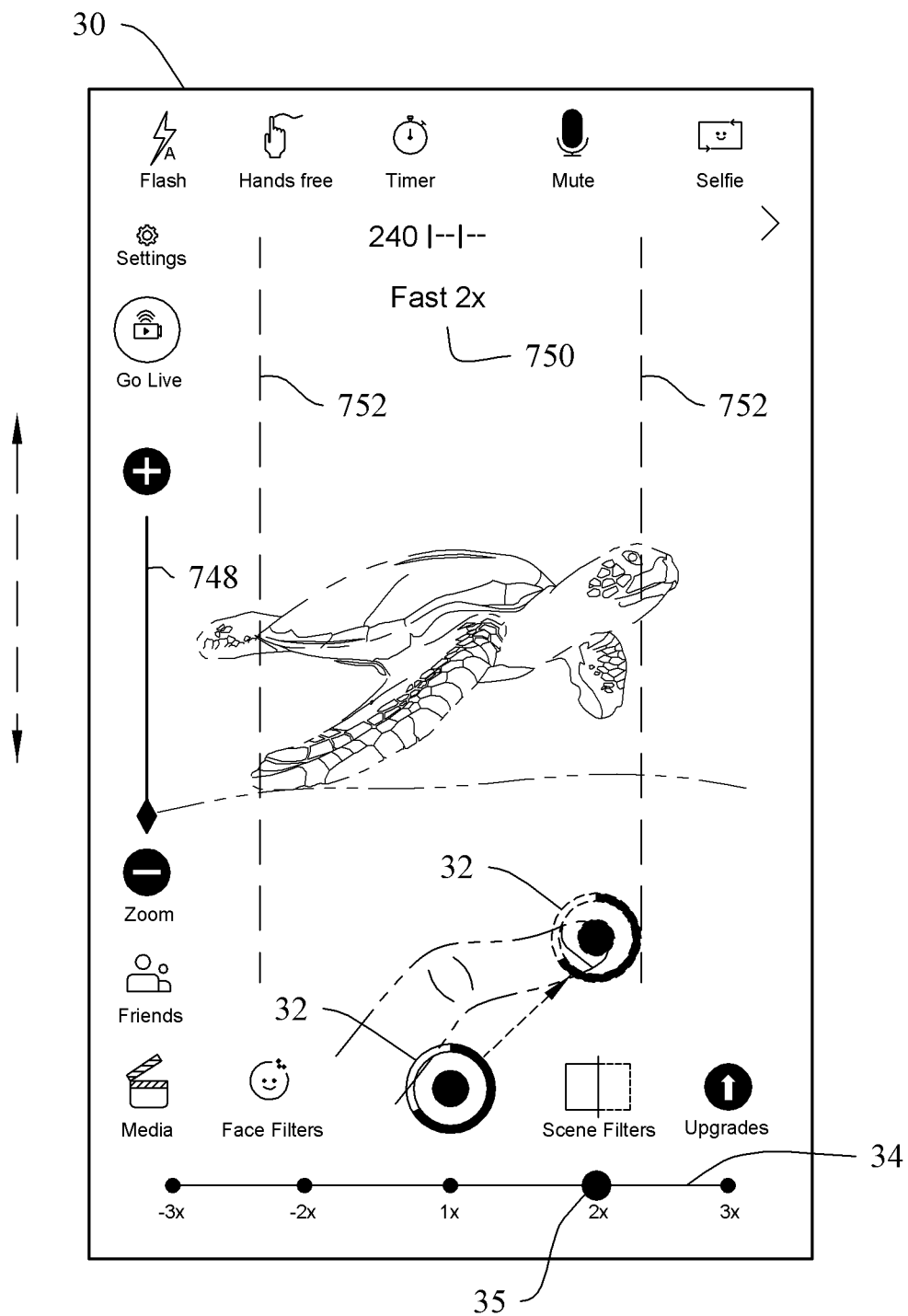
FIG. 32 is a sample GUI screenshot of a "Recording Screen" of the device employing the GUI while recording has started in fast motion "2×" speed utilizing the process of the present technology.

FIG. 32 illustrates an exemplary embodiment "Screen Shot" of the device employing the GUI 30 of the present technology while the system displays a recording screen while recording has started. In this example, the zoom factor is set to zero "0", and the speed factor is set to fast motion "2×" being two times faster than normal speed.

In some or all embodiments, while the recording operation is active, the present technology can enlarge the record button 32 to be visible even underneath the user's finger. A radial progressive bar can be utilized with the record button 32 to indicate recording has started and/or a time duration of the recording. The record button 32 can be colored inside to assist in viewing by the user, and it can be appreciated that the size, configuration and/or color of the record button 32 can be configurable by the user.

In the alternative, the record button 32 can be moved to a location adjacent to the selected speed factor (e.g. via a touch holding gesture). In this present example, above the highlighted "2×" in the "speed scale" 34. The record button 32 can be configurable to follow the user's finger movements as long as the user is touching the screen.

The selected recording FPS, playback FPS and/or speed factor can be displayed in the GUI, as illustrated by the indicator "240 I—I—" and "Fast 2×" 750 in the center near the top of the GUI. The FPS and/or speed factor indicator can be animated or blinking prominently to alert the user of the FPS and/or recording speed. In another embodiment, the indicator 750 is the maximum time length for the video segment.

In some or all embodiments, the GUI 30 can also include "speed guidelines" 752 utilized and displayed vertically in dashed lines. The guidelines 752 are configured or configurable to guide the user's finger or pointing device to indicate when the user's touch point is approaching and then crossing the boundary for speed change.

Upon the user sliding or tapping to the desired speed factor, the application program of the present technology initiates the appropriate subroutine and/or necessary algorithm to create the fast or slow motion special effect associated with the selected speed factor received by the GUI.

Figure 33:
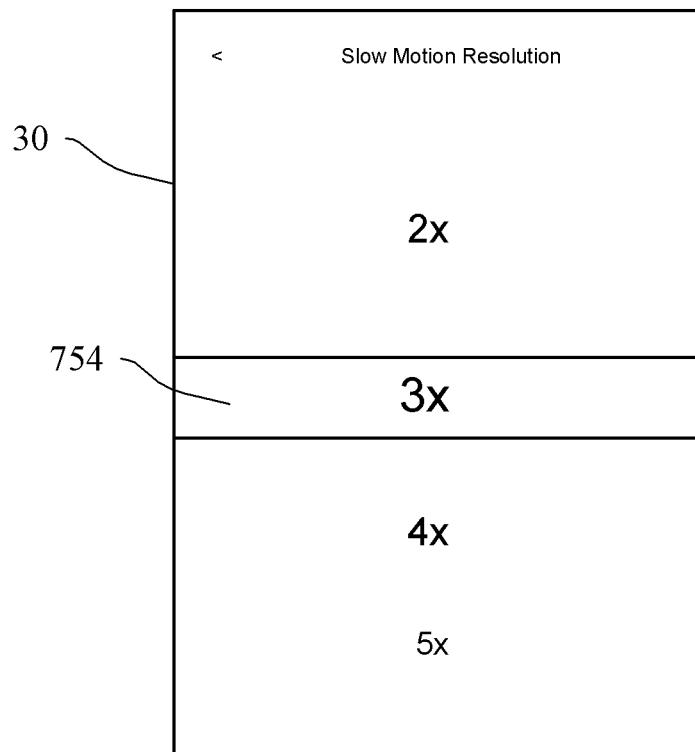
FIG. 33 is a sample GUI screenshot of a "Slow Motion Resolution" screen of the device employing the GUI including scrollable sections utilizing the process of the present technology.

FIG. 33 illustrates an exemplary embodiment "Screen Shot" of the device employing the GUI 30 of the present technology while the system displays a "Slow Motion Resolution" settings screen. In this example, the slow motion resolution is the slow motion factor supported by hardware, without frame adding.

In some or all embodiments, the GUI 30 can include a scrollable selection 754 of multiple speed factor values. The selectable speed factor values in scrollable selection 754 (e.g. via a slide gesture) are the settings for the maximum video quality that the device supports. The selected speed factor can be highlighted to indicated which speed factor selected.

Figure 34:
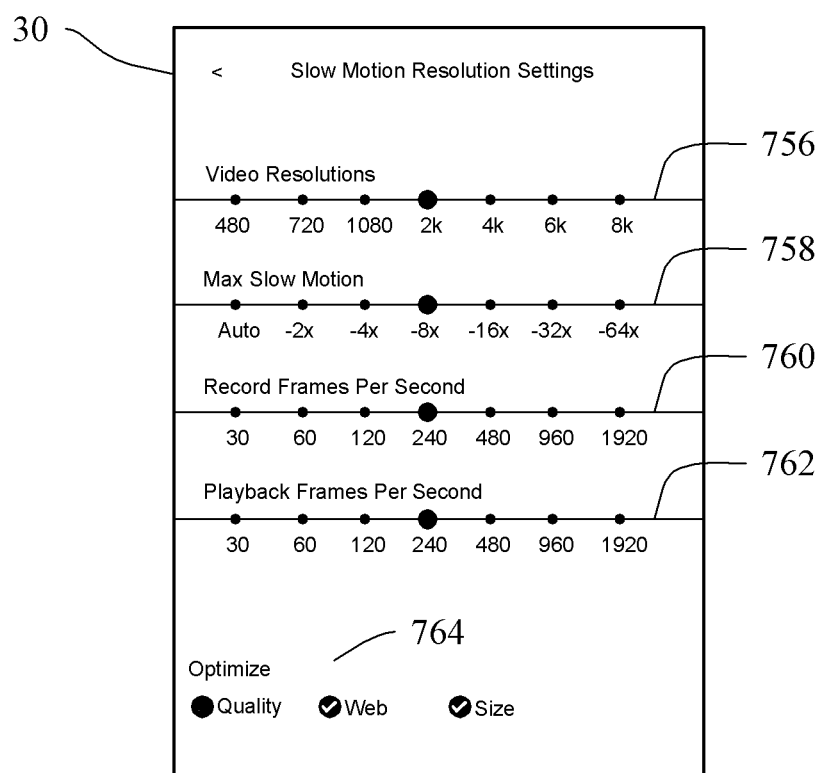
FIG. 34 is a sample GUI screenshot of a "Slow Motion Resolution" screen of the device employing the GUI including slide bars utilizing the process of the present technology.

FIG. 34 illustrates an exemplary embodiment "Screen Shot" of the device employing the GUI 30 of the present technology while the system displays an alternative advanced "Slow Motion Resolution" settings screen. In this example, the GUI 30 can display and utilize multiple slide bars, each controlling a different aspect or operation (e.g. via a slide gesture). When the value of one of the slides is adjusted, the corresponding values of the other slides change accordingly.

In some or all embodiments, the slide bars can be horizontally stacked or vertically spaced. The slide bars can be associated with a "Video Resolution" affordance 756, which when activated (e.g. via a slide gesture), enables the user to set a resolution size of the resulting video. The higher the resolution, the bigger the file, and the larger the bandwidth required to serve the files. Revenue can be received by charging users a fee relating to the desired resolution. With higher video resolution, higher rates can be charged for hosting and bandwidth costs.

Another slide bar can be associated with a "Max Slow Motion" affordance 758, which when activated (e.g. via a slide gesture), enables the user to set the maximum slow motion speed factor. As Video Resolution increases, the Maximum Slow Motion Effect (Max SlowMo) decreases and the Record Frames Per Second (Record FPS) decreases proportionally. Playback Frames Per Second (Playback FPS) is an independent variable and remains unchanged.

Another slide bar can be associated with a "Record Frames Per Second" affordance 760, which when activated (e.g. via a slide gesture), enables the user to set the recording FPS. The record FPS is the rate of which frames are captured by the camera. The higher the frame rate, the higher the slow motion effect with respect to a constant Playback FPS. As Record FPS increases, Max SlowMo increases and Video Resolution decreases proportionally.

As Record FPS decreases, Max SlowMo decreases and Video Resolution increases proportionally. As the user adjust the Record FPS 758 higher and lower, the values for the Max SlowMo and Video Resolution automatically adjust accordingly. Playback Frames Per Second (Playback FPS) is unchanged. The user can manually override and adjust the Video Resolution and Max SlowMo to lower the maximum selected by the software.

Still another slide can be associated with a "Playback Frames Per Second" affordance 762, which when activated (e.g. via a slide gesture), enables the user to set the playback FPS. The Playback FPS is the rate of which frames are played by the device. The higher the Playback FPS, the lower the slow motion effect with respect to a constant Record FPS.

The Playback FPS can be independent set without affecting either Recording Frames Per Second or Video Resolution.

As Playback FPS increases, Max SlowMo decreases proportionally.

As Playback FPS decreases, Max SlowMo increases proportionally.

As the user adjust the Playback FPS 762 higher and lower, the values for the Max SlowMo automatically adjust accordingly. Record FPS and Video Resolution are unchanged.

As Video Resolution decreases, the Max SlowMo increases and the Record FPS increases proportionally. Playback Frames Per Second (Playback FPS) is unchanged.

As the user adjust the Video Resolution 756 higher and lower, the values for the Max SlowMo and Record FPS automatically adjust accordingly. Playback FPS is unchanged.

User can select to create the original footage in high resolution but upload a lower resolution video to save on bandwidth and storage costs. The user has the option to save the high resolution original video to the local device, and/or upload to cloud for storage. Once uploaded, video files of high resolution can be resized into the proper format to optimize speed and size for the viewing device.

The maximum slow motion effect (Max Slow Motion 758) is a ratio of Record FPS to Playback FPS. The maximum slow motion effect uses existing frames only to create the slow motion effect when played in "real time" given the Playback FPS. It does not use frame adding or other digital enhancements or interpolated and extrapolated frames.

Max SlowMo is the maximum end of the range of usable slow motion effect that is available for the user. The user may choose to use a smaller slow motion range that is less than the Max SlowMo value.

Max SlowMo=Record FPS/Playback FPS

The user can set the Playback FPS 762 independently of all other variables. In this example, keeping the Playback FPS constant illustrates the function of the feature.

As the Max SlowMo increases, Record FPS increases and Video Resolution decreases proportionally.

As the Max SlowMo decreases, Record FPS decreases and Video Resolution increases proportionally.

As the user adjust the Max SlowMo 758 higher and lower, the values for the Record FPS and Video Resolution automatically adjust accordingly. Playback Frames Per Second (Playback FPS) is unchanged.

For example, recording fps=120, playback fps=30.

Maximum slow motion effect=4 times slower than normal speed.

The GUI 30 can further include an "Optimize" affordance 764, which when activated (e.g. via a slide gesture), enables the user to optimize the camera and/or playback settings to maximize the best video quality that the device can deliver. The user can select to optimize for video quality, file size, maximum slow motion effect, and combinations thereof.

The values in the Optimize 764 operations can be the settings for the maximum video quality and minimum size that the device supports. These are the "limits" for the range of values that are available for the user to select from.

To assist in understanding the utilization of the GUI 30 implementing at least in part some of the subroutines of the present technology, the following examples are provided, assume the following device supported recording frame rates:

8K at 240 fps
4 k at 480 fps
2K at 960 fps
1080 at 1920 fps

The UI automatically selects the values from the sets of values based on optimize routine selected. Optionally, the selected values are automatically highlighted and aligned vertically (left, middle, right) side of the screen.

Example 1

User sets the following values:
Video Resolution=8K
Playback FPS=30
Optimize for Quality
The UI automatically selects:
Max SlowMo=8×
Record FPS=240

Example 2

User sets the following values:
Video Resolution=4K.
Playback FPS=30
Optimize for Quality
The UI automatically selects:
Max SlowMo=16 selected from set of selectable values {16×, 32×}
Record FPS=480 {240, 480}
While Video Resolution is "locked in" at 4K:
If user selects Record FPS=240 then Max SlowMo automatically sets to 32×.
If user selects Record FPS=480 then Max SlowMo automatically sets to 16×.
If user selects Max SlowMo=32×, then Record FPS automatically sets to 240.
If user selects Max SlowMo=16×, then Record FPS automatically sets to 480. User can manually override and set Record FPS to 240 to decrease file size but with a 50% loss in frame resolution.

Example 3

User sets the following values:
Video Resolution=4K.
Playback FPS=30
Optimize for Size
The UI automatically selects:
Max SlowMo=32 selected from set of selectable values {16×, 32×}
Record FPS=240 {240, 480}

While Video Resolution is "locked in" at 4K:
If user selects Record FPS=480 then Max SlowMo automatically sets to 16×.
If user selects Record FPS=240 then Max SlowMo automatically sets to 32×.
If user selects Max SlowMo=16×, then Record FPS automatically sets to 480.
If user selects Max SlowMo=32×, then Record FPS automatically sets to 240. User can manually override and set Record FPS to 480 to increase frame resolution but increase file size by 100% before compression.

Example 4

User sets the following values:
Max SlowMo=32×
Playback FPS=30
Optimize for Quality
The UI automatically selects:
Video Resolution=2K {480, 720, 1080, 2 k}
Record FPS=240 {240, 480, 960}

Example 5

User sets the following values:
Max SlowMo=64×
Playback FPS=30
Optimize for Quality
The UI automatically selects
Video Resolution=1080 {480, 720, 1080}
Record FPS=1920 {240, 480, 960, 1920}

Example 6: Continuing with Example 5

User sets the following values:
Playback FPS=60
Optimize for Quality
The UI automatically selects
Max SlowMo=32×
Video Resolution=1080 {480, 720, 1080}
Record FPS=1920 {240, 480, 960, 1920}

Example 7: Continuing with Example 6

User sets the following values:
Playback FPS=120
Optimize for Quality
The UI automatically selects
Max SlowMo=16×
Video Resolution=1080 {480, 720, 1080}
Record FPS=1920 {240, 480, 960, 1920}

Example 8: Continuing with Example 7

User sets the following values:
Playback FPS=240
Optimize for Quality
The UI automatically selects
Max SlowMo=8×
Video Resolution=1080 {480, 720, 1080}
Record FPS=1920 {240, 480, 960, 1920}

Figures 35, 36:
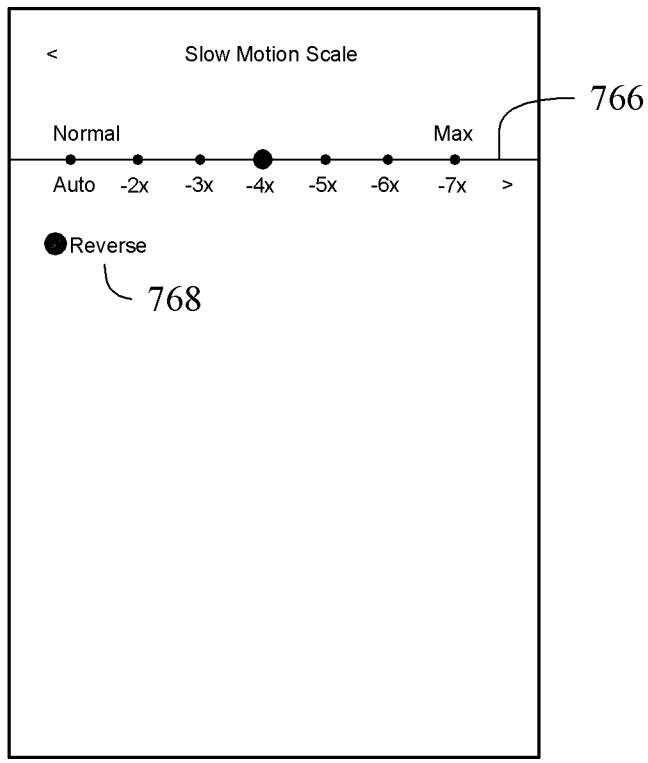
FIG. 35 is a sample GUI screenshot of an alternative "Slow Motion Resolution" screen of the device employing the GUI including scrollable sections utilizing the process of the present technology.
FIG. 36 is a sample GUI screenshot of a "Slow Motion Scale" screen of the device employing the GUI including a slide bar in setting a slow motion factor levels utilizing the process of the present technology.

FIG. 35 illustrates an exemplary embodiment "Screen Shot" of the device employing the GUI 30 of the present technology while the system displays an alternative "Slow Motion Resolution" settings screen. In this example, the GUI 30 has all of the same features as the embodiment illustrated in FIG. 34. The difference is in the presentation of the controls to the end user. All functions are accessible through both embodiments.

In some or all embodiments, the UI automatically selects the values from the sets of values based on optimize routine selected. Optionally, the selected values are automatically highlighted and aligned in the same row at the top, middle or bottom of the screen.

In this example in FIG. 35, the GUI 30 can display and utilize multiple scrollable sections, with each being associated with "Video Resolutions", "Max Slow Motion", "Record FPS" and "Playback FPS" affordances. Each affordance can be activated by moving the scroll to the desired value (e.g. via an up-down slide gesture). The slide bars can be horizontally stacked or vertically spaced. The scrollable sections can highlight the selected value, respectively.

FIG. 36 illustrates an exemplary embodiment "Screen Shot" of the device employing the GUI 30 of the present technology while the system displays a "Slow Motion Scale" screen. In some or all embodiments, the user can set custom settings for how the Slow Motion Scale control appears on the app and it's programmatic behavior in response to the user's input (e.g. via a left-right slide gesture).

In this example, a slide bar or number line 766 represents the slow motion factor levels available for the user. The range displayed is from "Normal" to "7×". There can be a ">" symbol besides the last scale value, in this case"7×", to represent that there are additional slow motion multipliers available but not displayed. The user can then scroll through the available slow motion multipliers and select how much or how little to limit the range of slow motion factor while recording.

The user can pinch at the number line and include more of the range of the slow motion to include in the live recording screen.

The user can set the orientation of the button to move right or left on the line 766 to control the speed. As exemplary illustrated, "Normal" is on the left and "Max" is on the right. The user would then slide his/her finger on the recording control from left to right to increase the slow motion factor.

A "Reverse" affordance 768 can be utilized and displayed on the GUI, which when activated (e.g. via a tap gesture), enables the user to reverse the display of the slide bar 766. If the user selects the "Reverse" option, then "Normal" would be on the right side, and "Max" is on the left. The user's motion is to slide from right to left on the line 766 to increase the slow motion factor.

Figure 37:
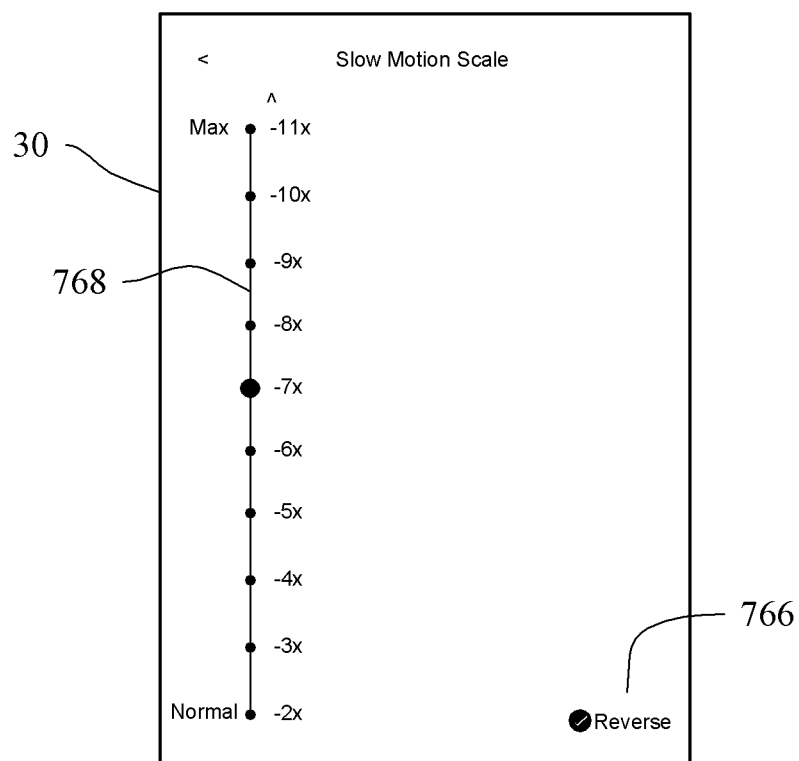
FIG. 37 is a sample GUI screenshot of an alternative "Slow Motion Resolution" screen of the device employing the GUI including a vertical slide bar utilizing the process of the present technology.

FIG. 37 illustrates an exemplary embodiment "Screen Shot" of the device employing the GUI 30 of the present technology while the system displays an alternative Slow Motion Scale screen. In this example, the GUI 30 has all of the same features as the embodiment illustrated in FIG. 36. The difference is in the presentation of the slide bar or line 766 to the end user. In this example, the slide bar 766 is orientated in a vertical configuration along a left or right side of the GUI 30. All functions are accessible through both embodiments. The user can set custom settings for how the Slow Motion Scale control appears on the app and it's programmatic behavior in response to the user's input.

In some or all embodiments, there can be a "A" symbol above the last scale value, in this case"11×", to represent that there are additional slow motion multipliers available but not displayed. The user can then scroll through the available slow motion multipliers and select how much or how little to limit the range of slow motion factor while recording.

Figure 38:
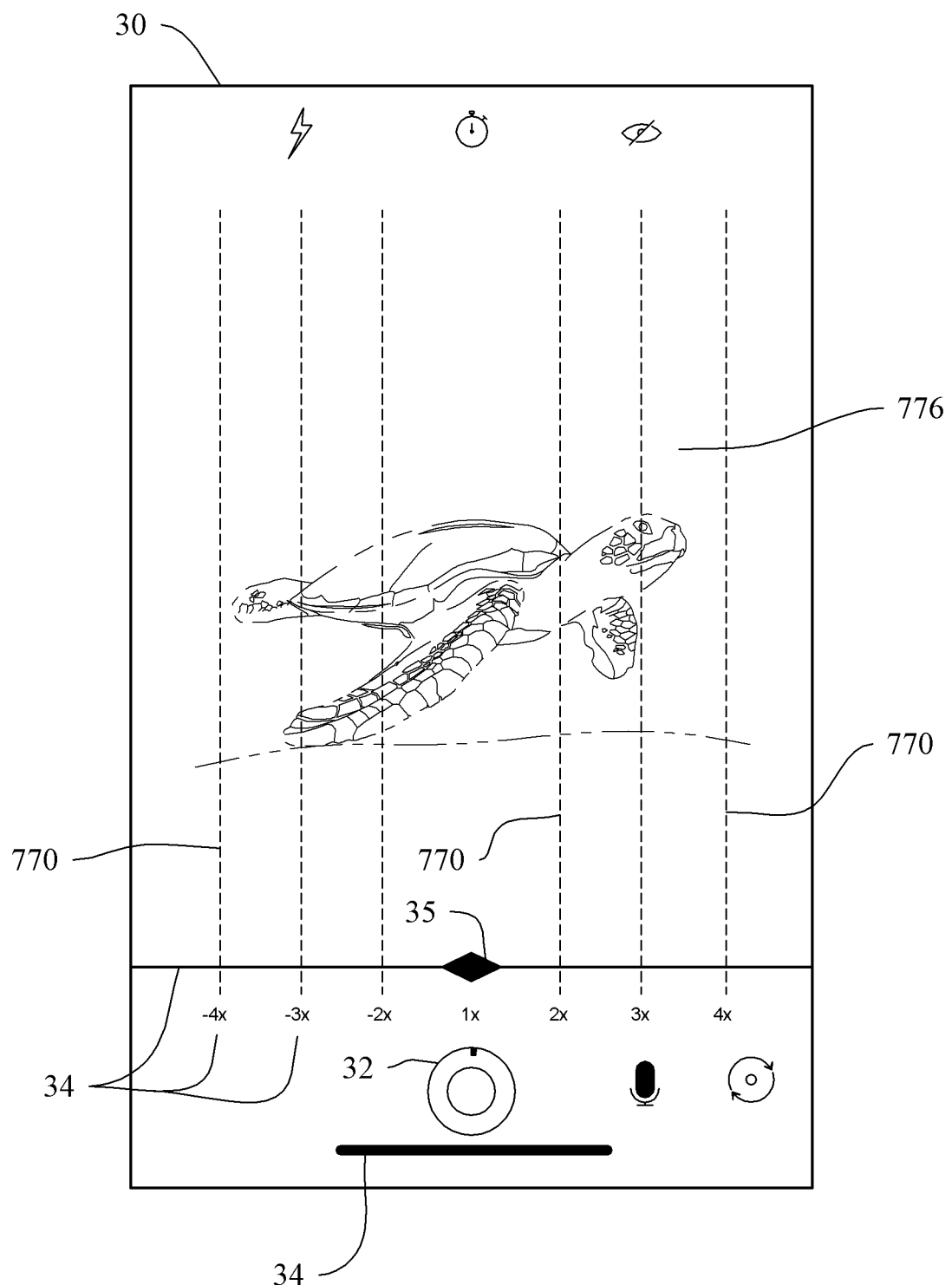
FIG. 38 is a sample GUI screenshot of a "Camera View" or "Editing View" of the device employing the GUI including the time guidelines displayed utilizing the process and/or of the present technology.

FIG. 38 illustrates an exemplary embodiment "Screen Shot" of the device employing the GUI 30 of the present technology while the system displays a "Camera View" or an "Editing View" screen. The GUI 30 can be configured or configurable to include a recording start/stop affordance or control 32 provided anywhere on the screen, and a speed selection region 34 provided anywhere on the screen that can provide a default or predefined frame rate speed that is used to manipulate the frame in the raw video data from the camera or from recorded video. The speed selection region 34 can include a speed rate/control affordance or indicator 35 that can travel along the speed selection region 34 via control by the user to indicate the current or selectable speed. The GUI interface 30 can also include regions anywhere on the screen for controlling zoom, zoom and fast motion speed rate, and/or zoom and slow motion speed rate.

The GUI 30 can include vertically oriented time guidelines 770 that extend vertically up from each of the speed rate indicators or the speed selection region 34 displayed on the GUI 30 or the display of the device utilizing the GUI. The speed rate indicators 34 can be, but not limited to, −2×, −3×, −4×, −"n"×, 1×, 2×, 3×, 4× or "n"×. It can be appreciated that the time guidelines 770 can, in the alternative, extend horizontally across a section of the GUI 30. The time guidelines 770 can be displayed while in camera live one-touch record mode or in-app one-touch edit mode.

The time guidelines 770 can be utilized to assist a user in determining which speed rate is currently be applied, which speed rate is next, which speed rate is nearest a finger touching the display, and/or as a composition guide for assisting in placing scene elements within a photo and video frame. The time guidelines 770 can be a different color, brightness and/or line type or line style from each other, thereby providing each speed rate a unique time guideline.

The GUI 30 can include a video display region 776, and one or more affordances configured or configurable to provide at least one input receivable and usable by the processing unit in operation of the present technology. The affordances can be a speed rate affordance associated with changing the speed rate of the video data. The speed rate affordances can be, but not limited to, associated with the recording start/stop affordance or control 32, the speed rate indicators 34, and/or the speed rate/control affordance 35. The GUI 30 or the processing unit of the present technology can determine if the input is associated with changing a first or native speed rate of the video data, and if so to modify at least one frame in the video data to create modified video data at a modified speed rate that is different to the first speed rate in real time.

It is difficult for the user to "eyeball" the distance their fingers are from the next speed rate indicator or setting as the user moves their finger left or right to engage the fast or slow motion one touch live recording and editing features of the present technology. The user's finger may have a tendency to drift right or left as they zoom in and out.

Without the on-screen time guidelines 770, the user must rely solely on their judgement on the placement of the main elements on the scenery of the photograph or video.

In any of the embodiments of the GUI of the present technology, the user can return to a previous screen or proceed to the next screen by a sliding gesture across the screen in a left or right direction, or by a tap gesture on an icon or affordance indicating the direction of screen progression.

The time guidelines 770 can be a visual guide so the user knows how much further is required to slide the finger or pointing device to engage the next setting for fast and slow motion. The time guidelines 770 can also serve as a "track" for the user to slide the finger to zoom in and zoom out while recording a video.

The time guidelines 770 can always be on or displayed when the GUI 30 is operated, as illustrated in FIG. 38.

Figure 39:
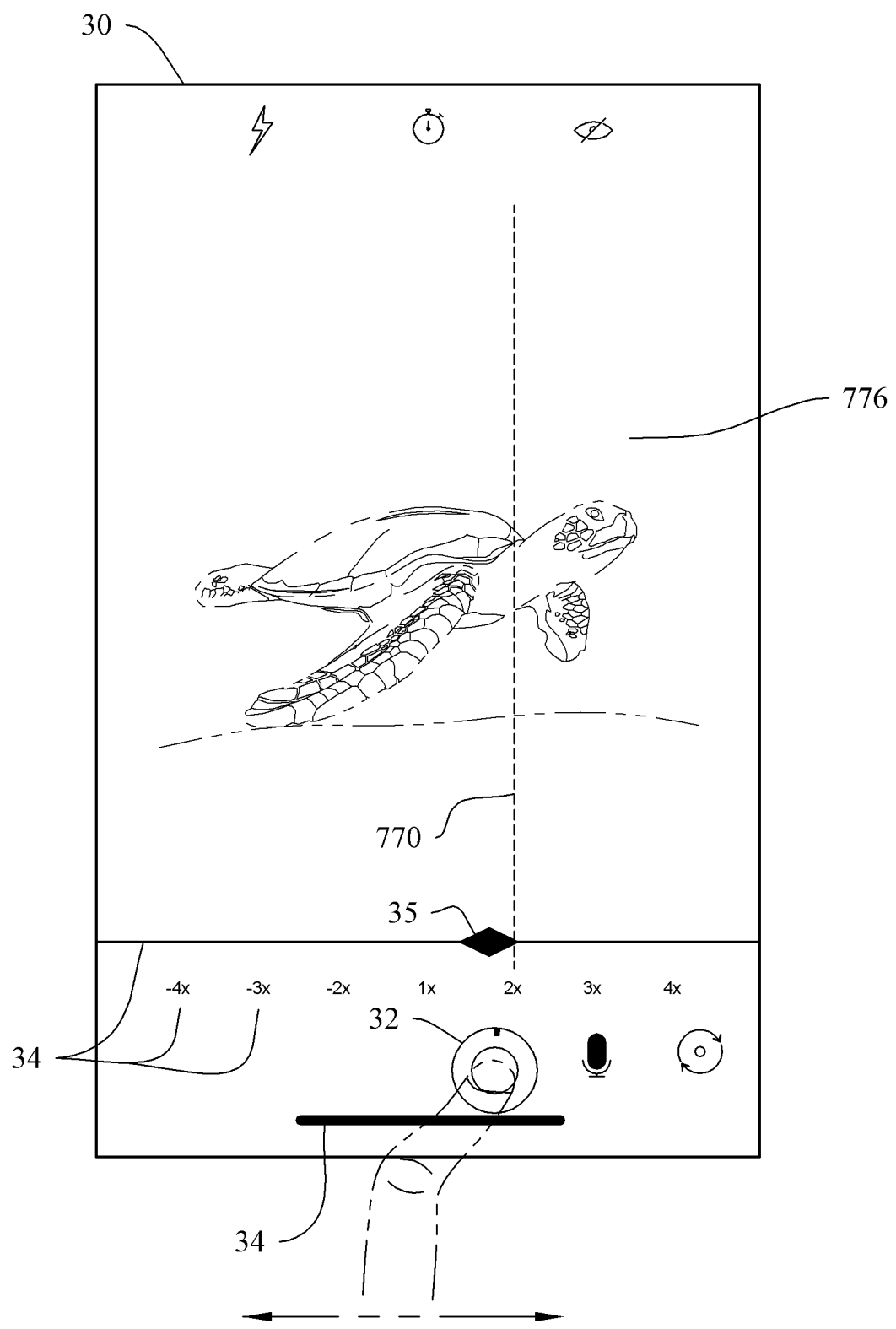
FIG. 39 is a sample GUI screenshot of a "Camera View" or "Editing View" of the device employing the GUI including the slide bar in setting a fast motion factor level with a fast motion time guideline nearest the finger or pointing device being displayed utilizing the process and/or system of the present technology.

Referring to FIG. 39, any of the time guidelines 770 can be activated, turned on, modified, displayed, deceived and/or turned off when recording starts, when a finger touches the display or a pointing device is activated, when the touching finger or pointing device is moved, when the speed rate affordance is moved, or when the speed rate/control affordance 35 is moved. It can be appreciated that the recording start/stop control 32 can be displayed anywhere in the GUI 30 at a location where the finger makes contact with the screen or the point device is activated, or can be always displayed. Still further, the time guidelines 770 can include at least one selectable value selected by a gesture on the display of the electronic device. The gesture can be any one or any combination of a tap, a multiple tap, a touch holding, a sliding, a pinch, and a touch holding and sliding In this exemplary operation as shown in FIG. 39, the present technology is recording at 1x or native speed rate. The user touches the screen with a finger, thereby displaying the recording start/stop control 32 at the point of finger contact. The time guideline 770 nearest the finger contact point is determined by the process of the present technology and its time guideline 770 is activated or displayed.

To engage the fast and slow motion operations of the present technology, the user can slides a finger or pointing device to the right and left, with the nearest time guideline 770 being displayed, thereby providing the user with a visual indication of how much further is required to slide the finger or pointing device to engage the next speed rate setting for fast and slow motion. The use of the time guidelines 770 can prevent the user from unwanted changing of the speed rate, or can confirm the changing of the speed rate.

In an exemplary operation, if the present technology is currently recorded at a slow motion speed rate of −2×, and the user slides a finger or moves a pointing device toward the left nearing the −3× speed rate indicator, then the time guideline 770 associated with the −3× speed rate will be displayed. The displaying of the −3× time guideline 770 can be displayed when the finger is at a predetermined distance to the −3× speed rate indicator and/or a predetermined distance away from the −2× speed rate indicator.

In the alternative, the GUI 30 or the processing unit can intuitively extend an imaginary line or region vertically from the speed rate indicator or the speed rate affordance on the slide bar 34. The time guideline 770 can be automatically displayed when a touch or pointing device input 32 is at predetermined distance form this imaginary line when the touch input 32 is anywhere on the display.

The user may slide the speed rate/control affordance 35 left or right along the slide bar or to a location associated with one of the speed rate indicators 34 to change the speed rate setting, or the user can touch the screen to activate the speed rate affordance 32 and then slide the finger and consequently the speed rate affordance 32 left or right to change the speed rat setting. During any of these instances, when the speed rate affordance is at a predetermined distance from one or more of the speed indicators alone or associated with the slide bar 34, or an imaginary line extending vertically from the speed indicators, then a time guideline 770 can be displayed for that speed indicator.

The present technology can calculate this value by determining the known coordinates of the speed rate indicators displayed in the GUI 30, determining the point of contact of the finger or point of activation by the pointing device, and then determining a linear or radial distance between the speed rate indicator coordinates and the finger contact point or the pointing device activation point. The process can then determine which speed rate indicator is nearest the finger contact point or the pointing device activation point, and then display that time guideline 770. The process may convert the speed rate coordinates, the finger contact point and/or the pointing device activation point into a common vector format.

Figure 40:
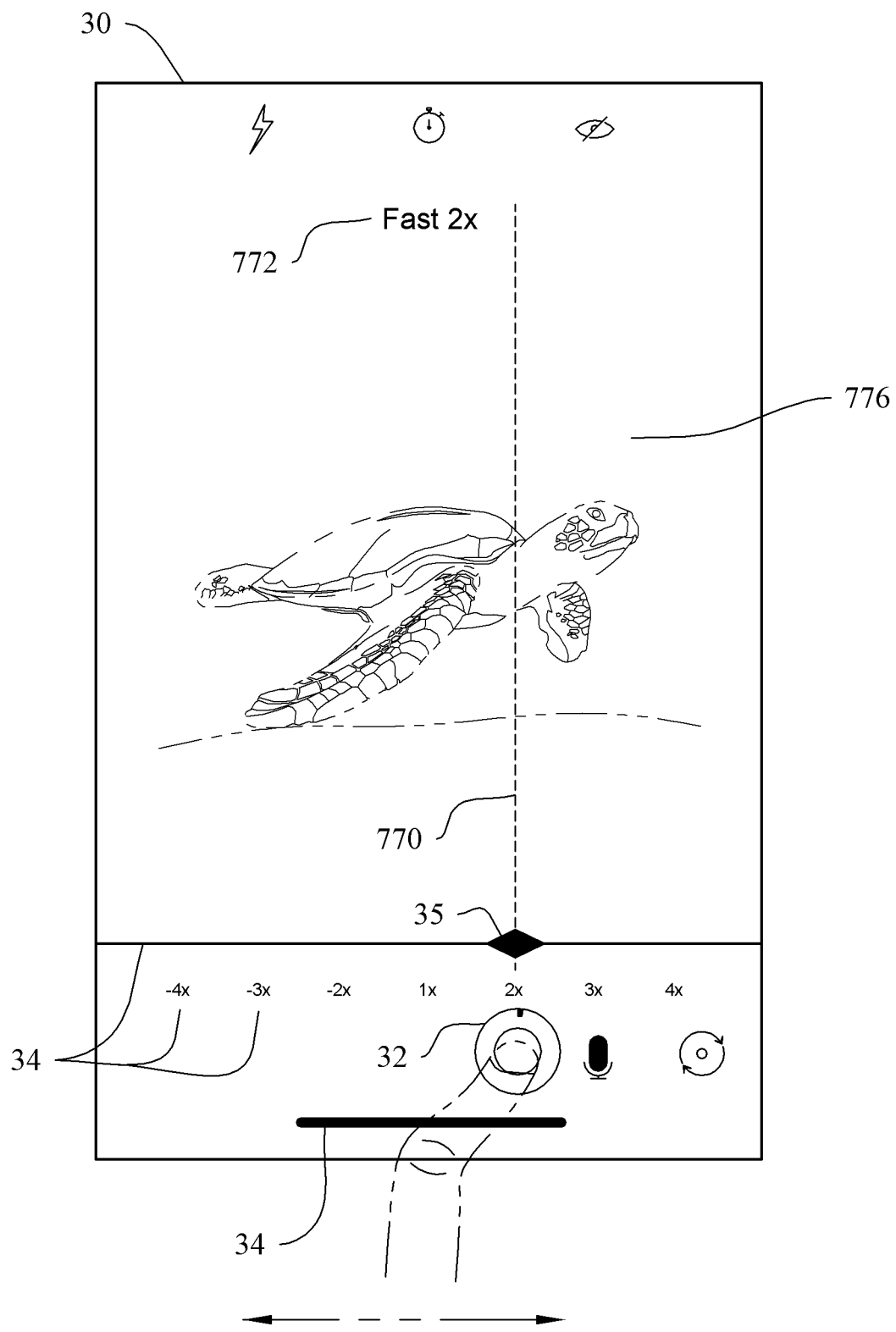
FIG. 40 is a sample GUI screenshot of a "Camera View" or "Editing View" of the device employing the GUI including the slide bar in setting a fast motion factor level with a fast motion time guideline nearest the finger or pointing device and the current fast motion factor level being displayed utilizing the process and/or system of the present technology.

Referring to FIG. 40, once a new speed rate has been set or activated, the GUI 30 can display the current speed rate with a current speed indicator 772 that appears on the screen. The current speed indicator 772 can be flashing, changing color, different color from the guidelines 770 and/or speed rate indicators, animated or any other characteristic to gain the user's attention. The current speed indicator 772 can be displayed anywhere on the screen or in the GUI 30, and can change to the speed rate currently being used. The current speed indicator 772 can also display a speed rate nearest the speed rate affordance 32, 35 being moved by a finger or pointing device, thereby providing additional visual indication or warning of a potential change in speed rate.

The time guideline 770 can further assist in the visual indication of how far the finger or pointing device is from the next time guideline 770, speed rate indicator or speed setting. This can be accomplished by displaying a distance between the nearest time guideline 770 and the speed rate affordance 32, 35. Another way to accomplish this is to have any one of the nearest time guideline 770 or the speed rate affordance 32, 35 flash at a rate dependent on the distance between the nearest time guideline 770 and the speed rate affordance 32, 35.

Figure 41:
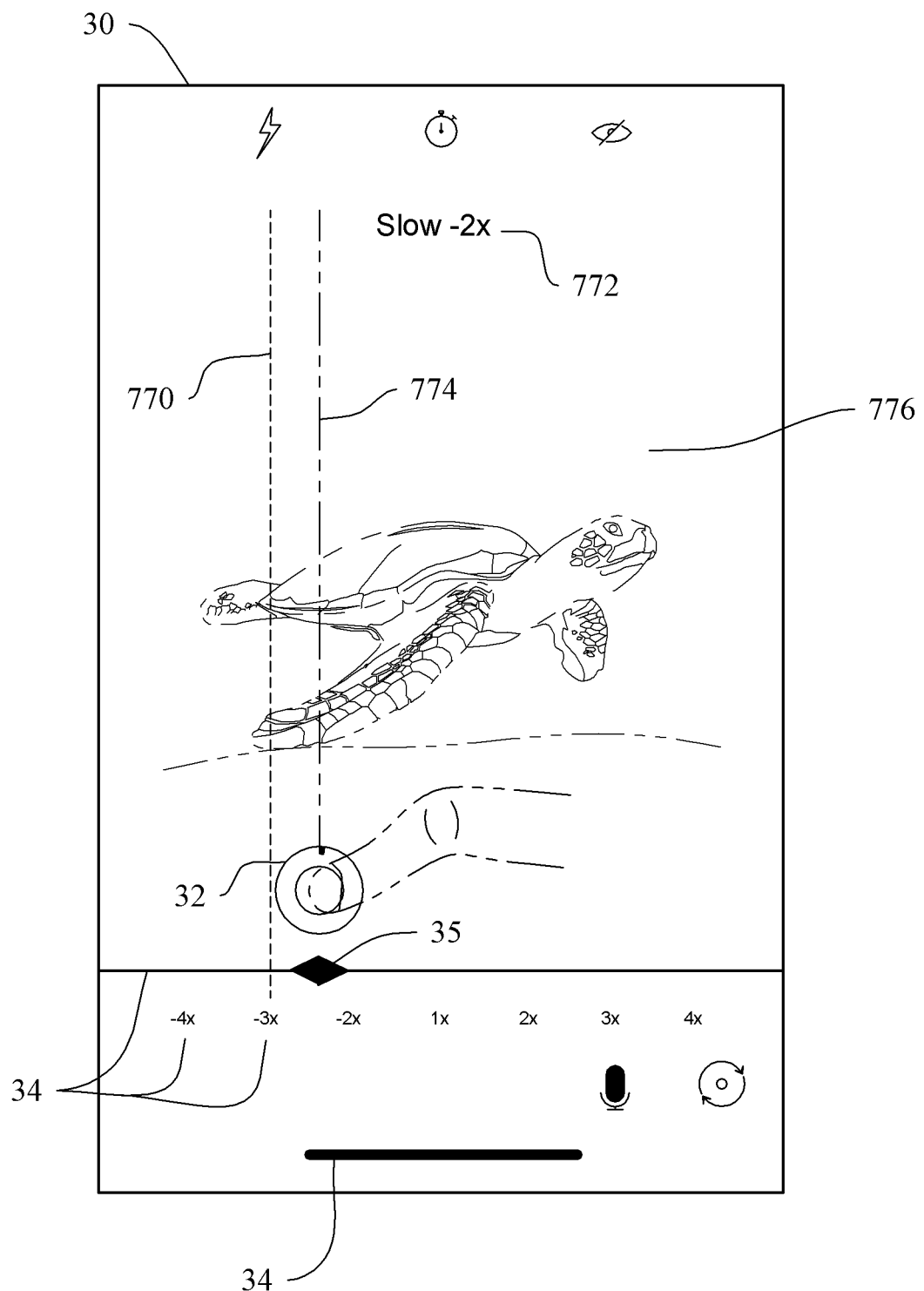
FIG. 41 is a sample GUI screenshot of a "Camera View" or "Editing View" of the device employing the GUI with a slow motion factor level being set remote from the slide bar, and with a slow motion time guideline nearest the finger or pointing device, a finger guideline and the current slow motion factor level being displayed utilizing the process and/or system of the present technology.

Referring to FIG. 41, a finger time guideline 774 can be displayed on the screen or the GUI 30. The finger time guideline 774 can extend vertically up from the finger contact point, the pointing device activation point, or the speed rate affordance 32, 35. The finger time guideline 774 can be a different characteristic, shape, color, brightness and/or line type or line style to that of the time guidelines 770.

The finger time guideline 774 can further assist in the visual indication of how far the finger or pointing device is from the next time guideline 770, speed rate indicator or speed setting. This can be accomplished by displaying a distance between the nearest time guideline 770 and the finger time guideline 774. Another way to accomplish this is to have any one of the nearest time guideline 770 or the finger time guideline 774 flash at a rate dependent on the distance between the nearest time guideline 770 and the finger time guideline 774.

Figure 42:
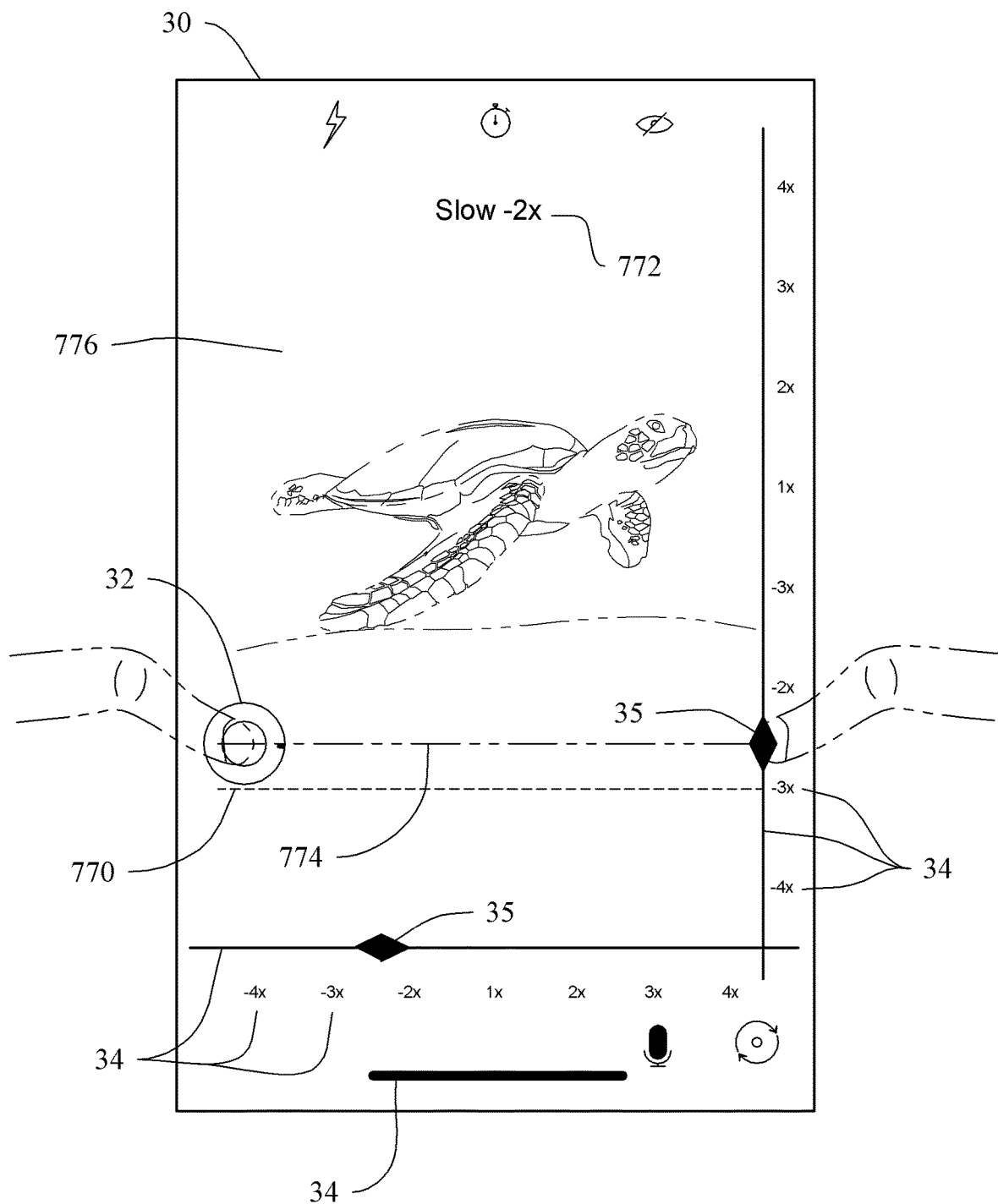
FIG. 42 is a sample GUI screenshot of a "Camera View" or "Editing View" of the device employing the GUI with the slide bar in a vertical orientation, and the activated time guideline nearest the finger or pointing device in a horizontal orientation utilizing the process and/or system of the present technology.

Referring to FIG. 42, in the alternative and exemplary, the time setting slide bar 34 can be vertically orientated, alone or in combination with a horizontally orientated slide bar 34. The user may slide a finger vertically along the vertically oriented slide bar 34 to change the time speed setting of the video being played. While utilizing the vertical slide bar 34, one or more horizontal time guidelines 770 can be displayed on the screen or the GUI 30.

It can be appreciated that the speed rate affordance 32 can be utilized in a vertical direction to control the speed rate setting, alone or in combination with the vertical slide bar 34. Still further, the finger time guideline 774 can extend horizontally from the finger contact point, the pointing device activation point, or the speed rate affordance 32, 35. The horizontal finger time guideline 774 can be a different characteristic, shape, color, brightness and/or line type or line style to that of the horizontal time guidelines 770.

Multiple horizontal time guidelines 770 can be displayed, alone or in combination with vertical time guidelines, to assist in positioning or centering the object in the video display region 776 or in a field-of-view.

It can be appreciated that the time guidelines 770 can be orientated at any angle on the GUI 30, and can even be arcuate to combine the changing of a time speed rate and a zoom function.

Figure 43:
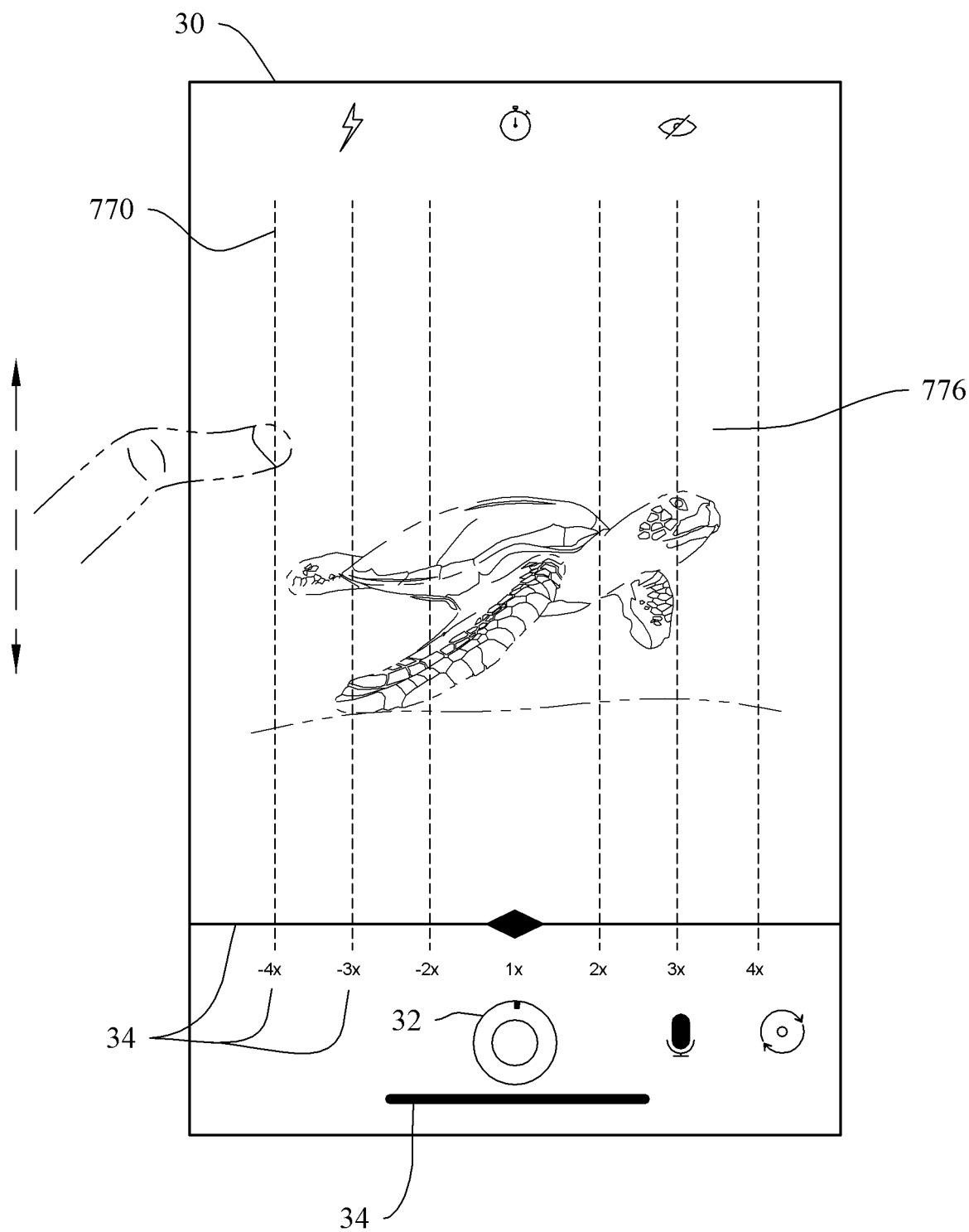
FIG. 43 is a sample GUI screenshot of a "Camera View" or "Editing View" of the device employing the GUI with the time guidelines being used to guide the finger or pointed device in a vertical sliding direction to control the zooming function utilizing the process and/or system of the present technology.

As illustrated in FIG. 43, in the alternative and exemplary, one or more zoom affordances can be associated, linked or utilized with one or more of the time guidelines 770. The zoom affordances can be usable in controlling or determining a change in zoom factor of the video data.

In this situation, the user can touch or point at any one of the time guidelines 770, and then slide the finger or move the pointing device up or down along the time guideline 770 to control a zoom-in or zoom-out function. During this up or down movement, if the finger or pointing device drifts off the time guideline 770 toward an adjacent new time speed setting region, then that time guideline associated with the adjacent time speed setting region can be activated. Thus, alerting the user that a change in time speed rate may be occur if the user keeps drifting toward that newly activated time guideline.

To avoid the time guidelines 770 and/or finger guideline 774 from becoming an annoyance or distraction, these guidelines can be configured to disappear after a predetermined time of being first displayed, when the finger contact point or pointing device activation point has moved a predetermined distance from along a horizontal or vertical axis, or if the finger or pointing device provides multiple sequential contacts or activations. Therefore, in a possible embodiment of the invention, the system further comprises processing means, e.g., a controller, for activating and deactivating the time guidelines 770 and/or finger guideline 774 on the GUI 30 or display of the electronic device depending on a threshold of the distance to or from a speed rate indicator or setting 34.

Any or all of the time guidelines 770 can be activated automatically when a user raises the camera or display from a horizontal to a vertical position, when the GUI 30 is in operation. Furthermore, any or all of the time guidelines 770 can be automatically rotated so they are substantially in a vertical orientation when the electronic device displaying the GUI 30 is rotated between a portrait and landscape orientation.

In some or all embodiments, the time guidelines 770 can be in any geometric shape, such as but not limited to, a square, a rectangle, an oval, a circle, a triangle or polygon. The guidelines 770 can be configured according to a parameter, which is configurable by a user. The parameter can be any one or any combination of color, pattern, length, thickness, flashing, brightness, shape, orientation, and display time.

The guidelines 770 and/or its geometric shape can be configured or configurable to represent a field-of-view of the camera associated with the GUI 30, thereby providing the user with a specific reference area for positioning the object being recorded or edited. In the exemplary, at least part of two or more guidelines 770 can be displayed in the video display region 776 of the GUI 30 in a spaced apart relationship, thereby assisting the user in centering an objected being recorded or viewed within a field-of-view of a camera or the video feed.

The guidelines 770 and/or the finger guideline 774 can be implemented or implementable in or with an electronic device, a video system, a computer system, a video interface system, a graphical user interface, a non-transitory computer readable medium and/or a method utilizing any of the above.

In the exemplary, some features of the guidelines 770, the current speed indicator 772 and/or the finger guideline 774 can be:

in a utilization for composition aide;
to display how close the software application of the present technology is to switching to the next time speed rate;
in a utilization as a track to guide user while zooming;
to display the current recording and/or playback speed indicator on-screen while in one-touch recording mode;
to display the current recording and/or playback speed indicator on-screen while in one-touch editing mode;
the user can "lock" the time speed rate while zooming to ensure no accidental change in the time speed rate;
a wider device screen can display more time speed rate options with or without vertical bars; and/or
the electronic device in landscape mode can display more time speed rate options with or without vertical bars.

In some or all embodiments, the present technology can include artificial intelligence (AI) to identify sections in the video that can be compressed or expanded the appropriate amounts so that viewing the resulting video is more discernible or indiscernible to the viewer from the original video to a) meet the project requirements; and b) "emotioneering" effect in the appropriate content category. Emotioneering refers to a vast body of techniques which can create, for a player or participant, a breadth and depth of emotions in a game or other interactive experience, and which can immerse a game player or interactive participant in a world or a role.

In some or all embodiments, the guidelines 770, the current speed indicator 772 and/or the finger guideline 774 can be displayed in 2-D or 3-D, and/or can be implemented and viewed in augmented reality or virtual reality mode.

In an exemplary Normal and/or 360 Live Record Mode, AI can in real-time scan and analyze the scene being recorded to make to higher accuracy of automatically adjusting the guidelines 770 in real time, moving them either closer together or further apart, or even bending the distance so that they are no longer parallel lines and may even intersect, depending on the scene's likelihood for the user to use more or less of the fast or slow motion speeds. This operation may be useful in 3-D Mode and/or/with the 360 Mode.

In Normal and/or 360 Edit Mode, the AI can pre-scan and analyze a previously recorded video to make to higher accuracy of automatically adjusting the guidelines 770 in real time, moving them either closer together or further apart, or even bending the distance so that they are no longer parallel lines and may even intersect, depending on the scene's likelihood for the user to use more or less of the fast or slow motion speeds. This operation may be useful in 3-D Mode and/or/with the 360 Mode.

The present technology can incorporate augmented reality, which can interact with the guidelines 770.

In some or all embodiments, the speed selection region 34 and/or the speed rate/control affordance or indicator 35 can be an artifact of an operating system utilizing the present technology that is displayed by default on certain electronic devices utilizing the operating system.

In some or all embodiments, the speed selection region 34 and/or the speed rate/control affordance or indicator 35 may be omitted or the functionality may be different.

For example, when a camera of a 360 video pans closely around a turn or an object, the relatively large size on the screen would actually display recognizable people's faces, especially as video resolutions continues to get higher with no practical limit in sight.

The present technology can be implemented as a premium feature in a mobile software application on the iOS and Android mobile platforms. Industry standard best practices software development operations, "Dev Ops", can be deployed to implement further embodiments of the present technology.

When in use, the guidelines 770 can appear as per the user setting for the camera live record mode and in-app edit mode screens. The guidelines 770 can be displayed in the screens while in camera live one-touch record mode or in-app one-touch edit mode.

The guidelines 770 can help the user as a composition guide for placing scene elements within the photo and video frame, like placement of the main subject in the center or using the rule of thirds and other compositional standards.

Figure 44:
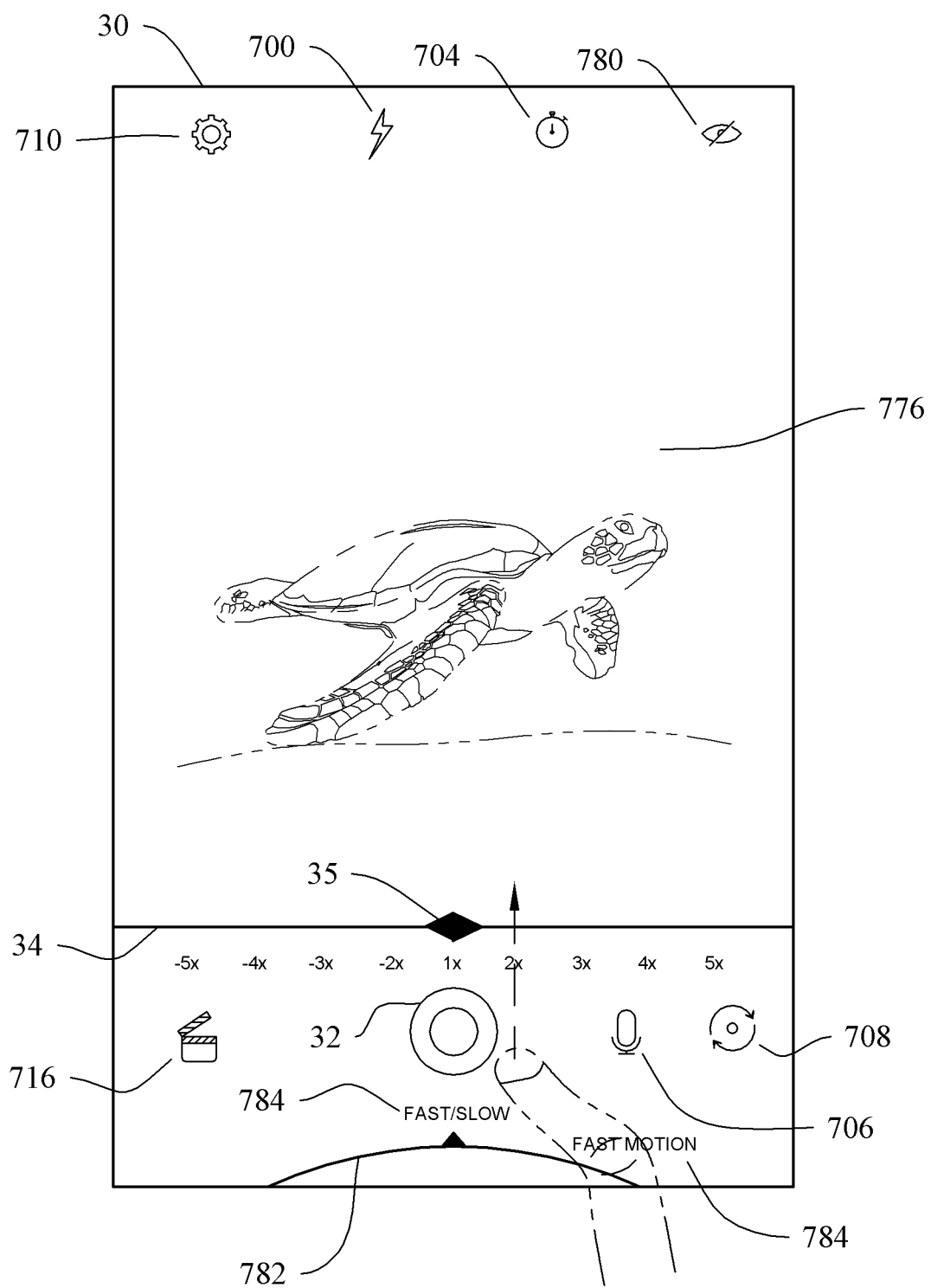
FIG. 44 is a sample GUI screenshot of a "Camera View" of the device employing the GUI with a vertical or upward finger swipe motion appearing the selectable options bar and with a "Fast/Slow Motion" option selected on the selectable options bar utilizing the process and/or system of the present technology.

FIG. 44 illustrates an exemplary embodiment "Screen Shot" of the device employing the GUI 30 of the present technology while the system displays a "Camera View" screen. The GUI 30 can be configured or configurable to include the recording start/stop affordance or control 32 provided anywhere on the screen, with a default position can be below the "1×" speed rate indicator. The speed selection region 34 can be provided anywhere on the screen for selecting a default or predefined frame rate speed that is used to manipulate one or more frames in video data or at least one image data. It can be appreciated that the video data can be obtained from the camera or from recorded video stored in the device or from a remote device. The speed rate/control affordance or indicator 35 can travel along the speed selection region 34 via control by the user to indicate the current or selectable speed. The speed rate affordance 35 can slide to different locations on the speed selection bar 34 to select a speed rate of the video. Alternatively to or in combination with sliding the speed rate affordance 35, a user can finger touch or select with a pointing device a location on the speed selection bar 34 to select a speed rate of the video. The GUI interface 30 can also include regions anywhere on the screen for controlling zoom, zoom and fast motion speed rate, and/or zoom and slow motion speed rate.

The GUI 30 can include a region adjacent to and/or below the speed selection bar 34 configured or configurable for receiving a vertical or upward finger swipe motion of a user's finger, as illustrated by the dashed arrowed line. Upon providing an upward finger swiping motion, a selectable options bar 782 can appear from a lower portion of the GUI 30 below the speed selection bar 34. The selectable options bar 782 can have a curved or arched configuration with at least one option indicator for providing a location on the selectable options bar 782 for selecting an option process 784 from a plurality of appearable option processes. A user can transition through the option processes 784 by, but not limited to, swiping left or right over the selectable options bar 782.

In the exemplary, FIG. 44 illustrates a default or first time viewing of the option processes 784 upon the selectable options bar 782 appearing into view. A first of the option processes 784 in the selected position can be a "FAST/SLOW" option process 784, with the next "FAST MOTION" option process 784 being viewable to the right of the selected "FAST/SLOW" option process 784. Accordingly, the next option process 784 either ahead of and/or behind the selected option process 784 can be displayed and viewable to the user.

One or more selectable affordances, such as but not limited to, the "Setting" affordance 710, the "Flash" affordance 700, the "Timer" affordance 704 or a "Hide" affordance 780 can be located in, but not limited to, an upper or top region of the GUI 30 or any other area of the GUI. The "Hide" affordance 780, when activated (e.g. via a tap gesture), can hide or display some or all of the affordances displayed on the GUI 30.

Once an option process 784 has been selected, the user can then initiate a video recording option, an image capture option or access stored video or images by operating the recording start/stop control 32.

A one touch taping gesture or touch holding gesture of the recording start/stop control 32 can initiate a recording operation, and a subsequent one touch taping gesture or removing of the touch holding gesture can stop the recording operation. Alternatively, the recording operation can automatically stop after a predetermined time period. During the recording operation, the time guidelines 770 can be displayed, and the user can slide the recording start/stop control 32 to the left or right to initiate a speed rate change operation utilizing the processes of the present technology. While touching and holding the recording start/stop control 32, the user can slide the recording start/stop control 32 vertically to change a zoom aspect of the video or image being displayed in the display region 776 while simultaneously sliding left or right to change a speed rate of a video.

Figure 45:
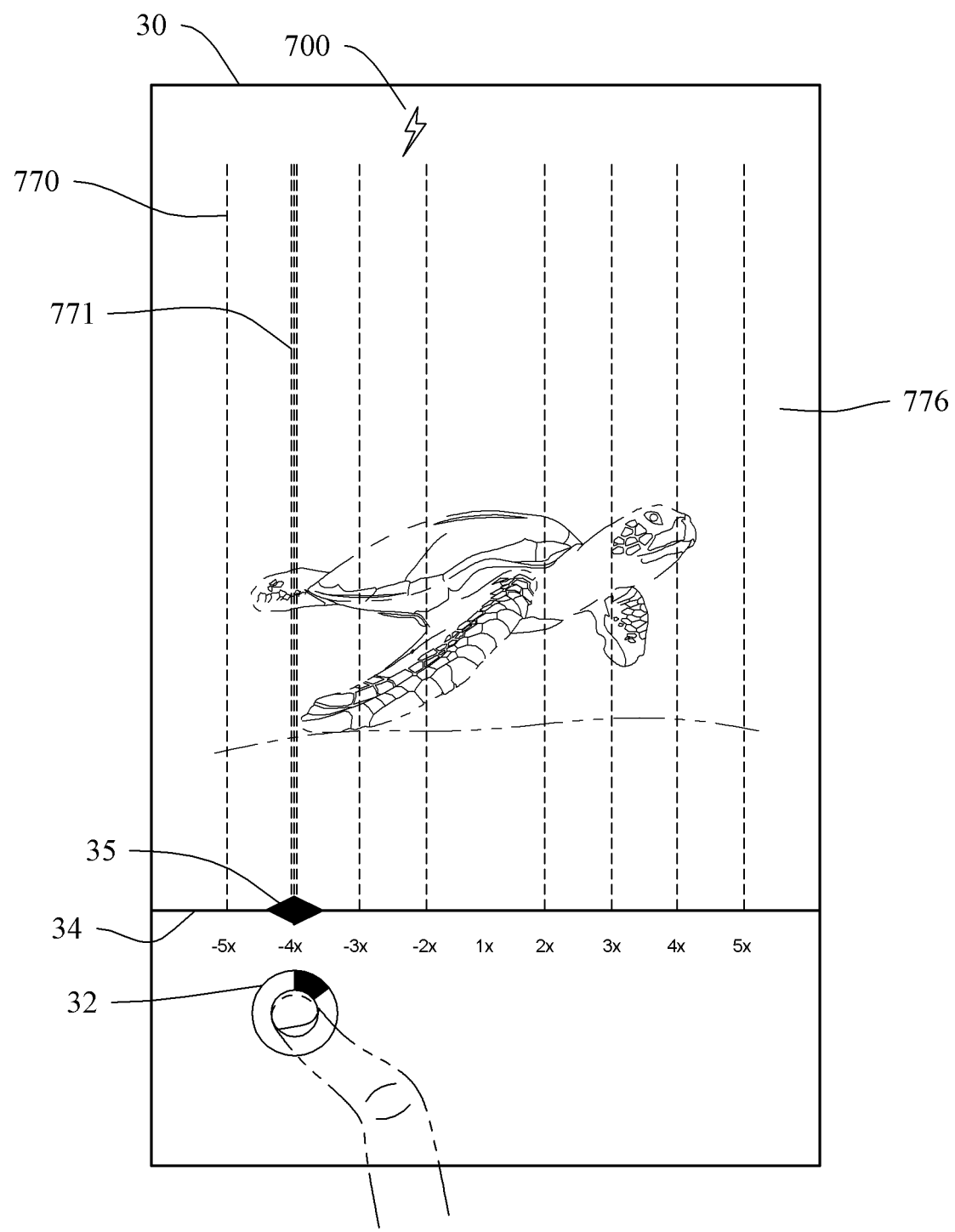
FIG. 45 is a sample GUI screenshot of a "Camera View" with a touch and hold finger operation selecting a "−4×" slow motion factor level with its corresponding slow motion time guideline nearest the touching finger being displayed in a different characteristic to that of the non-selected guidelines utilizing the process and/or system of the present technology.

For example and as illustrated in FIG. 45, the time guidelines 770 can vertically extend from all the displayed motion speed indicators other than the normal/raw speed rate "1×", thereby representing available speed rate changes. The time guidelines 770 can be in an inactive or an active state. The inactive time guidelines 770 can be, but not limited to, dimmer, thinner and/or a different color to that of an active time guideline 771. It can be appreciated that the time guidelines can be turned on (visible) or off (invisible) by the user, and the inactive and/or active characteristics of the time guidelines can be adjusted. Further, the time guidelines 770 can be on (visible) or off (invisible) before recording starts, and if off then turned on automatically by the present technology.

In the exemplary, the user can slide the recording start/stop control 32 toward the left toward the "−4×" speed rate indicator, and during its travel the inactive time guideline 770 nearest or at a predetermined distance from the recording start/stop control 32 can change to an active time guideline 771. The active time guideline 771 can have a characteristic that is different to the remaining inactive time guidelines 770. The characteristic of the active time guideline 771 that can change can be, but not limited to, visibility, color, line style, flashing, brightness and/or line weight.

For example, but not limiting, prior to moving the recording start/stop control 32, all the time guidelines 770 can be the same color. If the user slides the recording start/stop control 32 from the "1×" position to the "−4×" position, the time guideline 770 associated with the "−2×" speed rate indicator can change to an active time guideline 771 having a different color (e.g. to red) to that of the remaining inactive time guidelines 770. Then upon further sliding of the recording start/stop control 32, the time guideline associated with the "−3×" speed rate indicator can change to an active time guideline 771 while the time guideline associated with the "−2×" speed rate indicator change back to an inactive time guide line 770. This process can proceed during the travel of the recording start/stop control 32 until the user stops moving the recording start/stop control 32.

Alternatively, all the inactive time guidelines can be invisible and then visible when they become active. It can be appreciated that more than one time guideline can be active at the same time. Further, the user can choose the number of time guidelines displayed or displayable on the screen. The number of time guidelines available to the user can be limited by the user's subscription level permission. Optionally, an area below the speed rate bar 34 can be void of any affordances during the recording operation.

The present technology can further display additional speed rate indicators when the recording start/stop control 32 is moved to the far or extreme left or right of the screen. This motion can result in shifting the speed rate indicators 34 to the left or right to display more speed rate options. For example, moving or sliding the recording start/stop control 32 to the far or extreme right of the screen past the displayed "5×" fast motion speed indicator can result in shifting the fast motion speed rate indicators to the left allowing for the display of additional fast motion speed rate indicators (e.g. 6×, 7×, 8×, 9×, etc.).

Figure 46:
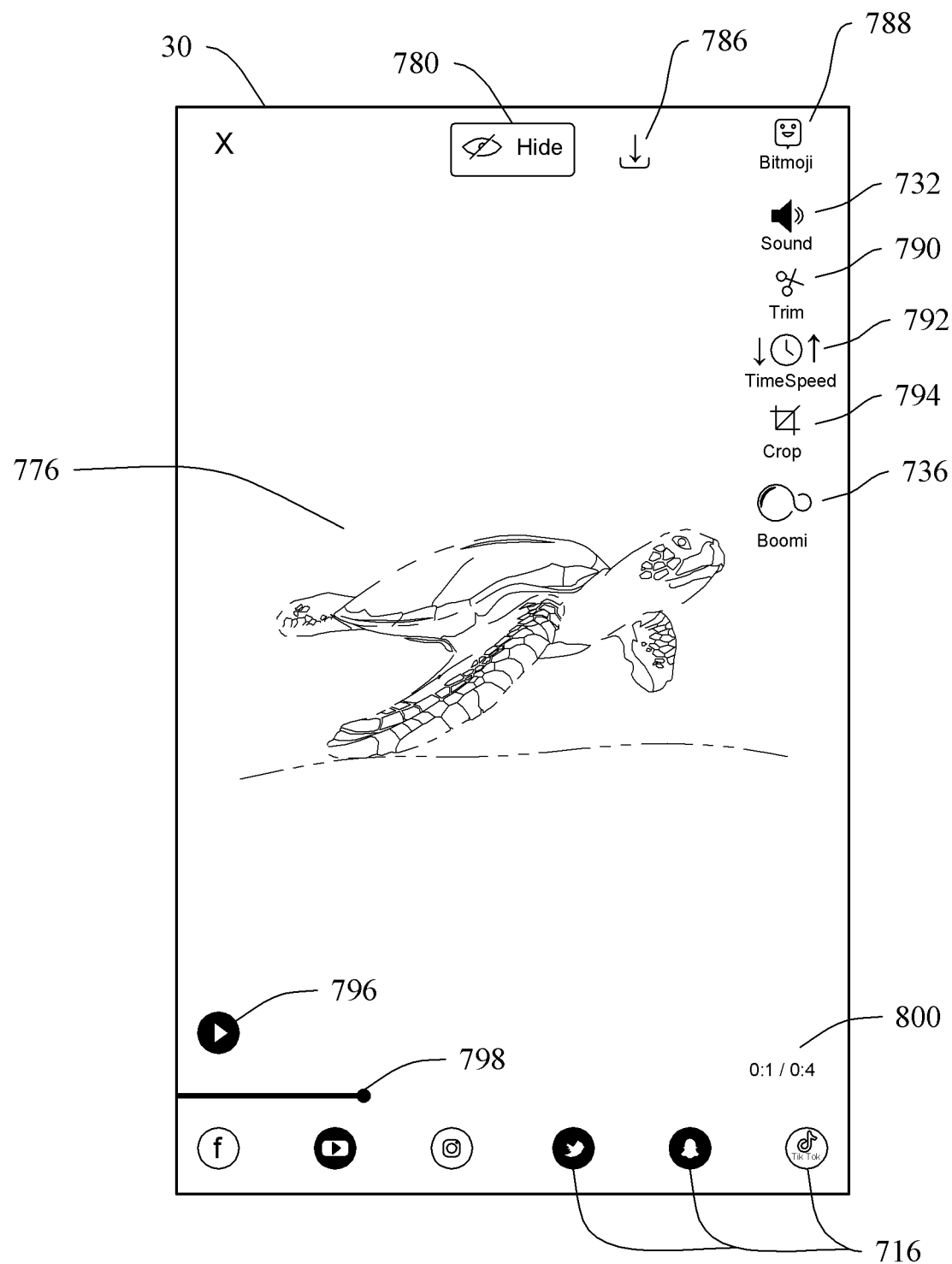
FIG. 46 is a sample GUI screenshot of an "Editing View" or "Review Screen" while the user has stopped video recording or image capturing utilizing the process and/or system of the present technology.

Further in the exemplary, once the recording operation is stopped by the user, any speed rate changes or other effect changes can be automatically implemented in real time or near real time utilizing the processes of the present technology, and displayed in an "Editing View" or "Review Screen", as illustrated in FIG. 46. If a video was captured or retrieved then the video can be played in a continuous loop manner. The GUI 30 can display an "X" affordance for closing the "Editing View" or "Review Screen" and returning back to the "Camera View" screen. Further affordances that can be displayed on the GUI 30 can be, but not limited to, a "Sound" affordance 732 activateable (e.g. via a tap gesture) for muting sound, a "Hide" affordance 780 activateable (e.g. via a tap gesture) for hiding or displaying some or all of the affordances displayed on the GUI 30, a "Save" affordance 786 activateable (e.g. via a tap gesture) for saving or accessing videos or images with the device or a remote device, a "Bitmoji" affordance 788 activateable (e.g. via a tap gesture) for adding or removing a personal emoji to the video or image, a "Trim" affordance 790 activateable (e.g. via a tap gesture) for initiating a video trimming operation, a "TimeSpeed" affordance 792 activateable (e.g. via a tap gesture) for initiating a "TimeSpeed" operation, a "Crop" affordance 794 activateable (e.g. via a tap gesture) for initiating a cropping operation, a "Boomi" affordance 736 activateable (e.g. via a tap gesture) for initiating a Boomi operation, a "Play/Pause" affordance 796 activateable (e.g. via a tap gesture) for starting or stopping the playing of the video, and one or more social media affordances 716. Each social media affordance 716 can be activateable (e.g. via a tap gesture) for opening a respective social media platform or app such as, but not limited to, Facebook®, YouTube®, Snapchat®, Twitter®, Instagram® or TikTok®. Activating any one of the social media affordances 716 can initiate its respective app or program, allowing the use to upload a video or image from the GUI 30 to that social media platform.

It can be appreciated that while the video is playing in the video display region 776, a time playing bar 798 can travel or slide across the GUI 30 indicating playing of the video and its corresponding time location. A tap or touch holding gesture can be applied to the time playing bar 798 to fast forward, rewind, pause and/or jump to a specific time of the video. The GUI 30 can further display a time stamp 800 of the video, which can include the present time of the playing video and the total time of the video.

Upon activation of the "Trim" affordance 790, a "Trim" editing mode or screen can be displayed on the GUI 30. In this "Trim" editing mode or screen, the frames of the video or images can be displayed, with a trimming line overlaid over the frames or images. A "Split" affordance can be displayed and activated (e.g. via a tap gesture) for cutting away frames from the video, and a "Merge" affordance can be displayed and activated (e.g. via a tap gesture) for merging frames. A cancel or close "X" affordance can be displayed and activated (e.g. via a tap gesture) for exiting the "Trim" editing mode or screen, and a "Save" affordance can be displayed and activated (e.g. via a tap gesture) for saving changes to the video data.

Upon activation of the "Crop" affordance 794, a "Crop" editing mode or screen can be displayed on the GUI 30. In this "Crop" editing mode or screen, a cropping window can be displayed including the video, one or more frames of the video or an image. The corners of the cropping window can be moved to adjust the size of the cropping window, and thus a viewable object in the video, one or more frames of the video or the image. The position, orientation and/or rotation of the viewable object in cropping in the window can be adjusted. A "Cancel" affordance can be displayed and activated (e.g. via a tap gesture) to exit the "Crop" editing mode or screen, a mirror affordance can be displayed and activated (e.g. via a tap gesture) for mirroring the viewable object in the cropping window, a rotation affordance can be displayed and activated (e.g. via a tap gesture) for rotating the viewable object in the cropping window, an undue affordance can be displayed and activated (e.g. via a tap gesture) for undoing a previous change, an orientation affordance can be displayed and activated (e.g. via a tap gesture) for displaying multiple selectable orientation options (e.g. Original, 1:1 Square, 2:3, 3:4, etc.), and a down affordance can be displayed and activated (e.g. via a tap gesture) for accepting any changes and returning to the previous "Reviewing Screen".

Figure 47:
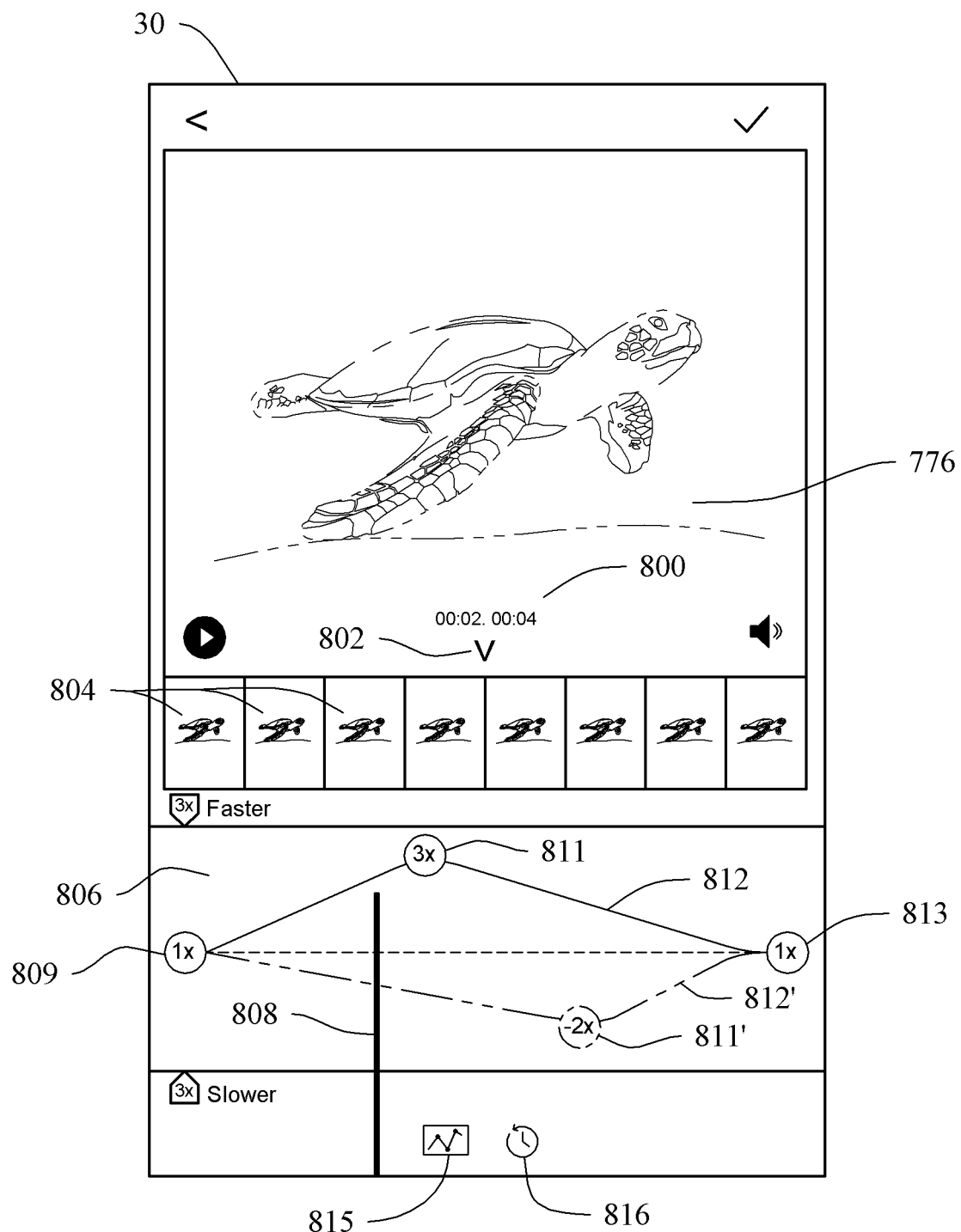
FIG. 47 is a sample GUI screenshot of an "Editing View" or "Review Screen" of the "TimeSpeed" option utilizing the process and/or system of the present technology.

Upon activation of the "TimeSpeed" affordance 792, a "TimeSpeed" editing mode or screen can be displayed on the GUI 30, as illustrated in FIG. 47. In this "TimeSpeed" editing mode or screen, a return "<" affordance can be displayed and activated to exit the "TimeSpeed" editing mode or screen, and an apply "checkmark" affordance can be displayed to accept effect changes. The video display region 776 can include the time stamp 800, the play/pause affordance, the speaker affordance, a video/image frame hide "v" affordance 802, and one or more video/image frames 804. Activation of the video/image frame hide affordance 802 (e.g. via a tap gesture) can hide or display the video/image frames 804.

The "TimeSpeed" editing mode or screen can further include a time/speed manipulation region 806. This region 806 can include a time playing bar 808 that can travel across the region 806 indicating playing of the video and its corresponding time location and frame location with the video/image frames 804. The time playing bar 808 can be moved to any position by a touching and holding gesture, resulting in the time of the video being displayed to correspond with the time location of the time playing bar 808.

An initial speed rate indicator 809 (e.g. "1×") can be located at one side of the region 806 and an ending speed rate indicator 813 (e.g. "1×") being located at another end thereof, with a baseline 810 connecting therebetween. The initial and ending speed rate indicators 809, 813 can represent a normal or raw speed rate of the video. A user can change a speed rate at any point in time of the video by tapping an area above or below the baseline at specific time location or by touching/holding a point on the baseline and sliding above or below the baseline. This operation can result in displaying a new speed rate indicator 811, 811' above or below the baseline 810 at that specific time, with a new altered baseline 812, 812' connecting the initial speed rate indicator 809 to the new speed rate indicator 811, 811' and then to an additional new speed rate indicator or to the ending speed rate indicator 813. It can be appreciated that the new speed rate indicator 811, 811' and/or the altered baseline 812, 812' can have a characteristic (e.g. color, line type, line weight, etc.) different to that of, but not limited to, the initial or ending speed rate indicators 809, 813 and/or the baseline 810.

It can be further appreciated that the user could adjust the speed rate at time zero of the baseline 810 at the initial speed rate indicator 809 thereby changing the initial speed rate at time zero to the new speed rate. Still further, it can be further appreciated that the user could adjust the speed rate at the end time of the baseline 810 at the ending speed rate indicator 813 thereby changing the ending speed rate at end time to the new speed rate.

Horizontal time speed guidelines 814 can be displayed to represent the upper and lower speed rate limits (e.g. fast motion limits and slow motion limits), or the time speed guidelines 814 can travel or move to represent the present location of the new speed rate indicator 811, 811'.

The "TimeSpeed" editing mode or screen can further display a "Chart" affordance 815 activateable (e.g. via a tap gesture) for initiating and displaying the time/speed manipulation region 806 and a "Time" affordance 816 activateable (e.g. via a tap gesture) for initiating and displaying a time line manipulation region including a horizontally moving time indictor traveling on a time line.

Figure 48:
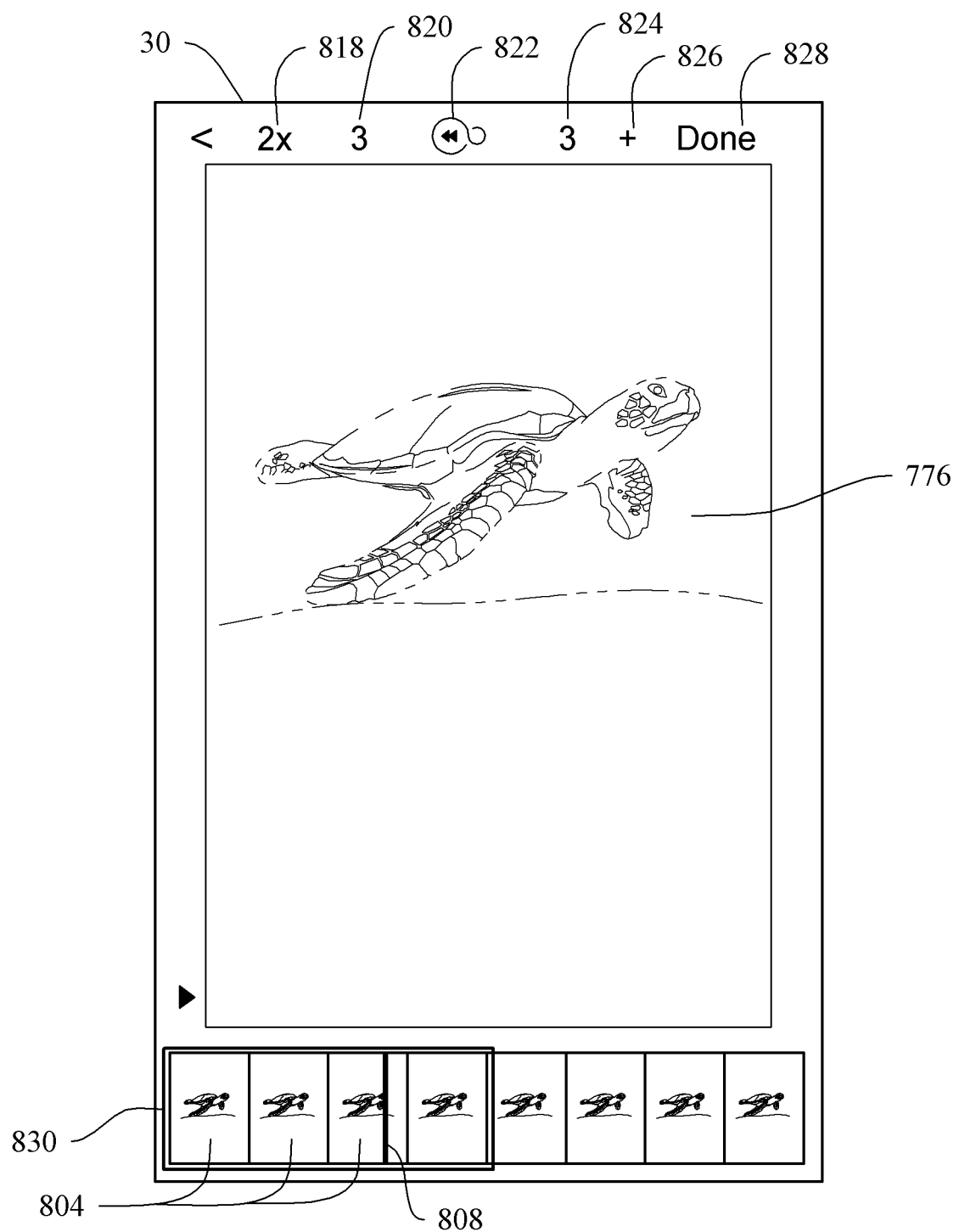
FIG. 48 is a sample GUI screenshot of an "Editing View" or "Review Screen" of the "Boomi" option utilizing the process and/or system of the present technology.

Upon activation of the "Boomi" affordance 736, a "Boomi" editing mode or screen can be displayed on the GUI 30, as illustrated in FIG. 48. In this "Boomi" editing mode or screen, a return "<" affordance can be displayed to exit the "Boomi" editing mode or screen, and a "Done" affordance 828 can be displayed to accept effect changes and return to a previous screen, the "Review Screen" or "Camera View". The "Boomi" editing mode or screen can further include a playback speed selector affordance 818 activateable (e.g. via a tap gesture) for bringing up a dropdown menu with selectable speed rates for changing the speed rate of the video or segment thereof, a loop affordance 820 activateable (e.g. via a tap gesture) for bringing up a dropdown menu with selectable number of loops for changing the number of loops or frames in the loops of the video or segment thereof, a forward/reverse affordance 822 activateable (e.g. via a tap gesture) for selecting a forward or reverse playing of the loop of the video or segment thereof, a number of seconds affordance 824 activateable (e.g. via a tap gesture) for bringing up a dropdown menu with selectable number of seconds or milliseconds for changing the number of seconds for the loop, and an add "+" affordance 826 activateable (e.g. via a tap gesture) for adding or creating a Boomi effect to multiple video segments or loops.

The "Boomi" editing mode or screen can include the frames from video or still images 804 in sequential order, with a traveling time playing bar 808, and an adjustable loop frame or box 830. The loop box 830 can surround the frames that are part of the loop, and size, length or configuration of the loop box 830 can be adjusted to remove from or add frame to the loop. Further, multiple loop boxes 830 can be displayed or utilized to represent multiple loops. The loop box 830 can have a characteristic (e.g. color, line type, line weight, etc.) different to that of, but not limited to, the time playing bar 808 or the frames 804.

In the "Boomi" editing/review mode or screen, the selected loop is played until it reaches the end of the loop and then it rewinds to the beginning of the loop and begins to play again. This forward and rewind/reverse playing cycle repeats until stopped or paused by the user.

In the exemplary, if the "Boomi" option process is utilized, then a "Boomi" subroutine can be initiated which utilizes a video stream or data including multiple frames or images in sequence. The video stream can be acquired from any of the previously described subroutines of the present technology, or the video stream altered by the "Boomi" subroutine can be provided to any of the previously described subroutines of the present technology. The user can utilize the "Boomi" subroutine to select specific frames in the video data, and change effects to those selected frames. The selected frames can then be played in sequence in a forward and/or reverse direction, and repeated in a play loop operation. The "Boomi" special effect whereby the video can play forward to a predetermined point in the video, then plays the video in reverse for a short duration (1-3 seconds), then plays forward again, and may or may not repeat. The "Boomi" special effect can include a Forward/Forward special effect whereby the video can play forward to a predetermined point in the video, then skips back several seconds in the video, then plays forward again, and may or may not repeat. It can be appreciated that the frames in the video can be multiple or a burst of images/photos.

The "Boomi" special effect can be applied to videos in real-time while recording with a camera device, or optionally while editing the video in an accompanying video editor in the same device or in other supported devices or by a remote server. The resulting video from the "Boomi" special effect can contain segments where the video playback is normal, as well as segments that has the "Boomi" special effect. The part of the video that has the "Boomi" special effect can be part of a continuous stream of video. The user can quickly re-edit and reapply the "Boomi" special effect to the same portion or other portions of the video. The user can apply the "Boomi" special effect in multiple sections of the video in real time (live recording), near real time or to saved video. The user can customize the "Boomi" special effect to change, but not limited to, the way the video plays, number of loops, number of seconds, and playback speed. It the user is using the "Boomi" special effect while recording in real time, the user can "mark" the location of the video to apply the "Boomi" special effect after recording has completed. The user can apply different special effects on each iteration of the loop in the "Boomi" special effect. The "Boomi" special effect can be applied to 360 degree videos, and/or while user is using Augmented Reality. The "Boomi" special effect can support real time or near real time fast and slow motion editing while recording.

It can be appreciated that the "Boomi" special effect or subroutine can be implemented as a standalone method, system, application or program on the same device or on a separate remote device.

Figure 49:
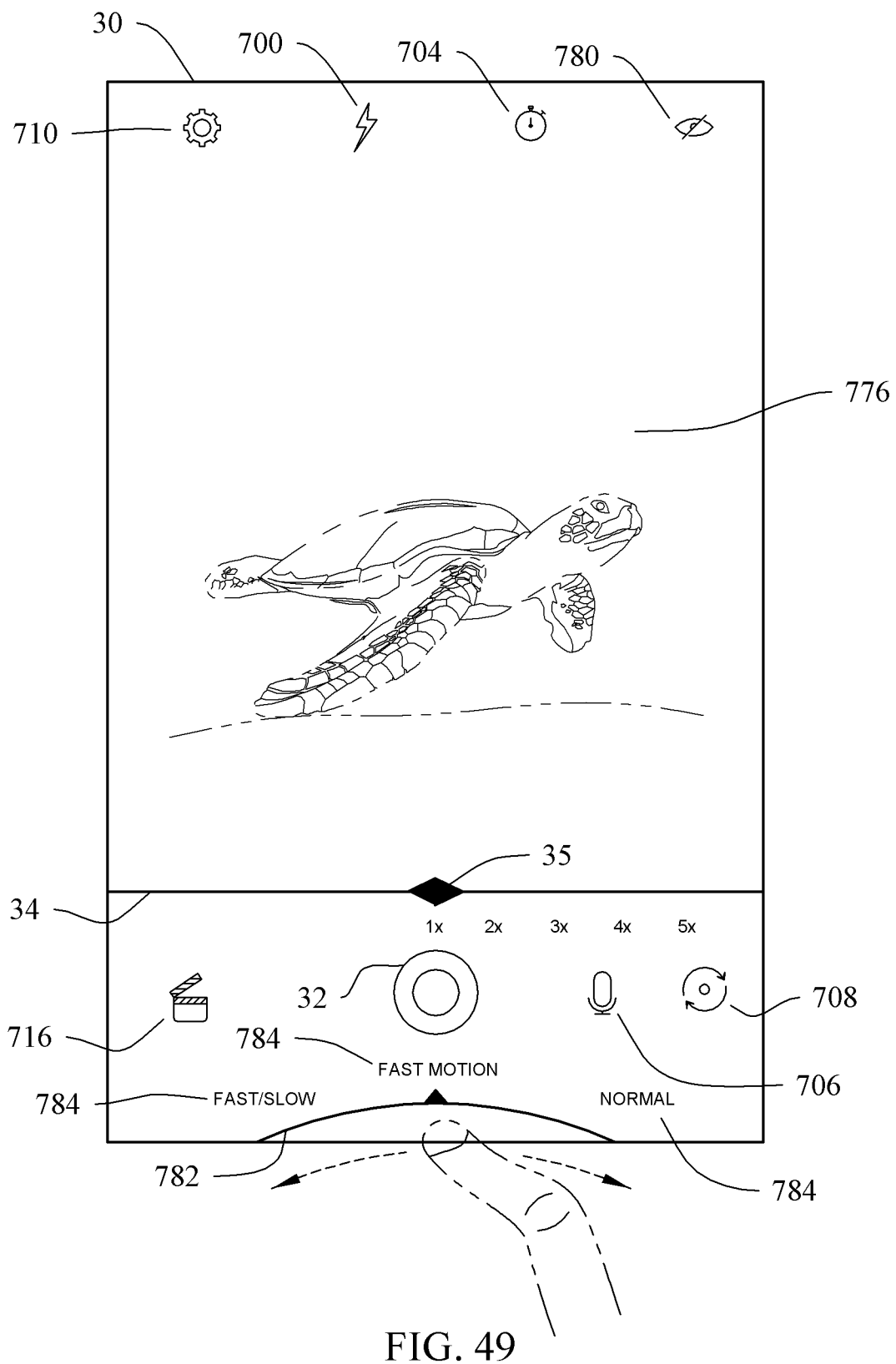
FIG. 49 is a sample GUI screenshot of a "Camera View" of the device employing the GUI with a "Fast Motion" option selected on the selectable options bar utilizing the process and/or system of the present technology.

In the exemplary, FIG. 49 illustrates a user swiping left across the or near the selectable options bar 782, thereby changing from the "FAST/SLOW" option process to a "FAST MOTION" process, with the previous "FAST/SLOW" option process and a next "NORMAL" option process being viewable to the left and right of the selected "FAST MOTION" option process 784, respectively. Accordingly, the next option process 784 either ahead of and/or behind the selected option process 784 can be displayed and viewable to the user.

Upon selecting the "FAST MOTION" option process 784, the GUI 30 can display the "Camera View", which is similar to the "FAST/SLOW" screen but with the slow motion speed indicators ($-2\times$, $-3\times$, $-4\times$, $-5\times$, $-n^{th}\times$) omitted. Consequently, the normal/raw speed and fast motion speed rate indicators are displayed.

Figure 50:
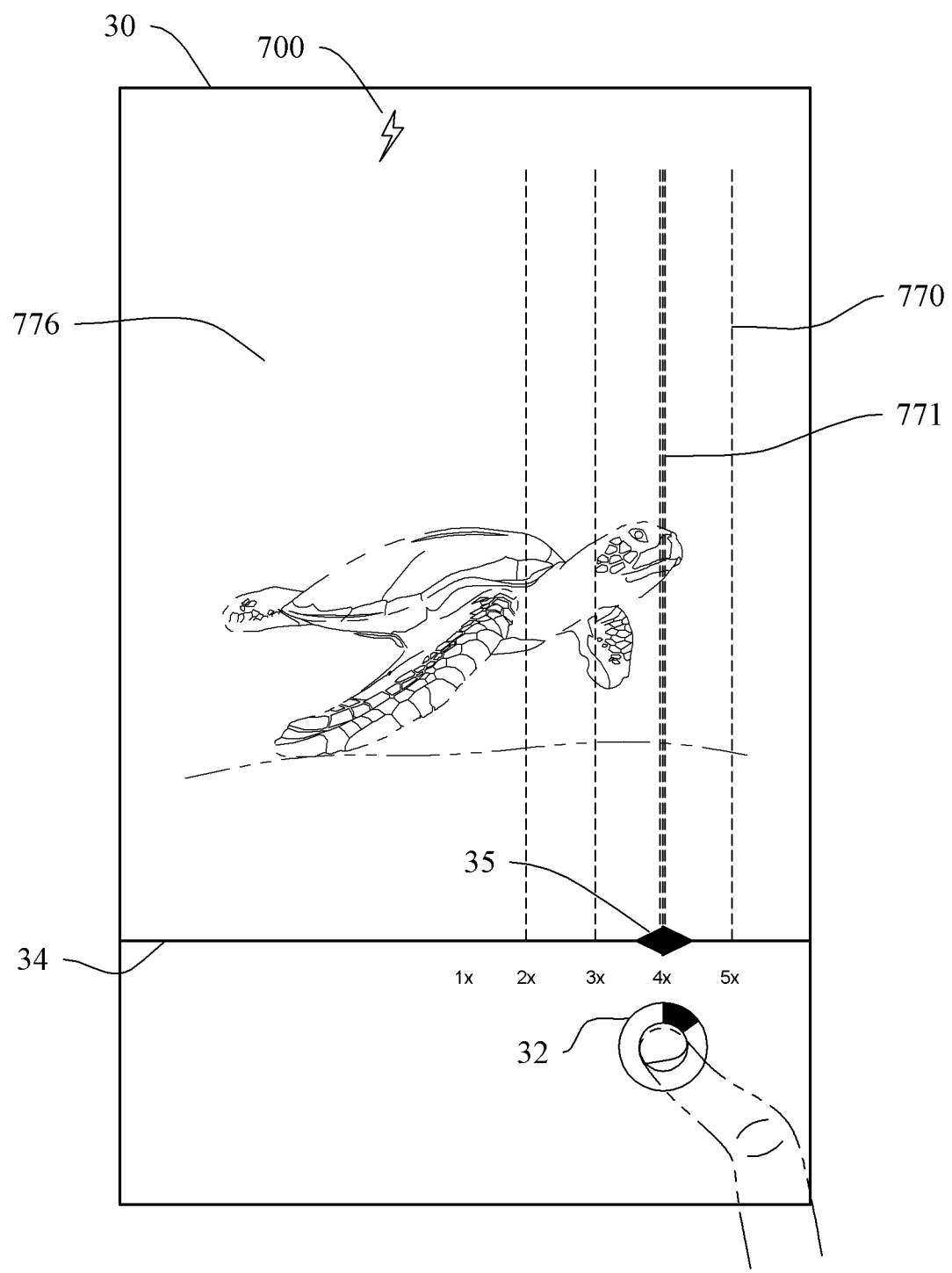
FIG. 50 is a sample GUI screenshot of a "Camera View" with a touch and hold finger operation selecting a "4×" fast motion factor level with its corresponding fast motion time guideline nearest the touching finger being displayed in a different characteristic to that of the non-selected guidelines utilizing the process and/or system of the present technology.

For example and as illustrated in FIG. 50, the time guidelines 770 can vertically extend from all the displayed fast motion speed indicators other than the normal/raw speed rate "$1\times$", thereby representing available fast motion speed rate changes. The user can slide the recording start/stop control 32 toward the right toward the "$4\times$" speed rate indicator, and during its travel, a characteristic of a time guideline 771 nearest or at a predetermined distance from the recording start/stop control 32 can change so that it is different to the remaining time guidelines 770. The characteristic of the nearest or selected time guideline 771 that can change can be, but not limited to, color, line style and/or line weight. In the exemplary, prior to moving the recording start/stop control 32, all the time guidelines 770 can be the same color. If the user slides the recording start/stop control 32 from the "$1\times$" position to the "$4\times$" position, the time guideline associated with the "$2\times$" speed rate indicator can change to a different color first. Then upon further sliding of the recording start/stop control 32, the time guideline associated with the "$3\times$" speed rate indicator can change color with the time guideline associated with the "$2\times$" speed rate indicator changing back to its initial color. This process can proceed during the travel of the recording start/stop control 32 until the user stops moving the recording start/stop control 32.

Figure 51:
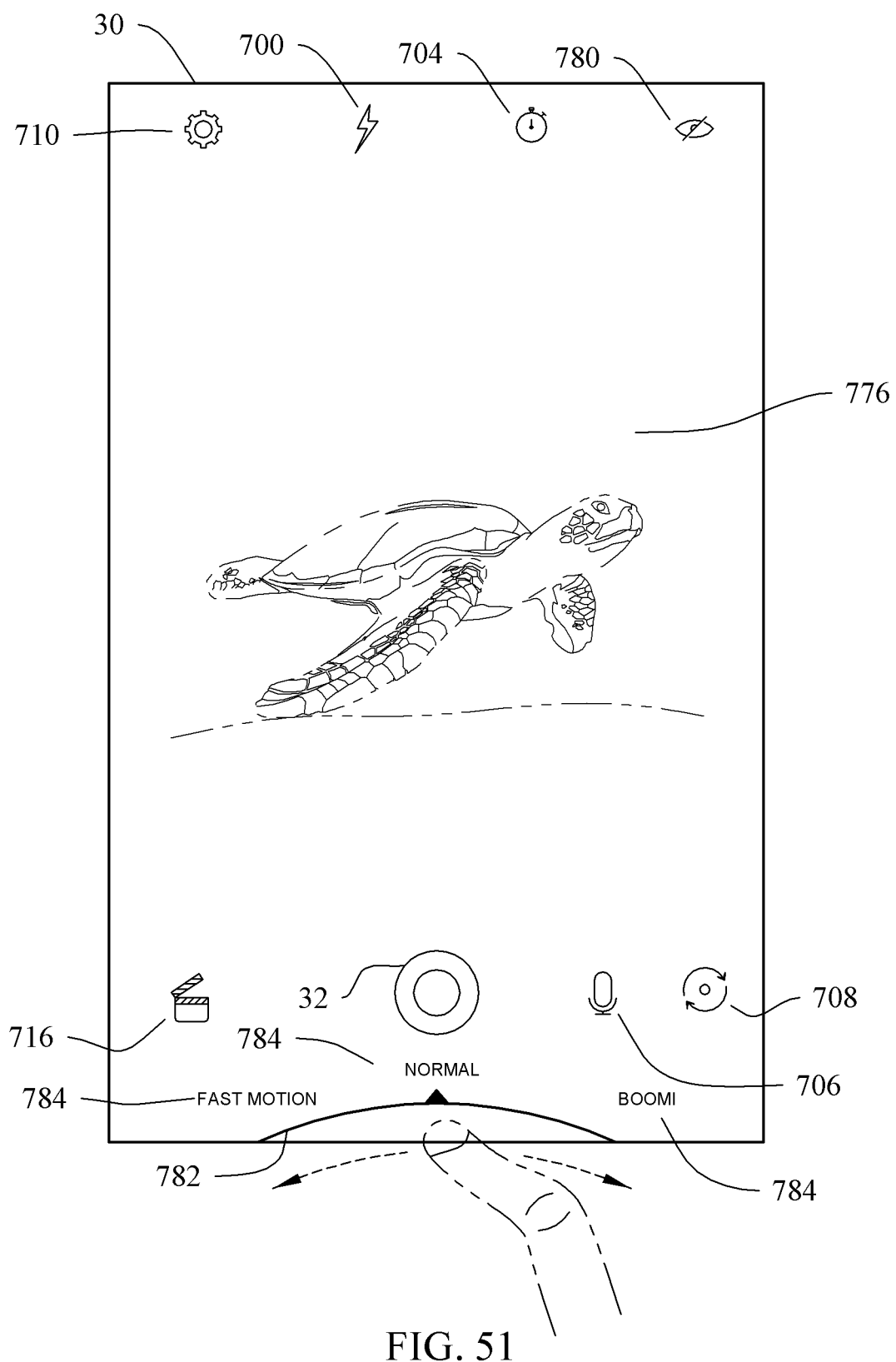
FIG. 51 is a sample GUI screenshot of a "Camera View" of the device employing the GUI with a normal option selected on the selectable options bar utilizing the process and/or system of the present technology.

In the exemplary, FIG. 51 illustrates a user swiping left across the or near the selectable options bar 782, thereby changing from the "FAST MOTION" option process to a "NORMAL" process, with the previous "FAST MOTION" option process and a next "BOOMI" option process being viewable to the left and right of the selected "NORMAL" option process 784, respectively. Accordingly, the next option process 784 either ahead of and/or behind the selected option process 784 can be displayed and viewable to the user.

Upon selecting the "NORMAL" option process 784, the GUI 30 can display the "Camera View", which is similar to the "FAST/SLOW" screen but with the speed selection region 34 and all speed rate/control affordances or indicators 35 omitted.

In the "Editing View" or "Review Screen" under the "NORMAL" operation process, any or all affordances 716, 732, 736, 780, 786, 788, 790, 792, 794 can be displayed, provided to and utilized by the user for selection via the GUI 30.

Figure 52:
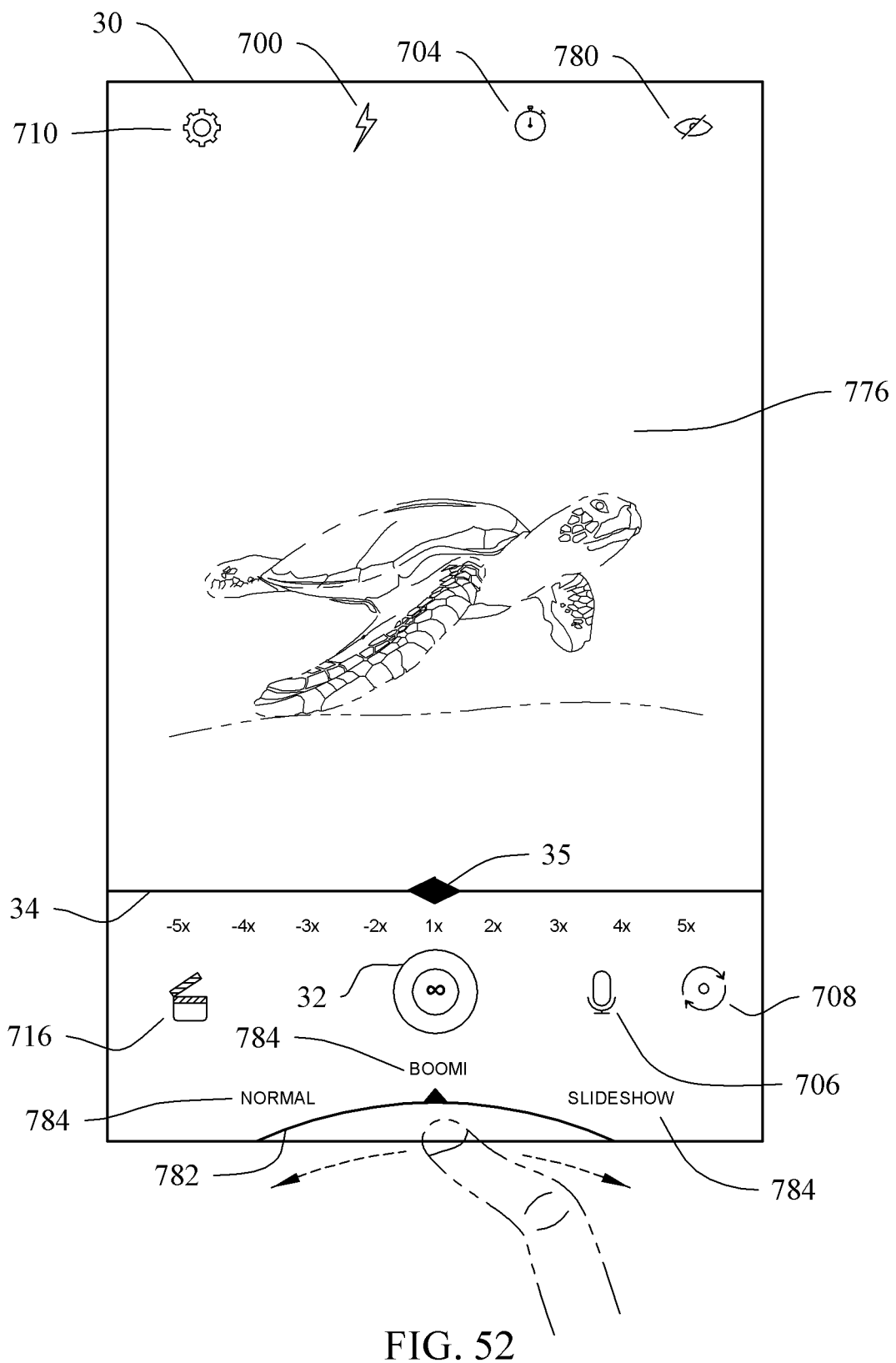
FIG. 52 is a sample GUI screenshot of a "Camera View" of the device employing the GUI with a "Boomi" option selected on the selectable options bar utilizing the process and/or system of the present technology.

In the exemplary, FIG. 52 illustrates a user swiping left across the or near the selectable options bar 782, thereby changing from the "NORMAL" option process to a "BOOMI" process, with the previous "NORMAL" option process and a next "SLIDESHOW" option process being viewable to the left and right of the selected "BOOMI" option process 784, respectively. Accordingly, the next option process 784 either ahead of and/or behind the selected option process 784 can be displayed and viewable to the user.

Upon selecting the "BOOMI" option process 784, the GUI 30 can display the "Camera View", which is similar to the "FAST/SLOW" screen including the speed selection region 34 and all speed rate/control affordances or indicators 35. The recording start/stop control 32 can include an image or icon representing that the "BOOMI" option process is selected and in current operation. All speed rate and time guideline operations can be provided in the "Camera View" under the "BOOMI" operation.

Figure 53:
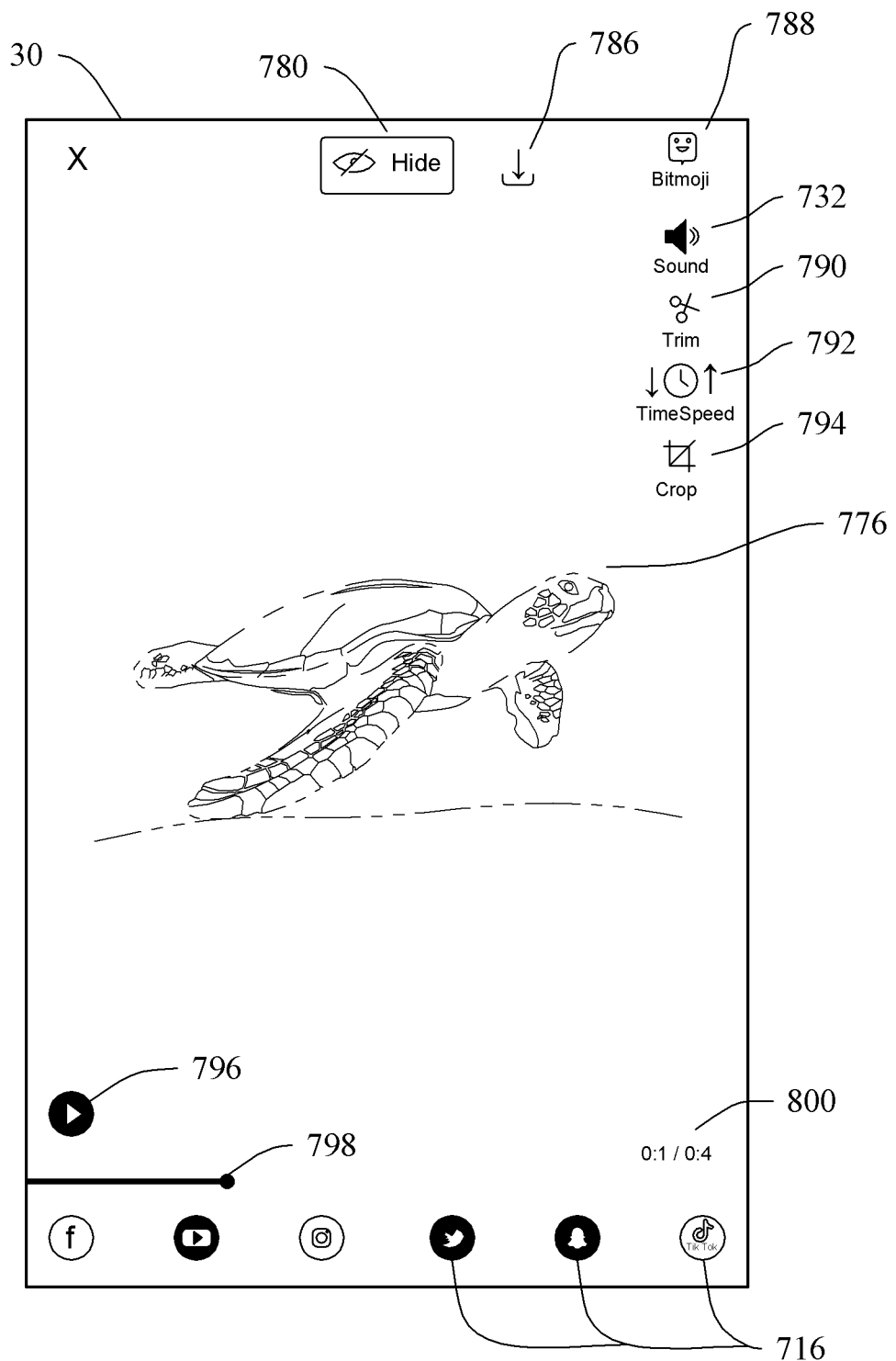
FIG. 53 is a sample GUI screenshot of an "Editing View" or "Review Screen" of the "Boomi" option utilizing the process and/or system of the present technology.

As illustrated in FIG. 53, in the "Editing View" or "Review Screen" under the "BOOMI" operation process, any or all affordances 716, 732, 780, 786, 788, 790, 792, 794 can be displayed, provided to and utilized by the user for selection via the GUI 30, except for the "Boomi" affordance since the user is in the "Boomi" option process.

Once the recording operation has stopped, the "Camera View" changes to the "Editing View" or "Review Screen", as illustrated in FIG. 48, thereby providing all "Boomi" operations to the user as previously described.

Figure 54:
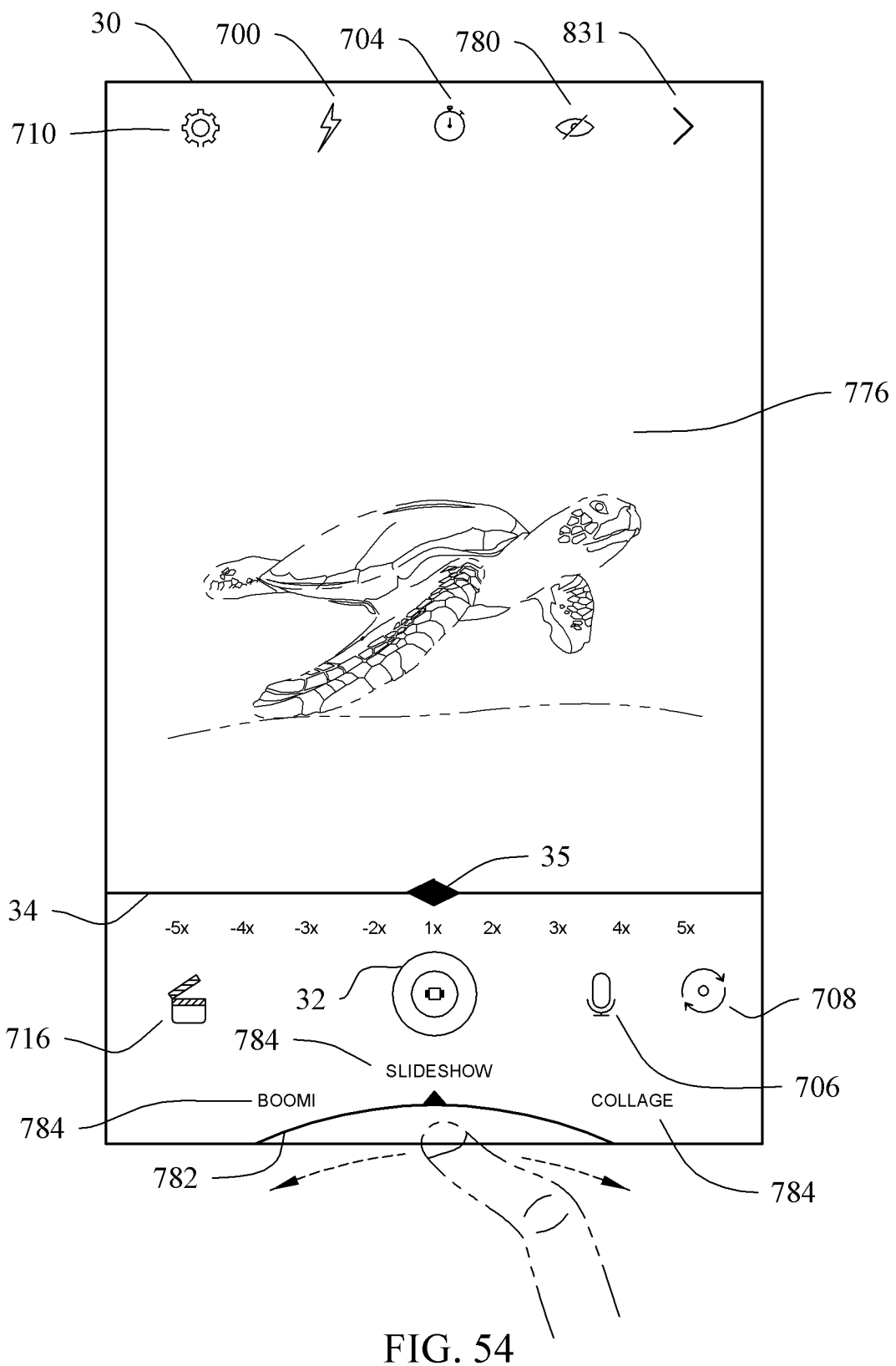
FIG. 54 is a sample GUI screenshot of a "Camera View" of the device employing the GUI with a "SlideShow" option selected on the selectable options bar utilizing the process and/or system of the present technology.

In the exemplary, FIG. 54 illustrates a user swiping left across the or near the selectable options bar 782, thereby changing from the "BOOMI" option process to a "SLIDESHOW" process, with the previous "BOOMI" option process and a next "COLLAGE" option process being viewable to the left and right of the selected "SLIDESHOW" option process 784, respectively. Accordingly, the next option process 784 either ahead of and/or behind the selected option process 784 can be displayed and viewable to the user.

When the "SLIDESHOW" option process 784 is in the selected position on the selectable options bar 782, a next ">" affordance 831 can be displayed and activated (e.g. via a tap gesture) to proceed to the "Editing View" or "Review Screen" of the "SLIDESHOW" operation process, after a predetermined number of images have been captured by activating (e.g. via a tap gesture) the recording start/stop control 32.

Upon selecting the "SLIDESHOW" option process 784, the GUI 30 can display the "Camera View", which is similar to the "FAST/SLOW" screen including the speed selection region 34 and all speed rate/control affordances or indicators 35. The recording start/stop control 32 can include an image or icon representing that the "SLIDESHOW" option process is selected and in current operation.

Figure 55:
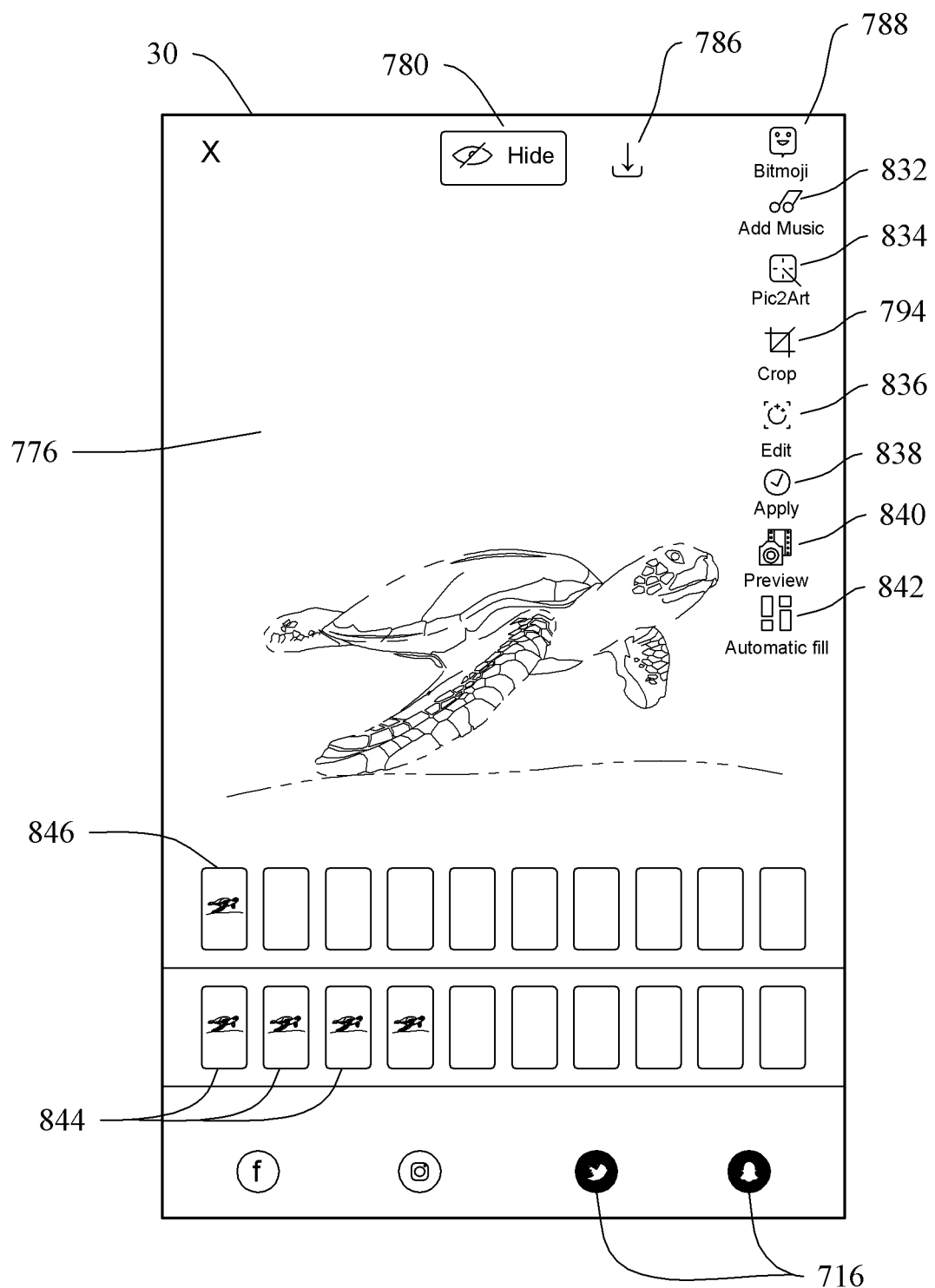
FIG. 55 is a sample GUI screenshot of an "Editing View" or "Review Screen" of the "SlideShow" option utilizing the process and/or system of the present technology.

Under the "SLIDESHOW" option process, video data may alternatively not be captured, with multiple images being captured for creating a slideshow effect. In "Camera View", the recording start/stop control 32 can be activated multiple times to capture multiple images, with each image being displayed in its own image window in sequential order. After a sufficient or predetermined number of images have been capture, the next ">" affordance 831 can be activated to proceed to the "Editing View" or "Review Screen" of the "SLIDESHOW" operation process, as illustrated in FIG. 55.

In the Editing View" or "Review Screen" of the "SLIDESHOW" operation process, all the images captured can be displayed in their own captured image window 844 in sequential order. Multiple slideshow image windows 846 are provided, wherein each window 846 can be initially empty. A user can select an image from the captured image window 844 and insert or provided it to one or more of the slideshow image windows 846. This process can be repeated until the desired captured images 844 are placed in the desired slideshow image windows 846. Placing the captured images 844 into a slideshow image window 846 can be accomplished by selecting (e.g. via a tap gesture) one or more captured images 844, thereby selecting them, and then selecting (e.g. via a tap gesture) the desired slideshow image windows 846. Resulting in the selected slideshow image windows 846 now including in the selected captured images 844. Alternatively, the captured images 844 can be placed into a slideshow image window 846 by selecting (e.g. via a touch and hold gesture) a captured image 844, and then moving the selected captured image (e.g. via a touch, hold and sliding gesture) to the desired slideshow image windows 846.

The Editing View" or "Review Screen" of the "SLIDESHOW" operation process, can include the following, but not limited to, affordances for providing effects to one or more of the images in the selected slideshow image windows 846: the social media affordances 716, the "Bitmoji" affordance 788, an "Add Music" affordance 832 activateable (e.g. via a tap gesture) for adding a music or sound track or file to the slideshow, a "Pic2Art" affordance 834 activateable (e.g. via a tap gesture) for changing a characteristic (e.g. color, tone, shade, shadow effect, etc.) to any one of the images, the "Crop" affordance 794, an "Edit" affordance 836 activateable (e.g. via a tap gesture) for a filter effect to any one of the images, an "Apply" affordance 838 activateable (e.g. via a tap gesture) for applying any changes made to the images, a "Preview" affordance 840 activateable (e.g. via a tap gesture) for previewing the slideshow of images with or without changes, and an "Automatic fill" activateable (e.g. via a tap gesture) for automatically selecting all the captured images 844 and placing in them in corresponding available slideshow image windows 846.

The slideshow, upon activation, would sequentially display the images of the slideshow image windows 846, with each image being displayed for a predetermined time before transitioning to the next image in the sequence.

The images can be one or more still images or one or more frames from video.

Figure 56:
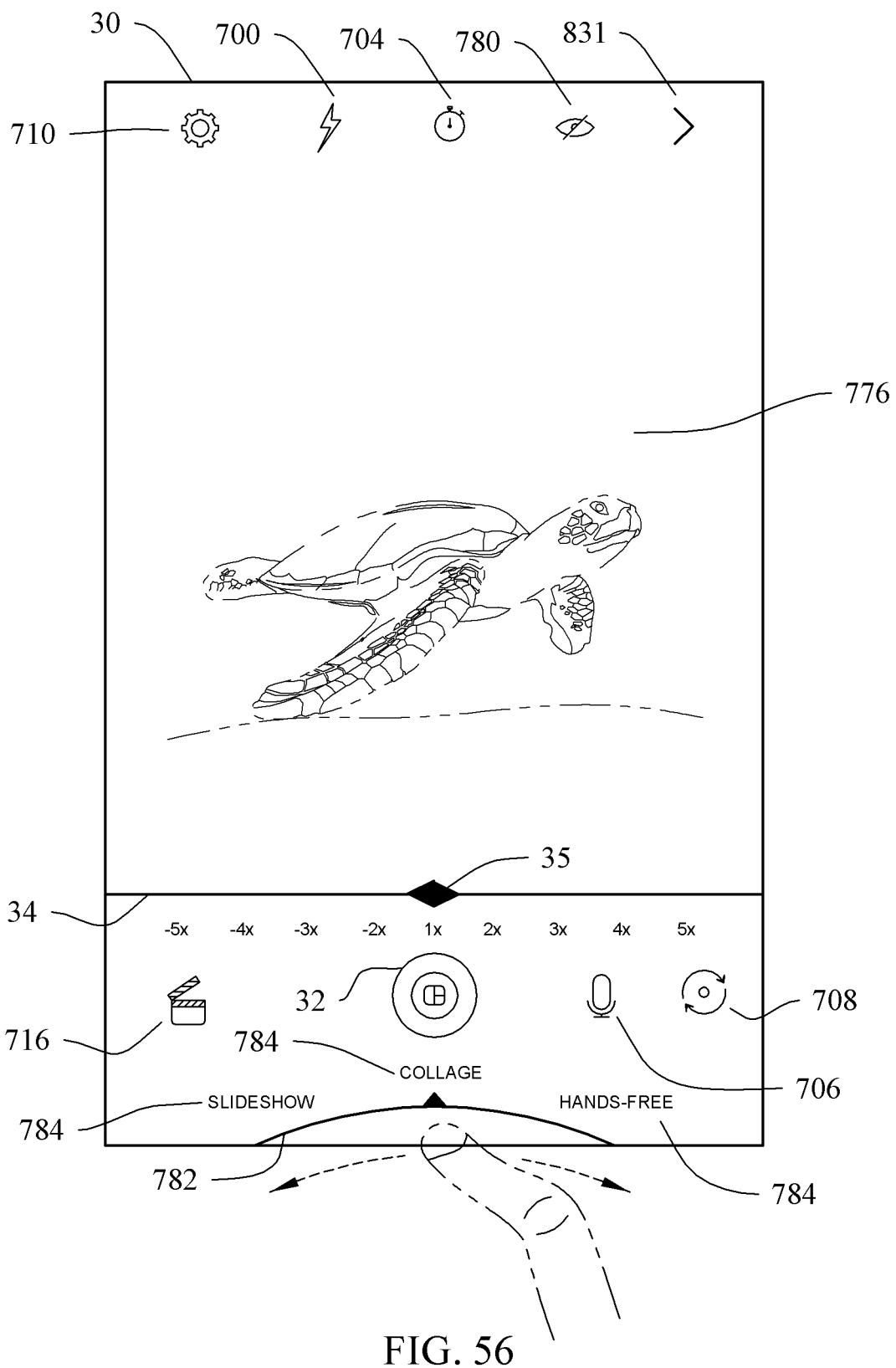
FIG. 56 is a sample GUI screenshot of a "Camera View" of the device employing the GUI with a "Collage" option selected on the selectable options bar utilizing the process and/or system of the present technology.

In the exemplary, FIG. 56 illustrates a user swiping left across the or near the selectable options bar 782, thereby changing from the "SLIDESHOW" option process to a "COLLAGE" process, with the previous "SLIDESHOW" option process and a next "HANDS-FREE" option process being viewable to the left and right of the selected "COLLAGE" option process 784, respectively. Accordingly, the next option process 784 either ahead of and/or behind the selected option process 784 can be displayed and viewable to the user.

When the "COLLAGE" option process 784 is in the selected position on the selectable options bar 782, a next ">" affordance 831 can be displayed and activated (e.g. via a tap gesture) to proceed to the "Editing View" or "Review Screen" of the "COLLAGE" operation process, after a predetermined number of images have been captured by activating (e.g. via a tap gesture) the recording start/stop control 32.

Upon selecting the "COLLAGE" option process 784, the GUI 30 can display the "Camera View", which is similar to the "FAST/SLOW" screen including the speed selection region 34 and all speed rate/control affordances or indicators 35. The recording start/stop control 32 can include an image or icon representing that the "COLLAGE" option process is selected and in current operation.

Figure 57:
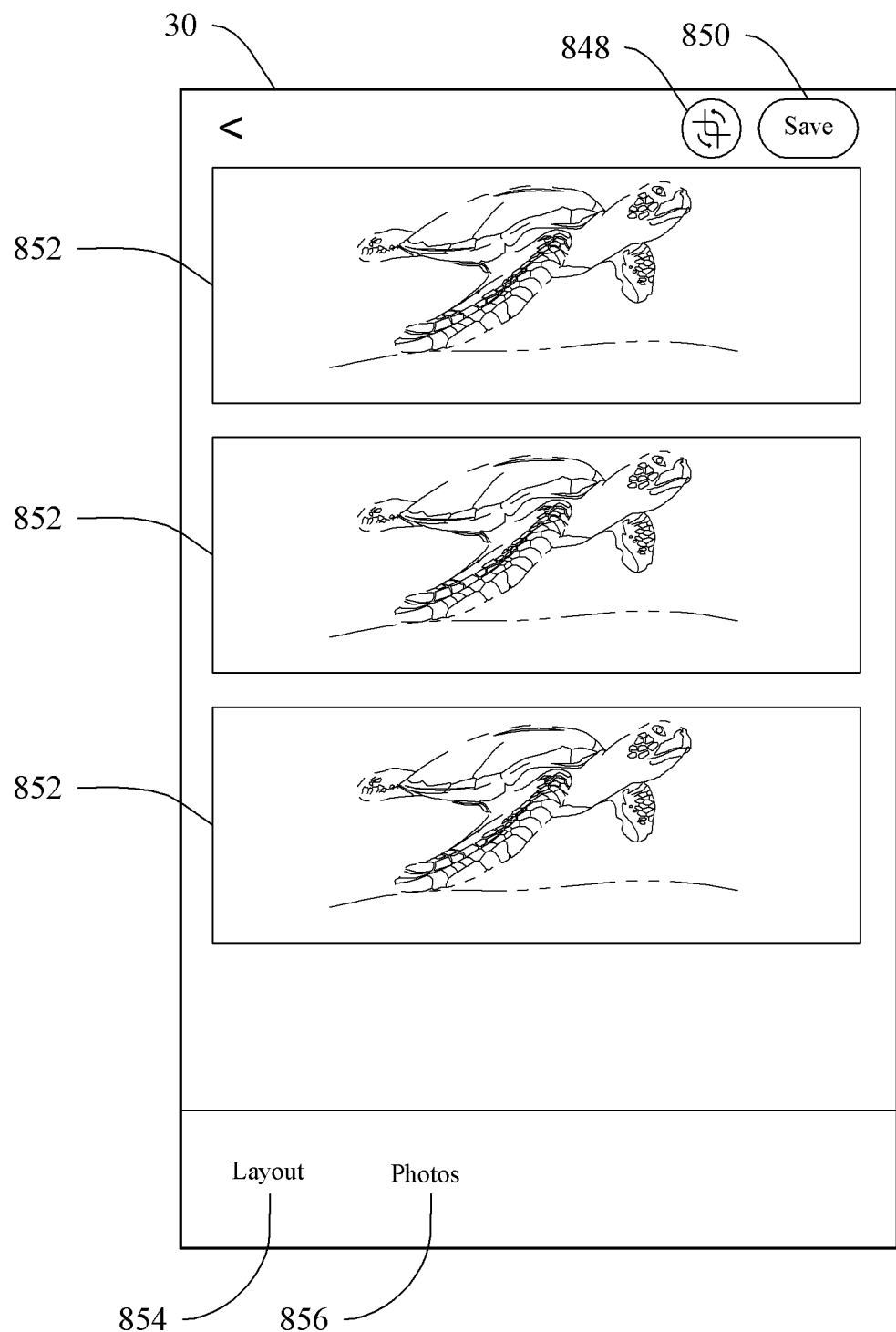
FIG. 57 is a sample GUI screenshot of an "Editing View" or "Review Screen" of the "Collage" option utilizing the process and/or system of the present technology.

Under the "COLLAGE" option process, video data may alternatively not be captured, with multiple images being captured for creating a slideshow effect. In "Camera View", the recording start/stop control 32 can be activated multiple times to capture multiple images, with each image being displayed in its own image window in sequential order. After a sufficient or predetermined number of images have been capture, the next ">" affordance 831 can be activated to proceed to the "Editing View" or "Review Screen" of the "COLLAGE" operation process, as illustrated in FIG. 57.

In the Editing View" or "Review Screen" of the "COL-LAGE" operation process, all the images captured can be displayed in their own captured image window 852 in sequential order or automatically arranged so that all the captures image windows 852 are displayed. Further, the Editing View" or "Review Screen" of the "COLLAGE" operation process can include a "Layout" affordance 854 activateable (e.g. via a tap gesture) for adding a collage layout from multiple selectable layout formats or templates, a "Photos" affordance 856 activateable (e.g. via a tap gesture) for selecting or switching between the captured images for use in the selected layout, a rotation affordance 848 activateable (e.g. via a tap gesture) for rotating the selected image in a select part of the layout, and a "Save" affordance 850 activateable (e.g. via a tap gesture) for saving the layout.

It can be appreciated that the image in each part of the layout can be, but not limited to, repositioned or orientated within it respective layout part or window. The images can be one or more still images or one or more frames from video.

Figure 58:
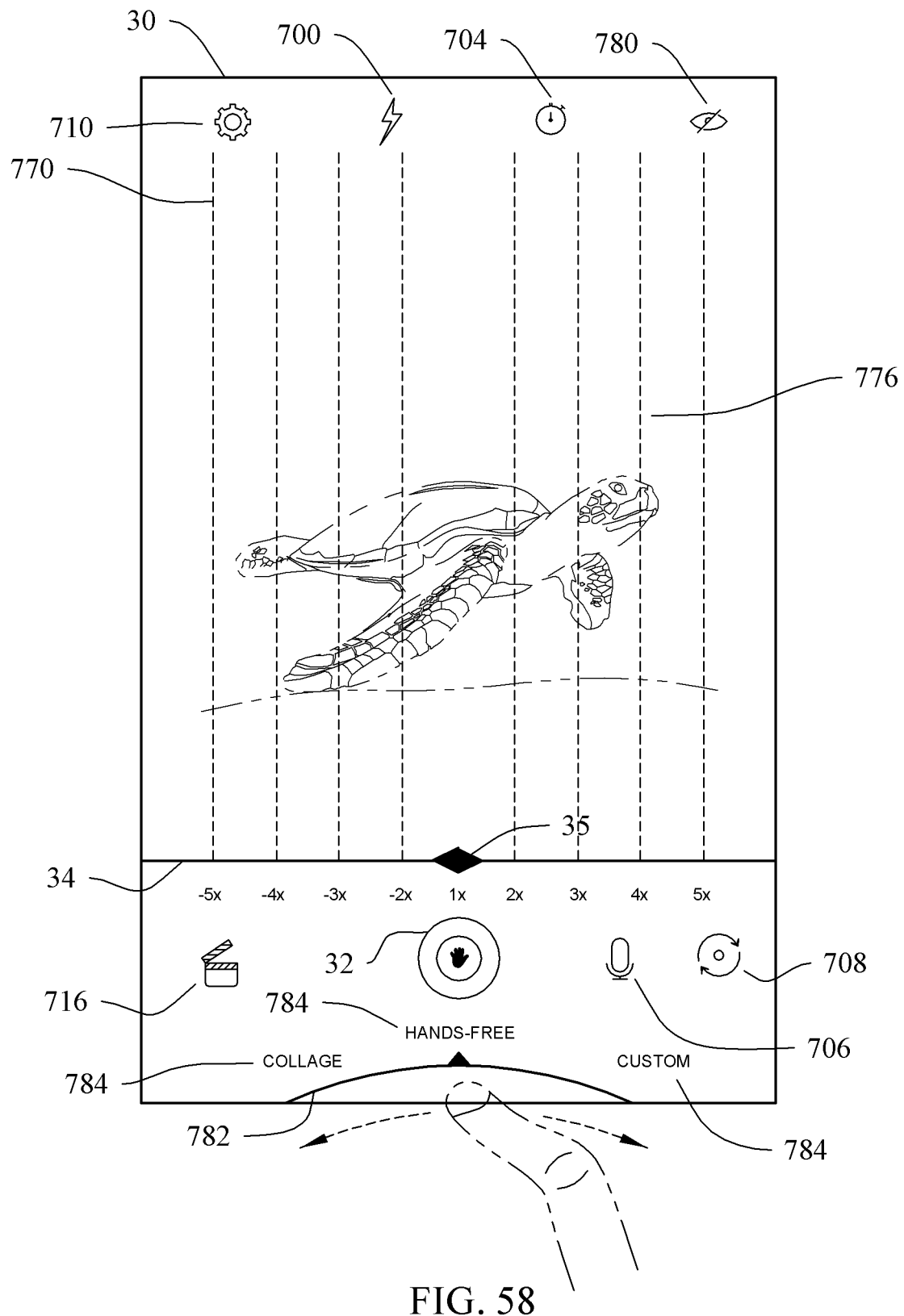
FIG. 58 is a sample GUI screenshot of a "Camera View" of the device employing the GUI with a "Hands-Free" option selected on the selectable options bar utilizing the process and/or system of the present technology.

In the exemplary, FIG. 58 illustrates a user swiping left across the or near the selectable options bar 782, thereby changing from the "COLLAGE" option process to a "HANDS-FREE" process, with the previous "COLLAGE" option process and a next "CUSTOM" option process being viewable to the left and right of the selected "HANDS-FREE" option process 784, respectively. Accordingly, the next option process 784 either ahead of and/or behind the selected option process 784 can be displayed and viewable to the user.

When the "HANDS-FREE" option process 784 is in the selected position on the selectable options bar 782, a next ">" affordance 831 can be displayed and activated (e.g. via a tap gesture) to proceed to the "Editing View" or "Review Screen" of the "HANDS-FREE" operation process, after a predetermined number of images have been captured by activating (e.g. via a tap gesture) the recording start/stop control 32.

Upon selecting the "HANDS-FREE" option process 784, the GUI 30 can display the "Camera View", which is similar to the "FAST/SLOW" screen including the speed selection region 34 and all speed rate/control affordances or indicators 35. The recording start/stop control 32 can include an image or icon representing that the "HANDS-FREE" option process is selected and in current operation.

In the "HANDS-FREE" option process, the recording operation can be initiated by a one touch taping gesture of the recording start/stop control 32, and a subsequent one touch taping gesture can stop the recording operation. Alternatively, the recording operation can automatically stop after a predetermined time period. During the recording operation, the time guidelines 770 can be displayed, and the user can tap (e.g. via a tap gesture) on the speed rate bar 34 or on the time guidelines 770 to change the speed rate. The changing of the speed rate can be accomplished before the recording operation starts or during recording operation in real time. Any change in the speed rate can be displayed by a changing of a characteristic (e.g. color, line type, line weight, etc.) of the selected speed rate 34, the speed rate indicator 35 and/or time guideline 770.

Figure 59:
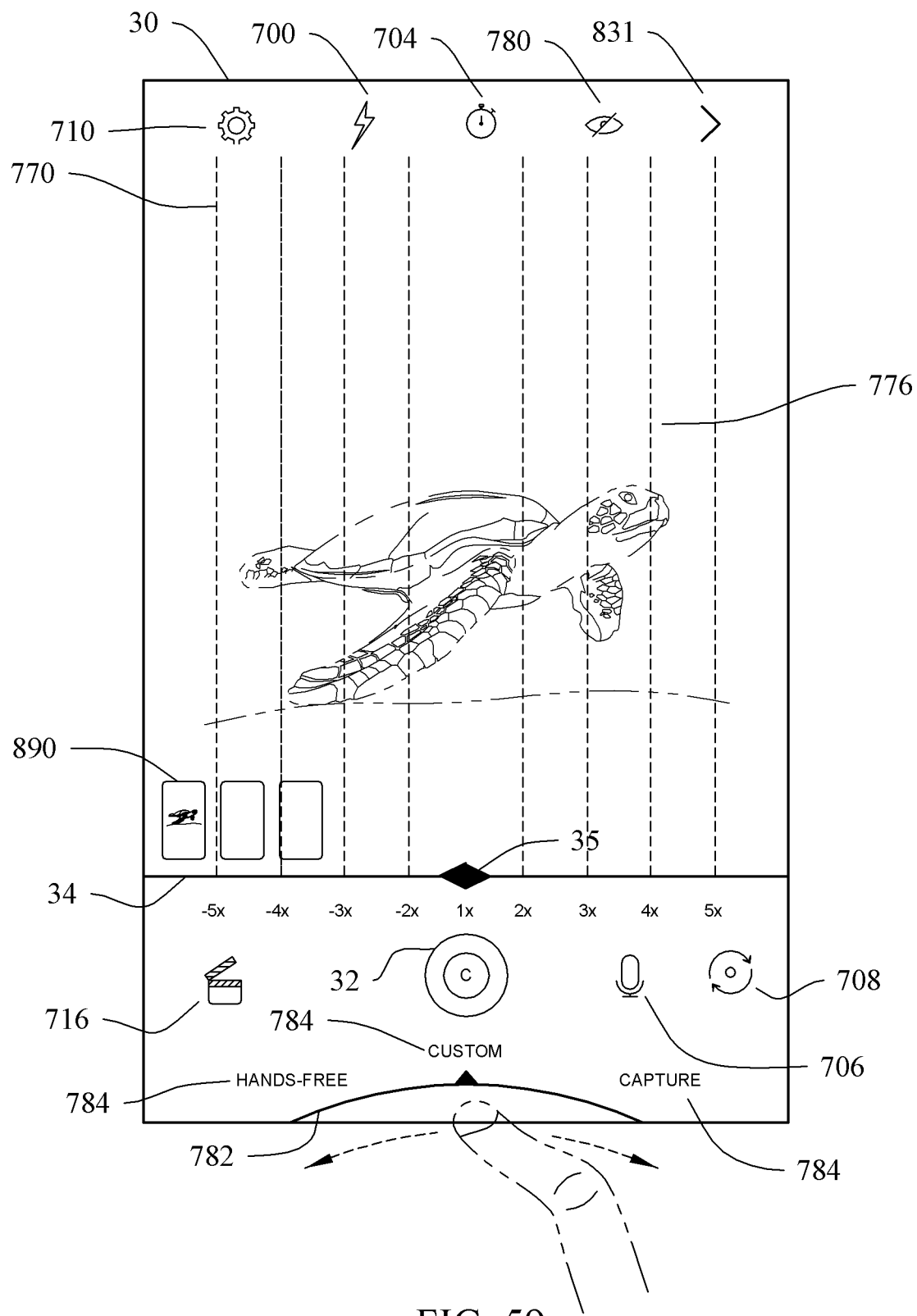
FIG. 59 is a sample GUI screenshot of a "Camera View" of the device employing the GUI with a "Custom" option selected on the selectable options bar utilizing the process and/or system of the present technology.

In the exemplary, FIG. 59 illustrates a user swiping left across the or near the selectable options bar 782, thereby changing from the "HANDS-FREE" option process to a "CUSTOM" process, with the previous "HANDS-FREE" option process and a next "CAPTURE" option process being viewable to the left and right of the selected "CUSTOM" option process 784, respectively. Accordingly, the next option process 784 either ahead of and/or behind the selected option process 784 can be displayed and viewable to the user.

When the "CUSTOM" option process 784 is in the selected position on the selectable options bar 782, a next ">" affordance 831 can be displayed and activated (e.g. via a tap gesture) to proceed to the "Editing View" or "Review Screen" of the "CUSTOM" operation process, after a predetermined number of images have been captured by activating (e.g. via a tap gesture) the recording start/stop control 32.

In the "Camera View" of the "CUSTOM" option process, the recording operation can be operated by a one touch taping gesture or a touch and holding gesture of the recording start/stop control 32, as previously described. During the recording operation, the time guidelines 770 can be displayed, and the user can tap (e.g. via a tap gesture) on the speed rate bar 34 or on the time guidelines 770, or slide the recording start/stop control 32 to change the speed rate, as previously described. The changing of the speed rate can be accomplished before the recording operation starts or during recording operation in real time. Any change in the speed rate can be displayed by a changing of a characteristic (e.g. color, line type, line weight, etc.) of the selected speed rate 34, the speed rate indicator 35 and/or time guideline 770.

This recording operation can be repeated multiple times to create multiple recordings or images, each of which can be identifiable by their one window 890 displayed in sequential order. After a sufficient or predetermined number of videos or images have been captured, the next ">" affordance 831 can be activated to proceed to the "Editing View" or "Review Screen" of the "CUSTOM" operation process, or a trash affordance can be activated to delete or remove all captured videos or images.

In the "Editing View" or "Review Screen" under the "CUSTOM" operation process, all the windows 890 can be displayed, and any or all affordances 716, 732, 736, 780, 786, 788, 790, 792, 794 can be displayed, provided to and utilized by the user for selection via the GUI 30. The video or image displayed in the display region 776 corresponds to the selected window 890. This provides multiple video or image data accessible to the user for selection, playing and altering.

In the exemplary, FIG. 60 illustrates a user swiping left across the or near the selectable options bar 782, thereby changing from the "CUSTOM" option process to a "CAPTURE" process, with the previous "CUSTOM" option process being viewable to the left of the selected "CUSTOM" option process 784. Accordingly, the next option process 784 behind the selected option process 784 can be displayed and viewable to the user.

When the "CAPTURE" option process 784 is in the selected position on the selectable options bar 782, a drawing affordance 858 can be displayed and activated (e.g. via a tap gesture) to allow free hand drawing on the video or image.

In the "Camera View" of the "CUSTOM" option process, the recording operation can be operated by a one touch taping gesture or a touch and holding gesture of the recording start/stop control 32, as previously described. With the video recording or image capturing being directed saved to memory of the device or a remote device/server. During the recording operation, the time guidelines 770 can be displayed, and the user can tap (e.g. via a tap gesture) on the speed rate bar 34 or on the time guidelines 770, or slide the recording start/stop control 32 to change the speed rate, as previously described. The changing of the speed rate can be accomplished before the recording operation starts or during recording operation in real time. Any change in the speed rate can be displayed by a changing of a characteristic (e.g. color, line type, line weight, etc.) of the selected speed rate 34, the speed rate indicator 35 and/or time guideline 770.

In the exemplary, a user can swipe left or right on the "Camera View" to access a "Tools" mode or screen, which can include a polls affordance that can be displayed and activated (e.g. via a tap gesture) to provide and/or display polling information (e.g. polling data, usage data, reviews, etc.), a "Stat" affordance that can be displayed and activated (e.g. via a tap gesture) to provide and/or display statistical data, a "Map" affordance that can be displayed and activated (e.g. via a tap gesture) to provide and/or display map information (e.g. geotag data, location data, etc.), a "Quiz" affordance that can be displayed and activated (e.g. via a tap gesture) to provide and/or display a quiz or questionnaire, and a "Follow Friday" affordance that can be displayed and activated (e.g. via a tap gesture) for recommending to the user's social media followers who they recommend to follow. The user can continue swiping left or right to return to the "Camera View" screen, or to an additional screen.

Further in the exemplary, a user can swipe left or right on the "Camera View" screen to access a "Social Media" mode or screen, which can include, but not limited to, the following selectable options including "Following", "Trending", "#'s", "Tagged", "Family", "VIP", "Featured", "Media", "Favorite" or "Custom". Selecting on any one of the options can display additional options associated with the selected option. For example, selecting the option "Following" can display the following, but not limited to, sub-options including "Snapchat", "Instagram", "Tiktok", "Youtube", "Twitter" or "Facebook". Still further, the following affordance can be displayed and activated, "Home", "Search", "Notification" or "Profile". The user can continue swiping left or right to return to the "Camera View" screen, or to an additional screen.

Further in the exemplary, in any of the "Edit View" or "Review Screen" of the GUI, a user can swipe left or right on to sequentially access image editing options for the video or image being displayed in the display region. Non-limited examples of effects options can be a "Fade" effect, a "Chrome" effect, a "Transfer effect", an "Instant" effect", a "Mono" effect, a "Noir" effect, a "Process" effect, a "Tonal" effect or a "Structure" effect.

Exemplary and/or sample GUI screenshots of design aspects of the present technology are illustrated in FIGS. 61-80. These figures show example screenshots of the present technology being utilized on the electronic device, with the phantom (dash-dot-dash) lines depicting environmental structure and forming no part of the claimed present technology or design and with the dashed (dot-dot) vertical lines representing the guidelines being part of the present technology and design. It can be appreciated by the exemplary screenshots that in some cases the design can include the guidelines visible to the user, while in other cases the guidelines are not visible. The exemplary screenshots further illustrate different arrangements of the guidelines, along with different locations of the speed selection region, the recording start/stop control affordance and the speed rate indicator.

Any or all of the embodiments of the GUI 30 can include vertically oriented time guidelines 770 that extend vertically up from each of the speed rate indicators or the speed selection region 34 displayed on the GUI 30 or the display of the device utilizing the GUI. The speed rate indicators 34 can be, but not limited to, −2×, −3×, −4×, −"n"×, 1×, 2×, 3×, 4× or "n"×. It can be appreciated that the time guidelines 770 can, in the alternative, extend horizontally across a section of the GUI 30. The time guidelines 770 can be displayed while in camera live one-touch or touch and hold recording mode (e.g. "Camera View") or in-app one-touch edit mode (e.g. "Editing View" or "Review Screen").

It can be appreciated that any of the processes, operations, effects, etc. of the present technology can be implemented to the video or image live, in real time, while the user is recording a video or capturing an image, or while the video is playing or the image is being displayed.

It can be further appreciated that a user interface can be used in place of or in combination with the GUI 30 of the present technology, and wherein the user interface can include, but not limited to, graphical user interfaces, command line or command language interfaces, natural language interfaces, menu driven interfaces, graphical user interfaces, question-and-answer interfaces, form-fill interfaces, stylus interfaces, touch-sensitive interfaces, speech recognition interfaces, batch interfaces, conversational interfaces, direct manipulation interfaces, gesture interfaces, hardware interfaces, holographic user interfaces, motion tracking interfaces, object-oriented user interfaces, permission-driven interfaces, tangible user interfaces, text-based interfaces, web-based interfaces, or zero-input interfaces.

In the alternative, it can be appreciated that the first or native speed rate of the video data can be modified or changed to the modified speed rate when a finger touches the display screen or GUI 30, and then revert from the modified speed rate to the first or native speed rate when the finger is taken off the screen, or vice versa. This operation can be accomplished by the processing unit while the video data is being played on the GUI 30 in real time utilizing any of the video modification processes described with the present technology. This operation can further be accomplished with a pointing device instead of finger touch, in that the first or native speed rate is modified or changed to the modified speed rate when the point device is activated or aimed at the display screen, and then revert to the first or native speed rate when the pointing device is deactivated or aimed away from the display screen.

Alternatively, the GUI 30 can be configured or configurable to utilize additional user feedback associated with the device implementing the present technology. This feedback can use vibration frequency and intensity, and 3D tactile to indicate the zoom, speed factors, and/or other operational factors.

In use, it can now be understood that a user could initiate a camera operation using an electronic device that includes or is operably associated with the present technology software application, or the user could initiate camera operation using present technology software application that is operably associated with the camera.

Upon operation of the present technology software application, a user interface is provided to the user for controlling the functions of the present technology software application and/or the camera.

The user can initiate a recording function of the camera using the interface, at which time the present technology software application would receive any raw video data from the camera or remote video feed, which can be associated with a microphone or a peripheral microphone(s). During this operation, the raw video data from the camera and/or microphone is diverted to the present technology software application instead of a memory unit, which would normally receive the raw data from the camera.

The interface provides a simple input from the user to control the recording speed rate of the raw video data received from the camera. For exemplary purposes, this input by the user on the interface can be movement across a portion of a touchscreen or pressure applied to a portion of the touchscreen. It can be appreciated that this input can come in a variety of forms such as, but not limited to, movement of a cursor, voice commands, activation of icons, operation of switches or buttons, on-screen gestures, infrasonic devices, and the like.

If the user does not provide input to change the speed rate, then the raw video data from the camera is displayed and is written to memory.

Alternatively, if the user does provide input to change the speed rate, then the raw video data is processed using the present technology software application and its associated algorithms in real time. The raw video data includes one or more frames, and these frames processed to create in a final video data stream that corresponds to the speed rate inputted by the user.

This is accomplished utilizing the present technology software application to create a modified video data stream. This modified video data stream can be created by dropping specifically identified frames from the raw video data or adding frames to the raw video data by copying specially identified frames and adding these copied frames adjacent to their original frame or by "frame blending", which interpolates one or more frames in between two reference frames. The number of dropped frames or added frames can be determined and repeated by the present technology software application until the desired speed rate is achieved.

The present technology software application can then write the raw video data or the modified video data stream to memory, thereby providing to be displayed a video in a normal speed rate, a fast motion speed rate or a slow motion speed rate.

It can be appreciated that the speed rate of the video is not modified after writing to memory, thereby recording the video in real time with or without special effects and omitting the need for postproduction editing to change the video speed rate.

The present technology can be configured or configurable so that the algorithm creates a smoother time modification of the video data stream. For example, the algorithm could fill in video gaps when the user jumps from one speed to another. The algorithm can interpolate data between two or more data points, thus creating even more smoothness, for example, when going from −3× slow to 4× fast.

During playback, the video can be very abrupt. This can be algorithmically corrected to smooth out the video to enhance the viewer's experience with perceived higher resolution during the transition into the beginning of each special effect, during each special effect and the transition from the special effect to normal time—occurring while the user is moving around and panning the camera as a user would need while capturing special moments (peak moments) in an active sporting event.

An example of "Peak moment" is when an object being videoed jumps, it is the instant where there is no more upward momentum, but the person has not yet begun to fall. Artificial intelligence (AI) can be utilized to calculate "peak moment" of the action in a scene being recorded, and take a predetermined desired action, such as using slow motion slightly before and slightly after the "peak moment".

The present technology can be embedded to any camera device, such as action cameras like GoPro®, DSLR's, mirrorless cameras, Pro Level video gear, gimbals, tripods, on the camera and remotely triggered flash lighting, eye glass cameras, drones, webcams. The present technology can be embedded into remote controls and connected through Bluetooth® or other protocols, to existing electronic gear that does not have the present technology embedded.

The user interface of the present technology can be represented in 3-D or 2-D. The user can slide a finger or stylus side to side on the touchscreen of the electronic device in one plane of motion. With a 3-D user interface, the electronic device can sense the changes in depth of the user's controllers, the amount of pressure the user is applying, and adjust the special effects appropriately. Joysticks can be employed and utilized with the present technology.

The user interface could be pressure sensitive so that the user could press harder or softer on the device and the device would interpret these as controls to modify the playback speed with the fast forward and slow motion special effects.

The present technology can allow for recording at sufficiently high frames per seconds with the resulting "raw" unedited video (recorded with no special effects applied) can be edited post recording, and the slow motions will remain smooth because the high recording frame rate supports it relative to a slower playback fps.

It can be appreciated that brainwave sensing devices, implanted or surface attachment, or wireless remote sensing, can be utilized with the present technology to directly control the time speed special effects with a thought.

Compression technology can be utilized with the present technology to improve recording at even higher frame rate to record finer details in the scenery and reduce file size. Device performance can improve and users can therefore record at even higher frame rate to record finer details in the scenery while reducing the file size.

Audio processing algorithms can be utilized with the present technology to give the clearest and most understandable audios to the videos during segments where the scene speeds up and slows down. 3rd party API's from companies such as Dolby Labs, DTS, Inc., Fraunhofer Institut, Philips, Technicolor, IMAX, Sony, and others can be utilized to perform the audio processing.

Data encryption algorithms can be utilized with the present technology to provide secure transmission and storage of the videos.

Cryptography and blockchain technology algorithms can be utilized with the present technology to create a distributed ledger to record the original content creator of the videos produced with the present technology. The videos can be accessed by requiring cryptographic tokens to be "redeemed" for access permission.

It should be understood that the particular order in which the operations in the figures have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method described above with respect to the figures.

For situations in which the systems, interfaces and/or methods discussed above collect information about users, the users may be provided with an opportunity to opt in/out of programs or features that may collect personal information (e.g., information about a user's preferences or usage of a smart device, biometric data, and environmental data such as location). In addition, in some or all implementations, certain data may be anonymized in one or more ways before it is stored or used, so that personally identifiable information is removed. For example, a user's identity may be made anonymous so that the personally identifiable information cannot be determined for or associated with the user, and so that user preferences or user interactions are generalized (for example, generalized based on user demographics) rather than associated with a particular user. Data encryption can also be utilized and "tokenized" access using the blockchain technology can also be utilized to further obfuscate the user's identity.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, middleware, software, API's or any combination thereof.

While embodiments of the real time video special effects system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above described. And although creating special effects in video recordings while recording is in progress have been described, it should be appreciated that the real time video special effects system and method herein described is also suitable for change frame attributes, change record frame rate, change playback frame rate, and time compression and expansion and other real-time special effects associated with any data stream in real time.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. An interface system utilizable with controlling a special effects operation of video data, the system comprising:
    an electronic device including at least one processing unit in operable communication with a display and at least one memory; and
    a user interface associated with the electronic device and displayable on the electronic device, the user interface comprising:
        a display region, and one or more affordances configured or configurable to provide an input utilizable in changing a speed rate of video data;
        one or more guidelines displayable in the display region; and
        a finger guideline displayable in the display region when a finger touches the display;
        wherein at least one of the guidelines and the finger guideline including a parameter associated with the input,
        wherein at least one of the one or more affordances is a speed rate affordance associated with changing the speed rate of the video data, and wherein at least one of the guidelines displayed on the user interface is activated, modified or deactivated automatically based on a distance between the speed rate affordance and one or more speed rate indicators displayed on the user interface.

2. The system of claim 1, wherein the guidelines are displayed upon activation of at least one of the one or more affordances or while at least one of the one or more affordances is in an activated state.

3. The system of claim 1, wherein the guidelines are not displayed upon deactivation of at least one of the one or more affordances or while at least one of the one or more affordances is in a deactivated state.

4. The system of claim 1, wherein the parameter being selected from the group consisting of any one or any combination of color, pattern, length, thickness, flashing, brightness, shape, orientation, and display time.

5. The system of claim 1, wherein the guidelines are vertically oriented in the display region with each of the guidelines extending from or being associated with the speed rate indicator displayed on the user interface, and wherein the finger guideline is vertically oriented in the display region from a point of contact of the finger on the display.

6. The system of claim 1, wherein the guidelines are multiple guidelines, and a color of at least one of the guidelines is changed to a different color to that of at least one other of the guidelines based in part on the input.

7. The system of claim 1, wherein the speed rate affordance or at least one of the guidelines on the user interface is activated, modified or deactivated based on a touch input on the display.

8. The system of claim 1, wherein the input being associated with a gesture on the display of the electronic device, the gesture being selected from the group consisting of any one or any combination of a tap, a multiple tap, a touch holding, a sliding, a pinch, and a touch holding and sliding.

9. The system of claim 1, wherein a video playing speed of the video data is changed from a first speed rate to a modified playing speed rate in response to the input, and wherein changing of the video playing speed is accomplished by the processing unit of the electronic device or a remote processing unit of a remote device in communication with the processing unit of the electronic device.

10. The system of claim 1, wherein the speed rate of the video data is changed from a first speed rate to a modified speed rate when the finger touches the display, and then revert from the modified speed rate to the first speed rate when the finger is removed from the display.

11. The system of claim 1, wherein the speed rate of the video data is changed from a first speed rate to a modified speed rate upon a first finger tap on the display, and then revert from the modified speed rate to the first speed rate upon a second finger tap on the display.

12. The system of claim 1, wherein at least one of the affordances is movable on the user interface to provide a movable affordance.

13. The system of claim 12, wherein the movable affordance is configured or configurable in determining a change in zoom factor of the video data based on vertical movement of the movable affordance on the user interface.

14. The system of claim 12, wherein the movable affordance is the speed rate affordance associated with changing the speed rate of the video data.

15. The system of claim 1, wherein the one or more affordances includes a slide bar associated with changing the speed rate of the video data.

16. The system of claim 1, wherein the processing unit receives the video data in real time from a camera.

17. The system of claim 1, wherein the speed rate is a recording speed rate while the video data is being recording by the electronic device.

18. A non-transitory computer readable medium with an executable program stored thereon comprising instructions for execution by at least one processing unit for controlling a special effects operation of video data, such that the instructions when executed by the at least one processing unit causes the at least one processing unit to:
- display video data on a user interface displayed on a display of an electronic device;
- receive, by the processing unit, an input from an affordance of the user interface upon activation of the affordance by a user, the input being utilizable in changing a speed rate of the video data, the user interface being executable by the at least one processing unit and displayable on the display;
- display on the user interface one or more guidelines;
- display on the user interface a finger guideline when a finger touches the display; and
- activate, modify or deactivate at least one of the guidelines on the user interface based on a distance between the affordance and one or more speed rate indicators displayed on the user interface, and wherein the affordance is a speed rate affordance associated with changing the speed rate of the video data;
- wherein at least one of the guidelines and the finger guideline including a parameter associated with the input.

19. The non-transitory computer readable medium of claim 18, wherein the processing unit is further caused to:
- modify, by the processing unit, the video data to create modified video data at a modified speed rate that is different to a first speed rate of the video data; and
- change, by the at least one processing unit, a playing speed of the video data being displayed on the user interface from the first speed rate to the modified speed rate based in part on the input.

20. The non-transitory computer readable medium of claim 18, wherein the processing unit is further caused to display the guidelines upon activation of the affordance or while the affordance is in an activated state.

21. The non-transitory computer readable medium of claim 18, wherein the processing unit is further caused to not display the guidelines upon deactivation of the affordance or while the affordance is in a deactivated state.

22. The non-transitory computer readable medium of claim 18, wherein the parameter being selected from the group consisting of any one or any combination of color, pattern, length, thickness, flashing, brightness, shape, orientation, and display time.

23. The non-transitory computer readable medium of claim 18, wherein the guidelines are vertically oriented in a display region of the user interface, with each of the guidelines extending from or being associated with the speed rate indicator displayed on the user interface, and wherein the finger guideline is vertically oriented in the display region from a point of contact of the finger on the display.

24. The non-transitory computer readable medium of claim 18, wherein the guidelines are multiple guidelines, and wherein the processing unit is further caused to change a color of at least one of at least one of the guidelines to a different color to that of at least one other of the guidelines based in part on the input.

25. The non-transitory computer readable medium of claim 18, wherein the processing unit is further caused to activate, modify or deactivate at least one of the guidelines or the speed rate affordance on the user interface based on a touch input on the display.

26. The non-transitory computer readable medium of claim 18, wherein the input being associated with a gesture on the display of the electronic device, the gesture being selected from the group consisting of any one or any combination of a tap, a multiple tap, a touch holding, a sliding, a pinch, and a touch holding and sliding.

27. The non-transitory computer readable medium of claim 18, wherein the processing unit is incorporated in the electronic device or is incorporated in a remote device in communication with the processing unit of the electronic device.

28. The non-transitory computer readable medium of claim 18, wherein the processing unit is further caused to change the speed rate of the video data from a first speed rate to a modified speed rate when the finger touches the display, and then revert from the modified speed rate to the first speed rate when the finger is removed from the display.

29. The non-transitory computer readable medium of claim 18, wherein the processing unit is further caused to change the speed rate from a first speed rate to a modified speed rate upon a first finger tap on the display, and then revert from the modified speed rate to the first speed rate upon a second finger tap on the display.

30. The non-transitory computer readable medium of claim 18, wherein at least one of the affordances is movable on the user interface to provide a movable affordance.

31. The non-transitory computer readable medium of claim 30, wherein the processing unit is further caused to change a zoom factor of the video data based on vertical movement of the movable affordance on the user interface.

32. The non-transitory computer readable medium of claim 18, wherein the affordance includes a slide bar associated with changing the speed rate of the video data.

33. The non-transitory computer readable medium of claim 18, wherein the processing unit receives the video data in real time from a camera.

34. The non-transitory computer readable medium of claim 18, wherein the speed rate is a recording speed rate while the video data is being recording by the electronic device.

35. A method for controlling a special effects operation of video data, the method comprising the steps of:
a) displaying a user interface including a speed rate affordance on a display operably associated with an electronic device including at least one processing unit and at least one memory in operable communication with the processing unit;
b) receiving, by the processing unit, an input associated with the speed rate affordance based upon activation by a user, the input being associated with changing a speed rate of video data;
c) displaying, by the processing unit, output video data to the display;

d) displaying one or more guidelines on the graphical user interface;
e) displaying a finger guideline on the graphical user interface when a finger touches the display; and
f) activating, modifying or deactivating at least one of the guidelines on the user interface based on a distance between the speed rate affordance and one or more speed rate indicators displayed on the user interface;
wherein at least one of the guidelines and the finger guideline including a parameter associated with the input.

36. The method of claim 35, wherein the guidelines are displayed upon activation of the speed rate affordance or while the speed rate affordance is in an activated state.

37. The method of claim 35, wherein the guidelines are not displayed upon deactivation of the speed rate affordance or while the speed rate affordance is in a deactivated state.

38. The method of claim 35, wherein the parameter being selected from the group consisting of any one or any combination of color, pattern, length, thickness, flashing, brightness, shape, orientation, and display time.

39. The method of claim 35, wherein the guidelines are vertically oriented in a display region of the user interface, with each of the guidelines extending from or being associated with at least one of the speed rate indicators displayed on the user interface, and wherein the finger guideline is vertically oriented in the display region from a point of contact of the finger on the display.

40. The method of claim 35 further comprising activating, modifying or deactivating at least one of the guidelines or the speed rate affordance on the user interface based on a touch input on the display.

41. The method of claim 35, wherein the input being associated with a gesture on the display of the electronic device, the gesture being selected from the group consisting of any one or any combination of a tap, a multiple tap, a touch holding, a sliding, a pinch, and a touch holding and sliding.

42. The method of claim 35, wherein the processing unit is incorporated in the electronic device or is incorporated in a remote device in communication with the processing unit of the electronic device.

43. The method of claim 35 further comprising the step of changing the speed rate of the video data from a first speed rate to a modified speed rate when the finger touches the display, and then revert from the modified speed rate to the first speed rate when the finger is removed from the display.

44. The method of claim 35 further comprising the step of changing the speed rate from a first speed rate to a modified speed rate upon a first finger tap on the display, and then revert from the modified speed rate to the first speed rate upon a second finger tap on the display.

45. The method of claim 35, wherein the speed rate affordance is movable on the user interface to provide a movable speed rate affordance.

46. The method of claim 45 further comprising the step of changing a zoom factor of the video data based on vertical movement of the movable speed rate affordance on the user interface.

47. The method of claim 35, wherein the user interface includes a slide bar associated with changing the speed rate of the video data.

48. The method of claim 35, wherein the processing unit receives the video data in real time from a camera.

49. The method of claim 35, wherein the speed rate is a recording speed rate while the video data is being recording by the electronic device.

50. An interface system utilizable with controlling a special effects operation of video data, the system comprising:
an electronic device including at least one processing unit in operable communication with a display and at least one memory; and
a user interface associated with the electronic device and displayable on the electronic device, the user interface comprising:
a display region, and one or more affordances configured or configurable to provide an input utilizable in changing a speed rate of video data; and
one or more guidelines displayable in the display region, at least one of the guidelines including a parameter associated with the input;
wherein the one or more guidelines are each a vertical linear line extending across the display region,
wherein at least one of the one or more affordances is a speed rate affordance associated with changing the speed rate of the video data, and wherein at least one of the guidelines displayed on the user interface is activated, modified or deactivated automatically based on a distance between the speed rate affordance and one or more speed rate indicators displayed on the user interface.

51. An interface system utilizable with controlling a special effects operation of video data, the system comprising:
an electronic device including at least one processing unit in operable communication with a display and at least one memory; and
a user interface associated with the electronic device and displayable on the electronic device, the user interface comprising:
a display region, and one or more affordances configured or configurable to provide an input utilizable in changing a speed rate of video data, wherein at least one of the affordances is movable on the user interface to provide a movable affordance; and
one or more guidelines displayable in the display region, at least one of the guidelines including a parameter associated with the input;
wherein the movable affordance is configured or configurable in determining a change in zoom factor of the video data based on vertical movement of the movable affordance on the user interface and configured or configurable in changing the speed rate of the video data based on horizontal movement of the movable affordance on the user interface.

52. An interface system utilizable with controlling a special effects operation of video data, the system comprising:
an electronic device including at least one processing unit in operable communication with a display and at least one memory; and
a user interface associated with the electronic device and displayable on the electronic device, the user interface comprising:
a display region, and one or more affordances configured or configurable to provide an input utilizable in changing a speed rate of video data; and
one or more guidelines displayable in the display region, at least one of the guidelines including a parameter associated with the input;
wherein at least one of the one or more affordances is a speed rate affordance associated with changing the speed rate of the video data, and wherein at least one of the guidelines displayed on the user interface is activated, modified or deactivated automatically based on a distance between the speed rate affordance with one or more speed rate indicators displayed on the user interface.

53. An interface system utilizable with controlling a special effects operation of video data, the system comprising:
    an electronic device including at least one processing unit in operable communication with a display and at least one memory; and
    a user interface associated with the electronic device and displayable on the electronic device, the user interface comprising:
        a display region, and one or more affordances configured or configurable to provide an input utilizable in changing a speed rate of video data; and
        one or more guidelines displayable in the display region, at least one of the guidelines including a parameter associated with the input;
    wherein the speed rate of the video data is changed from a first speed rate to a modified speed rate when the finger touches the display, and then revert from the modified speed rate to the first speed rate when the finger is removed from the display,
    wherein at least one of the one or more affordances is a speed rate affordance associated with changing the speed rate of the video data, and wherein at least one of the guidelines displayed on the user interface is activated, modified or deactivated automatically based on a distance between the speed rate affordance and one or more speed rate indicators displayed on the user interface.

* * * * *